US005576954A

United States Patent [19]

Driscoll

[11] Patent Number: 5,576,954

[45] Date of Patent: Nov. 19, 1996

[54] PROCESS FOR DETERMINATION OF TEXT RELEVANCY

[75] Inventor: Jim Driscoll, Orlando, Fla.

[73] Assignee: University of Central Florida, Orlando, Fla.

[21] Appl. No.: 148,688

[22] Filed: Nov. 5, 1993

[51] Int. Cl.[6] .................... G06F 17/30

[52] U.S. Cl. .................... 395/603; 395/759; 395/793

[58] Field of Search .................... 364/419.13, 419.19, 364/419.1, 419.11

[56] References Cited

U.S. PATENT DOCUMENTS

| | | | |
|---|---|---|---|
| 4,823,306 | 4/1989 | Barbic et al. . | |
| 4,849,898 | 7/1989 | Adi . | |
| 4,942,526 | 7/1990 | Okajima et al. . | |
| 5,020,019 | 5/1991 | Ogawa . | |
| 5,056,021 | 10/1991 | Ausborn . | |
| 5,140,692 | 8/1992 | Morita | 395/600 |
| 5,159,667 | 10/1992 | Borrey et al. . | |
| 5,243,520 | 9/1993 | Jacobs et al. | 364/419.08 |
| 5,263,159 | 11/1993 | Mitsui | 395/600 |
| 5,278,980 | 1/1994 | Pederson et al. | 395/600 |
| 5,418,717 | 5/1995 | Su et al. | 364/419.08 |

OTHER PUBLICATIONS

Lopez de Mantaras et al., "Knowledge engineering for a document retrieval system," *Fuzzy Information and Database Systems,* Nov. 1990, v38, n2, pp. 223–240.

Glavitsh et al., "Speech Retrieval in a Multimedia System," Elvesier Science Publishers, copyright 1992, pp. 295–298.

Mulder, "TextWise's plain–speaking software may repave information highway," *Syracuse Herald American,* Oct. 39, 1994, 2 pages.

Pritchard–Schoch, "Natural language comes of age," *Online,* v17, n3, May 1993, pp. 33–43 (renumbered Jan. 17).

Rich et al., "Semantic Analysis," *Artificial Intelligence,* Chapter 15.3, copyright 1991, pp. 397–414.

Dialog Abstract—Driscoll et al., "The QA System," *Text Retrieval Conference,* Nov. 4–6, 1992, one page.

Dialog Abstract—Driscoll et al. conference papers, 1991, 1992, three pages.

Dialog Abstract—Doyle, "Some Compromises Between Word Grouping and Document Grouping," System Development Corporation, journal announcement, Mar. 1964, 24 pages.

Dialog Abstract—Marshakova, "Document classification on a lexical basis (keyword based)," *Nauchno Teknicheskaya Informatsiya* (Russian journal), Seriya 2, No. 5, 1974, pp. 3–10.

(List continued on next page.)

*Primary Examiner*—Robert A. Weinhardt
*Assistant Examiner*—Jennifer L. Dixon
*Attorney, Agent, or Firm*—Brian S. Steinberger

[57] ABSTRACT

This is a procedure for determining text relevancy and can be used to enhance the retrieval of text documents by search queries. This system helps a user intelligently and rapidly locate information found in large textual databases. A first embodiment determines the common meanings between each word in the query and each word in the document. Then an adjustment is made for words in the query that are not in the documents. Further, weights are calculated for both the semantic components in the query and the semantic components in the documents. These weights are multiplied together, and their products are subsequently added to one another to determine a real value number (similarity coefficient) for each document. Finally, the documents are sorted in sequential order according to their real value number from largest to smallest value. Another, embodiment is for routing documents to topics/headings (sometimes referred to as filtering). Here, the importance of each word in both topics and documents are calculated. Then, the real value number (similarity coefficient) for each document is determined. Then each document is routed one at a time according to their respective real value numbers to one or more topics. Finally, once the documents are located with their topics, the documents can be sorted. This system can be used to search and route all kinds of document collections, such as collections of legal documents, medical documents, news stories, and patents.

9 Claims, 14 Drawing Sheets

OTHER PUBLICATIONS

Dialog Abstract—Glavitsch et al., "Speech retrieval in a multimedia system," *Proceedings of EUSIPCO–92, Sixth European Signal Processing Conference,* vol. 1, Aug. 24–27, 1992, pp. 295–298.

Dialog Abstract—Cagan, "automatic probabilistic document retrieval system," *Dissertation:* Washington State University, 243 pages.

Dialog Abstract—De Mantaras et al., "Knowledge engineering for a document retrieval system," *Fuzzy Sets and Systems,* v38, n2, Nov. 20, 1990, pp. 223–240.

Dialog Abstract—Dunlap et al., "Integration of user profiles into the p–norm retrieval model," *Canadian Journal of Information Science,* v15, n1, Apr. 1990, pp. 1–20.

Dialog Target Feature Description and "How–To" Guide, Nov. 1993 and Dec. 1993, reprectively, 19 pages.

Driscoll et al., Text Retrieval Using a Comprehensive Semantic Lexicon, Proceedings of ISMM Interantional Conference, Nov. 8–11, 1992, pp. 120–129.

Driscoll et al., The QA System: The First Text Retrieval Conference (TREC–1), NIST Special Publication 500–207, Mar., 1993, pp. 199–207.

Fig. 1

| | Thematic Role Categories |
|---|---|
| 1 | TACM Accompaniment |
| 2 | TAMT Amount |
| 3 | TBNF Beneficiary |
| 4 | TCSE Cause |
| 5 | TCND Condition |
| 6 | TCMP Comparison |
| 7 | TCNV Conveyance |
| 8 | TDGR Degree |
| 9 | TDST Destination |
| 10 | TDUR Duration |
| 11 | TGOL Goal |
| 12 | TINS Instrument |
| 13 | TSPL Location/Space |
| 14 | TMAN Manner |
| 15 | TMNS Means |
| 16 | TPUR Purpose |
| 17 | TRNG Range |
| 18 | TRES Result |
| 19 | TSRC Source |
| 20 | TTIM Time |

| | Attribute Categories |
|---|---|
| 21 | ACOL Color |
| 22 | AEID External and Internal Dimensions |
| 23 | AFRM Form |
| 24 | AGND Gender |
| 25 | AGDM General Dimensions |
| 26 | ALDM Linear Dimensions |
| 27 | AMFR Motion Conjoined with Force |
| 28 | AGMT Motion in General |
| 29 | AMDR Motion with Reference to Direction |
| 30 | AORD Order |
| 31 | APHP Physical Properties |
| 32 | APOS Position |
| 33 | ASTE State |
| 34 | ATMP Temperature |
| 35 | AUSE Use |
| 36 | AVAR Variation |

Fig. 2 Document Sorting Using Text Relevancy Determination Procedure
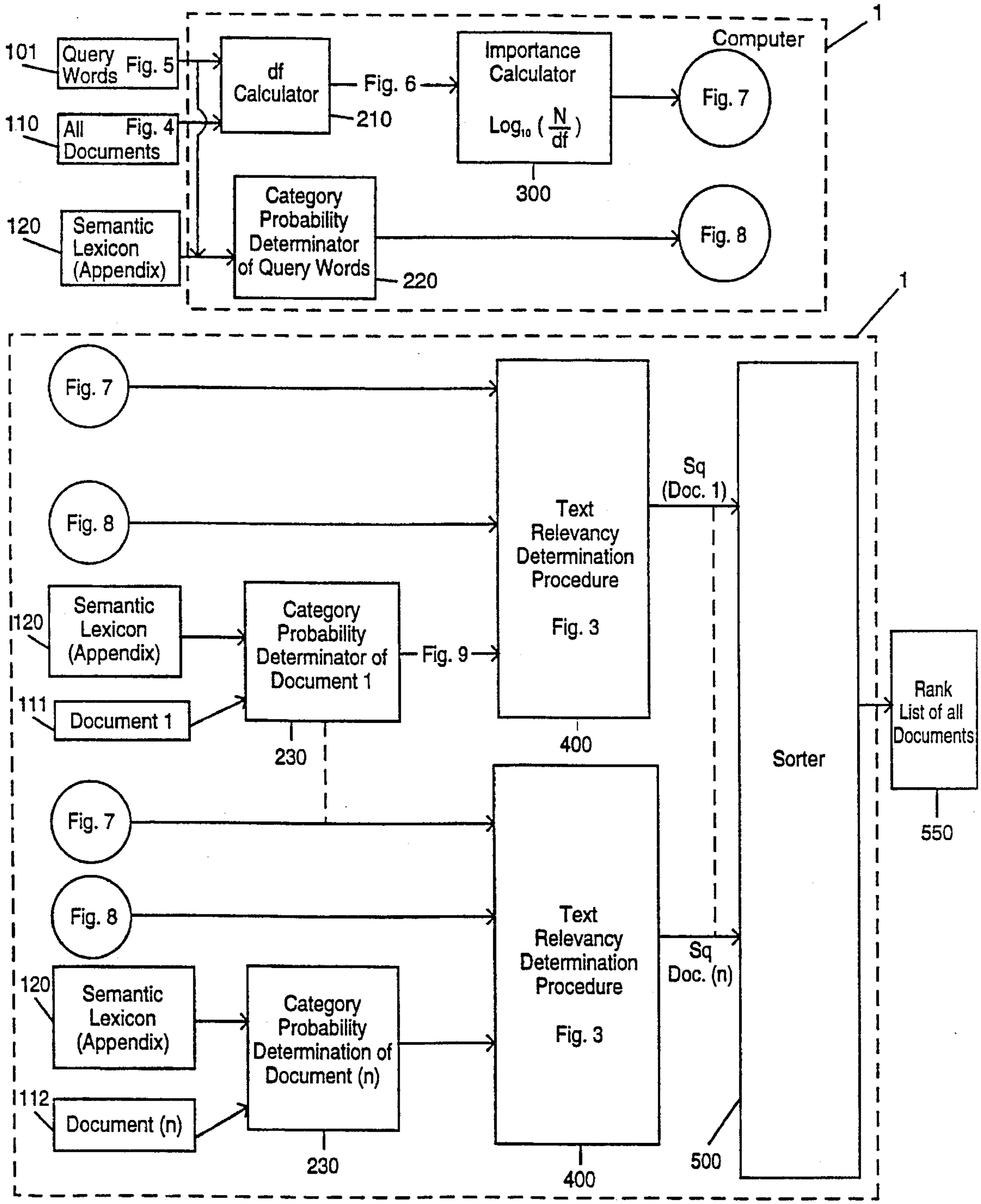

Fig. 4

Document #1

Locomotives pull the trains.

Document #2

People meet people under the canopy and within trains.

Document #3

Trains carry freight from the station.

Document #4

Trains leave the station hourly until noon.

Fig. 5

Query

When do the trains depart the station?

Fig. 6

| word | number of documents the word is in (*df*) |
|---|---|
| and | 1 |
| canopy | 1 |
| carry | 1 |
| do | 0 |
| depart | 0 |
| freight | 1 |
| from | 1 |
| hourly | 1 |
| leave | 1 |
| locomotives | 1 |
| meet | 1 |
| noon | 1 |
| people | 1 |
| pull | 1 |
| station | 2 |
| the | 4 |
| trains | 4 |
| under | 1 |
| until | 1 |
| when | 0 |
| within | 1 |

Fig. 7

| word | importance of the word $\log_{10} \frac{n}{df}$ |
|---|---|
| and | .6 |
| canopy | .6 |
| carry | .6 |
| depart | undefined |
| do | undefined |
| freight | .6 |
| from | .6 |
| hourly | .6 |
| leave | .6 |
| locomotives | .6 |
| meet | .6 |
| noon | .6 |
| people | .6 |
| pull | .6 |
| station | .3 |
| the | 0 |
| trains | 0 |
| under | .6 |
| until | .6 |
| when | undefined |
| within | .6 |

Fig. 8

| word | frequency | category | probability |
| --- | --- | --- | --- |
| depart | 1 | AMDR | 1/4 |
| | | TAMT | 1/8 |
| do | 1 | AUSE | 1/21 |
| | | ATMP | 1/21 |
| | | TCSE | 1/21 |
| | | TCNV | 2/21 |
| | | TRES | 1/21 |
| | | TSRC | 1/21 |
| station | 1 | APOS | 3/16 |
| | | AORD | 1/8 |
| | | TAMT | 1/16 |
| | | TCND | 1/8 |
| | | TDGR | 1/16 |
| | | TSPL | 3/16 |
| the | 1 | ---- | ---- |
| trains | 1 | AORD | 7/24 |
| | | AMDR | 1/12 |
| | | AMFR | 1/12 |
| | | TACM | 1/24 |
| | | TCNV | 1/12 |
| when | 1 | TAMT | 1/3 |
| | | TTIM | 2/3 |

Fig. 9

| word | frequency | category | probability |
|---|---|---|---|
| hourly | 1 | TTIM | 1.0 |
| leave | 1 | AMDR<br>TAMT | 1/7<br>1/7 |
| noon | 1 | ALDM<br>TTIM | 1/3<br>2/3 |
| the | 1 | ---- | ---- |
| station | 1 | APOS<br>AORD<br>TAMT<br>TCNP<br>TDGR<br>TSPL | 3/16<br>1/8<br>1/16<br>1/8<br>1/16<br>3/16 |
| trains | 1 | AORD<br>AMDR<br>AMFR<br>TACM<br>TCNV | 7/24<br>1/12<br>1/12<br>1/24<br>1/12 |
| until | 1 | TTIM | 1.0 |

Fig. 10

Output of Step 1

First List

| Item Number | First Entry Word & Frequency in Query | Second Entry Word & Frequency in Document #4 | Third Entry Category |
|---|---|---|---|
| 1 | (depart,1) | (leave,1) | AMDR |
| 2 | (depart,1) | (trains,1) | AMDR |
| 3 | (depart,1) | (leave,1) | TAMT |
| 4 | (depart,1) | (station,1) | TAMT |
| 5 | (do,1) | (trains,1) | TCNV |
| 6 | (station,1) | (station,1) | APOS |
| 7 | (station,1) | (station,1) | AORD |
| 8 | (station,1) | (trains,1) | AORD |
| 9 | (station,1) | (leave,1) | TAMT |
| 10 | (station,1) | (station,1) | TAMT |
| 11 | (station,1) | (station,1) | TCND |
| 12 | (station,1) | (station,1) | TDGR |
| 13 | (station,1) | (station,1) | TSPL |
| 14 | (the,1) | (the,1) | --- |
| 15 | (trains,1) | (trains,1) | AORD |
| 16 | (trains,1) | (leave,1) | AMDR |
| 17 | (trains,1) | (trains,1) | AMDR |
| 18 | (trains,1) | (trains,1) | AMFR |
| 19 | (trains,1) | (trains,1) | TACM |
| 20 | (trains,1) | (trains,1) | TCNV |
| 21 | (when,1) | (leave,1) | TAMT |
| 22 | (when,1) | (hourly,1) | TTIM |
| 23 | (when,1) | (noon,1) | TTIM |
| 24 | (when,1) | (until,1) | TTIM |

Fig. 11

Output of Step 2

Second List

| Item Number | First Entry Word & Frequency in Query | Second Entry Word & Frequency in Document #4 | Third Entry |
|---|---|---|---|
| 1 | (leave,1) | (leave,1) | AMDR |
| 2 | (trains,1) | (trains,1) | AMDR |
| 3 | (leave,1) | (leave,1) | TAMT |
| 4 | (station,1) | (station,1) | TAMT |
| 5 | (trains,1) | (trains,1) | TCNV |
| 6 | (station,1) | (station,1) | APOS |
| 7 | (station,1) | (station,1) | AORD |
| 8 | (station,1) | (trains,1) | AORD |
| 9 | (station,1) | (leave,1) | TAMT |
| 10 | (station,1) | (station,1) | TAMT |
| 11 | (station,1) | (station,1) | TCND |
| 12 | (station,1) | (station,1) | TDGR |
| 13 | (station,1) | (station,1) | TSPL |
| 14 | (the,1) | (the,1) | --- |
| 15 | (trains,1) | (trains,1) | AORD |
| 16 | (trains,1) | (leave,1) | AMDR |
| 17 | (trains,1) | (trains,1) | AMDR |
| 18 | (trains,1) | (trains,1) | AMFR |
| 19 | (trains,1) | (trains,1) | TACM |
| 20 | (trains,1) | (trains,1) | TCNV |
| 21 | (leave,1) | (leave,1) | TAMT |
| 22 | (hourly,1) | (hourly,1) | TTIM |
| 23 | (noon,1) | (noon,1) | TTIM |
| 24 | (until,1) | (until,1) | TTIM |

Fig. 12

Output of Step 3

Third List

| Item Number | First Entry | Second Entry |
|---|---|---|
| 1 | .6 * 1 * 1/7=.0857 | .6 * 1 * 1/7=.0857 |
| 2 | 0 * 1 * 1/12=0 | 0 * 1 * 1/12=0 |
| 3 | .6 * 1 * 1/7=.0857 | .6 * 1 * 1/7=.0857 |
| 4 | .3 * 1 * 1/16=.0188 | .3 * 1 * 1/16=.0188 |
| 5 | 0 * 1 * 1/12=0 | 0 * 1 * 1/12=0 |
| 6 | .3 * 1 * 3/16=.0563 | .3 * 1 * 3/16=.0563 |
| 7 | .3 * 1 * 7/24=.0875 | .3 * 1 * 7/24=.0875 |
| 8 | .3 * 1 * 1/8=.0375 | 0 * 1 * 7/24=0 |
| 9 | .3 * 1 * 1/16=.0188 | .6 * 1 * 1/7=.0857 |
| 10 | .3 * 1 * 1/16=.0188 | .3 * 1 * 1/16=.0188 |
| 11 | .3 * 1 * 1/8=.0375 | .3 * 1 * 1/8=.0375 |
| 12 | .3 * 1 * 1/16=.0188 | .3 * 1 * 1/16=.0188 |
| 13 | .3 * 1 * 3/16-.0563 | .3 * 1 * 3/16-.0563 |
| 14 | 0 * 1=0 | 0 * 1=0 |
| 15 | 0 * 1 * 7/24=0 | 0 * 1 * 7/24=0 |
| 16 | 0 * 1 * 1/12=0 | .6 * 1 * 1/7=.0857 |
| 17 | 0 * 1 * 1/12=0 | 0 * 1 * 1/12=0 |
| 18 | 0 * 1 * 1/12=0 | 0 * 1 * 1/12=0 |
| 19 | 0 * 1 * 1/24=0 | 0 * 1 * 1/24=0 |
| 20 | 0 * 1 * 1/12=0 | 0 * 1 * 1/12=0 |
| 21 | .6 * 1 * 1/7=.0857 | .6 * 1 * 1/7=.0857 |
| 22 | .6 * 1 * 1.0=.6000 | .6 * 1 * 1.0=.6000 |
| 23 | .6 * 1 * 2/3=.4000 | .6 * 1 * 2/3=.4000 |
| 24 | .6 * 1 * 1.0=.6000 | .6 * 1 * 1.0=.6000 |

Fig. 13

Output of Step 4

Fourth List

| Item Number | Value |
|---|---|
| 1 | .00734 |
| 2 | 0 |
| 3 | .00734 |
| 4 | .00035 |
| 5 | 0 |
| 6 | .00317 |
| 7 | .00734 |
| 8 | 0 |
| 9 | .00170 |
| 10 | .00035 |
| 11 | .00141 |
| 12 | .00035 |
| 13 | .00317 |
| 14 | 0 |
| 15 | 0 |
| 16 | 0 |
| 17 | 0 |
| 18 | 0 |
| 19 | 0 |
| 20 | 0 |
| 21 | .00734 |
| 22 | .36000 |
| 23 | .16000 |
| 24 | .36000 |

Output of Step 5

Sum of all values in Fourth List 0.91986

Algorithm for running Text Relevancy
Determination Procedure to Route Documents to Topics

PROCESS FOR DETERMINATION OF TEXT RELEVANCY

FIELD OF THE INVENTION

The invention relates generally to the field of determining text relevancy, and in particular to systems for enhancing document retrieval and document routing. This invention was developed with grant funding provided in part by NASA KSC Cooperative Agreement NCC 10-003 Project 2, for use with: (1) NASA Kennedy Space Center Public Affairs; (2) NASA KSC Smart O & M Manuals on Compact Disk Project; and (3) NASA KSC Materials Science Laboratory.

BACKGROUND AND PRIOR ART

Prior art commercial text retrieval systems which are most prevalent focus on the use of keywords to search for information. These systems typically use a Boolean combination of keywords supplied by the user to retrieve documents from a computer data base. See column 1 for example of U.S. Pat. No. 4,849,898, which is incorporated by reference. In general, the retrieved documents are not ranked in any order of importance, so every retrieved document must be examined by the user. This is a serious shortcoming when large collections of documents are searched. For example, some data base searchers start reviewing displayed documents by going through some fifty or more documents to find those most applicable. Further, Boolean search systems may necessitate that the user view several unimportant sections within a single document before the important section is viewed.

A secondary problem exists with the Boolean systems since they require that the user artificially create semantic search terms every time a search is conducted. This is a burdensome task to create a satisfactory query. Often the user will have to redo the query more than once. The time spent on this task is quite burdensome and would include expensive on-line search time to stay on the commercial data base.

Using words to represent the content of documents is a technique that also has problems of it's own. In this technique, the fact that words are ambiguous can cause documents to be retrieved that are not relevant to the search query. Further, relevant documents can exist that do not use the same words as those provided in the query. Using semantics addresses these concerns and can improve retrieval performance. Prior art has focussed on processes for disambiguation. In these processes, the various meanings of words (also referred to as senses) are pruned (reduced) with the hope that the remaining meanings of words will be the correct one. An example of well known pruning processes is U.S. Pat. No. 5,056,021 which is incorporated by reference.

However, the pruning processes used in disambiguation cause inherent problems of their own. For example, the correct common meaning may not be selected in these processes. Further, the problems become worse when two separate sequences of words are compared to each other to determine the similarity between the two. If each sequence is disambiguated, the correct common meaning between the two may get eliminated.

Accordingly, an object of the invention is to provide a novel and useful procedure that uses the meanings of words to determine the similarity between separate sequences of words without the risk of eliminating common meanings between these sequences.

SUMMARY OF THE INVENTION

It is accordingly an object of the instant invention to provide a system for enhancing document retrieval by determining text relevancy, An object of this invention is to be able to use natural language input as a search query without having to create synonyms for each search query, Another object of this invention is to reduce the number of documents that must be read in a search for answering a search query.

A first embodiment determines common meanings between each word in the query and each word in a document. Then an adjustment is made for words in the query that are not in the documents. Further, weights are calculated for both the semantic components in the query and the semantic components in the documents. These weights are multiplied together, and their products are subsequently added to one another to determine a real value number (similarity coefficient) for each document. Finally, the documents are sorted in sequential order according to their real value number from largest to smallest value.

A second preferred embodiment is for routing documents to topics/headings (sometimes referred to as filtering). Here, the importance of each word in both topics and documents are calculated. Then, the real value number(similarity coefficient) for each document is determined. Then each document is routed one at a time according to their respective real value numbers to one or more topics. Finally, once the documents are located with their topics, the documents can be sorted.

This system can be used on all kinds of document collections, such as but not limited to collections of legal documents, medical documents, news stories, and patents.

Further objects and advantages of this invention will be apparent from the following detailed description of preferred embodiments which are illustrated schematically in the accompanying drawings.

BRIEF DESCRIPTION OF THE FIGURES

FIG. 1 illustrates the 36 semantic categories used in the semantic lexicon of the preferred embodiment and their respective abbreviations.

FIG. 2 illustrates the first preferred embodiment of inputting a word query to determine document ranking using a text relevancy determination procedure for each document.

FIG. 4 shows an example of 4 documents that are to be ranked by the procedures of FIG. 2 and 3.

FIG. 5 shows the natural word query example used for searching the documents of FIG. 4.

FIG. 6 shows a list of words in the 4 documents of FIG. 4 and the query of FIG. 5 along with the df value for the number of documents each word is in.

FIG. 7 illustrates a list of words in the 4 documents of FIG. 4 and the query of FIG. 5 along with the importance of each word.

FIG. 8 shows an alphabetized list of unique words from the query of FIG. 5; the frequency of each word in the query; and the semantic categories and probability each word triggers.

FIG. 9 is an alphabetized list of unique words from Document #4 of FIG. 4; and the semantic categories and probability each word triggers.

FIG. 10 is an output of the first step (Step 1) of the text relevancy determination procedure of FIG. 3 which determines the common meaning based on one of the 36 categories of FIG. 1 between words in the query and words in document #4.

FIG. 11 illustrates an output of the second step (Step 2) of the text relevancy determination procedure of FIG. 3 which allows for an adjustment for words in the query that are not in any of the documents.

FIG. 12 shows an output of the third step (Step 3) of the procedure of FIG. 3 which shows calculating the weight of a semantic component in the query and calculating the weight of a semantic component in the document.

FIG. 13 shows the output of fourth step (Step 4) of the procedure depicted in FIG. 3 which are the products caused by multiplying the weight in the query by the weight in the document, and which are then summed up in Step 5 and outputted to Step 6.

DESCRIPTION OF THE PREFERRED EMBODIMENT

Figure 3:
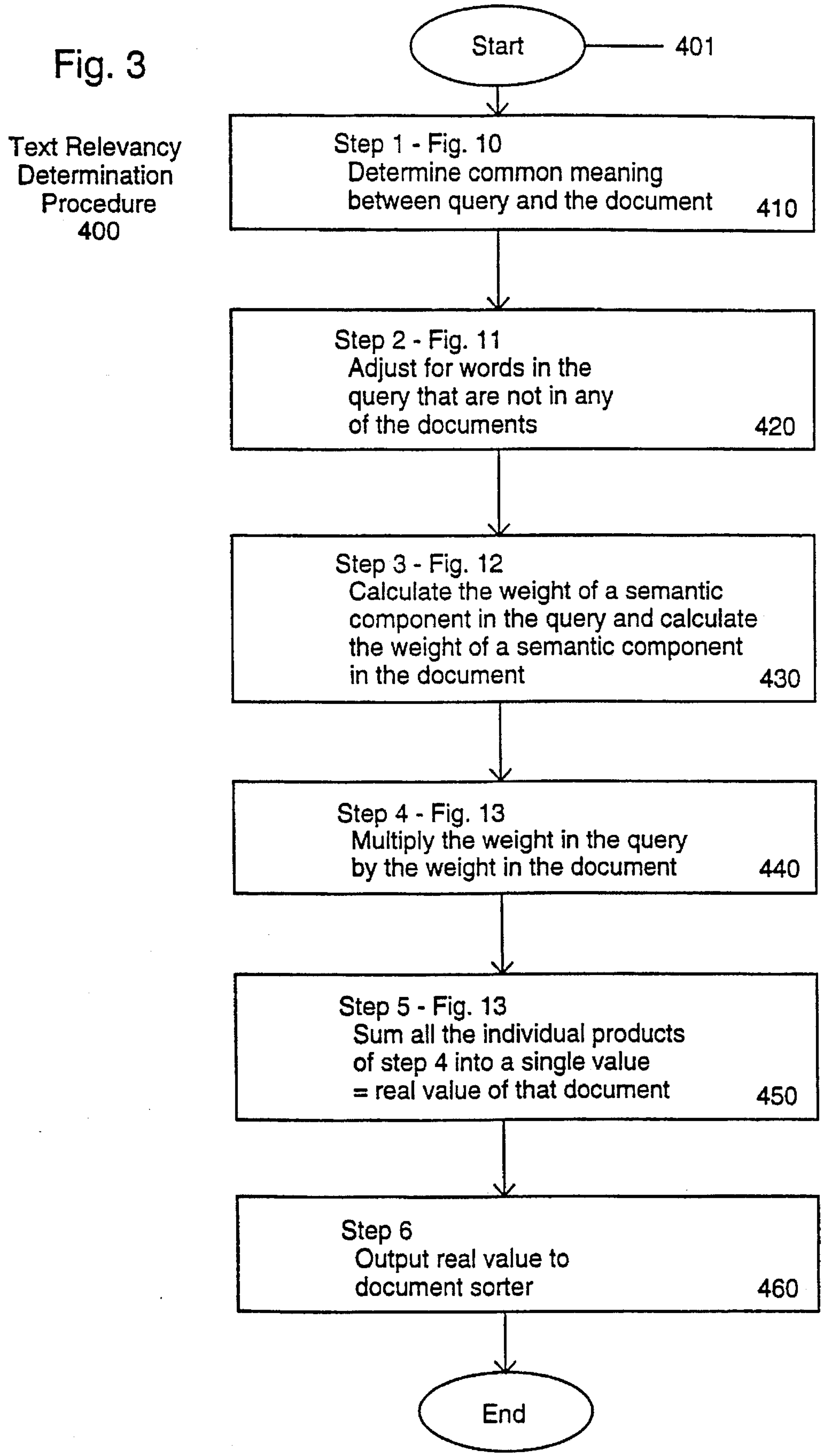
FIG. 3 illustrates the 6 steps for the text relevancy determination procedure used for determining real value numbers for the document ranking in FIG. 2.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The preferred embodiments were motivated by the desire to achieve the retrieval benefits of word meanings and avoid the problems associated with disambiguation.

A prototype of applicant's process has been successfully used at the NASA KSC Public Affairs office. The performance of the prototype was measured by a count of the number of documents one must read in order to find an answer to a natural language question. In some queries, a noticeable semantic improvement has been observed. For example, if only keywords are used for the query "How fast does the orbiter travel on orbit?" then 17 retrieved paragraphs must be read to find the answer to the query. But if semantic information is used in conjunction with key words then only 4 retrieved paragraphs need to be read to find the answer to the query. Thus, the prototype enabled a searcher to find the answer to their query by a substantial reduction of the number of documents that must be read.

Reference will now be made in detail to the present preferred embodiment of the invention as illustrated in the accompanying drawings.

SEMANTIC CATEGORIES AND SEMANTIC LEXICON

A brief description of semantic modeling will be beneficial in the description or our semantic categories and our semantic lexicon. Semantic modelling has been discussed by applicant in the paper entitled NIST Special Publication 500-207-The First Text Retrieval Conference (TREC-1) published in March, 1993 on pages 199–207. Essentially, the semantic modeling approach identified concepts useful in talking informally about the real world. These concepts included the two notions of entities (objects in the real world) and relationships among entities (actions in the real world). Both entities and relationships have properties.

The properties of entities are often called attributes. There are basic or surface level attributes for entities in the real world. Examples of surface level entity attributes are General Dimensions, Color and Position. These properties are prevalent in natural language. For example, consider the phrase "large, black book on the table" which indicates the General Dimensions, Color, and Position of the book.

In linguistic research, the basic properties of relationships are discussed and called thematic roles. Thematic roles are also referred to in the literature as participant roles, semantic roles and case roles. Examples of thematic roles are Beneficiary and Time. Thematic roles are prevalent in natural language; they reveal how sentence phrases and clauses are semantically related to the verbs in a sentence. For example, consider the phrase "purchase for Mary on Wednesday" which indicates who benefited from a purchase (Beneficiary) and when a purchase occurred (Time).

A goal of our approach is to detect thematic information along with attribute information contained in natural language queries and documents. When the information is present, our system uses it to help find the most relevant document. In order to use this additional information, the basic underlying concept of text relevance needs to be modified. The modifications include the addition of a semantic lexicon with thematic and attribute information, and computation of a real value number for documents (similarity coefficient).

From our research we have been able to define a basic semantic lexicon comprising 36 semantic categories for thematic and attribute information which is illustrated in FIG. 1. Roget's Thesaurus contains a hierarchy of word classes to relate words. Roget's International Thesaurus, Harper & Row, N.Y., Fourth Edition, 1977. For our research, we have selected several classes from this hierarchy to be used for semantic categories. The entries in our lexicon are not limited to words found in Roget's but were also built by reading information about particular words in various dictionaries to look for possible semantic categories the words could trigger.

Further, if one generalizes the approach of what a word triggers, one could define categories to be for example, all the individual categories in Roget's. Depending on what level your definition applies to, you could have many more than 36 semantic categories. This would be a deviation from semantic modeling. But, theoretically this can be done.

Presently, the lexicon contains about 3,000 entries which trigger one or more semantic categories. The accompanying Appendix represents for 3,000 words in the English language which of the 36 categories each word triggers. The Appendix can be modified to include all words in the English language.

In order to explain an assignment of semantic categories to a given term using a thesaurus such as Roget's Thesaurus, for example, consider the brief index quotation for the term "vapor" on page 1294–1295, that we modified with our categories:

| | | | |
|---|---|---|---|
| | Vapor | | |
| noun | fog | State | ASTE |
| | fume | State | ASTE |
| | illusion | | |
| | spirit | | |
| | steam | Temperature | ATMP |
| | thing imagined | | |
| verb | be bombastic | | |
| | bluster | | |
| | boast | | |
| | exhale | Motion with Reference to Direction | AMDR |
| | talk nonsense | | |

The term "vapor" has eleven different meanings. We can associate the different meanings to the thematic and attribute categories given in FIG. 3. In this example, the meanings "fog" and "fume" correspond to the attribute category entitled -State-. The vapor meaning of "steam" corresponds to the attribute category entitled -Temperature-. The vapor meaning "exhale" is a trigger for the attribute category entitled -Motion with Reference to Direction-. The remaining seven meanings associated with "vapor" do not trigger any thematic roles or attributes. Since there are eleven meanings associated with "vapor", we indicate in the lexicon a probability of 1/11 each time a category is triggered. Hence, a probability of 2/11 is assigned to the category entitled -State- since two meanings "fog" and "fume" correspond. Likewise, a probability of 1/11 is assigned to the category entitled -Temperature-, and 1/11 is assigned to the category entitled -Motion with Reference to Direction-. This technique of calculating probabilities is being used as a simple alternative to an analysis to a large body of text. For example, statistics could be collected on actual usage of the word to determine probabilities.

Other interpretations can exist. For example, even though there are eleven senses for vapor, one interpretation might be to realize that only three different categories could be generated so each one would have a probability of 1/3.

Other thesauruses and dictionaries, etc. can be used to associate their word meanings to our 36 categories. Roget's thesaurus is only used to exemplify our process.

The enclosed appendix covers all the words that have listed so far in our data base into a semantic lexicon that can be accessed using the 36 linguistic categories of FIG. 1. The format of the entries in the lexicon is as follows:

<word> <list of semantic category abbreviations>.

For example:

<vapor> <ASTE ASTE NONE NONE ATMP NONE NONE NONE NONE AMDR NONE>, where NONE is the acronym for a sense of "vapor" that is not a semantic sense.

FIRST PREFERRED EMBODIMENT

FIG. 2 illustrates an overview of using applicant's invention in order to be able to rank multiple documents in order of their importance to the word query. The overview will be briefly described followed by an example of determining the real value number (similarity coefficient SQ) for Document #4. The box labelled 1 represents a basic computer with display and printer that can perform the novel method steps and operations enclosed within box 1. Such basic computers for performing text retrieval searches are well known as represented by U.S. Pat. No. 4,849,898 which was cited previously in the background section of this invention. In FIG. 2, the Query Words 101 and the documents 110 are input into the df calculator 2 10. The output of the df calculator 2 10 as represented in FIG. 6 passes to the Importance Calculator 300, whose output is represented by an example in FIG. 7. This embodiment further uses data from both the Query words 101, and the Semantic Lexicon 120 to determine the category probability of the Query Words at 220, and whose output is represented by an example in FIG. 8. Each document 111, with the Lexicon 120 is cycled separately to determine the category probability of each of those document's words at 230, whose output is represented by an example in FIG. 9. The outputs of 300, 220, and 230 pass to the Text Determination Procedure 400 as described in the six step flow chart of FIG. 3 to create a real number value for each document, SQ. These real value numbers are passed to a document sorter 500 which ranks the relevancy of each document in a linear order such as a downward sequential order from largest value to smallest value. Such a type of document sorting is described in U.S. Pat. No. 5,020,019 issued to Ogawa which is incorporated by reference.

It is important to note that the word query can include natural language words such as sentences, phrases, and single words as the word query. Further, the types of documents defined are variable in size. For example, existing paragraphs in a single document can be separated and divided into smaller type documents for cycling if there is a desire to obtain real number values for individual paragraphs. Thus, this invention can be used to not only locate the best documents for a word query, but can locate the best sections within a document to answer the word query. The inventor's experiments show that using the 36 categories with natural language words is an improvement over relevancy determination based on key word searching. And if documents are made to be one paragraph comprising approximately 1 to 5 sentences, or 1 to 250 words, then performance is enhanced. Thus, the number of documents that must be read to find relevant documents is greatly reduced with our technique.

FIG. 3 illustrates the 6 steps for the Text Relevancy Determination Procedure 400 used for determining document value numbers for the document ranking in FIG. 2. Step 1 which is exemplified in FIG. 10, is to determine common meanings between the query and the document. Step 2, which is exemplified in FIG. 11, is an adjustment step for words in the query that are not in any of the documents. Step 3, which is exemplified in FIG. 12, is to calculate the weight of a semantic component in the query and to calculate the weight of a semantic component in the document. Step 4, which is exemplified in FIG. 13, is for multiplying the weights in the query by the weights in the document. Step 5, which is also exemplified in FIG. 13, is to sum all the individual products of step 4 into a single value which is equal to the real value for that particular document. Step 6 is to output the real value number (SQ) for that particular document to the document sorter. Clearly having 6 steps is to represent an example of using the procedure. Certainly one can reduce or enlarge the actual number of steps for this procedure as desired.

An example of using the preferred embodiment will now be demonstrated by example through the following figures. FIG. 4 illustrates 4 documents that are to be ranked by the procedures of FIG. 2 and 3. FIG. 5 illustrates a natural word query used for searching the documents of FIG. 4. The Query of "When do trains depart the station" is meant to be answered by searching the 4 documents. Obviously documents to be searched are usually much larger in size and can vary from a paragraph up to hundreds and even thousands of pages. This example of four small documents is used as an instructional bases to exemplify the features of applicant's invention.

First, the df which corresponds to the number of documents each word is in must be determined. FIG. 6 shows a list of words from the 4 documents of FIG. 4 and the query of FIG. 5 along with the number of documents each word is in (df). For example the words "canopy" and "freight" appear only in one document each, while the words "the" and "trains" appears in all four documents. Box 210 represents the df calculator in FIG. 2.

Next, the importance of each word is determined by the equation $\mathrm{Log}_{10}(N/df)$. Where N is equal to the total number of documents to be searched and df is the number of documents a word is in. The df values for each word have been determined in FIG. 6 above. FIG. 7 illustrates a list of words in the 4 documents of FIG. 4 and the query of FIG. 5 along with the importance of each word. For example, the importance of the word "station"=$\mathrm{Log}_{10}(4/2)=0.3$. Sometimes, the importance of a word is undefined. This happens when a word does not occur in the documents but does occur in a query (as in the embodiment described herein). For example, the words "depart", "do" and "when" do not appear in the four documents. Thus, the importance of these terms cannot be defined here. Step 2 of the Text Relevancy Determination Procedure in FIG. 11 to be discussed later adjusts for these undefined values. The importance calculator is represented by box 300 in FIG. 2.

Next, the Category Probability of each Query word is determined. FIG. 8 illustrates this where each individual word in the query is listed alphabetically with the frequency that each word occurs in that query, the semantic category triggered by each word, and the probability that each category is triggered. FIG. 8 shows an alphabetized list of all unique words from the query of FIG. 5; the frequency of each word in the query; and the semantic categories and probability each word triggers. For our example, the word "depart" occurs one time in the query. The entry for "depart" in the lexicon corresponds to this interpretation which is as follows:

<DEPART> <NONE NONE NONE NONE NONE AMDR AMDR TAMT>.

The word "depart" triggers two categories: AMDR (Motion with Reference to Direction) and TAMT (Amount). According to an interpretation of this lexicon, AMDR is triggered with a probability ¼ of the time and TAMT is triggered ⅛ of the time. Box 220 of FIG. 2 determines the category probability of the Query words.

Further, a similar category probability determination is done for each document. FIG. 9 is an alphabetized list of all unique words from Document #4 of FIG. 4; and the semantic categories and probability each word triggers. For example, the word "hourly" occurs 1 time in document #4, and triggers the category of TTIM (Time) a probability of 1.0 of the time. As mentioned previously, the lexicon is interpreted to show these probability values for these words. Box 230 of FIG. 2 determines the category probability for each document.

Next the text relevancy of each document is determined.

TEXT RELEVANCY DETERMINATION PROCEDURE-6 STEPS

The Text Relevancy Determination Procedure shown as boxes 410–460 in FIG. 2 uses 3 of the lists mentioned above:

1) List of words and the importance of each word, as shown in FIG. 7;

2) List of words in the query and the semantic categories they trigger along with the probability of triggering those categories, as shown in FIG. 8; and 3) List of words in a document and the semantic categories they trigger along with the probability of triggering those categories, as shown in FIG. 9.

These lists are incorporated into the 6 STEPS referred in FIG. 3.

STEP 1

Step 1 is to determine common meanings between the query and the document at 410. FIG. 10 corresponds to the output of Step 1 for document #4.

In Step 1, a new list is created as follows: For each word in the query, go through either subsections (a) or (b) whichever applies. If the word triggers a category, go to section (a). If the word does not trigger a category go to section (b).

(a) For each category the word triggers, find each word in the document that triggers the category and output three things:

1) The word in the Query and its frequency of occurrence.

2) The word in the Document and its frequency of occurrence.

3) The category.

(b) If the word does not trigger a category, then look for the word in the document and if it's there output two things:

1) The word in the Query and it's frequency of occurrence.

2) The word in the Document and it's frequency of occurrence.

3) --.

In FIG. 10, the word "depart" occurs in the query one time and triggers the category AMDR. The word "leave" occurs in Document #4 once and also triggers the category AMDR. Thus, item 1 in FIG. 10 corresponds to subsection a) as described above. An example using subsection b) occurs in Item 14 of FIG. 10.

STEP 2

Step 2, is an adjustment step for words in the query that are not in any of the documents at 420. FIG. 11 shows the output of Step 2 for document #4.

In this step, another list is created from the list depicted in Step 1. For each item in the Step 1 List which has a word with undefined importance, then replace the word in the First Entry column by the word in the Second Entry column. For example, the word "depart" has an undefined importance as shown in FIG. 7. Thus, the word "depart" is replaced by the word "leave" from the second column. Likewise, the words "do" and "when" also have an undefined importance and are respectively replaced by the words from the second entry column.

STEP 3

Step 3 is to calculate the weight of a semantic component in the query and to calculate the weight of a semantic component in the document at 430. FIG. 12 shows the output of Step 3 for document #4.

In Step 3, another list is created from the Step 2 list as follows:

For each item in the Step 2 list, follow subsection a) or b) whichever applies:

a) If the third entry is a category, then

1. Replace the first entry by multiplying:

| | | | | |
|---|---|---|---|---|
| importance of word in first entry | * | frequency of word in first entry | * | probability the word triggers the category in the third entry |

2. Replace the second entry by multiplying:

| | | | | |
|---|---|---|---|---|
| importance of word in second entry | * | frequency of word in second entry | * | probability the word triggers the category in the third entry |

3. Omit the third entry.

b) If the third entry is not a category, then

1. Replace the first entry by multiplying:

| | | |
|---|---|---|
| importance of word in first entry | * | frequency of word in first entry |

2. Replace the second entry by multiplying:

| | | |
|---|---|---|
| importance of word in second entry | * | frequency of word in second entry |

3. Omit the third entry.

Item 1 in FIG.'S 11 and 12 is an example of using subsection a), and item 14 is an example of utilizing subsection b).

STEP 4

Step 4 is for multiplying the weights in the query by the weights in the document at 440. The top portion of FIG. 13 shows the output of Step 4.

In the list created here, the numerical value created in the first entry column of FIG. 12 is to be multiplied by the numerical value created in the second entry column of FIG. 12.

STEP 5

Step 5 is to sum all the values in the Step 4 list which becomes the real value number (Similarity Coefficient SQ) for a particular document at 450. The bottom portion of FIG. 13 shows the output of step 5 for Document #4.

STEP 6

This step is for outputting the real value number for the document to the document sorter illustrated in FIG. 3 at 460.

Steps 1 through 6 are repeated for each document to be ranked for answering the word query. Each document eventually receives a real value number(Similarity Coefficient). Sorter 500 depicted in FIG. 2 creates a ranked list of documents 550 based on these real value numbers. For example, if Document #1 has a real value number of 0.88, then the Document #4 which has a higher real value number of 0.91986 ranks higher on the list and so on.

In the example given above, there are several words in the query which are not in the document collection. So, the importance of these words is undefined using the embodiment described. For general information retrieval situations, it is unlikely that these cases arise. They arise in the example because only 4 very small documents are participating.

Figure 14:
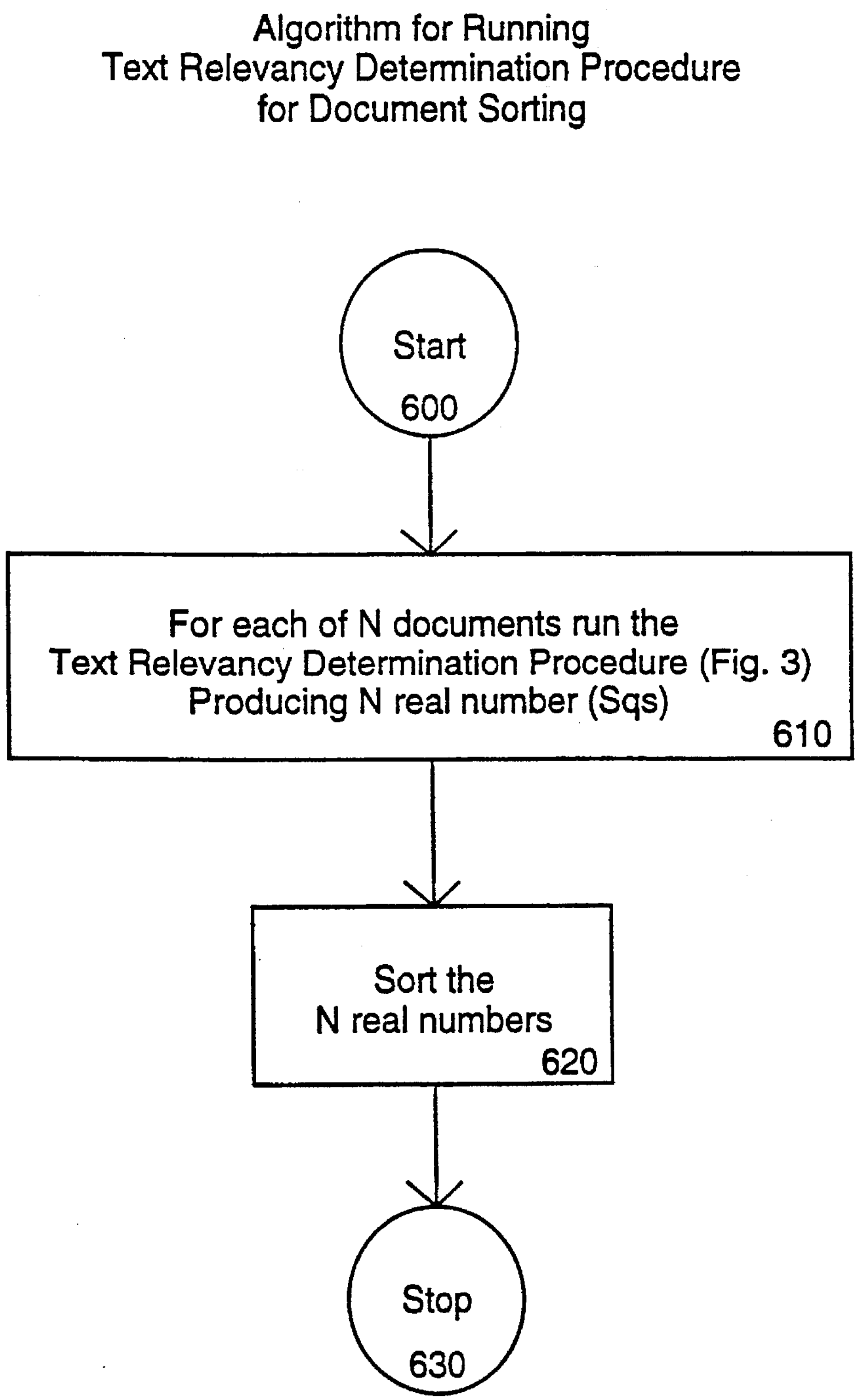
FIG. 14 illustrates an algorithm utilized for determining document ranking.

FIG. 14 illustrates a simplified algorithm for running the text relevancy determination procedure for document sorting. For each of N documents, where N is the total number of documents to be searched, the 6 step Text Relevancy Determination Procedure of FIG. 3 is run to produce N real value numbers (SQ) for each document 610. The N real value numbers are then sorted 620.

SECOND PREFERRED EMBODIMENT

This embodiment covers using the 6 step procedure to route documents to topics or headings also referred to as filtering. In routing documents there is a need to send documents one at a time to whichever topics they are relevant to. The procedure and steps used for document sorting mentioned in the above figures can be easily modified to handle document routing. In routing, the role of documents and the Query is reversed. For example, when determining the importance of a word for routing, the equation can be equal to $\mathrm{Log}_{10}(NT/dft)$, where NT is the total number of topics and dft is the number of topics each word is located within.

Figure 15:
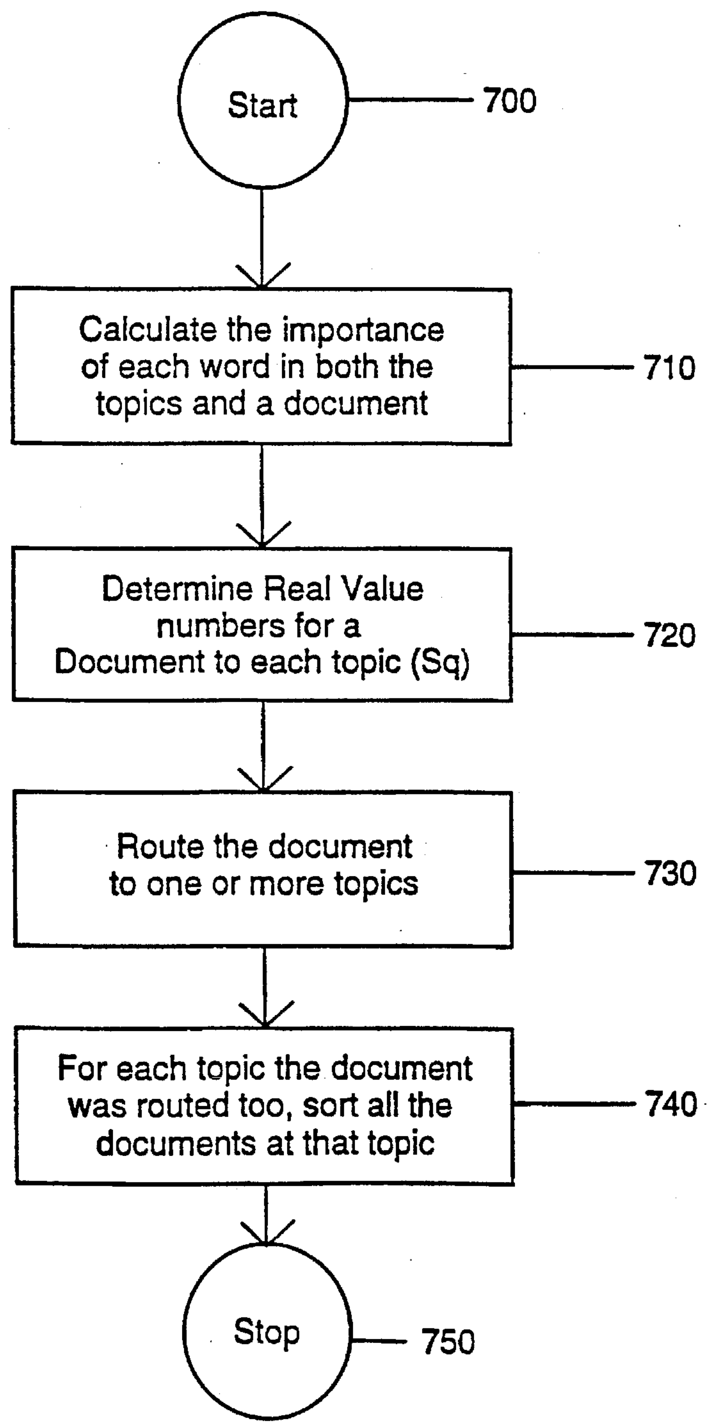
FIG. 15 illustrates an algorithm utilized for routing documents to topics.

FIG. 15 illustrates a simplified flow chart for this embodiment. First, the importance of each word in both a topic X, where X is an individual topic, and each word in a document, is calculated 710. Next, real value numbers (SQ) are determined 720, in a manner similar to the 6 step text relevancy procedure described in FIG. 3. Next, each document is routed one at a time to one or more topics 730. Finally, the documents are sorted at each of the topics 740.

This system can be used to search and route all kinds of document collections no matter what their size, such as collections of legal documents, medical documents, news stories, and patents from any sized data base. Further, as mentioned previously, this process can be used with a different number of categories fewer or more than our 36 categories.

The present invention is not limited to this embodiment, but various variations and modifications may be made without departing from the scope of the present invention.

APPENDIX

| | |
|---|---|
| after: | TTIM, TTIM, TTIM, NONE, NONE, NONE, AEID, AEID, AMDR, AORD, TSPL |
| above: | TAMT, TAMT, TSPL, NONE, NONE, ALDM, ALDM, AORD, AEID, APOS |
| atop: | TSPL, APOS |
| before: | TSPL, TTIM, TTIM, TTIM, TTIM, AEID, AMDR, AORD, NONE, NONE, APOS |
| below: | AMDR, NONE, NONE, TAMT, ASTE, ALDM, ALDM, TSPL, APOS |
| between: | TCMP, TDUR, AEID, TSPL, APOS, TAMT |
| during: | TDUR, TTIM |
| except: | TCND, NONE, NONE, AORD, TAMT, TAMT |
| into: | TCND, TSPL, TTIM, AMDR, AEID, APOS, NONE |
| like: | TCMP, TCMP, TCMP, TAMT, TAMT, TCND, TMAN, NONE, NONE, NONE, NONE, NONE, NONE, NONE |
| over: | TDUR, TSPL, TTIM, TTIM, AORD, ALDM, ALDM, ALDM, TAMT, TAMT, TAMT, TAMT, AGDM, AMDR, AEID, APOS, TDGR, TCND |
| per: | TMNS, AORD, AORD |
| through: | NONE, AORD, TGOL, ALDM, TMNS, TTIM, TSPL, APOS, AMDR |
| under: | TCND, TSPL, APOS, AORD, TDGR, NONE, TAMT, ALDM, ALDM, ALDM |
| until: | TCND, TTIM |
| upon: | TCND, TCNV, TSRC, TTIM, NONE, AGDM, ALDM, TMNS, AEID, AMDR, TPUR |
| with: | TACM, TACM, TCMP, TMAN, TRES, TAMT, TAMT, TAMT, TMNS, NONE, AORD, TSPL, APOS, TTIM |
| within: | TRNG, AEID, AEID, TTIM, TDGR, APOS, TSPL |
| without: | AEID, AORD, TAMT, NONE, NONE |
| as: | TCND, TCMP, TMAN, NONE, NONE, TAMT |
| at: | TCND, TSPL, TMAN, TTIM, APOS, AEID, TDUR |
| by: | TAMT, TCNV, TSPL, TTIM, APOS, AEID, TMNS, AORD, AMDR, TDUR, NONE |
| for: | TDUR, TGOL, TPUR, AVAR, TDST, TBNF, TAMT, TRNG |
| from: | TCSE, TSRC, TTIM, AMDR, AMDR, TAMT, TSPL, APOS, TINS |
| in: | TINS, TSPL, TPUR, TTIM, AMDR, AMDR, AMDR, AMDR, AMDR, AEID, AEID, APOS, TCND, TGOL, TMNS |
| of: | TCSE, TSPL, TSRC, NONE, TTIM, TDUR, APOS |
| on: | TCND, TCNV, TSPL, TSRC, TTIM, ALDM, ALDM, AMDR, AGDM, APOS, TMNS, AEID, TPUR |
| to: | TACM, TBNF, TCND, TDGR, TSPL, TPUR, TRES, TTIM, AGDM, APOS, AMDR, AMDR, TCMP |
| houston: | APOS, TSPL |
| 1610-11: | TTIM, TTIM, TTIM, TTIM, TDUR, TDUR, TDUR, NONE, NONE, NONE, AORD, AORD, TACM, TACM |
| 2-mile: | ALDM |
| 200-foot: | ALDM |
| 490-foot: | ALDM |
| 39-a: | TSPL, APOS |
| 39-b: | TSPL, APOS |
| 6-inch: | ALDM |
| 35-degree: | NONE, NONE, NONE, NONE, NONE, AMDR, TDGR, TAMT, AORD |
| 201-degree: | NONE, NONE, NONE, NONE, NONE, AMDR, TDGR, TAMT, AORD |
| 104-degree: | NONE, NONE, NONE, NONE, NONE, AMDR, TDGR, TAMT, AORD |
| 70-degree: | NONE, NONE, NONE, NONE, NONE, AMDR, TDGR, TAMT, AORD |
| 57-degree: | NONE, NONE, NONE, NONE, NONE, AMDR, TDGR, TAMT, AORD |
| 98-degree: | NONE, NONE, NONE, NONE, NONE, AMDR, TDGR, TAMT, AORD |
| 14-degree: | NONE, NONE, NONE, NONE, NONE, AMDR, TDGR, TAMT, AORD |
| 17-degree: | NONE, NONE, NONE, NONE, NONE, AMDR, TDGR, TAMT, AORD |
| 3-degree: | NONE, NONE, NONE, NONE, NONE, AMDR, TDGR, TAMT, AORD |
| 5-degree: | NONE, NONE, NONE, NONE, NONE, AMDR, TDGR, TAMT, AORD |
| azimuths-35: | NONE, AMDR, AMDR, ALDM, TSPL, APOS |
| 150-pound: | TAMT, TAMT, TAMT, AMFR, AMFR, TSPL, APOS, APHP, APHP, TCNV, AMDR, NONE, NONE, NONE, NONE, NONE, NONE, NONE, NONE |
| 110-nautical: | AGDM, TCNV, AGMT, AMDR |
| 126-statute: | AGDM, TCNV, AGMT, AMDR |
| 8-percent: | TAMT |
| 5-percent: | TAMT |
| aerothermal: | ASTE, ATMP, ATMP |
| africa: | APOS, TSPL |
| ailerons: | AMDR, AMDR, AMDR, AMDR, NONE, NONE, NONE, NONE, NONE, NONE, AEID, AEID, AFRM, AMFR, AMFR, AMFR, ALDM |
| airflow: | AMDR |
| ala: | APOS, TSPL |
| alaska: | APOS, TSPL |
| aldrin: | TCNV, TCNV, TCNV |
| april: | TDUR, TTIM |
| armstrong: | TCNV, TCNV, TCNV |
| atlantic: | TSPL, APOS |
| atlantis: | TCNV, TCNV, ALDM, AMDR, AMDR |
| aug: | TDUR, TTIM |
| autoland: | TDST, AMDR, AMDR, TCNV |
| avionics: | TCNV |
| backface: | NONE, NONE, NONE, NONE, NONE, NONE, NONE, NONE, NONE, NONE, NONE, AEID, AEID, AEID, AEID, AEID, AEID, ALDM, ALDM, TAMT, TAMT, TAMT, TAMT, AMDR, AMDR, AMDR, AMDR, AGMT, AGMT, TCNV, TCNV, APHP, TSPL, APOS, TTIM, TTIM, TACM |
| basketball: | AVAR, AEID, NONE, NONE, NONE, NONE, NONE, NONE, NONE, NONE, NONE, NONE, NONE, NONE, NONE, NONE, NONE, NONE, NONE |
| brigham: | TSPL, APOS |
| calif: | TSPL, APOS |
| california: | TSPL, APOS |
| canada: | TSPL, APOS |
| canaveral: | TSPL, APOS |
| canoga: | TSPL, APOS |
| capt: | NONE, NONE, NONE, NONE, NONE, NONE, TSPL, APOS, TCNV |
| captain: | NONE, NONE, NONE, NONE, NONE, NONE, TSPL, APOS, TCNV |
| centerline: | TSPL, APOS, AORD, AORD, AORD, AORD, AORD, AORD, ALDM, ALDM, AEID |
| challenger: | TCNV, TCNV, ALDM, AMDR, AMDR |
| collins: | TCNV, TCNV, TCNV |
| columbia: | TCNV, TCNV, ALDM, AMDR, AMDR |
| compress: | NONE, NONE, AGDM, AGDM, TAMT, ALDM |
| conform: | AORD, NONE, NONE, NONE, NONE, NONE |
| connections: | NONE, NONE, NONE, NONE, NONE, NONE, NONE, NONE, TAMT, TAMT, TAMT, AORD, AGND, AEID, TACM, TACM, AGDM, TMAN |
| consist: | TAMT |
| consists: | TAMT |
| countdown: | NONE, NONE, NONE, NONE, NONE, NONE, TAMT, TAMT, TAMT, TAMT TAMT, TAMT, TCND, TCMP, TCMP, AORD |
| criteria: | NONE, NONE, NONE, AORD |
| dakar: | TSPL, APOS |
| demate: | TACM, TACM, AORD, NONE, NONE, NONE, NONE, TAMT, TAMT, TCMP TCNV, AGND |
| deorbit: | AFRM, AFRM, AFRM, AMDR, AMDR, AMDR, TSPL, APOS, TMAN, TCNV NONE, NONE, NONE |
| deorbiting: | AFRM, AFRM, AFRM, AMDR, AMDR, AMDR, TSPL, APOS, TMAN, TCNV, NONE, NONE, NONE |
| ddt: | AFRM |
| dimethylethoxysilane: | ASTE, NONE, NONE, NONE, NONE, TAMT, TAMT, TAMT, TAMT, TAMT, TSRC |
| dmes: | ASTE, NONE, NONE, NONE, NONE, TAMT, TAMT, TAMT, TAMT TAMT, TSRC |
| downey: | TSPL, APOS |
| downrange: | TSPL, APOS |
| downranging: | TSPL, APOS |
| dryden: | TSPL, APOS |
| dulles: | TSPL, APOS |
| edward: | TCNV, TCNV, TCNV |
| edwards: | TSPL, APOS |

| | |
|---|---|
| edwards': | TSPL, APOS |
| elastomer: | NONE, NONE, NONE, APHP, APHP, APHP, APHP |
| elevon: | AMDR, AMDR, AMDR, AMDR, NONE, NONE, NONE, NONE, NONE, NONE AEID, AEID, AFRM, AMFR, AMFR, AMFR, ALDM |
| elevons: | AMDR, AMDR, AMDR, AMDR, NONE, NONE, NONE, NONE, NONE, NONE AEID, AEID, AFRM, AMFR, AMFR, AMFR, ALDM |
| emittance: | AMDR, AMDR, AMDR, NONE, NONE, ASTE |
| et: | AEID, AEID, AEID, NONE, NONE, TCNV, ASTE |
| february: | TDUR, TTIM |
| feet: | ALDM |
| fla: | TSPL, APOS |
| florida: | TSPL, APOS |
| france: | TSPL, APOS |
| frigate: | TCNV, TCNV, TCNV, TCNV, TCNV |
| ft: | ALDM |
| germany: | TSPL, APOS |
| guerur: | TSPL, APOS |
| hudson: | TSPL, APOS |
| huntsville: | TSPL, APOS |
| hydrogen: | AMDR, AMDR, NONE, NONE, NONE, NONE, NONE, NONE, NONE, NONE NONE, NONE, ATMP, ASTE, ASTE |
| inc: | TACM, TACM, TAMT, TAMT, NONE |
| italy: | TSPL, APOS |
| iv: | AORD |
| jan: | TDUR, TTIM |
| johnson: | TSPL, APOS |
| july: | TDUR, TTIM |
| june: | TDUR, TTIM |
| kennedy: | TSPL, APOS |
| ketch: | TCNV, TCNV, TCNV, TCNV, TCNV |
| ksc: | TSPL, APOS |
| ksc's: | TSPL, APOS |
| la: | TSPL, APOS |
| may: | TDUR, TTIM |
| michael: | TCNV, TCNV, TCNV |
| michoud: | TSPL, APOS |
| midfuselage: | AORD, AEID, NONE, TAMT |
| mississippi: | TSPL, APOS |
| morocco: | TSPL, APOS |
| neil: | TCNV, TCNV, TCNV |
| nomex: | ATMP, ATMP, AEID, NONE, NONE, NONE, NONE NONE, NONE |
| nov: | TDUR, TTIM |
| november: | TDUR, TTIM |
| october: | TDUR, TTIM |
| orleans: | TSPL, APOS |
| ov-99: | TCNV, TCNV, ALDM, AMDR, AMDR |
| ov-101: | TCNV, TCNV, ALDM, AMDR, AMDR |
| ov-102: | TCNV, TCNV, ALDM, AMDR, AMDR |
| ov-103: | TCNV, TCNV, ALDM, AMDR, AMDR |
| ov-104: | TCNV, TCNV, ALDM, AMDR, AMDR |
| ov-105: | TCNV, TCNV, ALDM, AMDR, AMDR |
| palmdale: | TSPL, APOS |
| paris: | TSPL, APOS |
| postlanding: | AEID, AMDR, TTIM, TDST, TDST, AMDR, AMDR, AMDR, TCNV |
| prebinding: | TACM, TACM, TACM, TAMT, TAMT, TAMT, AEID, TTIM, TTIM, TTIM, AORD |
| prefinal: | AEID, TTIM, TTIM, TTIM, AORD |
| preflare: | AEID, TTIM, TTIM, TTIM, AORD |
| prelaunch: | AEID, TTIM, TTIM, TTIM, AORD |
| psi: | AMFR, APHP |
| pure: | AMDR, TAMT, TAMT, NONE, NONE, NONE, NONE, NONE, NONE, NONE NONE, NONE, NONE, NONE, NONE |
| reconfiguration: | AFRM |
| reconfigured: | NONE, NONE, NONE, AORD, AFRM, AEID |
| recontact: | NONE, NONE, NONE, NONE, NONE, AGDM, AGDM |
| reinstalled: | TSPL, APOS |
| reuse: | AUSE, NONE, TTIM, TAMT |
| senegal: | TSPL, APOS |
| sensor: | TCMP, NONE, NONE, NONE, NONE, NONE, NONE, NONE, NONE, NONE NONE, AEID, TRES |
| sintering: | ATMP |
| six: | TAMT |
| sleeve: | AEID, AEID |
| slidewire: | TCNV, TCNV, AMDR, AMDR |
| slidewires: | TCNV, TCNV, AMDR, AMDR |
| slurry: | NONE, NONE, NONE, TAMT, TAMT, TAMT, TAMT, AORD, TACM TINS, ASTE |
| smithsonian: | TSPL, APOS |
| spacelab: | TSPL, APOS |
| spain: | TSPL, APOS |
| subsystems: | NONE, NONE, NONE, AORD, AORD, TPUR, TMAN |
| tailfirst: | TAMT, TAMT, TAMT, AEID, AEID, AEID, AEID, AEID, AEID, AEID AEID, AORD, AORD, AORD, AORD, AORD, AORD, AORD, TGOL, TGOL, AMDR, AMDR, AMDR, NONE, NONE, NONE, TSRC, TSRC, TSRC, TTIM |
| texas: | TSPL, APOS |
| their: | NONE, NONE, NONE, NONE, NONE, TAMT, AFRM |
| tracking: | NONE, NONE, NONE, TCNV, TCNV |
| transatlantic: | AMDR |
| ultrahigh: | NONE, NONE, NONE, NONE, NONE, NONE, NONE, NONE, NONE, NONE NONE, NONE, NONE, NONE, NONE, NONE, NONE, NONE, NONE, NONE, TINS, ASTE, TAMT, TAMT, ALDM, ALDM, AMDR |
| utah: | TSPL, APOS |
| vab: | TSPL, APOS |
| vandenberg: | TSPL, APOS |
| vernier: | TINS |
| wings: | TACM, TACM, TACM, TAMT, TAMT, AMDR, AORD, TCNV, TCNV, NONE NONE, NONE, NONE, NONE, NONE, NONE |
| workstand: | TSPL, APOS |
| workstands: | TSPL, APOS |
| aoa: | TGOL, AVAR, NONE, TTIM, TTIM, TTIM, TTIM, TAMT AMDR, AMDR, AMDR, AEID, AGDM, AGDM |
| afrsi: | AORD, NONE |
| alt: | TDST, TDST, TDST, AMDR, AMDR, AMDR, AMDR, AMDR AMDR, AMDR, AMDR, AMDR, TCNV, TCNV, TCNV, AGDM, AGDM, AGDM, TPUR, TCMP, TCMP, TMAN, TTIM, ALDM, AEID, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE |
| ato: | TGOL, AVAR, NONE, NONE, NONE, NONE, AFRM, AFRM AFRM, AMDR, AMDR, AMDR, TSPL, APOS, TMAN, TCNV |
| frci: | NONE, NONE, TMAN, AEID |
| frci-12: | NONE, NONE, TMAN, AEID |
| frsi: | AORD, NONE |
| hac: | AEID, AORD, AORD, AORD, AORD, TRES, TDGR, TAMT TGOL, TPUR, TCMP, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE |

| | |
|---|---|
| brsi: | NONE, NONE, THAN, AEID |
| mpta: | TINS |
| opf: | TSPL, APOS |
| rss: | TSPL, APOS |
| rtls: | TSPL, APOS, AMDR |
| rtv: | TACH, ASTE |
| sca: | TCNV, TCNV, TCNV |
| sip: | TINS |
| sl6: | TSPL, APOS |
| smch: | TINS |
| scms: | AEID, NONE |
| spi: | TINS |
| spidpo: | AUSE |
| spif: | TSPL, APOS |
| spt: | TINS |
| srb: | TCNV, TCNV, TCNV, TCNV, TCNV, TCNV, TCNV, AMDR, AMDR, NONE NONE, AGMT |
| srm: | THAN, NONE, NONE, NONE, TPUR, TPUR |
| srm&qa: | THAN, NONE, NONE, NONE, TPUR, TPUR |
| same: | TCNV, AVAR, TINS, TINS, TINS |
| st: | TINS |
| sta: | TCNV, TCNV, TCNV |
| stdn: | NONE, NONE, NONE, NONE, NONE, NONE, NONE, TACH, TACH, AORD, AORD |
| sts: | TCNV, NONE, NONE, NONE, NONE, NONE, NONE, NONE, NONE, NONE |
| t: | TDUR, TDUR, TDUR, TDUR, TDUR, TDUR, TDUR, TDUR, TDUR, TDUR TDUR, TTIM, TTIM, TTIM, TTIM, TTIM, TTIM, TTIM, TTIM, TTIM, TTIM, TTIM, TTIM, NONE |
| t-0: | TDUR, TDUR, TDUR, TDUR, TDUR, TDUR, TDUR, TDUR, TDUR, TDUR TDUR, TTIM, TTIM, TTIM, TTIM, TTIM, TTIM, TTIM, TTIM, TTIM, TTIM, TTIM, TTIM, NONE |
| tacan: | TINS |
| taem: | TPUR, NONE, AORD |
| tal: | ALDM, ALDM, ALDM, ALDM, ALDM, ALDM, AGDM, AEID TSPL, APOS, TGOL, AVAR, AVAR, NONE, NONE, TCNV, TCNV, AMDR, AMDR, TDST |
| tdrs: | TINS |
| tdrss: | TINS |
| tho: | TINS |
| tio: | AFRM, AFRM, AFRM, AMDR, AMDR, AMDR, TSPL, APOS, THAN TCNV, NONE, NONE, NONE |
| tlm: | NONE, NONE, TCNV |
| tps: | ATMP, ATMP, THAN, NONE |
| tsm: | TINS |
| tt: | TCNV, TAMT, TRNG, ALDM, NONE, NONE, NONE, NONE, NONE NONE, NONE, NONE, NONE, NONE, NONE, NONE, NONE, NONE, NONE, NONE, NONE, NONE, NONE |
| tt&o: | TCNV, TAMT, TRNG, ALDM, NONE, NONE, NONE, NONE, NONE NONE, NONE, NONE, NONE, NONE, NONE, NONE, NONE, NONE, NONE, NONE, NONE, NONE, NONE |
| tvc: | TINS |
| vafb: | TSPL, APOS |
| vcu: | TINS |
| vfm: | TINS |
| vib: | TSPL, APOS |
| viu: | TINS |
| vpf: | TSPL, APOS |
| vtr: | TINS |
| washington: | TSPL, APOS |
| wbso: | TINS |
| wccu: | TINS |
| wcls: | TINS |
| wcs: | TINS |
| which: | TAMT |
| wmc: | TINS |
| wong: | APHP, APHP, APHP, APHP, APHP, TAMT, NONE, NONE, NONE, NONE NONE, NONE, NONE, NONE, NONE, NONE, NONE |
| wow: | APHP, APHP, APHP, APHP, APHP, TAMT, NONE, NONE, NONE, NONE NONE, NONE, NONE, NONE, NONE, NONE, NONE |
| wp: | TSPL, APOS |
| wsb: | TINS |
| wsgt: | TSPL, APOS |
| wstf: | TSPL, APOS |
| wtr: | TSPL, APOS |
| dddddd: | TTIM |
| feb: | TTIM, TDUR |
| mar: | TTIM, TDUR |
| apr: | TTIM, TDUR |
| may: | TTIM, TDUR |
| jun: | TTIM, TDUR |
| jul: | TTIM, TDUR |
| aug: | TTIM, TDUR |
| nov: | TTIM, TDUR |
| dec: | TTIM, TDUR |
| reused: | AUSE, NONE, TTIM, TAMT |
| orbiter: | NONE, AFRM, AMDR, AMDR, TSPL, APOS, THAN, TCNV, AFRM, NONE, NONE, AFRM, AMDR |
| fast: | NONE, NONE, NONE, NONE, AFRM, NONE, ACOL, TACH, TAMT, NONE, NONE, AVAR, AVAR, AGMT, NONE, TACH, TAMT, AGMT |
| origin: | TSRC, AORD, NONE, TSRC, AORD, TCSE |
| differ: | NONE, NONE, NONE, NONE, TCMP, NONE, NONE |
| decide: | TCSE, TCMP, TCSE, NONE, NONE, NONE, NONE |
| far: | AGDM, TAMT, AGDM |
| dimensions: | AGDM, TSPL, APOS |
| dimension: | AGDM, TSPL, APOS |
| disposed: | AORD, NONE, NONE, NONE |
| minority: | TAMT, TTIM, TAMT, NONE, TAMT |
| eat: | AUSE, NONE, NONE, NONE, AMDR, AMDR |
| orbiter's: | NONE, AFRM, AMDR, AMDR, TSPL, APOS, THAN, TCNV, AFRM, NONE, NONE, AFRM, AMDR |
| rocket: | TCNV, AMDR, TCNV, TCNV, TCNV, NONE, TCNV, AGMT, TCNV, NONE, AMDR, TCNV |
| available: | NONE, AUSE, NONE, NONE, NONE, NONE |
| how: | TAMT, TCND, TDGR, THAN, TMNS, TPUR |
| when: | TTIM, TTIM, TDUR |
| where: | TSPL, APOS, TSRC, TCSE |
| why: | TCSE, TPUR |
| gliding: | TCNV, TCNV, TCNV, TCNV, TCNV, AMDR, AMDR, NONE, NONE, NONE, TTIM |
| cutoff: | AEID, ALDM, AVAR |
| cylinders: | AFRM |
| damping: | NONE, NONE, NONE, NONE, NONE, NONE, NONE, NONE, NONE, NONE, NONE, NONE, ASTE, ASTE, ASTE, ASTE, ATMP, TAMT |
| decreased: | AGDM, AGDM, TAMT, TAMT, TAMT, TAMT, TAMT, TAMT, TAMT, NONE, NONE, TDGR |
| decreasing: | AGDM, AGDM, TAMT, TAMT, TAMT, TAMT, TAMT, TAMT, TAMT, NONE, NONE, TDGR |
| deep: | ALDM, ALDM, ALDM, ALDM, ACOL, NONE, NONE, NONE, NONE, NONE, NONE, TSPL, APOS, TAMT, AEID |
| define: | AORD, AEID, NONE, NONE, NONE, AVAR |
| definite: | NONE, NONE, NONE, NONE, AEID, TRNG, AORD, TCND |
| dependent: | AMDR, NONE, NONE, NONE, NONE, NONE, NONE, NONE, TCND, ALDM |
| descend: | NONE, NONE, NONE, TCNV, AMDR, APHP, ALDM, AGMT |

| | |
|---|---|
| destined: | NONE, TTIM |
| differs: | NONE, NONE, NONE, NONE, NONE, NONE, TCMP |
| discovered: | TSRC |
| dissipation: | TAMT, TAMT, TAMT, AORD, NONE, NONE, NONE |
| ditch: | NONE, NONE, NONE, ASTE, AGDM, AGDM, AFRM, AFRM, TCNV, AUSE |
| ditched: | NONE, NONE, NONE, ASTE, AGDM, AGDM, AFRM, AFRM, TCNV, AUSE |
| drained: | NONE, NONE, NONE, NONE, ACOL, AUSE |
| dress: | AEID, AEID, AEID, AEID, AEID, NONE, NONE, NONE, NONE, NONE, NONE, NONE, NONE, NONE, NONE, AFRM |
| dried: | ASTE |
| earliest: | TTIM, TTIM, TTIM, TTIM, TTIM, TTIM, TTIM, TTIM |
| elevator: | NONE, AMDR |
| elevators: | NONE, AMDR |
| emmittance: | AMDR, AMDR, AMDR, NONE, NONE, ASTE |
| england: | TSPL, APOS |
| ensemble: | NONE, NONE, NONE, TAMT, TACM, AORD |
| equator: | NONE, TAMT, AFRM, ATMP, TSPL, APOS, AORD |
| equatorial: | AORD, ATMP |
| equilibrium: | NONE, NONE, NONE, NONE, TAMT, AVAR, AFRM |
| estimated: | NONE, NONE, NONE, NONE, TCMP, TCMP, TAMT |
| exceeding: | TAMT, TAMT, NONE, AMDR |
| exercise: | NONE, NONE, NONE, NONE, NONE, NONE, NONE, NONE, NONE, NONE, NONE, NONE, NONE, NONE, AUSE, AUSE |
| exists: | NONE, NONE, NONE, NONE, TDUR, TTIM |
| explosion: | NONE, NONE, NONE, NONE, NONE, TAMT |
| extendable: | AGDM, AGDM, AGDM, AGDM, AGDM, APHP, ALDM, ALDM, ALDM, AEID, TDUR, TDUR, TTIM, TTIM, TTIM, NONE, NONE, NONE, AORD, TAMT, TSPL, APOS, AFRM, AVAR |
| extent: | ALDM, ALDM, TDGR, TAMT, TAMT, TRNG, AGDM, AGDM, TSPL, APOS |
| extra: | NONE, NONE, NONE, NONE, NONE, NONE, TAMT, TAMT, TAMT, TTIM, AUSE |
| extreme: | TGOL, TGOL, AORD, AORD, NONE, NONE, NONE, NONE, NONE, NONE, NONE, NONE, NONE, NONE, TAMT, TAMT, AEID, AGDM |
| extremely: | TDGR, TAMT, TAMT |
| fair: | NONE, NONE, NONE, NONE, NONE, NONE, NONE, NONE, NONE, NONE, NONE, NONE, NONE, NONE, NONE, NONE, NONE, NONE, NONE, NONE, ACOL, ACOL, ASTE |
| faster: | NONE, NONE, NONE, NONE, NONE, NONE, NONE, NONE, AFRM, ACOL, TACM, TACM, TAMT, TAMT, AVAR, AVAR, AGMT, AGMT |
| flies: | NONE, NONE, NONE, NONE, NONE, NONE, AEID, AMDR, AMDR, AMDR, TCNV, TCNV, TCNV, TCNV, TDUR, TTIM, TTIM, AGMT |
| glides: | TCNV, TCNV, TCNV, TCNV, TCNV, TCNV, AMDR, AMDR, NONE, NONE, TTIM |
| goal: | TDST, AMDR, TGOL, TGOL, TGOL, AORD, TCSE, TPUR, NONE |
| gross: | NONE, NONE, NONE, NONE, NONE, NONE, NONE, NONE, NONE, NONE, NONE, TAMT, TAMT, TAMT, TAMT, TAMT, APHP, AGDM, ALDM |
| handled: | ALDM, ALDM, NONE, NONE, NONE, NONE, NONE, NONE, NONE, NONE, NONE, NONE, NONE, NONE, AFRM, AUSE, AUSE, TCNV |
| heads: | NONE, NONE, NONE, NONE, NONE, NONE, NONE, NONE, ALDM, ALDM, ALDM, ALDM, ALDM, AORD, AORD, AORD, AORD, AEID, AEID, AEID, AEID, AEID, ASTE, ASTE, ASTE, AFRM, AMFR, AMDR, AMDR, AMDR, AMDR, TCNV, TCSE, TAMT, TSRC, TSRC, APHP |
| highest: | TAMT, TAMT, NONE, NONE, ALDM, ALDM |
| ice: | APHP, ATMP, ATMP, ATMP, ATMP, ATMP, ATMP, AMDR, NONE, NONE, AFRM, ALDM |
| impossible: | AORD, NONE, NONE, NONE, NONE, TAMT |
| improves: | AVAR, AVAR, TAMT, NONE, NONE, NONE, NONE, NONE, AUSE |
| inclinations: | NONE, NONE, NONE, NONE, NONE, NONE, NONE, NONE, NONE, AMDR, AMDR, ALDM, ALDM |
| indian: | ASTE, NONE |
| induce: | NONE, NONE, TCSE, TCSE, TCMP, AMDR |
| inform: | NONE, NONE, NONE, TCSE, TINS |
| initiators: | TSRC |
| institution: | TSRC, TSRC, AORD, NONE, NONE, NONE, NONE, TACM |
| knowledge: | NONE, NONE, NONE, TINS |
| lasts: | TGOL, TGOL, TGOL, AORD, AORD, AORD, NONE, NONE, NONE, NONE NONE, NONE, TTIM, TTIM, TTIM, TTIM, TDUR, AVAR, AMDR |
| latitude: | ALDM, NONE, NONE, NONE, TPUR, TSPL, TSPL, APOS, APOS |
| leveling: | AORD, TDGR, TAMT, TAMT, TAMT, TSPL, APOS, ALDM, ALDM, ALDM ALDM, AEID, ASTE, AFRM, AFRM, AFRM, AFRM, NONE, NONE, NONE, NONE, NONE, NONE, AMDR |
| limitations: | AEID, AEID, NONE, NONE, ALDM, TCND |
| linked: | AORD, TACM, TAMT, NONE |
| lunar: | NONE, AFRM |
| machine: | TACM, TCNV, AVAR, NONE, NONE, NONE, NONE, TINS, TINS, TINS, TSRC |
| manages: | NONE, NONE, NONE, NONE, NONE, NONE, NONE, NONE, NONE, TCND, AUSE, AUSE, TAMT, AVAR, TCNV |
| manufacture: | NONE, NONE, TRES, TSRC, TSRC, AFRM |
| meridian: | NONE, TSPL, APOS, TPUR, TTIM, TTIM, ALDM, ALDM |
| methods: | NONE, NONE, THNS, AORD, TPUR, THAN |
| modify: | AVAR, NONE, TCND |
| moment: | NONE, NONE, NONE, AMFR, TDUR, TDUR, TDUR, TDUR, TTIM, TTIM, TTIM, TTIM |
| months: | TDUR, TTIM |
| mount: | AMDR, AMDR, AMDR, AMDR, AMDR, NONE, NONE, NONE, ALDM, ALDM, ALDM, ALDM, AGND, TCNV, TCNV, TAMT, AGMT |
| navy: | NONE, NONE, TCNV |
| nominally: | TAMT, NONE, AORD |
| normally: | NONE, AORD, AORD |
| northeast: | AMDR, AMDR, AMDR, TSPL, APOS |
| northwest: | AMDR, AMDR, AMDR, TSPL, APOS |
| oceans: | TAMT, ASTE |
| orbiting: | AMDR |
| outfitted: | NONE, NONE, NONE, NONE, TACM, TACM, TACM, AEID, AEID, AEID, AORD, AORD |
| pacific: | AGMT, NONE, NONE, NONE, NONE |
| parking: | NONE, NONE, NONE, NONE, NONE, AEID, TRNG, TSPL, TSPL, APOS APOS |
| passage: | NONE, NONE, NONE, NONE, NONE, NONE, THAN, ASTE, AVAR, TSPL, APOS, AGMT, AMDR, AMDR, TCNV, TCNV, TCNV, TCNV, TAMT, AGDM |
| past: | NONE, NONE, NONE, TTIM, TTIM, TTIM, TTIM, TTIM, TTIM, TTIM, AGDM |
| periodic: | AORD, TTIM, NONE, AMDR, TAMT |
| planes: | TCNV, TDGR, TAMT, ALDM, ALDM, AFRM, AFRM, AFRM, TINS, AMDR |
| plugs: | NONE, NONE, NONE, NONE, NONE, NONE, NONE, NONE, NONE, ASTE, AFRM, AFRM, AGMT, AMFR |
| preference: | NONE, NONE, NONE, NONE, NONE, NONE, AORD |
| preparing: | NONE, NONE, NONE, NONE, NONE, NONE, NONE, NONE, ATMP, TSRC |
| progresses: | AMDR, AMDR, AVAR, AVAR, AVAR, AVAR, AGMT, AGMT, AGMT, NONE, NONE, NONE, NONE, TCNV, TCNV, TCNV, TCNV |
| prohibits: | AORD, NONE, NONE, NONE, NONE |
| projects: | TGOL, TPUR, TPUR, TPUR, TPUR, NONE, NONE, NONE, NONE, NONE, TTIM, TTIM, AEID, ALDM, AFRM, TCNV, AMFR |
| qualities: | AORD, NONE, NONE, NONE, NONE, AEID, TCND |
| quarters: | TSPL, APOS |
| rack: | TCNV, TCNV, TINS, NONE, NONE, NONE, NONE, NONE, NONE, NONE, NONE, NONE, NONE, AMDR, AGMT |
| rapidly: | TTIM, AGMT |
| reaching: | ASTE, TDGR, TDGR, TAMT, TAMT, AGDM, AGDM, AGDM, TRNG, TRNG, ALDM, TSPL, TSPL, APOS, APOS, TDST, TDST, AMDR, AMDR, NONE, NONE, NONE, NONE, NONE, NONE, TCNV, TCNV |
| reactant: | TRES, NONE, AMFR |
| redundantly: | NONE, NONE, TAMT |
| referred: | NONE, NONE, NONE, NONE, NONE, NONE, NONE, NONE, AUSE |
| refractory: | NONE, NONE, NONE, NONE, NONE, NONE, AORD |
| remained: | TAMT, NONE, NONE, AGMT, AVAR, AVAR, TDUR, TTIM |

| | |
|---|---|
| repaired: | TCND, NONE, NONE, NONE, NONE |
| representing: | NONE, NONE, NONE, NONE, NONE, NONE, NONE, AVAR |
| responses: | TRES, TRES, NONE, NONE, NONE, NONE, NONE, NONE, NONE, NONE, AMFR |
| reversals: | NONE, NONE, NONE, NONE, NONE, AVAR, AVAR, AVAR, ALDM, AMDR |
| reversed: | ALDM, AMDR |
| rolling: | TCNV, AMDR, AMDR, AMDR, AMDR, NONE, NONE, NONE, ALDM, AFRM |
| rolls: | TCNV, TCNV, TCNV, TCNV, TCNV, TCNV, NONE, NONE, NONE, NONE NONE, NONE, NONE, NONE, NONE, NONE, NONE, AMDR, AMDR, AMDR, AMDR, AMDR, AMDR, AMDR, AMDR, AMDR, TACM, AORD, AFRM, AFRM, AFRM, ALDM, ALDM, TAMT, TAMT, ASTE, ASTE, AMFR |
| rotating: | TCNV, ALDM, AGMT, TTIM, AMDR |
| rotational: | TCNV, AORD, AORD, AMDR, TTIM |
| safed: | TAMT, NONE, NONE, NONE |
| sailing: | TCNV, TCNV, TCNV |
| sending: | NONE, NONE, NONE, NONE, NONE, TCNV, TCNV, AMFR, ASTE |
| served: | AMFR, AMFR, NONE, NONE, NONE, NONE, NONE, NONE, NONE, NONE, NONE, NONE, NONE, NONE, TAMT, TMNS, AUSE, AGND |
| severe: | NONE, NONE, NONE, NONE, NONE, NONE, NONE, NONE, NONE, NONE, NONE, NONE, ATMP, TAMT |
| shape: | NONE, NONE, NONE, NONE, NONE, NONE, AORD, AORD, AORD, TCND, TCND, AFRM, AFRM, AFRM, AFRM, AFRM, TSRC, TPUR |
| sheets: | AEID, AEID, NONE, NONE, TAMT, ACOL |
| shifts: | AVAR, AVAR, AVAR, AVAR, AVAR, AEID, AMDR, AMDR, TMNS, NONE, NONE, NONE, NONE, NONE, NONE, NONE, NONE, TCNV, TCNV, TCNV, TDUR, TTIM, AGMT |
| simulating: | NONE, NONE, NONE, NONE, TCMP |
| sip: | AMDR, AMDR, NONE, NONE, NONE, NONE, TAMT |
| slumping: | NONE, NONE, NONE, NONE, NONE, TAMT, TAMT, TAMT, AMDR, AMDR, AMDR, AMDR |
| southern: | AMDR |
| southwest: | AMDR, AMDR, AMDR, TSPL, APOS |
| splashdown: | TCNV |
| stacked: | TACM, AORD, NONE, NONE |
| staging: | TSPL, APOS, AEID, AEID, TDUR, TTIM, ALDM, ALDM, NONE, NONE, TDGR, TAMT, TCNV |
| steeper: | ALDM, ALDM, ALDM, ALDM, AMDR, TAMT, ASTE, NONE, NONE, TAMT |
| steer: | NONE, NONE, NONE, AGND, TINS, AMDR, AMDR, AMDR, TCNV |
| steerable: | NONE, NONE, NONE, AGND, TINS, AMDR, AMDR, AMDR, TCNV |
| stopping: | AVAR, AVAR, AVAR, AVAR, AVAR, AVAR, AFRM, AFRM, AFRM NONE, NONE, NONE, NONE, NONE, NONE, NONE, NONE, NONE, NONE, NONE, NONE, NONE, NONE, NONE, TTIM, TTIM, TDST, AMDR, TINS, AGMT, AGMT, AUSE, TGOL, AORD |
| strips: | ALDM, ALDM, ALDM, TCNV, NONE, NONE, NONE, TAMT, TAMT, AMDR, AEID, AEID, AEID |
| studies: | NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, TGOL, TPUR, TSPL, APOS |
| success: | NONE, NONE, NONE, NONE, NONE, NONE, TAMT |
| suitable: | NONE, NONE, NONE, NONE, NONE, NONE, TTIM |
| sums: | TAMT, TAMT, TAMT, TAMT, TAMT, TAMT, TAMT, TAMT, NONE, NONE |
| survival: | TDUR, TTIM, TTIM, TAMT |
| suspended: | AORD, ALDM, AGMT, AUSE |
| sustained: | TTIM, AVAR, AVAR, ALDM |
| tactical: | NONE, TPUR |
| takeoff: | AMDR, AMDR, AMDR, AMDR, TCNV, TSRC, AORD, NONE, NONE |
| tangency: | AGDM, AMDR, AFRM |
| tangent: | AGDM, AMDR, AFRM |
| taxi: | TCNV, TCNV, TCNV |
| tell: | NONE, NONE, NONE, NONE, NONE, NONE, NONE, NONE, NONE, NONE, TINS, TAMT |
| temporary: | NONE, NONE, NONE, TDUR, TDUR, TTIM, TTIM, AVAR |
| termination: | AVAR, NONE, TGOL, AORD, TRES |
| terms: | TCND, NONE |
| thrusters: | AGMT, NONE, NONE, NONE, NONE, TCNV, AMFR, AMFR, AMFR, AMFR, AMFR, AMFR, TAMT, TSPL, APOS |
| towards: | AEID, AMDR |
| trajectories: | NONE, TCNV, TMAN |
| transporters: | TCNV |
| tremendous: | AGDM, TAMT, NONE, NONE |
| triggered: | TCSE, NONE |
| truck: | NONE, NONE, NONE, NONE, TCNV, TCNV, TCNV, TCNV, AUSE |
| turning: | AMDR, AMDR, AMDR, AMDR, AMDR, AFRM, AFRM, AFRM |
| twice: | TAMT |
| utilized: | AUSE, NONE |
| varies: | AVAR, AVAR, AVAR, AMDR, NONE, NONE, NONE, NONE, NONE, NONE, TTIM, TCMP |
| vicinity: | AEID, AGDM, TSPL, APOS |
| wearing: | NONE, NONE, NONE, NONE, NONE, NONE, NONE, NONE, AEID, AEID, TAMT, TAMT, TCNV, TDUR, TTIM |
| weights: | NONE, NONE, NONE, NONE, NONE, NONE, NONE, NONE, NONE, NONE, NONE, APHP, APHP, APHP, APHP, APHP, TAMT |
| world's: | NONE, NONE, NONE, TAMT, TSPL, APOS |
| aboard : | TSPL, APOS, TCNV, TCNV |
| abort : | TGOL, AVAR, AORD, NONE |
| about : | AEID, AGDM, AGDM, TAMT, NONE |
| ac : | NONE, TTIM |
| acceleration : | TTIM, TAMT, AGMT |
| access : | NONE, NONE, NONE, NONE, AMDR, AMDR, AMDR, AMDR, AMDR, AMDR TAMT, TMAN |
| active : | NONE, NONE, NONE, NONE, NONE, AUSE, AGMT |
| activities : | NONE, NONE, NONE, NONE, NONE, NONE, TCSE, AGMT |
| activity : | NONE, NONE, NONE, NONE, NONE, NONE, TCSE, AGMT |
| actual : | NONE, NONE, NONE, TTIM |
| actuate : | AMFR, TCSE, AGMT |
| actuator : | AMFR, TCSE, AGMT |
| actuators : | AMFR, TCSE, AGMT |
| adapt : | NONE, NONE, NONE, NONE, AVAR, AORD, AMDR |
| adapter : | NONE, NONE, NONE, NONE, NONE, AVAR, AORD, AMDR |
| add : | TAMT, TAMT, TAMT |
| added : | TAMT, TAMT, TAMT |
| addition : | NONE, NONE, NONE, TAMT, TAMT, TAMT, TAMT, TAMT, TAMT, AGDM |
| additional : | TAMT, TAMT, TTIM, NONE |
| aerodynamic : | TCNV, ASTE, NONE |
| aft : | AEID, AEID, TCNV |
| against : | NONE, NONE, NONE, AEID, AMDR, AGDM |
| air : | ASTE, ASTE, ASTE, ASTE, TSPL, TCNV, APOS, NONE, NONE, NONE NONE, NONE, NONE, NONE, NONE, NONE, NONE, NONE, APHP, AEID |
| aircraft : | TCNV, TCNV, TCNV |
| airlock : | AMDR, ASTE |
| alignment : | TACM, AMDR, ALDM |
| all : | NONE, AORD, AORD, TAMT, TAMT, TAMT, TAMT |
| allow : | NONE, NONE, NONE, NONE, TCND, TAMT, TCMP |
| allows : | NONE, NONE, NONE, NONE, TCND, TAMT, TCMP |
| along : | AEID, AMDR, ALDM |
| also : | TAMT, TAMT |
| altitude : | TCNV, NONE, ALDM |
| ammonia : | ATMP, NONE, ASTE |
| amount: | TAMT, TAMT, TAMT, TAMT, TAMT, TAMT, TDGR |
| and : | TAMT |
| angle : | NONE, NONE, NONE, NONE, NONE, NONE, TCNV, AFRM, AFRM, AFRM TSPL, APOS, ALDM, TPUR |
| another : | NONE, NONE, TAMT, TTIM |

| | |
|---|---|
| antenna : | NONE, NONE, NONE, AEID |
| antennas : | NONE, NONE, NONE, AEID |
| any : | AORD, AORD, TAMT, TAMT, TAMT |
| applied : | NONE, NONE, NONE, NONE, NONE, AEID, AUSE |
| apply : | NONE, NONE, NONE, NONE, NONE, AEID, AUSE |
| approach : | TDST, TDST, AMDR, AMDR, AMDR, AMDR, AMDR, AMDR, AMDR, NONE NONE, NONE, NONE, NONE, NONE, NONE, NONE, NONE, NONE, NONE, NONE, TCNV, AGDM, AGDM, AGDM, TPUR, TCMP, TCMP, THAN, TTIM |
| approximately : | AGDM, TAMT, TAMT |
| area : | TSPL, TSPL, TSPL, APOS, APOS, APOS, AGDM, AORD, NONE, NONE NONE |
| areas : | TSPL, TSPL, TSPL, APOS, APOS, APOS, AGDM, AORD, NONE, NONE NONE |
| arm : | TACH, ASTE, AMFR, NONE, NONE, NONE, NONE, NONE, TAMT, ALDM |
| around : | AMDR, AMDR, AMDR, AEID, AGDM, AGDM |
| ascent : | ALDM, AGMT, AMDR, AMDR, NONE, TAMT, APHP |
| assemblies : | TACH, TACH, TACH, AORD, AORD, AORD, TAMT, NONE, NONE, NONE TSRC |
| assembly : | TACH, TACH, TACH, AORD, AORD, AORD, TAMT, NONE, NONE, NONE TSRC |
| associated : | TACH, TACH, TACH, TACH, AORD, NONE, NONE, TAMT, TAMT |
| atmosphere : | ASTE, ASTE, NONE, NONE, AEID |
| atmospheric : | ASTE |
| attach : | TAMT, TAMT, NONE, NONE, TACH |
| attached : | TAMT, TAMT, NONE, NONE, TACH |
| attitude : | NONE, NONE, TSPL, APOS |
| auto : | TCNV, TCNV, TCNV |
| auxiliary : | TACH, NONE, NONE, NONE, NONE, TAMT |
| axis : | TACH, TCNV, AMDR, AEID, AMFR, NONE, AFRM |
| azimuth : | NONE, AMDR, AMDR, ALDM, TSPL, APOS |
| back : | NONE, NONE, NONE, NONE, NONE, NONE, NONE, NONE, NONE, NONE NONE, AEID, AEID, AEID, AEID, AEID, ALDM, ALDM, TAMT, TAMT, TAMT, AMDR, AMDR, AMDR, AMDR, AGMT, AGMT, TCNV, TCNV, APHP, TTIM, TTIM, TSPL, APOS |
| backup : | NONE, AMDR, AVAR, AVAR |
| base : | ALDM, ALDM, ALDM, ALDM, ALDM, TCSE, NONE, NONE, NONE, NONE NONE, NONE, NONE, NONE, NONE, NONE, NONE, NONE, AEID, AMDR, TSPL, TSPL, APOS, APOS, TAMT |
| based : | ALDM, ALDM, ALDM, ALDM, ALDM, TCSE, NONE, NONE, NONE, NONE NONE, NONE, NONE, NONE, NONE, NONE, NONE, NONE, AEID, AMDR, TSPL, TSPL, APOS, APOS, TAMT |
| bay : | ASTE, TSPL, APOS, NONE, NONE, NONE, NONE, NONE, NONE, AFRM AFRM,. ACOL |
| bays : | ASTE, TSPL, APOS, NONE, NONE, NONE, NONE, NONE, NONE, AFRM AFRM, ACOL |
| beam : | TCNV, ALDM, ALDM, ALDM, ALDM, AMFR, NONE, NONE, NONE, NONE NONE, NONE, NONE, NONE, NONE, NONE, NONE, NONE, AEID |
| bearing : | AMDR, AMDR, NONE, NONE, NONE, NONE, NONE, NONE, NONE, NONE AMFR, AMFR, ALDM, ALDM, TSPL, APOS, TSRC, TSRC, TCNV become :AVAR, AVAR, TSRC, AORD, NONE, NONE |
| begin : | TSRC, AORD |
| begins : | TSRC, AORD |
| being : | NONE, NONE, NONE, NONE, NONE, NONE, TTIM |
| body : | TACH, TACH, TACH, TACH, AORD, AORD, NONE, NONE, NONE, NONE NONE, NONE, NONE, NONE, TAMT, AFRM, AGDM, APHP, ALDM |
| boil : | ATMP, ATMP, ATMP, ATMP, AMDR, AMDR, NONE, NONE, NONE, NONE, AFRM, ASTE |
| boiler : | ATMP, ATMP, ATMP, ATMP, AMDR, AMDR, NONE, NONE, NONE, NONE, AFRM, ASTE |
| booster : | NONE, NONE, NONE, NONE, NONE, NONE, NONE, TCNV |
| boosters : | NONE, NONE, NONE, NONE, NONE, NONE, NONE, TCNV |
| both : | TAMT, TAMT |
| box : | NONE, NONE, NONE, NONE, NONE, NONE, NONE, NONE, NONE, AMFR AMFR, AEID, AEID, TSPL, TSPL, TSPL, APOS, APOS, APOS |
| brake : | NONE, NONE, NONE, AGMT, AVAR |
| braking : | NONE, AGMT, AVAR |
| building : | TAMT, AFRM, AFRM, TSPL, APOS, TSRC |
| built : | NONE, TSRC |
| bulkhead : | NONE, NONE, AMDR, AEID |
| burn : | ATMP, ATMP, ATMP, ATMP, ATMP, NONE, NONE, NONE, NONE, NONE NONE, NONE, NONE, NONE, NONE, NONE, NONE, TCNV, TCNV, ASTE, ASTE, TRES, ACOL |
| bus : | TCNV, TCNV, TCNV, TCNV |
| buses : | TCNV, TCNV, TCNV, TCNV |
| but : | TAMT, TCND |
| button : | AEID, TACH, TINS, TAMT, TAMT, NONE, NONE, AFRM, AFRM, AGDM ASTE |
| bypass : | TSPL, TSPL, THAN, THAN, APOS, APOS, AMDR, AMDR, AMDR |
| cabin : | TSPL, TSPL, APOS, APOS |
| cable : | NONE, NONE, NONE, NONE, ALDM, ALDM |
| call : | NONE, NONE, NONE, NONE, NONE, NONE, NONE, NONE, NONE, NONE NONE, NONE, NONE, NONE, NONE, NONE, NONE, NONE, NONE, NONE, NONE, NONE, TCSE, TAMT, TCMP |
| called : | NONE, NONE, NONE, NONE, NONE, NONE, NONE, NONE, NONE, NONE NONE, NONE, NONE, NONE, NONE, NONE, NONE, NONE, NONE, NONE, NONE, NONE, TCSE, TAMT, TCMP |
| camera : | TINS, NONE, NONE |
| can : | AEID, AEID, TCNV, NONE, NONE, NONE, NONE, AMDR, AMDR, AMDR TSPL, APOS |
| cargo : | APHP, NONE, NONE, NONE, TCNV |
| carried : | TRNG, TCNV, TCNV, NONE, NONE, NONE, NONE, TSPL, APOS, TAMT TAMT, TCSE, ALDM |
| carrier : | TCNV, TCNV, TCNV, TCNV, NONE, NONE, NONE, NONE, NONE, ALDM |
| carry : | TRNG, TCNV, TCNV, NONE, NONE, NONE, NONE, TSPL, APOS, TAMT TAMT, TCSE, ALDM |
| case : | NONE, NONE, NONE, NONE, NONE, NONE, NONE, NONE, NONE, NONE NONE, NONE, AFRM, AEID, AEID, AEID, AEID, AEID, AORD, TCND, TCND |
| cause : | TCSE, TCSE, TCSE, TCSE, TCSE, NONE, NONE, NONE, TGOL, TSRC |
| caution : | NONE, NONE, NONE, NONE, NONE, NONE, NONE, NONE, NONE, NONE NONE,' NONE, TINS |
| cell : | NONE, NONE, NONE, NONE, TACH, TSPL, APOS |
| cells : | NONE, NONE, NONE, NONE, TACH, TSPL, APOS |
| center : | NONE, NONE, NONE, NONE, NONE, TCNV, AEID, AEID, AEID, TAMT AORD, AMDR, AMFR |
| chamber : | TSPL, TSPL, TSPL, APOS, APOS, APOS, NONE, NONE, AMDR |
| change : | AVAR, AVAR, AVAR, AVAR, AVAR, AVAR, AVAR, AVAR, AVAR, NONE NONE, NONE, NONE, TAMT, AEID, AGMT |
| changes : | AVAR, AVAR, AVAR, AVAR, AVAR, AVAR, AVAR, AVAR, AVAR, NONE NONE, NONE, NONE, TAMT, AEID, AGMT |
| channel : | ALDM, ALDM, ASTE, ASTE, ASTE, TINS, TINS, AMDR, THAN, NONE TCNV, TCNV, AFRM, AFRM |
| channels : | ALDM, ALDM, ASTE, ASTE, ASTE, TINS, TINS, AMDR, THAN, NONE TCNV, TCNV, AFRM, AFRM |
| check : | TAMT, TAMT, TAMT, TAMT, TAMT, TAMT, NONE, NONE, NONE, NONE NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, TCMP, TCMP, AGDM, AGDM, TSPL, APOS, ACOL, ACOL, AGMT, AGMT, AVAR, AVAR, TTIM |
| checkout : | TAMT, NONE, NONE, NONE, NONE, AMDR |
| checks : | TAMT, TAMT, TAMT, TAMT, TAMT, TAMT, NONE, NONE, NONE, NONE NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, TCMP, TCMP, AGDM, AGDM, TSPL, APOS, ACOL, ACOL, AGMT, AGMT, AVAR, AVAR, TTIM |
| circuit : | AFRM, AMDR, AMDR, AMDR, NONE, NONE, NONE, NONE, AEID, TCNV TSPL, APOS, TTIM, THAN |
| circulation : | ASTE, AMDR, AMDR, TAMT, NONE |
| close : | AVAR, AVAR, NONE, NONE, NONE, NONE, NONE, NONE, NONE, NONE NONE, NONE, NONE, NONE, NONE, NONE, NONE, NONE, NONE, TGOL, TGOL, AORD, AORD, AORD, AMDR, AMDR, AFRM, AFRM, AEID, AEID, AEID, AEID, TSPL, TSPL, THAN, APOS, APOS, AGMT, TACH, TACH, APHP, APHP, ATMP, TCMP, TAMT, TAMT, ALDM, AGDM, AGDM, AGDM |
| closed : | NONE, NONE, NONE, NONE, NONE, AFRM |
| combustion : | ATMP, ATMP |
| command : | NONE, NONE, NONE, NONE, NONE, NONE, NONE, NONE, NONE, NONE NONE, NONE, NONE, NONE, NONE, TAMT, TRNG, ALDM |
| commanded : | NONE, NONE, NONE, NONE, NONE, NONE, NONE, NONE, NONE, NONE NONE, NONE, NONE, NONE, NONE, TAMT, TRNG, ALDM |
| commander : | NONE, NONE, NONE, TCNV, TAMT |
| commander's : | NONE, NONE, NONE, TCNV, TAMT |

commands : NONE, NONE, NONE, NONE, NONE, NONE, NONE, NONE, NONE, NONE NONE, NONE, NONE, NONE, NONE, TAMT, TRNG, ALDM
communication : NONE, NONE, NONE, NONE, NONE, NONE, TINS, TACH, TAMT, THAN, TCNV
communications : NONE, TINS, TACH, TAMT, THAN, TCNV
compartment : TSPL, APOS, TCNV
complete : AVAR, TGOL, TGOL, AORD, AORD, AORD, AORD, NONE, NONE, NONE NONE, NONE, NONE, TAMT, TAMT, TAMT, TAMT, TCND
completed : AVAR, TGOL, TGOL, AORD, AORD, AORD, AORD, NONE, NONE, NONE NONE, NONE, NONE, TAMT, TAMT, TAMT, TAMT, TCND
complex : NONE, NONE, NONE, NONE, NONE, TAMT, TAMT, TAMT, TAMT
computer : NONE, NONE, NONE, TAMT
computers : NONE, NONE, NONE, TAMT
condition : TCND, TCND, TCND, TCND, TCND, TCND, TCND, NONE, NONE, NONE NONE, NONE, NONE, NONE, NONE, TDGR, TAMT, AEID
conditions : TCND, TCND, TCND, TCND, TCND, TCND, TCND, NONE, NONE, NONE NONE, NONE, NONE, NONE, NONE, TDGR, TAMT, AEID
conduct : NONE, NONE, NONE, NONE, NONE, NONE, NONE, NONE, NONE, ASTE AMDR, TACH, AORD, TCNV
conducted : NONE, NONE, NONE, NONE, NONE, NONE, NONE, NONE, NONE, ASTE AMDR, TACH, AORD, TCNV
cone : AFRM, NONE, TINS
configuration : NONE, NONE, NONE, AORD, AFRM, AEID
connected : TAMT, TAMT, AORD, NONE, NONE, TACH, TCMP
contain : AFRM, AEID, AEID, AEID, AORD, AORD, TAMT, NONE
contains : AFRM, AEID, AEID, AEID, AORD, AORD, TAMT, NONE
contingency : NONE, NONE, NONE, NONE, NONE, NONE, NONE, TCND
continue : AORD, TTIM, TTIM, TTIM, TTIM, TTIM, TDUR, TDUR, ALDM, NONE AVAR
continues : AORD, TTIM, TTIM, TTIM, TTIM, TTIM, TDUR, TDUR, ALDM, NONE AVAR
contract : NONE, NONE, NONE, NONE, NONE, NONE, NONE, NONE, NONE, AFRM AGDM, AGDM, ALDM, ALDM
contractor : NONE, NONE, NONE, NONE, NONE, NONE, NONE, NONE, NONE, AFRM AGDM, AGDM, ALDM, ALDM
control : NONE, NONE, NONE, NONE, NONE, NONE, NONE, NONE, NONE, NONE NONE, NONE, NONE, NONE, NONE, NONE, NONE, NONE, NONE, NONE, NONE, NONE, NONE, TAMT, TCNV
controlled : NONE, NONE, NONE, NONE, NONE, NONE, NONE, NONE, NONE, NONE NONE, NONE, NONE, NONE, NONE, NONE, NONE, NONE, NONE, NONE, NONE, NONE, NONE, TAMT, TCNV
controller : NONE, NONE, TAMT, TAMT
controllers : NONE, NONE, TAMT, TAMT
controls : NONE, NONE, NONE, NONE, NONE, NONE, NONE, NONE, NONE, NONE NONE, NONE, NONE, NONE, NONE, NONE, NONE, NONE, NONE, NONE, NONE, NONE, NONE, TAMT, TCNV
cool : ATMP, ATMP, ATMP, ATMP, NONE, NONE, NONE, NONE, NONE, NONE NONE, NONE, NONE, NONE, NONE, NONE, NONE, NONE, NONE, NONE, NONE, NONE, NONE, AVAR, AVAR, AGMT, ACOL
coolant : ATMP
cooling : ATMP, ATMP, ATMP, ATMP, NONE, NONE, NONE, NONE, NONE, NONE NONE, NONE, NONE, NONE, NONE, NONE, NONE, NONE, NONE, NONE, NONE, NONE, NONE, AVAR, AVAR, AGMT, ACOL
corresponding : NONE, NONE, NONE, NONE, TCMP, AORD, TAMT
crew : TCNV, TACH, TACH, TACH, AORD, NONE
cubic : AFRM, TSPL, APOS
current : AGMT, AMDR, NONE, NONE, NONE, NONE, NONE, NONE, NONE, NONE NONE, NONE, ASTE, ASTE, TTIM, AORD, AORD
data : TACH, AORD, NONE, NONE, NONE, NONE, NONE, TINS
day : TDUR, TDUR, TDUR, TDUR, TTIM, TTIM, TTIM, TTIM, NONE
days : TDUR, TDUR, TDUR, TDUR, TTIM, TTIM, TTIM, TTIM, NONE
deck : TACH, AORD, NONE, NONE, NONE, NONE, ALDM, AEID, AEID, TCNV AMFR, AMDR
deflection : AFRM, AFRM, AMDR, ALDM, NONE
degree : NONE, NONE, NONE, NONE, NONE, AMDR, TDGR, TAMT, AORD
degrees : NONE, NONE, NONE, NONE, NONE, AMDR, TDGR, TAMT, AORD
depend : TCND, NONE, ALDM
depending : TCND, NONE, ALDM
deploy : TSPL, APOS, NONE, NONE, AMDR, AORD, AGDM
deployed : TSPL, APOS, NONE, NONE, AMDR, AORD, AGDM
deployment : AORD, AORD, NONE, AMDR, AGDM, TSPL, APOS
design : NONE, NONE, NONE, NONE, NONE, NONE, NONE, NONE, NONE, NONE NONE, TPUR, TPUR, TPUR, TPUR, TPUR, TGOL, TSRC
designed : TPUR, TPUR
desire : NONE, NONE, NONE, NONE, NONE, NONE, NONE, NONE, NONE, NONE NONE, TGOL, TPUR, TPUR, AGND, AGND
desired : NONE, NONE, NONE, NONE, NONE, NONE, NONE, NONE, NONE, NONE NONE, TGOL, TPUR, TPUR, AGND, AGND
detection : TRES, NONE, NONE
determine : TCSE, TCSE, AEID, NONE, NONE, NONE, NONE, NONE, NONE, NONE AMDR, TRES, TGOL, AORD, AORD, TPUR, TCMP
developed : TAMT, NONE, NONE, AGDM, TTIM
development : AVAR, NONE, NONE, NONE, NONE, NONE, NONE, AGDM, TAMT, TTIM TRES
device : NONE, NONE, NONE, NONE, NONE, NONE, NONE, NONE, NONE, NONE NONE, NONE, NONE, NONE, NONE, NONE, NONE, THNS, THNS, THNS, THNS, TPUR, TINS
devices : NONE, NONE, NONE, NONE, NONE, NONE, NONE, NONE, NONE, NONE NONE, NONE, NONE, NONE, NONE, NONE, NONE, THNS, THNS, THNS, THNS, TPUR, TINS
diameter : TAMT, AORD, AGDM, AFRM, ALDM
different : AORD, AORD, NONE, NONE, NONE, TCMP, TTIM
digital : NONE, TAMT
direct : NONE, NONE, NONE, NONE, NONE, NONE, NONE, NONE, NONE, NONE NONE, NONE, NONE, NONE, NONE, NONE, NONE, NONE, AMDR, AMDR, AMDR, AMDR, TCNV, AORD, AFRM
directed : AMDR
direction : NONE, NONE, NONE, NONE, NONE, NONE, NONE, NONE, NONE, NONE NONE, NONE, AMDR, TCSE
directly : NONE, NONE, NONE, TTIM, TTIM, AFRM, AMDR
disconnect : TAMT
discovery : TRES, NONE, NONE, AVAR
display : NONE, NONE, NONE, NONE, NONE, NONE, NONE, NONE, NONE, NONE NONE, NONE, AEID
displayed : NONE, NONE, NONE, NONE, NONE, NONE, NONE, NONE, NONE, NONE NONE, NONE, AEID
displays : NONE, NONE, NONE, NONE, NONE, NONE, NONE, NONE, NONE, NONE NONE, NONE, AEID
distribution : AORD, AORD, NONE
division : TACH, TACH, TACH, TAMT, TAMT, TAMT, TAMT, TAMT, NONE, NONE NONE, NONE, NONE, NONE, NONE, NONE, NONE, NONE, NONE, TCMP, TSPL, APOS, AMDR, AORD, AORD, AORD, AORD, AEID
do : NONE, NONE, NONE, NONE, NONE, NONE, NONE, NONE, NONE, NONE NONE, NONE, NONE, NONE, AUSE, TCSE, ATMP, TSRC, TRES, TCNV, TCNV
dock : TCNV, TCNV, NONE, NONE, NONE, NONE, AEID, AMDR, TAMT, ALDM TDST
does : NONE, NONE, NONE, NONE, NONE, NONE, NONE, NONE, NONE, NONE NONE, NONE, NONE, NONE, AUSE, TCSE, ATMP, TSRC, TRES, TCNV, TCNV
door : AMDR, AMDR, AFRM
doors : AMDR, AMDR, AFRM
down : AEID, AEID, AMDR, AMDR, AMDR, AMDR, AMDR, AMDR, APHP, APHP APHP, ALDM, ALDM, ASTE, NONE, NONE, NONE, NONE, NONE, NONE, NONE, NONE, TAMT
drag : NONE, NONE, NONE, NONE, NONE, NONE, NONE, AMFR, AMFR, AMFR AMFR, TCNV, TCNV, TCNV, AGMT, AGMT, AGMT, TTIM, TTIM, AMDR, TDUR, AFRM, ALDM
drain : ASTE, ASTE, ASTE, AUSE, AUSE, AUSE, NONE, NONE, NONE, NONE NONE, NONE, NONE, NONE, AMDR, AMDR, AMDR, AMDR, ACOL, TAMT drive :AGMT, AGMT, NONE, NONE, NONE, NONE, NONE, NONE, NONE, NONE, NONE, NONE, NONE, NONE, NONE, NONE, NONE, NONE, NONE, TCSE, TCSE, TACH, AORD, TTIM, AMFR, AMFR, AMFR, AMFR, AMFR, TINS, TCNV, TCNV, TCNV, TCNV, TSPL, THAN, APOS, AFRM
duct : ASTE, ASTE
due : NONE, NONE, NONE, NONE, NONE, NONE, NONE, NONE, NONE, TAMT TAMT, AMDR
dump : NONE, NONE, NONE, NONE, NONE, NONE, NONE, NONE, NONE, NONE NONE, NONE, NONE, TSPL, TSPL, APOS, APOS, AUSE, AUSE, AMDR
each : AORD, AORD earth : NONE, NONE, NONE, NONE, ALDM, ALDM, TSPL, APOS, ASTE, ASTE effect : NONE, NONE, NONE, NONE, NONE, NONE, NONE, TGOL, TGOL, AORD TPUR, TRES, TRES, TTIM, TCSE, TCSE, TSRC effector : NONE, NONE, NONE, NONE, NONE, NONE, NONE, TGOL, TGOL, AORD TPUR, TRES, TRES, TTIM, TCSE, TCSE, TSRC egress : ASTE, AMDR, AMDR, AMDR, AMDR, AMDR eight : TAMT, TACM either : AORD, TAMT, TAMT, TCMP elements : TSRC, AORD, NONE, NONE, NONE, ASTE emergency : TTIM, NONE, NONE, TSPL, APOS end : NONE, NONE, NONE, NONE, NONE, NONE, NONE, NONE, NONE, NONE AEID, TAMT, TAMT, TAMT, TGOL, TGOL, TGOL, TPUR, TRES, TRES, TRES, AVAR, AVAR, AORD, AORD engine : TCNV, AVAR, TINS, TINS, TINS engines : TCNV, AVAR, TINS, TINS, TINS enterprise : NONE, NONE, NONE, NONE, NONE, NONE, NONE, TACM, TPUR entry : AMDR, AMDR, AMDR, TAMT, TSPL, APOS, AFRM, NONE, NONE, NONE environment : TCND, AEID, AEID environmental : TCND, AEID equipment : NONE, NONE, NONE, NONE, NONE, NONE, NONE, NONE, TCNV error : NONE, NONE, NONE, NONE, NONE, NONE, NONE, NONE, NONE, TCMP escape : NONE, NONE, NONE, NONE, NONE, NONE, NONE, AMDR, AMDR essential : NONE, NONE, NONE, NONE, NONE, NONE, NONE, ALDM, AMDR, TAMT evaporate : TDUR, AORD, NONE, NONE, NONE, ASTE, ASTE, TTIM evaporator : TDUR, AORD, NONE, NONE, NONE, ASTE, ASTE, TTIM event : TCND, NONE, NONE, NONE, TRES exchange : NONE, NONE, NONE, NONE, NONE, NONE, NONE, NONE, NONE, NONE, AVAR, AVAR, AVAR, AVAR, AVAR exchanger : NONE, NONE, NONE, NONE, NONE, NONE, NONE, NONE, NONE, NONE, AVAR, AVAR, AVAR, AVAR, AVAR exhaust : TCNV, TCNV, NONE, NONE, NONE, NONE, NONE, NONE, NONE, AMDR, AMDR, AMDR, AMDR, AMDR, AMDR, AMDR, ASTE, AUSE, TAMT external : AEID, AEID, NONE facilities : NONE, NONE, NONE, NONE, NONE, NONE, NONE, NONE, NONE, TINS, APHP facility : NONE, NONE, NONE, NONE, NONE, NONE, NONE, NONE, NONE, TINS, APHP failed : TAMT, NONE failure : TAMT, TAMT, TAMT, NONE, NONE, NONE, NONE, NONE, NONE, NONE NONE, NONE, NONE, NONE, NONE, NONE, NONE, AMDR failures : TAMT, TAMT, TAMT, NONE, NONE, NONE, NONE, NONE, NONE, NONE NONE, NONE, NONE, NONE, NONE, NONE, NONE, AMDR fan : NONE, NONE, NONE, NONE, NONE, NONE, ASTE, ASTE, ASTE, ATMP AMDR, AMDR, AMFR, AORD, TACM, TCSE, AGDM fault : NONE, NONE, NONE, NONE, NONE, NONE, AGDM feed : AMDR, AMDR, AMDR, AMDR, ATMP, ATMP, TCSE, NONE, NONE, NONE NONE, NONE, NONE ferry : TCNV, TCNV, TCNV, TMAN field : TCNV, TSPL, TSPL, TSPL, TSPL, TSPL, TSPL, APOS, APOS, APOS APOS, APOS, APOS, NONE, NONE, NONE, NONE, NONE, NONE, NONE, AEID, AEID, AORD fill : TAMT, TAMT, TAMT, NONE, NONE, NONE, NONE, NONE, NONE, NONE NONE, AORD, APOS, TSPL, AFRM filter : NONE, NONE, NONE, AMDR, ASTE final : NONE, NONE, NONE, NONE, NONE, AMDR, TRES, TGOL, AORD, TCND fire : NONE, NONE, NONE, NONE, NONE, NONE, NONE, NONE, NONE, NONE NONE, NONE, NONE, NONE, NONE, NONE, NONE, NONE, ATMP, ATMP, ATMP, ATMP, TCSE, TCSE, TCSE, TCSE, TSRC, AORD, AMDR, ASTE, TCNV, AMFR, AMFR firing : NONE, NONE, AMDR, ATMP, ATMP, TCSE, TCSE, AMFR first : TSRC, TSRC, TSRC, AORD, AORD, AORD, AORD, NONE, AEID, AEID AMDR, TTIM, TAMT five : TAMT, TACM fixed : AORD, AORD, AORD, AEID, TCND, TCND, NONE, NONE, NONE, NONE NONE, NONE, NONE, TACM, TAMT, TSPL, APOS, AGMT, AVAR, AVAR, AVAR, TTIM flap : AMDR, AMDR, AMDR, AMDR, NONE, NONE, NONE, NONE, NONE, NONE AEID, AEID, AFRM, AMFR, AMFR, AMFR, ALDM flash : NONE, NONE, NONE, NONE, NONE, NONE, NONE, NONE, NONE, NONE, ATMP, TDUR, TTIM, AGMT flight : NONE, NONE, NONE, NONE, NONE, NONE, TCNV, TCNV, TCNV, TCNV, TACM, AORD, AGMT, AGMT, AMDR, TAMT flights : NONE, NONE, NONE, NONE, NONE, NONE, TCNV, TCNV, TCNV, TCNV, TACM, AORD, AGMT, AGMT, AMDR, TAMT floor : TSPL, TSPL, APOS, APOS, ALDM, ALDM, ALDM, ALDM, ALDM, AEID, AEID, AEID, AEID, TAMT, AMDR, NONE, NONE, NONE flow : TCNV, TCNV, TCNV, TCNV, AGMT, AGMT, NONE, NONE, NONE, NONE, NONE, AMDR, AMDR, AMDR, ASTE, ASTE, ASTE, ASTE, TTIM, ALDM, TRES flows : TCNV, TCNV, TCNV, TCNV, AGMT, AGMT, NONE, NONE, NONE, NONE, NONE, AMDR, AMDR, AMDR, ASTE, ASTE, ASTE, ASTE, TTIM, ALDM, TRES fluid : ASTE, ASTE, ASTE, ASTE, AVAR following : TACM, AORD, AORD, AORD, AMDR, AMDR, AMDR, NONE, NONE, NONE, NONE, NONE, TTIM, TTIM, TRES, TCMP food : AMDR foot : ALDM, ALDM, NONE, NONE, TCNV, TCNV, TCNV, TCNV, TCNV, AGMT force : NONE, NONE, NONE, NONE, NONE, NONE, NONE, NONE, NONE, NONE, NONE, NONE, NONE, NONE, NONE, TRES, TAMT, APHP, ASTE, TCSE, AMFR, AMDR forward : AMDR, AMDR, AMDR, NONE, NONE, NONE, NONE, NONE, NONE, NONE, NONE, NONE, NONE, TMNS, TCSE, TTIM, TTIM, AMFR, AMFR, TCNV, AEID, AEID, AEID four : TAMT freon : ATMP frequency : TTIM, AMDR, AMDR, NONE, NONE fuel : ATMP, ATMP, TCNV, NONE full : TAMT, TAMT, TAMT, TAMT, AFRM, ALDM, ALDM, ACOL, AGDM, TACM AORD, TCND, NONE, NONE, NONE, NONE, NONE, NONE, NONE, AMDR fully : TAMT, TCND, NONE, NONE function : NONE, NONE, NONE, NONE, NONE, NONE, NONE, NONE, NONE, TGOL TPUR, AUSE functions : NONE, NONE, NONE, NONE, NONE, NONE, NONE, NONE, NONE, TGOL TPUR, AUSE gas : AMDR, AMDR, NONE, NONE, NONE, NONE, NONE, NONE, NONE, NONE NONE, NONE, ATMP, ASTE, ASTE gaseous : APHP, NONE, ASTE gear : NONE, NONE, NONE, AEID, ALDM, TINS, TINS, TCNV generator : TCNV, TCSE, NONE, NONE, NONE, TINS, TSRC glide : TCNV, TCNV, TCNV, TCNV, TCNV, AMDR, AMDR, NONE, NONE, NONE TTIM greater : TAMT, ALDM ground : TSPL, TSPL, TSPL, TSPL, NONE, NONE, NONE, NONE, NONE, ALDM ALDM, ALDM, ALDM, ALDM, ALDM, TCSE, TCSE, AEID, AEID, ASTE, TGOL, ACOL, APOS, APOS, APOS, APOS, AVAR, AMDR, TCNV, APHP group : TAMT, TAMT, NONE, NONE, NONE, TACM, TACM, TACM, TACM, TACM AORD, AORD, AORD, AORD, AORD, AORD, AGDM, TCMP half : TAMT, TAMT, AORD, NONE, NONE hand : NONE, NONE, NONE, NONE, NONE, NONE, NONE, NONE, NONE, NONE NONE, NONE, NONE, NONE, NONE, TAMT, TCNV, AEID handling : NONE, NONE, NONE, NONE, AUSE, AUSE hatch : NONE, NONE, NONE, NONE, NONE, NONE, NONE, NONE, AMDR, TSRC TSRC, TSRC, TPUR have : NONE, NONE, NONE, NONE, NONE, NONE, NONE, NONE, NONE, NONE TSRC, TBNF heat : NONE, NONE, NONE, NONE, NONE, NONE, NONE, ATMP, ATMP, ATMP AGND, TCSE heater : NONE, ATMP, ATMP heaters : NONE, ATMP, ATMP high : NONE, NONE, NONE, NONE, NONE, NONE, NONE, NONE, NONE, NONE NONE, NONE, NONE, NONE, NONE, NONE, NONE, NONE, NONE, NONE, TINS, ASTE, TAMT, TAMT, ALDM, ALDM, AMDR hold : TSPL, TSPL, TSPL, APOS, APOS, APOS, NONE, NONE, NONE, NONE NONE, NONE, NONE, NONE, NONE, NONE, NONE, NONE, NONE, NONE, NONE, NONE, NONE, NONE, NONE, NONE, NONE, NONE, NONE, ALDM, ALDM, ALDM, AMFR, AVAR, AVAR, AVAR, AVAR, AVAR, TAMT, TDUR, TTIM, AORD, TCMP horizontal : ALDM, ALDM, AFRM

```
hour :             TDUR, TDUR, TDUR, TTIM, TTIM, TTIM
hours :            TDUR, TDUR, TDUR, TTIM, TTIM, TTIM
however :          THAN, TAMT
hydraulic :        NONE, ASTE
identical :        TAMT, TAMT, NONE, TCMP
if :               NONE, NONE, TCND
ignition :         ATMP, ATMP, TCNV
inch :             AGDM, TCNV, AGMT, AMDR
inches :           AGDM, TCNV, AGMT, AMDR
include :          TAMT, TAMT, AORD, AEID, AEID, TACH
included :         AORD, NONE
includes :         TAMT, TAMT, AORD, AEID, AEID, TACH
including :        TAMT, TAMT, AORD
indicate :         NONE, NONE, NONE, NONE, NONE, TINS, AORD
indicates :        NONE, NONE, NONE, NONE, NONE, TINS, AORD
indicator :        NONE, NONE, NONE, ALDM
indicators :       NONE, NONE, NONE, ALDM
individual :       NONE, NONE, NONE, NONE, NONE, TAMT, TAMT, AORD
inertia :          AVAR, NONE, NONE, NONE, NONE, AGMT, AGMT
inertial :         AVAR, NONE, NONE, NONE, NONE, AGMT, AGMT
information :      NONE, NONE, NONE, NONE, NONE, NONE, NONE, NONE, TINS
initial :          TSRC, TSRC, AORD, AORD, NONE, NONE
initiate :         TACH, NONE, NONE, NONE, TSRC, TSRC, AORD, AORD, AMDR
initiated :        TACH, NONE, NONE, NONE, TSRC, TSRC, AORD, AORD, AMDR
inlet :            AMDR, TSPL, APOS, ASTE, THAN
inner :            AORD, AEID, NONE
input :            AMDR
inputs :           AMDR
inside :           NONE, NONE, AEID, AEID, AEID, AEID
installation :     AMDR, NONE, NONE, NONE, NONE, TSRC, TSRC, AORD, TSPL, APOS
installed :        TSPL, APOS
instrumentation :  NONE, NONE, TCNV, TINS
insulation :       AORD, NONE
integrated :       TAMT, TAMT, TAMT, TAMT, TACH
integration :      TACH, TAMT, TAMT, TAMT, TAMT, TAMT, TAMT, NONE, AFRM
interconnect :     TACH, TAMT, NONE
interface :        AEID, TACH, TAMT
interfaces :       AEID, TACH, TAMT
internal :         AEID, AEID, NONE, NONE
isolation :        TAMT, TAMT, NONE, NONE, NONE, NONE, AORD, TSPL, APOS
it :               AORD, NONE
its :              AORD, NONE
jet :              TCNV, TCNV, TCNV, AMDR, AMDR, AMDR, AMDR, AMDR, ACOL, TINS  NONE, ATMP, ASTE, ASTE
jets :             TCNV, TCNV, TCNV, AMDR, AMDR, AMDR, AMDR, AMDR, ACOL, TINS  NONE, ATMP, ASTE, ASTE
joint :            AGDM, TSPL, APOS, NONE, NONE, NONE, NONE, NONE, NONE, TACH  TACH, TACH, TACH, TACH, TACH, TACH,
                   TAMT, TAMT, TAMT, TAMT, TAMT, AMDR, AORD, AORD
just :             NONE, NONE, NONE, NONE, NONE, NONE, NONE, NONE, NONE, NONE  NONE, NONE, TAMT, TAMT
keyboard :         TINS, NONE
l :                AFRM, TAMT, TAMT, THAN, NONE
land :             ASTE, TSPL, TSPL, APOS, APOS, NONE, NONE, AMDR, AMDR, TCNV  TDST
landing :          TCNV, TCNV, AMDR, AMDR, NONE, ALDM, TDST
large :            TAMT, TAMT, AGDM
last :             TGOL, TGOL, TGOL, AORD, AORD, AORD, NONE, NONE, NONE, NONE  NONE, NONE, TTIM, TTIM, TTIM, TTIM,
                   TDUR, AVAR, AMDR
latch :            AFRM, TACH, TAMT
latches :          AFRM, TACH, TAMT
launch :           TCNV, TCNV, TCNV, TCNV, TSRC, AORD, NONE, AMFR, AMFR
left :             AEID, AEID, AEID, NONE, NONE, NONE, AMDR, TAMT
less :             TAMT, TAMT, TAMT, TAMT, TAMT, TAMT, NONE
level :            TAMT, TAMT, TAMT, TDGR, TSPL, APOS, ALDM, ALDM, ALDM, ALDM  AEID, ASTE, AFRM, AFRM, AFRM, AFRM,
                   NONE, NONE, NONE, NONE, NONE, NONE, AMDR, AORD
life :             NONE, NONE, NONE, NONE, NONE, NONE, NONE, NONE, NONE, NONE  TCND, TDUR, TTIM
light :            NONE, NONE, NONE, NONE, NONE, NONE, NONE, NONE, NONE, NONE, NONE  NONE, NONE, NONE, NONE, NONE,
                   NONE, NONE, NONE, NONE, NONE, NONE, NONE, NONE, TTIM, ATMP, ATMP, TINS, AMDR, AMDR, AGMT, AFRM,
                   TCNV, ASTE, ACOL, ACOL, ACOL, ALDM, APHP
lighting :         ATMP, ATMP, NONE, NONE
lights :           NONE, NONE, ASTE
limit :            AEID, AEID, AEID, AEID, AGDM, TAMT, TGOL, AORD, AORD, ALDM  ALDM, TCND, NONE
limits :           AEID
line :             NONE, NONE, NONE, NONE, NONE, NONE, NONE, NONE, NONE, NONE, NONE  NONE, NONE, NONE, NONE, NONE,
                   TSPL, APOS, AEID, AEID, AEID, AORD, AORD, AORD, AORD, AORD, AORD, AORD, AORD, ALDM, ALDM, AMDR,
                   TCNV, TPUR, TPUR, TTIM, THAN, THAN, THAN
lines :            NONE, NONE, NONE, NONE, NONE, TSPL, APOS, AEID, THAN
link :             AEID, TACH, TACH, TACH, TAMT, TAMT, TAMT, NONE, NONE, NONE  AORD, AORD
liquid :           AMDR, ASTE, ASTE, ASTE, NONE, NONE, TAMT
load :             NONE, NONE, NONE, NONE, NONE, NONE, NONE, NONE, NONE, TCNV  TCNV, APHP, APHP, TAMT, TAMT, TAMT,
                   TSPL, APOS, AMFR
loaded :           APHP, TTIM, TAMT, TAMT, NONE, NONE
loads :            NONE, NONE, NONE, NONE, NONE, NONE, NONE, NONE, NONE, TCNV  TCNV, APHP, APHP, TAMT, TAMT, TAMT,
                   TSPL, APOS, AMFR
located :          TSPL, APOS
location :         TRES, TSPL, TSPL, TSPL, APOS, APOS, APOS, TCND
long:              TDUR, TDUR, TDUR, TTIM, TTIM, TTIM, ALDM, ALDM, NONE, NONE  NONE, NONE
loop:              TCNV, TCNV, AFRM, AFRM, AFRM, AFRM, AEID, ALDM, AMDR, NONE
loops:             TCNV, TCNV, AFRM, AFRM, AFRM, AFRM, AEID, ALDM, AMDR, NONE
loss:              TAMT, NONE, NONE, NONE, NONE
low:               TINS, ASTE, TAMT, TAMT, TAMT, AMDR, ALDM, ALDM, ALDM, NONE  NONE, NONE, NONE, NONE, NONE, NONE,
                   NONE, NONE, NONE, NONE, NONE, NONE, NONE, NONE, NONE, NONE
lower:             TAMT, TAMT, TAMT, TAMT, ALDM, ALDM, ALDM, AFRM, AMDR, AMDR  NONE, NONE, NONE, NONE, NONE, NONE,
                   NONE, NONE, NONE, NONE, NONE
mach:              AGMT
made:              TSRC, TSRC, NONE
main:              ASTE, ASTE, ASTE, TAMT, TAMT, TSRC, AORD, NONE
maintain:          TDUR, TTIM, TAMT, ALDM, AVAR, NONE, NONE, NONE, NONE, NONE  NONE, NONE, NONE
maintenance:       TDUR, TTIM, TAMT, ALDM, AVAR, AVAR, NONE, NONE, NONE
major:             TTIM, TTIM, TAMT, NONE, NONE, NONE, NONE
management:        TAMT, TAMT, AUSE, AUSE, NONE, NONE, NONE, NONE, NONE, NONE  NONE, NONE
maneuver:          THNS, TCNV, TCNV, TPUR, NONE, NONE, NONE, NONE, NONE, NONE  NONE
maneuvering:       TPUR, NONE
maneuvers:         THNS, TCNV, TCNV, TPUR, NONE, NONE, NONE, NONE, NONE, NONE  NONE
manifold:          TAMT, NONE
manual:            TINS, NONE, NONE, NONE
march:             AEID, AEID, AEID, TCNV, TCNV, TCNV, AMDR, AMDR, AMDR, AMDR  APOS, AGDM, TSPL, NONE, NONE, NONE
marshall:          NONE, NONE, NONE, NONE, NONE, AORD, AORD, AORD, TACH, TACH  TAMT
mass:              TAMT, TAMT, TAMT, TAMT, TAMT, TAMT, TAMT, TAMT, TACH, TACH  TACH, TACH, TACH, APHP, APHP, APHP,
                   APHP, AGDM, AGDM, ALDM, TSPL, APOS, AORD, AORD, AORD, NONE, NONE, NONE
master:            TTIM, TCNV, TSRC, TRNF, TAMT, TAMT, NONE, NONE, NONE, NONE  NONE, NONE, NONE, NONE, NONE, NONE,
                   NONE, NONE, NONE, NONE, NONE, NONE, NONE, NONE, NONE
```

| | |
|---|---|
| mated: | TAMT, TAMT, TACM, NONE |
| mating: | AGND |
| maximum: | TAMT, TAMT, TAMT, TAMT, ALDM, ALDM, NONE |
| measurement: | TAMT, TAMT, AGDM, TCMP, NONE |
| mechanical: | TINS, NONE, NONE, NONE |
| mechanism: | TINS, TINS, THNS, THNS, NONE, NONE, NONE |
| member: | TACM, TAMT |
| members: | TACM, TAMT |
| memory: | TTIM, NONE, NONE, NONE, NONE, NONE |
| meter: | TTIM, NONE, NONE, NONE, NONE, NONE, NONE, NONE, NONE |
| miles: | AGDM, TCNV, AGMT, AMDR |
| minimum: | TAMT, TAMT, NONE, NONE |
| minus: | TAMT, TAMT, TAMT, AMDR, NONE, NONE, NONE, NONE |
| minute: | TAMT, TAMT, TDUR, TDUR, TDUR, TDUR, TTIM, TTIM, TTIM, TTIM TCND, AORD, AGDM, NONE, NONE, NONE |
| minutes: | TAMT, TAMT, TDUR, TDUR, TDUR, TDUR, TTIM, TTIM, TTIM, TTIM TCND, AORD, AGDM, NONE, NONE, NONE |
| mission: | TCNV, NONE, NONE, NONE, NONE, NONE, NONE, NONE, NONE, NONE |
| missions: | TCNV, NONE, NONE, NONE, NONE, NONE, NONE, NONE, NONE, NONE |
| mobile: | AVAR, AGMT, NONE, NONE |
| mode: | AFRM, TCND, TCND, TMAN, NONE, NONE, NONE, NONE, NONE |
| modes: | AFRM, TCND, TCND, TMAN, NONE, NONE, NONE, NONE, NONE |
| modifications: | AVAR, TCND, NONE, NONE |
| modified: | AVAR, TCND |
| module: | TAMT, TCNV |
| monitor: | TINS, NONE, NONE, NONE, NONE, NONE, NONE, NONE, NONE, NONE NONE |
| monitors: | TINS, NONE, NONE, NONE, NONE, NONE, NONE, NONE, NONE, NONE NONE |
| more: | TAMT, TAMT, TAMT, TAMT, TAMT |
| most: | TAMT, TAMT, TAMT, TAMT, TAMT, TAMT, TAMT |
| motion: | TINS, AGMT, TCNV, NONE, NONE, NONE, NONE, NONE, NONE, NONE |
| motor: | TCNV, TCNV, TCNV, AVAR, TINS, AGMT |
| motors: | TCNV, TCNV, TCNV, AVAR, TINS, AGMT |
| mounted: | TCNV |
| move: | TMNS, AGMT, AGMT, AGMT, APOS, TSPL, AMFR, AMFR, AMDR, TCNV TCNV, TCSE, NONE, NONE, NONE, NONE, NONE, NONE, NONE, NONE, NONE, NONE, NONE, NONE |
| moved: | TMNS, AGMT, AGMT, AGMT, APOS, TSPL, AMFR, AMFR, AMDR, TCNV, TCNV, TCSE, NONE, NONE, NONE, NONE, NONE, NONE, NONE, NONE, NONE, NONE, NONE, NONE |
| movement: | TCSE, AMDR, AMDR, TCNV, TCNV, TACM, TINS, AGMT, AORD, NONE, NONE, NONE, NONE, NONE, NONE, NONE, NONE, NONE, NONE, NONE |
| moving: | TCNV, TCNV, TCNV, AGMT, AGMT, TCSE, TCSE, AMFR, AMDR, NONE, NONE, NONE, NONE, NONE |
| must: | AGND, NONE, NONE, NONE, NONE, NONE, NONE, NONE, NONE |
| nautical: | TCNV, ASTE |
| navigation: | TCNV, TCNV, AMDR, APOS, TSPL |
| near: | AMDR, AMDR, TTIM, AGDM, AGDM, AGDM, AGDM, AGDM, TCMP, TCMP, AEID, ALDM, TAMT, TSPL, APOS, NONE, NONE, NONE, NONE |
| network: | ALDM, NONE |
| new: | TAMT, TAMT, TTIM, TTIM, TTIM, AUSE, NONE, NONE |
| next: | AGDM, AGDM, AORD, TTIM |
| nitrogen: | ASTE, NONE |
| nominal: | TAMT, NONE, NONE, NONE |
| normal: | TAMT, TAMT, AFRM, AFRM, ALDM, AORD, AORD, AORD, NONE, NONE, NONE, NONE, NONE, NONE |
| nose: | ASTE, AFRM, AEID, AEID, NONE, NONE, NONE, NONE, NONE, NONE |
| nozzle: | ASTE, ASTE, AFRM |
| nozzles: | ASTE, ASTE, AFRM |
| number: | TAMT, TAMT, TAMT, TAMT, TAMT, TAMT, TAMT, TAMT, TAMT, TAMT, TAMT, AORD, NONE, NONE, NONE, NONE, NONE |
| oct: | TTIM, TDUR |
| off: | TAMT, TCMP, TTIM, AORD, AEID, AGDM, AMDR, ASTE, NONE, NONE, NONE, NONE, NONE, NONE, NONE, NONE, NONE |
| oil: | ATMP, ATMP, AFRM, NONE, NONE, NONE, NONE, NONE, NONE, NONE NONE, NONE, NONE, NONE, NONE, NONE |
| onboard: | TCNV, TSPL, APOS, NONE |
| once: | TTIM, TTIM, TTIM, TTIM, TAMT |
| one: | TAMT, TAMT, TAMT, TAMT, TAMT, NONE, NONE, NONE, NONE |
| only: | TAMT, TAMT, TAMT, TAMT |
| open: | AORD, TSRC, AGDM, AGDM, NONE, NONE, NONE, NONE, NONE, NONE NONE, NONE, NONE, NONE, NONE, NONE, NONE, NONE, NONE, NONE, NONE, NONE, NONE, NONE, AFRM, AFRM, ASTE, TAMT, TAMT, TTIM, AMDR, TRNG |
| opened: | AORD, TSRC, AGDM, AGDM, NONE, NONE, NONE, NONE, NONE, NONE NONE, NONE, NONE, NONE, NONE, NONE, NONE, NONE, NONE, NONE, NONE, NONE, NONE, NONE, AFRM, AFRM, ASTE, TAMT, TAMT, TTIM, AMDR, TRNG |
| opening: | AFRM, TSRC, AMDR, AMDR, AMDR, TTIM, TMAN, AORD, AGDM, NONE NONE, NONE, NONE |
| opens: | AORD, TSRC, AGDM, AGDM, NONE, NONE, NONE, NONE, NONE, NONE NONE, NONE, NONE, NONE, NONE, NONE, NONE, NONE, NONE, NONE, NONE, NONE, NONE, NONE, AFRM, AFRM, ASTE, TAMT, TAMT, TTIM, AMDR, TRNG |
| operate: | TCNV, TPUR, AUSE, NONE, NONE, NONE, NONE |
| operated: | TCNV, TPUR, AUSE, NONE, NONE, NONE, NONE |
| operates: | TCNV, TPUR, AUSE, NONE, NONE, NONE, NONE |
| operating: | TCNV, TPUR, AUSE, NONE, NONE, NONE, NONE |
| operation: | TSRC, AUSE, AUSE, NONE, NONE, NONE, NONE, NONE, NONE, NONE |
| operations: | TSRC, AUSE, AUSE, NONE, NONE, NONE, NONE, NONE, NONE, NONE |
| or: | ACOL, ACOL, APOS, TSPL, NONE, NONE |
| orbit: | AFRM, AFRM, AFRM, AMDR, AMDR, AMDR, TSPL, APOS, TMAN, TCNV NONE, NONE, NONE |
| orbital: | AMDR |
| order: | AORD, AORD, AORD, AORD, AORD, AORD, AORD, AORD, AORD, AORD TACH, TACH, TACH, TCND, TCMP, TCMP, TMAN, TDGR, TAMT, NONE, NONE, NONE, NONE, NONE, NONE, NONE, NONE, NONE, NONE, NONE, NONE, NONE, NONE, NONE, NONE, NONE |
| other: | TAMT, TTIM, NONE, NONE, NONE, NONE |
| out: | AMDR, AMDR, AMDR, AMDR, AMDR, ATMP, ATMP, TCMP, AUSE, AEID AEID, TTIM, AORD, NONE, NONE, NONE, NONE, NONE, NONE, NONE, NONE, NONE, NONE |
| outer: | AEID |
| outlet: | AMDR, TMAN, TSPL, APOS, AFRM, NONE, NONE, NONE |
| output: | TRES, TAMT, NONE, NONE |
| outside: | AEID, AEID, AEID, AEID, AEID, AEID, AORD, NONE |
| overboard: | TCNV |
| oxidizer: | ATMP, NONE, NONE |
| oxygen: | ASTE |
| pad: | TSPL, APOS, ALDM, ALDM, AEID, TCNV, TCNV, TAMT, TAMT, NONE NONE, NONE, NONE, NONE, NONE, NONE, NONE, NONE |
| pair: | TAMT, TAMT, TAMT, TAMT, TAMT, TCMP, TCNV, AORD, TACH TACH, NONE |
| panel: | AEID, AEID, AEID, AORD, TACH, NONE, NONE, NONE, NONE |
| panels: | AEID, AEID, AEID, AORD, TACH, NONE, NONE, NONE, NONE |
| parallel: | TAMT, TAMT, TSPL, APOS, TCMP, TCMP, TCMP, TCMP, TCMP, TCMP TPUR, ALDM, ALDM, ALDM, AORD, TACH, NONE, NONE, NONE, NONE |
| parameters: | AEID, TCND, NONE |
| part: | TAMT, TAMT, TAMT, TAMT, TAMT, TAMT, TAMT, TAMT, TAMT, TAMT TSPL, APOS, ALDM, TCND, AORD, AGDM, AFRM, NONE, NONE, NONE, NONE, NONE, NONE, NONE, NONE, NONE, NONE |
| pass: | TTIM, TTIM, TTIM, TTIM, TAMT, ALDM, TMAN, AGDM, TCND, AMFR, AMFR AORD, AFRM, TDUR, TGOL, AMDR, AMDR, AMDR, AGMT, TCNV, TCNV, AUSE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE |
| path: | TCNV, TMAN, TMAN, NONE, NONE |
| payload: | NONE, NONE, TCNV, TCNV, TCNV |
| payloads: | NONE, NONE, TCNV, TCNV, TCNV |

| | |
|---|---|
| percent: | TAMT |
| perform: | NONE, NONE, NONE, NONE, NONE, NONE, NONE, NONE, NONE, TSRC |
| performance: | NONE, NONE, NONE, NONE, NONE, NONE, NONE, NONE, NONE, NONE NONE, NONE, TSRC |
| performed: | NONE, NONE, NONE, NONE, NONE, NONE, NONE, NONE, NONE, TSRC |
| period: | NONE, NONE, NONE, NONE, TAMT, TDGR, TTIM, TTIM, TTIM, TTIM AORD, TGOL, TDUR, TDUR, AMDR, AMDR, AVAR |
| pilot: | NONE, NONE, NONE, NONE, NONE, NONE, TCNV, TCNV, TCNV, TCNV |
| pilot's: | NONE, NONE, NONE, NONE, NONE, NONE, TCNV, TCNV, TCNV, TCNV |
| pitch: | TCNV, TCNV, ACOL, TAMT, TDGR, AMDR, AMDR, AMDR, AMDR, AMDR AMDR, AMDR, NONE, NONE, NONE, NONE, NONE, NONE, ALDM, ALDM, ALDM, ALDM, ALDM, AMFR, AMFR, TSPL, APOS |
| place: | TSPL, TSPL, TSPL, TSPL, TSPL, TSPL, TSPL, TSPL, TSPL, TSPL, APOS, APOS, APOS, APOS, APOS, APOS, APOS, APOS, APOS, APOS, NONE, NONE, NONE, NONE, NONE, NONE, NONE, NONE, TTIM, TTIM, AORD, AORD, AORD, TAMT, TAMT, TDGR, TMAN, AMDR, TCND, TDUR |
| planned: | TPUR, TPUR, TTIM, NONE, NONE |
| plant: | NONE, NONE, NONE, NONE, NONE, NONE, NONE, NONE, NONE, TSPL, APOS, AVAR |
| plates: | AEID, AEID, AEID, AEID, AFRM, AMDR, AMDR, NONE, NONE, NONE, NONE |
| platform: | APOS, TSPL, ALDM, ALDM, NONE, NONE, NONE, TPUR |
| plus: | TAMT, TAMT, TAMT, TAMT, TAMT, NONE, NONE |
| pneumatic: | ASTE, ASTE, NONE, NONE, AFRM |
| pod: | AEID, AEID, AORD, TACM, NONE |
| pods: | AEID, AEID, AORD, TACM, NONE |
| point: | NONE, NONE, NONE, NONE, NONE, NONE, NONE, NONE, NONE, NONE NONE, NONE, NONE, AFRM, AFRM, AFRM, AFRM, AFRM, AUSE, TINS, TAMT ,TAMT, TAMT, TDGR, AMDR, AMDR, AMDR, AORD, AORD, TGOL, TGOL, TPUR, TSPL, APOS, AEID, APHP, TTIM, TDUR, AVAR, ALDM, ALDM, AGDM, TCND |
| points: | NONE, NONE, NONE, NONE, NONE, NONE, NONE, NONE, NONE, NONE NONE, NONE, NONE, AFRM, AFRM, AFRM, AFRM, AFRM, AUSE, TINS, TAMT ,TAMT, TAMT, TDGR, AMDR, AMDR, AMDR, AORD, AORD, TGOL, TGOL, TPUR, TSPL, APOS, AEID, APHP, TTIM, TDUR, AVAR, ALDM, ALDM, AGDM, TCND |
| port: | TCNV, NONE, NONE, NONE, NONE, TDST, AMDR, AMDR, AEID, AEID AEID, AFRM |
| portion: | TAMT, TAMT, TAMT, TAMT, AMDR, AMDR, NONE, NONE, NONE, NONE NONE, NONE, ALDM |
| position: | NONE, NONE, NONE, NONE, NONE, NONE, NONE, NONE, NONE, NONE AORD, TSPL, TSPL, TSPL, APOS, APOS, APOS, TAMT, TDGR, TCND, TCND |
| positioned: | TSPL, APOS |
| positioning: | TSPL, APOS |
| positive: | NONE, NONE, NONE, NONE, NONE, NONE, NONE, NONE, NONE, NONE NONE, NONE, NONE, TAMT, TAMT, TCND |
| possible: | NONE, NONE, TAMT |
| potable: | AMDR, AMDR, NONE |
| pounds: | TAMT, TAMT, TAMT, AMFR, AMFR, TSPL, APOS, NONE, NONE, NONE NONE, NONE, NONE, NONE, NONE, APHP, APHP, APHP, TCNV, AMDR |
| power: | NONE, NONE, NONE, NONE, NONE, NONE, NONE, NONE, NONE, NONE NONE, NONE, NONE, TSPL, APOS, TAMT, TAMT, AMFR, AMFR, TMNS |
| powered: | TINS |
| preparation: | NONE, NONE, NONE, NONE, NONE, NONE, TSRC |
| press: | NONE, NONE, NONE, NONE, NONE, NONE, NONE, NONE, NONE, NONE NONE, NONE, AMDR, TCSE, TCSE, TINS, AGDM, AGDM, AORD, TACM, AMFR, AMFR, APHP, APHP, TTIM, AFRM |
| pressure: | NONE, NONE, NONE, NONE, NONE, NONE, NONE, NONE, NONE, NONE NONE, NONE, TCNV, APHP, TCSE, TCSE, TCSE, AGDM, AMFR |
| primary: | ACOL, NONE, NONE, NONE, NONE, NONE, ALDM, AORD, TSRC, TCSE TAMT, AEID |
| probe: | NONE, NONE, NONE, NONE, NONE, NONE, NONE, TCNV, TCNV |
| procedures: | TMAN, NONE, NONE, NONE, TPUR, TPUR |
| process: | TMAN, NONE, NONE, NONE, NONE, AEID, TSRC |
| processed: | TSRC |
| processing: | NONE, NONE, TSRC |
| program: | NONE, NONE, NONE, NONE, NONE, NONE, NONE, NONE, NONE, TAMT TAMT, TPUR, TPUR |
| propellant: | ATMP, AMFR, AMFR, TCNV, AGMT |
| propellants: | ATMP, AMFR, AMFR, TCNV, AGMT |
| proper: | NONE, NONE, NONE, NONE, NONE, NONE, NONE, NONE, NONE, NONE AORD, AORD, TAMT, AUSE |
| propulsion: | TCNV, AMFR, AMFR, NONE |
| provided: | NONE, NONE, NONE, TCND |
| pulse: | TTIM, TTIM, NONE, NONE, NONE, NONE, AMDR, AMDR, AMDR |
| pump: | AMDR, AMDR, AMDR, AEID, TINS, NONE, AGDM, TSRC |
| pumps: | AMDR, AMDR, AMDR, AEID, TINS, NONE, AGDM, TSRC |
| purge: | NONE, NONE, NONE, NONE, NONE, NONE, NONE, NONE, NONE, NONE NONE, NONE, NONE, NONE, NONE, NONE, AMDR, AMDR, AMDR, AORD, AORD |
| push: | NONE, NONE, NONE, NONE, NONE, NONE, NONE, NONE, NONE, TTIM TTIM, AMFR, AMFR, AMFR, AMFR, AMFR, TCSE, AGMT, AMDR |
| radar: | TCNV, TCNV, TINS, NONE, NONE, NONE |
| radiator: | ATMP, NONE, NONE |
| range: | TCNV, TCNV, TCNV, TAMT, TDGR, AMDR, AGDM, AGDM, AGDM TRNG, TRNG, TRNG, TRNG, TRNG, TRNG, TSPL, TSPL, TSPL, APOS, APOS, APOS, NONE, NONE, ALDM, AORD, AORD, AORD, AORD |
| rate: | TAMT, TAMT, TAMT, TAMT, TAMT, TAMT, TAMT, AGMT, TCMP, TCMP NONE, NONE, NONE, NONE, AORD, AORD, TDGR |
| rates: | TAMT, TAMT, TAMT, TAMT, TAMT, TAMT, TAMT, AGMT, TCMP, TCMP NONE, NONE, NONE, NONE, AORD, AORD, TDGR |
| reaction: | TRES, TRES, TCNV, TCNV, NONE, NONE, NONE, NONE, NONE, AMDR AMFR |
| readiness: | NONE, NONE, NONE, NONE, NONE, NONE, NONE, NONE, NONE, NONE NONE, TTIM, TTIM |
| ready: | NONE, NONE, NONE, NONE, NONE, NONE, NONE, NONE, NONE, NONE NONE, NONE, NONE, NONE, AUSE, TTIM |
| receive: | AMDR, NONE, NONE, NONE, NONE, NONE, TBNF, TAMT, AORD |
| received: | TBNF, NONE, NONE, NONE, NONE, NONE, NONE, NONE, TTIM |
| receives: | AMDR, NONE, NONE, NONE, NONE, NONE, TBNF, TAMT, AORD |
| recorder: | TAMT, NONE, NONE, NONE, NONE, TINS, TINS |
| red: | NONE, NONE, NONE, NONE, NONE, NONE, ACOL, ACOL, ACOL, AVAR |
| reduce: | TAMT, TAMT, TAMT, TAMT, TAMT, TAMT, TAMT, TAMT, NONE, NONE NONE, NONE, NONE, NONE, NONE, NONE, NONE, NONE, AGDM, AVAR, AMDR, TCND, ALDM, ALDM |
| redundancy: | NONE, NONE, NONE, TAMT, TAMT, TINS |
| redundant: | NONE, NONE, TAMT |
| release: | NONE, NONE, NONE, NONE, NONE, NONE, NONE, NONE, NONE, NONE NONE, NONE, NONE, NONE, NONE, NONE, NONE, NONE, NONE, AORD, AORD, TINS, TAMT, TAMT, AMDR |
| relief: | NONE, NONE, NONE, NONE, NONE, NONE, NONE, NONE, NONE, NONE TTIM, TTIM, TDUR, TDUR, APHP, AEID, AVAR, AFRM |
| remaining: | AVAR, AVAR, TTIM, TDUR, NONE, NONE, TAMT |
| remote: | NONE, NONE, NONE, NONE, NONE, NONE, AGDM |
| removed: | TAMT, TAMT, AGDM, AGDM, NONE, NONE, NONE, NONE |
| removes: | TAMT, TAMT, TAMT, TDGR, NONE, NONE, NONE, NONE, AORD, AUSE AMDR, AMDR, AMDR, AMDR, AMDR, AEID, AEID, AGDM, TCNV |
| require: | TAMT, NONE, NONE, NONE, NONE, NONE, NONE, AORD |
| respective: | NONE, NONE, AORD |
| responsible: | NONE, NONE, NONE, TAMT |
| result: | TRES, TRES, TRES, TRES, TRES, TTIM, NONE |
| results: | TRES, TRES, TRES, TRES, TRES, TTIM, NONE |
| retention: | NONE, NONE, NONE, TAMT |
| return: | TRES, TRES, NONE, NONE, NONE, NONE, NONE, NONE, NONE, NONE NONE, NONE, TDST, AMDR, AMDR, AMDR, AMDR, TAMT, TAMT, TAMT, TAMT, TAMT, TTIM, TTIM, AMFR, AVAR, AVAR, AVAR |
| returned: | TRES, TRES, NONE, NONE, NONE, NONE, NONE, NONE, NONE, NONE NONE, NONE, TDST, AMDR, AMDR, AMDR, AMDR, TAMT, TAMT, TAMT, TAMT, TAMT, TTIM, TTIM, AMFR, AVAR, AVAR, AVAR |
| reusable: | AUSE |
| review: | NONE, NONE, NONE, NONE, NONE, NONE, NONE, NONE, NONE, NONE NONE, NONE, NONE, NONE, NONE, NONE, NONE, NONE, TCMP, TCMP, TAMT, TAMT, AORD |
| right: | NONE, NONE, NONE, NONE, NONE, NONE, NONE, NONE, NONE, NONE NONE, NONE, NONE, NONE, NONE, NONE, |

| | |
|---|---|
| | NONE, NONE, NONE, NONE, NONE, NONE, NONE, NONE, NONE, NONE, NONE, NONE, AEID, AEID, AEID, AORD, AFRM, TAMT, TAMT, AMDR, AMDR, TCNV |
| roll: | TCNV, TCNV, TCNV, TCNV, TCNV, TCNV, NONE, NONE, NONE, NONE NONE, NONE, NONE, NONE, NONE, NONE, NONE, AMDR, AMDR, AMDR, AMDR, AMDR, AMDR, AMDR, AMDR, AMDR, AORD, TACH, AFRM, AFRM, AFRM, ALDM, ALDM, TAMT, TAMT, ASTE, ASTE, AMFR |
| room: | AGDM, TSPL, TSPL, TSPL, TSPL, APOS, APOS, APOS, APOS, NONE NONE, NONE, TTIM |
| rotary: | ALDM, AMDR, AMDR, AGMT, TTIM |
| rotation: | TCNV, AORD, AORD, AMDR, TTIM |
| routed: | THAN |
| run: | NONE, NONE, NONE, NONE, NONE, NONE, NONE, NONE, NONE, NONE, NONE, NONE, NONE, NONE, NONE, NONE, NONE, NONE, NONE, NONE, TAMT, AVAR, AGMT, AGMT, AGMT, AGMT, AMDR, AMDR, TCNV, TCNV, TCNV, TCNV, TCNV, TCNV, TCNV, TCNV, TCNV, TCNV, ASTE, ASTE, ASTE, ASTE, NONE, AORD, AORD, AORD, TSPL, TSPL, APOS, APOS, ALDM, TRES, THAN, THAN, TTIM, TTIM, TTIM, TDUR, ATMP, AMFR |
| runway: | TCNV, THAN |
| safe: | TAMT, NONE, NONE, NONE |
| same: | NONE, NONE, NONE, AORD, TAMT |
| sands: | APHP, ASTE, AFRM, NONE |
| satellite: | AORD, TACH, TACH, TSPL, APOS, AMDR, NONE, TCNV, TCNV, TCNV |
| satellites: | AORD, TACH, TACH, TSPL, APOS, AMDR, NONE, TCNV, TCNV, TCNV |
| scale: | TAMT, TAMT, TAMT, AEID, AEID, AEID, AEID, AEID, AORD, TDGR TRNG, TRNG, AMDR, AMDR, AMDR, TPUR, TINS, TINS, AGDM, NONE |
| seal: | AORD, NONE, NONE, NONE, NONE, NONE, NONE, NONE, NONE, NONE NONE, NONE, NONE, NONE, NONE, AFRM, ACOL |
| seals: | AORD, NONE, NONE, NONE, NONE, NONE, NONE, NONE, NONE, NONE NONE, NONE, NONE, NONE, NONE, AFRM, ACOL |
| second: | TACH, TACH, NONE, NONE, NONE, NONE, TTIM, TTIM, TDUR, TDUR TAMT, TAMT |
| secondary: | ACOL, NONE, NONE, NONE, NONE, NONE, NONE, TAMT, TAMT, TAMT AEID, AVAR, AVAR |
| seconds: | TACH, TACH, NONE, NONE, NONE, NONE, TTIM, TTIM, TDUR, TDUR TAMT, TAMT |
| section: | TSPL, TSPL, APOS, APOS, AORD, AORD, NONE, NONE, NONE, NONE TAMT, TAMT, TAMT, TAMT |
| segment: | TAMT, TAMT, TAMT, AFRM, NONE, NONE |
| segments: | TAMT, TAMT, TAMT, AFRM, NONE, NONE |
| select: | NONE, NONE, NONE, NONE, NONE, NONE, NONE, TCMP, AORD, AORD |
| selected: | NONE, NONE, NONE, NONE, NONE, NONE, NONE, TCMP, AORD, AORD |
| selection: | NONE, NONE, NONE, NONE, AORD, AORD |
| selects: | NONE, NONE, NONE, NONE, NONE, NONE, NONE, TCMP, AORD, AORD |
| separate: | TAMT, TAMT, TAMT, TAMT, TAMT, AORD, AORD, AORD, AEID, AEID TCMP, AMDR, AGDM, AFRM, NONE, NONE, NONE, NONE, NONE, NONE, NONE, NONE, NONE, NONE |
| separation: | TAMT, TAMT, AORD, AORD, TCMP, NONE, NONE, NONE, NONE, NONE NONE,TRNG, AMDR, AEID |
| sept: | TTIM, TDUR |
| sequence: | TAMT, AORD, AORD, AORD, AMDR, TTIM, TRES |
| series: | AORD, AORD, AORD, AORD, TTIM, NONE, AMDR, TAMT, TACH |
| service: | TMNS, NONE, NONE, NONE, NONE, NONE, NONE, NONE, NONE, NONE NONE, NONE, NONE, NONE, NONE, AUSE, AMDR, AMDR, TCNV, AMFR, AGND |
| set: | NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, TAMT, TAMT, TAMT, TAMT, TAMT, AORD, AORD, AORD, TACH, AGMT, AGMT, AMDR, AMDR, AMDR, AMDR, ASTE, ASTE, AFRM, AFRM, AFRM, AFRM, AFRM, TCMP, TSPL, TSPL, TSPL, TSPL, APOS, APOS, APOS, APOS, NONE, TTIM, APHP, APHP, APHP, AVAR, AVAR, AVAR, AEID |
| sets: | NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, TAMT, TAMT, TAMT, TAMT, TAMT, AORD, AORD, AORD, TACH, AGMT, AGMT, AMDR, AMDR, AMDR, AMDR, ASTE, ASTE, AFRM, AFRM, AFRM, AFRM, AFRM, TCMP, TSPL, TSPL, TSPL, TSPL, APOS, APOS, APOS, APOS, NONE, TTIM, APHP, APHP, APHP, AVAR, AVAR, AVAR, AEID |
| several: | TAMT, TAMT, TAMT, NONE, NONE, NONE, AORD |
| shut: | AFRM, AFRM, AVAR |
| shutdown: | AFRM, TAMT, NONE, NONE, AVAR, AVAR |
| shuttle: | TCNV, TCNV, ALDM, AMDR, AMDR |
| side: | NONE, NONE, NONE, NONE, NONE, NONE, NONE, NONE, NONE, NONE NONE, AEID, AEID, AEID, AEID, AEID, TACH, ALDM, ALDM, AFRM, TCNV, AMDR, TTIM |
| signal: | NONE, NONE, NONE, NONE, NONE, NONE, NONE, NONE, TINS, TINS TCNV, TAMT |
| signals: | NONE, NONE, NONE, NONE, NONE, NONE, NONE, NONE, TINS, TINS TCNV, TAMT |
| similar: | NONE, TCMP, TCMP |
| simultaneously: | TTIM, TTIM, TTIM, TDUR |
| since: | TTIM, TTIM, TTIM, NONE |
| single: | TAMT, TAMT, TAMT, NONE, NONE, AORD |
| site: | APOS, APOS, TSPL, TSPL |
| small: | NONE, NONE, NONE, NONE, NONE, NONE, TAMT, TAMT, AGDM, AGDM ALDM |
| so: | TCMP, TCMP, NONE, TAMT, TAMT, TAMT, THAN, TCND, TCND, TPUR |
| solenoid: | AMFR |
| solid: | APHP, APHP, APHP, TAMT, TAMT, TAMT, AORD, TACH, NONE, NONE NONE, NONE, NONE, NONE, NONE, AVAR, AVAR |
| some: | TAMT, TAMT, TAMT, TAMT, NONE |
| source: | ASTE, TINS, TGOL, TCSE, TCSE, NONE |
| space: | TCNV, TCNV, TSPL, TSPL, TSPL, TSPL, TSPL, TSPL, TSPL, TSPL APOS, APOS, APOS, APOS, APOS, APOS, APOS, AGDM, TAMT, TDGR, TRNG, NONE, NONE, NONE, AFRM, TTIM, TTIM, TDUR, AORD |
| spacecraft: | TCNV, TCNV |
| special: | NONE, NONE, NONE, NONE, AORD, AORD, AORD, TCNV, TCND |
| specialist: | AORD, AORD, NONE, NONE |
| specialists: | AORD, AORD, AORD, NONE |
| specific: | AORD, NONE, AEID, TCND |
| speed: | NONE, NONE, NONE, TCNV, TTIM, TTIM, AGMT, AGMT, TCSE |
| spray: | NONE, NONE, NONE, NONE, ASTE, ASTE, ASTE, ASTE, ASTE, ASTE ASTE, ASTE, TAMT, AMFR |
| square: | TTIM, TSPL, TSPL, TSPL, APOS, APOS, APOS, AORD, AORD, AEID AFRM, AFRM, ALDM, ALDM, ALDM, NONE, NONE, NONE, NONE, NONE, NONE, NONE, NONE, AGDM, AMDR, TAMT, TAMT, TAMT, TAMT, TAMT, TAMT, TAMT |
| stage: | TSPL, APOS, AEID, AEID, TTIM, TDUR, ALDM, ALDM, NONE, NONE NONE, TAMT, TCNV, TDGR |
| standard: | ALDM, ALDM, TAMT, TAMT, TDGR, NONE, NONE, NONE, NONE, NONE NONE, NONE, NONE, NONE, NONE, NONE, NONE, NONE, AORD, AORD, TCMP, AVAR |
| standby: | NONE, NONE, NONE, NONE, NONE, TACH, AGDM, AGDM, TCNV |
| star: | NONE, NONE, NONE, NONE, NONE, NONE, NONE, NONE, NONE, NONE NONE, NONE, NONE, NONE, NONE, TAMT, TAMT, TAMT |
| start: | TAMT, TAMT, AORD, AORD, TSRC, TSRC, AEID, AMFR, AMFR, AMFR AMDR, AMDR, AMDR, AMDR, NONE, NONE, NONE, NONE, NONE, NONE, NONE |
| state: | TCND, TSPL, TSPL, APOS, APOS, NONE, NONE, NONE, NONE, NONE NONE, NONE, NONE, NONE, AORD |
| station: | AORD, TSPL, TSPL, TSPL, APOS, APOS, APOS, APOS, NONE, NONE TAMT, TDGR, TCND |
| stations: | AORD, TSPL, TSPL, TSPL, APOS, APOS, APOS, APOS, NONE, NONE TAMT, TDGR, TCND |
| status: | AORD, NONE, TAMT, TDGR, TCND, TCND, TSPL, APOS |
| steering: | NONE, NONE, NONE, AMDR |
| storage: | NONE, NONE, NONE, TAMT, TSPL, APOS |
| stored: | AUSE, NONE |
| stowed: | TSPL, AUSE, APOS, NONE |
| structural: | TSRC, AFRM, NONE, NONE |
| structure: | AFRM, AFRM, AFRM, AFRM, TAMT, TAMT, TSPL, APOS, NONE, NONE NONE, AORD, AORD, APHP |
| such: | TCMP |
| suit: | NONE, NONE, NONE, NONE, NONE, NONE, NONE, NONE, AORD, AORD TACH, AEID, AEID, AEID |
| supplies: | AMDR, NONE, NONE |
| supply: | NONE, NONE, NONE, NONE, NONE, TMNS |
| support: | NONE, NONE, NONE, NONE, NONE, NONE, NONE, NONE, NONE, NONE NONE, NONE, NONE, NONE, NONE, NONE, NONE, NONE, NONE, NONE, NONE, NONE, NONE, NONE, ALDM, ALDM, ALDM, ALDM, TAMT, TAMT, TAMT, TAMT, TAMT, AMDR, TACH |
| supports: | NONE, NONE, NONE, NONE, NONE, NONE, NONE, NONE, NONE, NONE NONE, NONE, NONE, NONE, NONE, NONE, |

NONE, NONE, NONE, NONE, NONE, NONE, NONE, NONE, ALDM, ALDM, ALDM, ALDM, TAMT, TAMT, TAMT, TAMT, TAMT, AMDR, TACH
surface: TSPL, TSPL, APOS, APOS, AEID, AEID, ALDM, ALDM, ALDM, APHP AMDR, AMDR, TCNV, NONE, NONE
switch: TAMT, AVAR, AVAR, AVAR, AVAR, AVAR, AVAR, AVAR, AEID, NONE NONE, NONE, NONE, NONE, NONE, NONE, TCNV, AMDR
switches: TAMT, AVAR, AVAR, AVAR, AVAR, AVAR, AVAR, AVAR, AEID, NONE NONE, NONE, NONE, NONE, NONE, NONE, TCNV, AMDR
switching: TAMT, AVAR, AVAR, AVAR, AVAR, AVAR, AVAR, AVAR, AEID, NONE NONE, NONE, NONE, NONE, NONE, NONE, TCNV, AMDR
system: NONE, NONE, NONE, AORD, AORD, TPUR, THAN
systems: NONE, NONE, NONE, AORD, AORD, TPUR, THAN
tail: TAMT, TAMT, AEID, AEID, AEID, AEID, AEID, AEID, AORD, AORD AORD, TGOL, TGOL, AMDR, AMDR, NONE, NONE
takes: NONE, NONE, NONE, NONE, NONE, NONE, NONE, NONE, NONE, NONE, NONE, NONE, NONE, NONE, NONE, NONE, NONE, NONE, NONE, TAMT, ATMP, AMDR, AORD, TBNF, TCNV
talkback: TRES, NONE
tank: ASTE, TCNV, AEID, NONE
tanks: ASTE, TCNV, AEID, NONE
tape: NONE, NONE, NONE, NONE, ALDM, TAMT, TACH
target: NONE, NONE, TGOL, TPUR
team: AORD, TACH, TACH, TCNV, TAMT, TAMT
telemetry: NONE, NONE, TCNV
temperature: ATMP
temperatures: ATMP
terminal: TDST, AMDR, AORD, AORD, TGOL, TGOL, NONE, NONE, NONE, NONE, THAN, AEID, AEID
test: NONE, NONE, NONE, NONE, NONE, NONE, NONE, NONE, NONE, NONE, AEID
tests: NONE, NONE, NONE, NONE, NONE, NONE, NONE, NONE, NONE, NONE, AEID
than: TCMP, AORD, NONE
that: AORD, NONE
them: NONE, AORD
then: TTIM, TTIM, TTIM, TTIM, TTIM, TAMT, NONE
there: TSPL, APOS, NONE
thermal: ATMP, ATMP
these: AORD
they: AORD, NONE
third: NONE, NONE, TAMT, TAMT, TAMT
this: AORD
those: AORD
three: TAMT, TAMT
throughout: TAMT, AORD, TTIM, TSPL, APOS
thrust: AGMT, NONE, NONE, NONE, NONE, TCNV, TCNV, AMFR, AMFR, AMFR AMFR, AMFR, AMFR, TAMT, TSPL, APOS
thrusting: AGMT, NONE, NONE, NONE, NONE, TCNV, TCNV, AMFR, AMFR, AMFR AMFR, AMFR, AMFR, TAMT, TSPL, APOS
thus: NONE, NONE, THAN, TCMP, TCND
tiles: NONE, NONE, THAN, AEID
time: TDUR, TDUR, TDUR, TDUR, TDUR, TDUR, TDUR, TDUR, TDUR, TDUR TDUR, TTIM, TTIM, TTIM, TTIM, TTIM, TTIM, TTIM, TTIM, TTIM, TTIM, TTIM, TTIM, NONE
times: TCND, TTIM
top: TAMT, TAMT, TAMT, TAMT, AEID, AEID, AEID, AEID, AEID, NONE NONE, AMDR, ALDM, ALDM, ALDM, ALDM, ALDM
total: TAMT, TAMT, TAMT, TAMT, TAMT, TAMT, TAMT, TAMT, TAMT, TAMT TAMT, NONE, NONE, AORD, AORD, AORD, TACH, TCND
trajectory: NONE, TCNV, THAN
transfer: NONE, NONE, NONE, NONE, NONE, NONE, NONE, TCNV, TCNV
transferred: NONE, NONE, NONE, NONE, NONE, NONE, NONE, TCNV, TCNV
transition: AVAR, AVAR, TCNV
translation: NONE, NONE, TCNV, AVAR
transmission: TINS, TINS, NONE, NONE, NONE, TCNV
transmit: NONE, NONE, NONE, NONE, NONE, TCNV, TCNV
transmitted: NONE, NONE, NONE, NONE, NONE, TCNV, TCNV
transportation: TCNV, AMDR
trim: AEID, AEID, AEID, TCND, NONE, NONE, NONE, NONE, NONE, NONE NONE, NONE, NONE, NONE, NONE, TAMT, TAMT, TACH, AMFR, TCNV, TCNV, TCNV, ALDM, AORD, AORD, AFRM
tunnel: AFRM, AFRM, ASTE, TSPL, APOS, THAN, ALDM, NONE
turbine: AMFR
two: TAMT, TAMT
umbilical: AEID
unit: NONE, NONE, NONE, NONE, NONE, NONE, TAMT, TAMT, APHP
units: NONE, NONE, NONE, NONE, NONE, NONE, TAMT, TAMT, APHP
up: TAMT, TAMT, AMDR, AMDR, AMDR, AMDR, AGDM, ALDM, ALDM, NONE NONE
upper: ALDM, NONE, TAMT
use: AUSE, AUSE, AUSE, AUSE, AUSE, AUSE, AUSE, NONE, NONE, NONE NONE, NONE, NONE, NONE
used: AUSE, NONE, TTIM, TAMT
uses: AUSE, AUSE, AUSE, AUSE, AUSE, AUSE, AUSE, NONE, NONE, NONE NONE, NONE, NONE, NONE
using: AUSE, AUSE, AUSE, AUSE, AUSE, AUSE, AUSE, NONE, NONE, NONE NONE, NONE, NONE, NONE
valve: ASTE, NONE, AFRM, TINS
valves: ASTE, NONE, AFRM, TINS
various: NONE, NONE, NONE, TAMT, TAMT
vector: TCNV, NONE, NONE, AMDR, AFRM
vehicle: TCNV, THRS, ACOL, NONE, NONE
velocity: TCNV, AGMT, AGMT
vent: ASTE, AMDR, AMDR, AMDR, NONE, NONE, AFRM, TCNV
vertical: ALDM, ALDM, ALDM, ALDM, AFRM
via: AMDR
view: NONE, NONE, NONE, NONE, NONE, NONE, NONE, NONE, NONE, NONE NONE, TGOL, TPUR, TCMP, TRNG
volume: NONE, NONE, NONE, NONE, AGDM, AGDM, TAMT, TAMT, TSPL, APOS
warning: NONE, NONE, NONE, NONE, NONE, NONE, NONE, NONE, NONE, TINS
waste: NONE, NONE, NONE, NONE, NONE, NONE, NONE, NONE, NONE, NONE NONE, AUSE, AUSE, AUSE, TAMT, TAMT, TAMT, TAMT, TAMT, AMDR, AMDR, AMDR, AGDM, TSPL, APOS
water: AVAR, ALDM, ALDM, NONE, NONE, NONE, NONE, NONE, NONE, ATMP ASTE, ASTE, ASTE, ASTE, AMDR, AMDR, AMDR, TAMT, APHP
weighs: TAMT, NONE, NONE, NONE, NONE, TCMP, APHP
weight: NONE, NONE, NONE, NONE, NONE, NONE, NONE, NONE, NONE, NONE NONE, APHP, APHP, APHP, APHP, APHP, TAMT
well: ASTE, ASTE, ASTE, ALDM, TCSE, AFRM, AMDR, NONE, NONE, NONE NONE, NONE, NONE, NONE, NONE
west: AMDR, AMDR, AMDR, AMDR, TSPL, TSPL, APOS, APOS
wheel: AFRM, NONE, NONE, NONE, NONE, NONE, AMFR, AMDR, AMDR, AMDR AMDR, AMDR, AMDR, AMDR, TTIM, TTIM, TCNV, TCNV
while: TTIM, TTIM, TTIM, TTIM, TDUR, TDUR
white: NONE, NONE, NONE, NONE, NONE, NONE, ACOL, ACOL, ACOL, ACOL ACOL, ACOL, ACOL, TTIM
wide: ALDM, NONE, NONE, NONE, AORD, AORD, TSPL, APOS, AGDM, AGDM AGDM
will: NONE, NONE, NONE, NONE, NONE, NONE, NONE, NONE, NONE, NONE TGOL, TPUR
window: AFRM, NONE
wing: TACH, TACH, TACH, TAMT, TAMT, AMDR, AORD, TCNV, TCNV, NONE NONE, NONE, NONE, NONE, NONE, NONE
work: NONE, NONE, NONE, NONE, NONE, NONE, NONE, NONE, NONE, NONE NONE, NONE, NONE, NONE, NONE, NONE, NONE, NONE, NONE, NONE, NONE, NONE, NONE, NONE, NONE, NONE, NONE, NONE, AUSE, AUSE, TRES, TRES, ASTE, TCSE, AFRM, TAMT, TSRC

| | |
|---|---|
| yaw: | TCNV, TCNV, TCNV, TCNV, TCNV, AMDR |
| yellow: | NONE, NONE, NONE, NONE, NONE, ACOL, ACOL, ACOL, ACOL |
| zero: | NONE, NONE, ATMP |
| aborts : | AVAR, TGOL, AORD, NONE |
| accommodate : | AVAR, NONE, NONE, NONE, NONE, NONE, NONE, NONE, NONE, NONE NONE, NONE, AORD, TAMT, AMDR |
| accumulate : | TAMT, TAMT, TACM, TACM, NONE, NONE, AORD |
| accumulator : | TAMT, TAMT, TACM, TACM, NONE, NONE, AORD |
| achieve : | NONE, NONE, NONE, TDST, AMDR, TSRC |
| achieved : | NONE, NONE, NONE, TDST, AMDR, TSRC |
| acquisition : | NONE, NONE, NONE, TBNF |
| across : | ALDM, ALDM, ALDM, ALDM, ALDM, AGDM, AEID |
| action : | NONE, NONE, NONE, NONE, NONE, NONE, NONE, NONE, NONE, NONE NONE, TMNS, TCMP, TINS |
| actuated : | AMFR, TCSE, AGMT |
| adjacent : | AGDM |
| advanced : | TTIM, TTIM, TTIM, NONE, AORD |
| aerospace : | TCNV, TCNV, TSPL, APOS |
| again : | TAMT, TAMT, TAMT, TAMT, TAMT, TTIM, TTIM |
| aid : | TACM, NONE, NONE, NONE, NONE, NONE, NONE, NONE, ALDM |
| aids : | TACM, NONE, NONE, NONE, NONE, NONE, NONE, NONE, ALDM |
| airspeed : | TCNV, AGMT |
| alert : | NONE, NONE, NONE, NONE, NONE, NONE, NONE, NONE, TINS, TTIM |
| allowable : | NONE, NONE, NONE, NONE, TCND, TAMT, TCMP |
| allowing : | NONE, NONE, NONE, NONE, TCND, TAMT, TCMP |
| almost : | AGDM |
| alpha : | TSRC, TSRC, AORD, AORD |
| although : | TAMT |
| altimeter : | ALDM |
| ambient : | AEID |
| among : | TSPL, APOS, AEID, TAMT |
| analyses : | NONE, NONE, NONE, NONE, NONE, NONE, NONE, NONE, TAMT, TAMT TAMT, AORD, TCND |
| analysis : | NONE, NONE, NONE, NONE, NONE, NONE, NONE, NONE, TAMT, TAMT TAMT, AORD, TCND |
| angles : | NONE, NONE, NONE, NONE, NONE, NONE, TCNV, AFRM, AFRM, AFRM TSPL, APOS, ALDM, TPUR |
| apollo : | NONE, NONE, NONE, NONE, NONE, TCNV |
| applicable : | NONE, NONE, NONE, AUSE |
| applications : | NONE, NONE, NONE, AUSE |
| appropriate : | NONE, NONE, NONE, NONE, NONE, NONE, NONE, NONE, NONE, NONE NONE, NONE, NONE, AMDR, AORD, TTIM, AUSE |
| arms : | TACM, ASTE, AMFR, NONE, NONE, NONE, NONE, NONE, TAMT, ALDM |
| arrangement : | NONE, NONE, NONE, NONE, NONE, NONE, NONE, NONE, NONE, NONE NONE, NONE, NONE, AORD, AORD, AORD, TPUR, AFRM article :NONE, NONE, NONE, NONE, NONE, NONE, NONE, NONE, NONE, TAMT TAMT, TCND |
| assembled : | AORD, TACM, TACM, TAMT, TSRC |
| assessment : | TAMT, TAMT, TAMT, TAMT, TCMP, NONE, NONE |
| assign : | NONE, NONE, NONE, NONE, NONE, NONE, NONE, TSPL, APOS, AORD TCNV |
| assigned : | NONE, NONE, NONE, NONE, NONE, NONE, NONE, TSPL, APOS, AORD TCNV |
| assist : | NONE, NONE, NONE, TMNS |
| astronaut : | TCNV, TCNV, TCNV |
| astronauts : | TCNV, TCNV, TCNV |
| attachment : | TAMT, TAMT, TAMT, NONE, NONE, NONE, NONE, TACM |
| attack : | NONE, NONE, NONE, NONE, NONE, NONE, NONE, NONE, NONE, NONE NONE, NONE, NONE, NONE, NONE, NONE, NONE, TPUR, AMDR, TMAN |
| augment : | TAMT, TAMT, NONE, AGDM |
| augmented : | TAMT, TAMT, NONE, AGDM |
| average : | AORD, AORD, AORD, AORD, AORD, TAMT, TAMT, TAMT, NONE |
| away : | NONE, NONE, NONE, AGDM, AGDM, AGDM, AEID, AMDR, AMDR |
| ax : | TINS, NONE, NONE, TAMT |
| axes : | TINS, NONE, NONE, TAMT |
| bag : | NONE, NONE, NONE, NONE, NONE, NONE, NONE, NONE, NONE, NONE TAMT, TAMT, ALDM, ALDM, AGND, AORD, AFRM, AFRM, AEID, TSPL, APOS |
| ball : | NONE, NONE, NONE, NONE, NONE, TACM, AORD, AMFR, AFRM, AFRM AGND |
| band : | TACM, TACM, TACM, TACM, TACM, AFRM, AORD, NONE, NONE, NONE NONE, ALDM, ACOL, ACOL, TAMT, TAMT, AEID, AEID |
| bank : | NONE, NONE, NONE, NONE, NONE, NONE, NONE, NONE, AEID, AEID ALDM, ALDM, ALDM, ALDM, TAMT, TAMT, ASTE, ASTE, TACM, TACM, AORD, AORD, AORD, AORD, TCNV, ATMP |
| bar : | NONE, NONE, NONE, NONE, NONE, NONE, NONE, NONE, NONE, NONE NONE, NONE, NONE, AFRM, AFRM, AFRM, TAMT, TAMT, AORD, AORD, AORD, ASTE, ALDM, ALDM, ALDM, ALDM, ALDM, ALDM, AMFR, ACOL, ACOL, AEID |
| basic : | TCSE, NONE, NONE, NONE, TAMT, ALDM |
| battery : | NONE, NONE, NONE, NONE, NONE, TINS, TACM, AORD |
| beach : | ASTE, TCNV |
| becomes : | AVAR, AVAR, TSRC, AORD, NONE, NONE |
| bed : | NONE, NONE, NONE, NONE, NONE, NONE, NONE, NONE, NONE, NONE ALDM, ALDM, ALDM, ALDM, ALDM, ALDM, TSPL, APOS, AEID, ASTE, AMDR, AVAR |
| began : | TSRC, AORD |
| bellows : | ASTE, ASTE |
| beneath : | ALDM, NONE |
| black : | ACOL, ACOL, ACOL, ACOL, ACOL, NONE, NONE, NONE, NONE, NONE NONE, NONE, NONE, NONE, NONE |
| blanket : | AEID, AEID, AEID, NONE, AORD, TCMP |
| blankets : | AEID, AEID, AEID, NONE, AORD, TCMP |
| board : | NONE, NONE, NONE, NONE, NONE, NONE, NONE, NONE, NONE, NONE AEID, AEID, AMDR, AMDR, AMDR, AMDR, AMDR, AMDR, AMDR, ALDM, TCNV |
| bolt : | NONE, NONE, NONE, NONE, NONE, NONE, NONE, NONE, NONE, NONE NONE, NONE, NONE, TACM, TACM, AORD, AORD, AORD, ALDM, AFRM, AMDR, TAMT, AGMT |
| bolts : | NONE, NONE, NONE, NONE, NONE, NONE, NONE, NONE, NONE, NONE NONE, NONE, NONE, TACM, TACM, AORD, AORD, AORD, ALDM, AFRM, AMDR, TAMT, AGMT |
| bond : | NONE, NONE, NONE, NONE, NONE, NONE, NONE, NONE, NONE, NONE, NONE, TACM, TACM, TACM, TAMT, TAMT, TAMT |
| bonded : | NONE, NONE, NONE, NONE, NONE, NONE, NONE, NONE, NONE, NONE, NONE, TACM, TACM, TACM, TAMT, TAMT, TAMT |
| bottom : | ALDM, ALDM, ALDM, ALDM, NONE, NONE, ASTE, TCNV, AFRM, TAMT |
| boxes : | NONE, NONE, NONE, NONE, NONE, NONE, NONE, NONE, NONE, TSPL, TSPL, TSPL, APOS, APOS, APOS, AMFR, AMFR, AEID, AEID |
| brakes : | NONE, NONE, NONE, AGMT, AVAR |
| breaker : | NONE, ASTE, ASTE, TAMT |
| breakers : | NONE, ASTE, ASTE, TAMT |
| bridge : | NONE, NONE, NONE, NONE, AFRM, TMAN, TINS, AEID, TACM, TAMT |
| buildup : | NONE, NONE, TAMT, TAMT |
| cables : | NONE, NONE, NONE, NONE, ALDM, 'ALDM |
| cameras : | TINS, NONE, NONE |
| cap : | ALDM, ALDM, ALDM, ALDM, AEID, AEID, AEID, AEID, ATMP, NONE, NONE, NONE, TAMT |
| capacity : | NONE, NONE, NONE, NONE, NONE, NONE, NONE, TAMT, TAMT, TMNS, TCND, TSPL, APOS, AGDM |
| cape : | AEID, AFRM |
| carbon: | ATMP, NONE |
| cases : | NONE, NONE, NONE, NONE, NONE, NONE, NONE, NONE, NONE, NONE, NONE, NONE, AFRM, AEID, AEID, AEID, AEID, AEID, AORD, TCND, TCND |
| caused : | TCSE, TCSE, TCSE, TCSE, TCSE, NONE, NONE, NONE, TGOL, TSRC |
| causes : | TCSE, TCSE, TCSE, TCSE, TCSE, NONE, NONE, NONE, TGOL, TSRC |
| causing : | TCSE, TCSE, TCSE, TCSE, TCSE, NONE, NONE, NONE, TGOL, TSRC |
| cavity : | TSPL, TSPL, APOS, APOS, AGDM, AFRM, ALDM |
| ceiling : | TCNV, TCNV, TSPL, APOS, AEID, AEID, TAMT, TAMT, ALDM, TRNG |

centers : NONE, NONE, NONE, NONE, NONE, TCNV, AEID, AEID, AEID, TAMT AORD, AMDR, AMFR
central : NONE, NONE, NONE, NONE, TCSE, TAMT, TAMT, AEID, AEID, AORD
certain : NONE, NONE, NONE, NONE, NONE, NONE, NONE, AORD, TAMT, TAMT TAMT
changed : AVAR, AVAR
characteristic : NONE, NONE, NONE, NONE, NONE, NONE, AORD, AORD, AORD characteristics :NONE, NONE, NONE, NONE, NONE, NONE, AORD, AORD, AORD
circuitry : NONE, AMDR
circuits : AFRM, AMDR, AMDR, AMDR, NONE, NONE, NONE, NONE, AEID, TCNV TSPL, APOS, TTIM, THAN
city : TSPL, TSPL, TSPL, TSPL, APOS, APOS, APOS, APOS
closeout : NONE, NONE, NONE, NONE, TAMT
closes: AVAR, AVAR, NONE, NONE, NONE, NONE, NONE, NONE, NONE, NONE, NONE, NONE, NONE, NONE, NONE, NONE, NONE, NONE, NONE, TGOL, TGOL, AORD, AORD, AORD, AMDR, AMDR, AFRM, AFRM, AEID, AEID, AEID, AEID, TSPL, TSPL, THAN, APOS, APOS, AGMT, TACH, TACH, APHP, APHP, TCMP, TAMT, TAMT, ALDM, AGDM, AGDM, AGDM, ATMP
closing : AVAR, AFRM, NONE, TGOL, TGOL, AORD, AORD
closure : AFRM, TAMT, TAMT, NONE, TACH
coast : AEID, AEID, ASTE, AMDR, AMDR, AGMT, NONE, NONE, NONE, TCNV TCNV, TCNV
coating : AEID, AEID, AEID, AEID, ACOL, ACOL
code : AORD, AORD, NONE, NONE, NONE, NONE, NONE, NONE, NONE
cold : ATMP, ATMP, ATMP, ACOL, NONE, NONE, NONE, NONE, NONE, NONE NONE, NONE, NONE, NONE, NONE, AGND
collection : NONE, NONE, NONE, NONE, NONE, NONE, NONE, TACH, TACH, AORD AORD
color : NONE, NONE, NONE, NONE, NONE, NONE, NONE, NONE, NONE, NONE NONE, NONE, NONE, NONE, NONE, NONE, NONE, ACOL, ACOL, ACOL, ACOL, ACOL, ACOL, ACOL, ACOL, ACOL, ACOL, ACOL, ACOL, ACOL, ACOL, ACOL, ACOL, ACOL, ACOL, AORD, AFRM, TAMT
combination : TACH, TACH, TACH, TACH, TACH, NONE, NONE, NONE, TAMT, TAMT TAMT, TAMT, TAMT, TAMT, AORD
combined : TACH, TACH, TACH, TACH, TACH, AORD, AORD, AORD, TAMT, TAMT
common : NONE, NONE, NONE, NONE, NONE, NONE, NONE, NONE, NONE, NONE NONE, NONE, NONE, NONE, NONE, NONE, NONE, TACH, TTIM, TAMT, TAMT, AORD, AORD
compass : AEID, AEID, AEID, AEID, AEID, TDGR, TAMT, TRNG, TRNG, TRNG TINS, NONE, NONE, NONE, AMDR
completion : TAMT, NONE, NONE, NONE, TRES
component : TAMT, TAMT, TAMT, NONE, NONE, NONE
composed : AORD, NONE, NONE, NONE, TAMT
composite : TAMT, TAMT, TAMT, TAMT
compute : TAMT, TAMT, NONE
computed : TAMT, TAMT, NONE
concrete : NONE, NONE, TAMT, AEID, AEID, AEID, APHP, APHP, APHP, APHP APHP, APHP, THAN, AORD
configurations : NONE, NONE, NONE, AORD, AFRM, AEID
conjunction : TAMT, TAMT, TACH, TACH, AGDM, NONE
conn : TCNV
connect : AGDM, NONE, NONE, NONE, NONE, TACH, TACH, TAMT, TAMT, TAMT TAMT, AORD
connects : AGDM, NONE, NONE, NONE, NONE, TACH, TACH, TAMT, TAMT, TAMT, TAMT, AORD
considered : TPUR, NONE
console : NONE, NONE, NONE, NONE, NONE, TINS
consoles : NONE, NONE, NONE, NONE, NONE, TINS
consolidated : TAMT, AGDM, APHP
constant : NONE, NONE, NONE, NONE, NONE, NONE, NONE, NONE, NONE, ACOL, TDUR, TDUR, TTIM, TTIM, TTIM, TTIM, AORD, AVAR, AVAR
constraint : NONE, NONE, NONE, NONE, NONE, NONE, NONE, NONE, TCSE
constraints : NONE, NONE, NONE, NONE, NONE, NONE, NONE, NONE, TCSE
construct : AFRM, AFRM, TAMT, TSRC
constructed : AFRM, AFRM, TAMT, TSRC
construction : AFRM, AFRM, TAMT, NONE, NONE, NONE, NONE, TSRC
contact : NONE, NONE, NONE, NONE, NONE, AGDM, AGDM
contained : AFRM, AEID, AEID, AEID, AORD, AORD, TAMT, NONE
container : AEID, NONE
containers : AEID, NONE
containing : AFRM, AEID, AEID, AEID, AORD, AORD, TAMT, NONE
contaminate : TAMT, NONE, NONE, NONE, NONE
contamination : TAMT, NONE, NONE, NONE, NONE
continuous : TAMT, TAMT, AVAR, TDUR, TTIM, TTIM, NONE, AORD
contractors : NONE, NONE, NONE, NONE, NONE, NONE, NONE, NONE, NONE, AFRM, AGDM, AGDM, ALDM, ALDM
conventional : NONE, NONE, NONE, NONE, NONE, NONE, AORD, AORD, TTIM
convert : NONE, NONE, NONE, NONE, NONE, NONE, AVAR, AVAR, AVAR, ALDM, AUSE, TSRC
converts : NONE, NONE, NONE, NONE, NONE, NONE, AVAR, AVAR, AVAR, ALDM AUSE, TSRC
cooled : ATMP, ATMP, ATMP, ATMP, NONE, NONE, NONE, NONE, NONE, NONE NONE, NONE, NONE, NONE, NONE, NONE, NONE, NONE, NONE, NONE, NONE, NONE, NONE, AVAR, AVAR, ACOL, AGMT
coordinate : TCMP, TAMT, TAMT, NONE, AORD, AFRM, AFRM, TACH
core : AEID, AEID, TSPL, APOS, NONE, NONE, NONE, NONE, AORD, AORD
correct : AORD, NONE, NONE, NONE, NONE, NONE, NONE, NONE, NONE, NONE NONE, NONE, NONE, NONE
course : TSPL, APOS, TCNV, TCNV, TCNV, TCNV, TCNV, TCNV, AGMT, ASTE ASTE, ASTE, TTIM, AORD, AMDR, AMDR, AMDR, AMDR, AEID, THAN, THAN, TPUR, NONE, NONE, NONE, NONE, NONE, NONE
cover : AEID, AEID, AEID, AEID, AEID, NONE, NONE, NONE, NONE, NONE NONE, NONE, NONE, NONE, NONE, NONE, NONE, AMDR, AMDR, AMDR, AMDR, TCNV, AFRM, AFRM, ACOL, TAMT, TAMT, AGND, TSPL, APOS, AORD, TACH, TDUR, TTIM, ALDM
covered : AEID, AEID, AEID, AEID, AEID, NONE, NONE, NONE, NONE, NONE NONE, NONE, NONE, NONE, NONE, NONE, NONE, AMDR, AMDR, AMDR, AMDR, TCNV, AFRM, AFRM, ACOL, TAMT, TAMT, AGND, TSPL, APOS, AORD, TACH, TDUR, TTIM, ALDM
covers : AEID, AEID, AEID, AEID, AEID, NONE, NONE, NONE, NONE, NONE NONE, NONE, NONE, NONE, NONE, NONE, NONE, AMDR, AMDR, AMDR, AMDR, TCNV, AFRM, AFRM, ACOL, TAMT, TAMT, AGND, TSPL, APOS, AORD, TACH, TDUR, TTIM, ALDM
critical : NONE, NONE, NONE, NONE, NONE, NONE, NONE, NONE, NONE, TTIM TCMP, TCMP
cross : NONE, NONE, NONE, NONE, NONE, NONE, NONE, NONE, NONE, NONE NONE, NONE, NONE, NONE, NONE, NONE, NONE, NONE, NONE, NONE, NONE, NONE, ALDM, ALDM, ALDM, ALDM, ALDM, ALDM, TAMT, TAMT, TAMT, TAMT, AMDR, TCNV
cryogenic: ATMP, ATMP, ATMP
damage : NONE, NONE, NONE, NONE, NONE, NONE, TAMT
deactivate : NONE, AORD
deactivated : NONE, AORD
dead : NONE, NONE, NONE, NONE, NONE, NONE, NONE, NONE, NONE, NONE, NONE, NONE, NONE, NONE, AFRM, ACOL, TGOL, AORD, AGMT, TTIM, TTIM, AMDR, TAMT
decrease : AGDM, AGDM, TAMT, TAMT, TAMT, TAMT, TAMT, TAMT, TAMT, NONE, NONE, TDGR
decreases : AGDM, AGDM, TAMT, TAMT, TAMT, TAMT, TAMT, TAMT, TAMT, NONE, NONE, TDGR
defense : NONE, NONE, NONE, NONE, NONE, NONE, NONE, TRES
defined : AEID, TRNG, NONE, AORD
delayed : TTIM, AGMT
deliver : NONE, NONE, NONE, NONE, NONE, NONE, TCNV
delivered : NONE, NONE, NONE, NONE, NONE, NONE, TCNV
delta : AMDR, ASTE, AFRM

```
demonstrate :       TAMT, NONE, NONE, NONE, NONE, NONE, NONE, NONE, NONE, NONE
demonstrated :      TAMT, NONE, NONE, NONE, NONE, NONE, NONE, NONE, NONE, NONE
department :        TSPL, TSPL, APOS, APOS, NONE, NONE
depends :           TCND, NONE, ALDM
depletion :         AUSE, TAMT, TAMT, AMDR, NONE
deployable :        TSPL, APOS, NONE, NONE, AMDR, AORD, AGDM
depressed :         NONE, NONE, NONE, AFRM, AMDR, ALDM
descent :           NONE, NONE, NONE, NONE, NONE, AORD, AORD, AGMT, ALDM, AMDR, AMDR, TCNV
designate :         NONE, NONE, NONE, NONE, AORD
designated :        NONE, NONE, NONE, NONE, AORD
detailed :          NONE, TCND, AORD
detect :            TRES
detected :          TRES
determined :        AEID, NONE, NONE, NONE, NONE, NONE, NONE, TTIM
determines :        TCSE, TCSE, AEID, AMDR, TRES, TGOL, AORD, AORD, NONE, NONE  NONE, NONE, NONE, NONE, NONE, TPUR,
                    TCMP
deviation :         AORD, AORD, AVAR, AMDR, AMDR, AMDR, AMDR, NONE, NONE, NONE  NONE, NONE, AFRM, ALDM
difference :        AORD, AVAR, NONE, NONE, NONE, NONE, NONE, NONE, TCMP, TAMT  TAMT, TAMT
differential :      AORD, AORD, NONE, NONE, TINS, TCMP, TAMT
discharge:          NONE, NONE, NONE, NONE, NONE, NONE, NONE, NONE, NONE, NONE, NONE, NONE, NONE, NONE, NONE, NONE,
                    NONE, NONE, NONE, NONE, NONE, NONE, AMDR, AMDR, AMDR, AMDR, AMDR, AMDR, AMDR, AMDR, AMDR, AMDR,
                    AMDR, AMDR, AMDR, TAMT, TAMT, TAMT, ASTE, AMFR, AMFR, AORD
disconnects :       TAMT
discrete :          NONE, NONE, TAMT, TAMT, AORD, AORD
discretes :         NONE, NONE, TAMT, TAMT, AORD, AORD
distance :          ALDM, TSPL, APOS, AGDM, NONE, NONE, AEID, TAMT
distribute :        AORD, AORD, NONE, NONE, NONE
distributed :       AORD, NONE
distributes :       AORD, AORD, NONE, NONE, NONE
divided :           NONE, TAMT, TAMT
done :              NONE, NONE, NONE, NONE, ATMP, TGOL, AORD, TSRC
driven :            AGMT, AGMT, NONE, NONE, NONE, NONE, NONE, NONE  NONE, NONE, NONE, NONE, NONE, NONE, NONE, NONE,
                    NONE, NONE, NONE, TCSE, TCSE, TACM, AORD, TTIM, AMFR, AMFR, AMFR, AMFR, AMFR, TINS, TCNV, TCNV,
                    TCNV, TCNV, TSPL, THAN, APOS, AFRM
driver :            TCNV, TCNV, NONE, NONE, NONE, AMFR
drivers :           TCNV, TCNV, NONE, NONE, NONE, AMFR
drives :            AGMT, AGMT, NONE, NONE, NONE, NONE, NONE, NONE, NONE, NONE, NONE, NONE, NONE, NONE, NONE, NONE,
                    NONE, NONE, NONE, TCSE, TCSE, TACM, AORD, TTIM, AMFR, AMFR, AMFR, AMFR, AMFR, TINS, TCNV, TCNV,
                    TCNV, TCNV, TSPL, THAN, APOS, AFRM
dry :               NONE, NONE, NONE, NONE, NONE, NONE, NONE, NONE, NONE, NONE  NONE, NONE, NONE, ASTE, ASTE
dual :              TAMT, TAMT
dumped :            NONE, NONE, NONE, NONE, NONE, NONE, NONE, NONE, NONE, NONE  NONE, NONE, NONE, TSPL, TSPL, APOS,
                    APOS, AUSE, AUSE, AMDR
duration :          TDUR, TDUR, TTIM, TTIM, TTIM, AVAR
dynamics :          NONE, NONE, AGMT
early :             TTIM, TTIM, TTIM, TTIM, TTIM, TTIM, TTIM, TTIM
east :              AMDR, AMDR, AMDR, TSPL, TSPL, APOS, APOS
edge :              NONE, NONE, TAMT, TSRC, AORD, AEID, AEID, AEID, AEID, AFRM  AFRM, AFRM, AFRM, ALDM
effective :         NONE, NONE, NONE, NONE, NONE, NONE, AUSE
elapsed :           TTIM
electric :          TCNV, TCNV, NONE, NONE
element :           TCSE, NONE, NONE, TAMT, TAMT, TAMT, AEID, ATMP, ATMP, TCND
elevation :         AMDR, AMDR, TPUR, NONE, NONE, NONE, NONE, NONE, ALDM, ALDM  ALDM, TAMT
ends :              NONE, NONE, NONE, NONE, NONE, NONE, NONE, NONE, NONE, NONE  AEID, TAMT, TAMT, TAMT, TGOL, TGOL,
                    TGOL, TPUR, TRES, TRES, TRES, AVAR, AVAR, AORD, AORD
engineer :          NONE, NONE, NONE, NONE, NONE, NONE, TSRC, TSRC, TCNV, TPUR
engineering :       NONE, NONE, NONE, NONE, NONE, NONE, TSRC, TSRC, TCNV, TPUR
enough :            NONE, NONE, NONE, NONE, AVAR
enter :             NONE, NONE, TSRC, AORD, AMDR, AMDR, TACM, TAMT, TAMT
enters :            NONE, NONE, TSRC, AORD, AMDR, AMDR, TACM, TAMT, TAMT
entire :            TAMT, TAMT, NONE, TCND
equivalent :        TAMT, TAMT, TAMT, TCMP, TCMP, AVAR, AVAR, AVAR, NONE, NONE  NONE, NONE
errors :            NONE, NONE, NONE, NONE, NONE, NONE, NONE, NONE, NONE, TCMP
established :       NONE, NONE, NONE, NONE, NONE, AVAR, TSPL, APOS, TTIM
evaluate :          TAMT, TAMT, TCMP, NONE
even :              NONE, NONE, NONE, NONE, NONE, NONE, NONE, NONE, TAMT, TAMT  TAMT, TAMT, TAMT, TAMT, ALDM, ALDM,
                    ALDM, AFRM, AFRM, AFRM, AFRM, AFRM, AVAR, AVAR, TTIM
events :            TCND, NONE, NONE, NONE, TRES
every :             AORD
exceed :            TAMT, TAMT, NONE, AMDR
exceeds :           TAMT, TAMT, NONE, AMDR
excess :            NONE, NONE, NONE, NONE, NONE, TAMT, TAMT, AMDR
existing :          NONE, TTIM
exit :              ASTE, NONE, NONE, NONE, NONE, NONE, AMDR, AMDR, AMDR, AMDR  AMDR, TMAN
expansion :         NONE, NONE, NONE, AVAR, AORD, AGDM, AGDM, TAMT, TSPL, APOS
exposed :           ASTE, ASTE, NONE, NONE, NONE, NONE, AEID, AFRM, TRNG
extend :            AGDM, AGDM, AGDM, AGDM, AGDM, APHP, ALDM, ALDM, ALDM, AEID, TDUR, TDUR, TTIM, TTIM, TTIM, NONE,
                    NONE, NONE, AORD, TAMT, TSPL, APOS, AFRM, AVAR
extended :          AGDM, TSPL, APOS, TAMT, ALDM, NONE, NONE, TDUR, TTIM
extends :           AGDM, AGDM, AGDM, AGDM, AGDM, APHP, ALDM, ALDM, ALDM, AEID  TDUR, TDUR, TTIM, TTIM, TTIM, NONE,
                    NONE, NONE, AORD, TAMT, TSPL, APOS, AFRM, AVAR
extension :         TAMT, TAMT, TAMT, AVAR, AGDM, AGDM, ALDM, ALDM, TDUR, TTIM, AORD, TSPL, APOS, APHP, NONE, NONE,
                    NONE
extensive :         ALDM, ALDM, AGDM, AGDM, TAMT, TSPL, APOS, AORD
exterior :          NONE, NONE, AEID
extinguish :        NONE, NONE, NONE, TGOL, AORD, TAMT, TAMT, ATMP
extinguished :      NONE, NONE, NONE, TGOL, AORD, TAMT, TAMT, ATMP
fabrication :       TAMT, TSRC, TSRC, NONE, AFRM
fail :              TTIM, NONE, NONE, NONE, NONE, NONE, NONE, NONE, NONE, NONE  NONE, TAMT, TAMT, AMDR
fails :             TTIM, NONE, NONE, NONE, NONE, NONE, NONE, NONE, NONE, NONE  NONE, TAMT, TAMT, AMDR
fans :              NONE, NONE, NONE, NONE, NONE, NONE, ASTE, ASTE, ASTE, ATMP  AMDR, AMDR, AMFR, AORD, TACM, TCSE,
                    AGDM
feature :           NONE, NONE, NONE, NONE, NONE, NONE, NONE, NONE, AORD, AORD  AORD, AORD, TAMT
ferried :           TCNV, TCNV, TCNV, TMAN
fifth :             TAMT, TAMT, NONE
filters :           NONE, NONE, NONE, AMDR, ASTE
finally :           TGOL, AORD, TRES, TRES, NONE
firings :           NONE, NONE, AMDR, ATMP, ATMP, TCSE, TCSE, AMFR
fit :               NONE, NONE, NONE, NONE, NONE, NONE, NONE, NONE, NONE, NONE  NONE, NONE, NONE, NONE, NONE, NONE,
                    NONE, NONE, NONE, NONE, NONE, NONE, NONE, NONE, AMDR, TDUR, TTIM, TTIM, AVAR, AORD, TAMT, TSPL,
                    APOS, AEID
fitting :           AVAR, NONE, NONE, NONE, NONE, NONE, NONE, NONE, TTIM, AUSE
fittings :          AVAR, NONE, NONE, NONE, NONE, NONE, NONE, NONE, TTIM, AUSE
fixture :           TAMT, NONE, NONE, TINS, AVAR
flag :              NONE, NONE, NONE, NONE, NONE, NONE, NONE, NONE, NONE, NONE  TMAN, AEID, AGMT
flame :             NONE, NONE, NONE, NONE, NONE, ATMP, ATMP, ATMP, ATMP, ACOL
flexible :          AVAR, AORD, NONE, NONE, NONE, NONE, AFRM, APHP, APHP
fly :               NONE, NONE, NONE, NONE, NONE, NONE, AEID, AMDR, AMDR, AMDR  TCNV, TCNV, TCNV, TCNV, TDUR, TTIM,
```

TTIM, AGMT follow : NONE, NONE, NONE, NONE, NONE, NONE, NONE, NONE, NONE, NONE NONE, NONE, AEID, TAMT, TAMT, AORD, AORD, AORD, ALDM, TCMP, TRES, AMDR followed : NONE, NONE, NONE, NONE, NONE, NONE, NONE, NONE, NONE, NONE NONE, NONE, AEID, TAMT, TAMT, AORD, AORD, AORD, ALDM, TCMP, TRES, AMDR follows : NONE, NONE, NONE, NONE, NONE, NONE, NONE, NONE, NONE, NONE NONE, NONE, AEID, TAMT, TAMT, AORD, AORD, AORD, ALDM, TCMP, TRES, AMDR form : NONE, NONE, NONE, NONE, NONE, NONE, NONE, NONE, NONE, NONE NONE, NONE, NONE, NONE, NONE, NONE, NONE, NONE, NONE, AORD, AORD, AORD, AORD, AORD, TCND, TCND, AFRM, AFRM, AFRM, AFRM, AFRM, AFRM, TSPL, APOS, THAN, TAMT, TSRC, TSRC fourth : NONE, TAMT, TAMT frame : NONE, NONE, NONE, NONE, NONE, NONE, NONE, NONE, ALDM, ALDM AFRM, AFRM, AFRM, AFRM, AFRM, AFRM, AEID, AEID, TSRC, TSRC, TPUR, TPUR free :NONE, NONE, NONE, NONE, NONE, NONE, NONE, NONE, NONE, NONE NONE, NONE, NONE, NONE, NONE, NONE, NONE, NONE, NONE, NONE, TAMT, TAMT, TAMT, TAMT, TAMT, TAMT, AFRM, AFRM, TTIM front : NONE, NONE, NONE, NONE, NONE, NONE, NONE, NONE, NONE, NONE NONE, NONE, TCNV, TSPL, TSPL, APOS, APOS, AEID, AEID, AEID, AEID, AEID, AEID, AEID, AMDR, ASTE, AORD, AORD, TSRC functional : NONE, NONE, NONE, NONE, NONE, NONE, NONE, AUSE further : AMDR, NONE, TAMT, TAMT, AGDM, TTIM future : NONE, NONE, NONE, NONE, TTIM, TTIM g : APHP, TAMT, TAMT galley : ATMP, TCNV, TCNV, TCNV, NONE, NONE garment : NONE, AEID, AEID gases : AMDR, AMDR, NONE, NONE, NONE, NONE, NONE, NONE, NONE, NONE NONE, NONE, ATMP, ASTE, ASTE general : NONE, NONE, NONE, NONE, NONE, NONE, AORD, AORD, TCMP generate : TCSE, NONE, NONE, TSRC generated : TCSE, NONE, NONE, TSRC generates : TCSE, NONE, NONE, TSRC getaway : AGMT, AMDR, NONE given : TCND, TCND, NONE, NONE, NONE, NONE, TAMT glass : APHP, NONE, NONE, NONE, NONE, NONE, AFRM, ATMP, ASTE, AEID TINS, TINS, TINS go : NONE, NONE, NONE, NONE, NONE, NONE, NONE, NONE, NONE, NONE NONE, NONE, NONE, NONE, NONE, NONE, TDUR, TDUR, TTIM, TTIM, AMDR, AMDR, AMDR, AMDR, AGDM, TSPL, TSPL, APOS, APOS, AGMT, TCNV, TCNV goes : NONE, NONE, NONE, NONE, NONE, NONE, NONE, NONE, NONE, NONE NONE, NONE, NONE, NONE, NONE, NONE, TDUR, TDUR, TTIM, TTIM, AMDR, AMDR, AMDR, AMDR, AGDM, TSPL, TSPL, APOS, APOS, AGMT, TCNV, TCNV good : NONE, NONE, NONE, NONE, NONE, NONE, NONE, NONE, NONE, NONE NONE, NONE, NONE, NONE, NONE, NONE, NONE, NONE, NONE, NONE, NONE, TAMT gravity : AMFR, NONE, NONE, NONE, NONE, NONE, NONE, NONE, APHP, APHP gray : ACOL, ACOL, ACOL, ACOL, NONE, NONE, NONE, TTIM groups : TAMT, TAMT, NONE, NONE, NONE, TACM, TACM, TACM, TACM, TACM AORD, AORD, AORD, AORD, AORD, AORD, AGDM, TCMP handle : ALDM, ALDM, NONE, NONE, NONE, NONE, NONE, NONE, NONE, NONE NONE, NONE, NONE, NONE, AFRM, AUSE, AUSE, TCNV hard : NONE, NONE, NONE, NONE, NONE, NONE, NONE, NONE, NONE, NONE NONE, NONE, NONE, NONE, NONE, NONE, NONE, NONE, NONE, NONE, NONE, APHP, APHP, APHP, APHP, AGDM hatches : NONE, NONE, NONE, NONE, NONE, NONE, NONE, NONE, AMDR, TSRC TSRC, TSRC, TPUR he : AORD, AGMD heading : TCNV, NONE, NONE, AORD, AMDR, AMDR, AMDR, AEID, ALDM, ALDM held : NONE, NONE, NONE, NONE, AVAR, ALDM, AUSE higher : ALDM, TAMT hinge : AMDR, TACM, TACM, TAMT, TAMT, TTIM, TCND, TRES hinges : AMDR, TACM, TACM, TAMT, TAMT, TTIM, TCND, TRES honeycomb : NONE, NONE, NONE, NONE, AFRM, AFRM, AFRM hook : TCNV, AFRM, AFRM, AFRM, AFRM, AFRM, AMFR, ALDM, TACM, TAMT NONE, NONE, NONE, NONE, NONE, NONE, TCSE horizontally : ALDM, ALDM, AFRM hot : NONE, NONE, NONE, NONE, NONE, NONE, NONE, NONE, NONE, NONE NONE, NONE, NONE, NONE, NONE, NONE, TRES, ATMP, ATMP, AGND, AGND, AGDM, ACOL house : TSPL, TSPL, APOS, APOS, NONE, NONE, NONE, NONE, NONE, NONE NONE, NONE, NONE, NONE, AFRM, TACM, AEID houses : TSPL, TSPL, APOS, APOS, NONE, NONE, NONE, NONE, NONE, NONE NONE, NONE, NONE, NONE, AFRM, TACM, AEID housing : TCNV, AEID, AEID, AEID, NONE, NONE, TSPL, APOS, TSRC identification : TAMT, NONE, NONE, NONE, NONE, NONE, NONE, NONE, NONE ignite : NONE, ATMP illuminate : ACOL, NONE, NONE, NONE, NONE impact : AMFR, NONE, NONE, TRES, TCNV, AVAR, AMDR improve : AVAR, AVAR, TAMT, NONE, NONE, NONE, NONE, NONE, AUSE improved : NONE, AVAR improvements : NONE, NONE, NONE, AVAR, AVAR inclination : NONE, NONE, NONE, NONE, NONE, NONE, NONE, NONE, NONE, AMDR, ALDM, ALDM incorporated : TACM, TACM, TAMT, TAMT, NONE increase : TAMT, TAMT, TAMT, TAMT, TAMT, TAMT, TAMT, TAMT, TAMT, TAMT TAMT, NONE, NONE, AMDR, AGDM, AGDM, AGDM, AGDM, TDGR increased : NONE, AGDM, TAMT, TAMT increases : TAMT, TAMT, TAMT, TAMT, TAMT, TAMT, TAMT, TAMT, TAMT, TAMT TAMT, NONE, NONE, AMDR, AGDM, AGDM, AGDM, AGDM, TDGR independent : TAMT, NONE, NONE, NONE, NONE, NONE, NONE, NONE, NONE, NONE NONE, NONE indication : NONE, NONE, NONE, NONE, TINS industrial : NONE, NONE, TSRC industries : NONE, NONE, NONE, NONE, NONE, TACM industry : NONE, NONE, NONE, NONE, NONE, TACM initially : TSRC, AORD inject : AMDR, TCSE, ASTE injector : AMDR, TCSE, ASTE insertion : AMDR, AMDR, AMDR, AEID, NONE, TCNV instead : AVAR instrument : NONE, NONE, NONE, NONE, NONE, NONE, TCNV, TINS, TINS, TINS, TINS, TINS, TINS, TINS, TINS, TMNS, AFRM instruments : NONE, NONE, NONE, NONE, NONE, NONE, TCNV, TINS, TINS, TINS TINS, TINS, TINS, TINS, TINS, TMNS, AFRM intact : NONE, NONE, NONE, NONE, TAMT, TAMT, TTIM, TTIM, AVAR, AFRM integrity : TAMT, TAMT, TAMT, TAMT, NONE, NONE, AORD intensity : ACOL, NONE, NONE, NONE, NONE, NONE, TAMT interior : AEID, AEID, AEID, AEID, AORD, AORD, NONE, NONE intermediate : TINS, NONE, NONE, NONE, NONE, TMNS, AEID, TAMT, AORD international : NONE, AORD invert : AGND, ALDM inverter : AGND, ALDM involve : NONE, NONE, NONE, NONE, NONE, NONE, NONE, NONE, NONE, NONE NONE, TAMT, AORD, AEID involved : NONE, NONE, NONE, NONE, NONE, NONE, NONE, NONE, TAMT, TAMT AORD involving : NONE, NONE, NONE, NONE, NONE, NONE, NONE, NONE, NONE, NONE NONE, TAMT, AORD, AEID isolate : NONE, NONE, TAMT, TAMT, ASTE, AORD isolated : TAMT, TAMT, ASTE, NONE, NONE, NONE, NONE, AGMT isolates : NONE, NONE, TAMT, TAMT, ASTE, AORD issue: TCSE, NONE, NONE, NONE, NONE, NONE, NONE, NONE, NONE, NONE NONE, NONE, NONE, NONE, NONE, NONE, NONE, NONE, NONE, AMDR, AMDR, AMDR, TRES, TRES, TRES, TRES, TSRC, AORD, AORD, TTIM, ASTE, TAMT issued : TCSE, NONE, NONE, NONE, NONE, NONE, NONE, NONE, NONE, NONE NONE, NONE, NONE, NONE, NONE, NONE,

| | |
|---|---|
| | NONE, NONE, NONE, AMDR, AMDR, AMDR, TRES, TRES, TRES, TRES, TSRC, AORD, AORD, TTIM, ASTE, TAMT |
| item : | TAMT, TAMT, TAMT, TAMT, TAMT, NONE, NONE, NONE, TCND |
| items : | TAMT, TAMT, TAMT, TAMT, TAMT, NONE, NONE, NONE, TCND |
| itself : | AORD |
| jettison : | NONE, NONE, AUSE, AUSE, AMDR, AMDR |
| jettisoned : | NONE, NONE, AUSE, AUSE, AMDR, AMDR |
| joints : | AGDM, TSPL, APOS, NONE, NONE, NONE, NONE, NONE, NONE, TACM TACM, TACM, TACM, TACM, TACM, TACM, TAMT, TAMT, TAMT, TAMT, TAMT, AMDR, AORD, AORD |
| keep : | NONE, NONE, NONE, NONE, NONE, NONE, NONE, NONE, NONE, NONE NONE, NONE, NONE, NONE, NONE, NONE, NONE, NONE, NONE, NONE, NONE, AMDR, TDUR, TTIM, AVAR, AVAR |
| kit : | NONE, NONE, TACM, AORD, TINS, TTIM |
| knob : | AFRM, AFRM, AFRM, ALDM |
| knot : | TCNV, AFRM, AFRM, AFRM, AFRM, AFRM, TACM, TACM, TACM, TACM AORD, TAMT, TAMT, TAMT, TAMT, TAMT, TAMT, AEID, NONE, NONE, APHP, APHP, AGMT |
| knots : | TCNV, AFRM, AFRM, AFRM, AFRM, AFRM, TACM, TACM, TACM, TACM AORD, TAMT, TAMT, TAMT, TAMT, TAMT, TAMT, AEID, NONE, NONE, APHP, APHP, AGMT |
| laboratory: | NONE, NONE, TSPL, APOS |
| lake: | ASTE, ACOL |
| landings: | TCNV, TCNV, TDST, AMDR, AMDR, NONE, ALDM |
| larger: | TAMT, TAMT, AGDM |
| largest: | TAMT, TAMT, AGDM |
| latched: | AFRM, TAMT, TACM |
| later: | TTIM, TTIM, TTIM, TTIM, TTIM, TTIM |
| lateral: | NONE, NONE, AMFR, AEID, AEID, AEID |
| launched: | TCNV, TCNV, TCNV, TCNV, AORD, TSRC, NONE, AMFR, AMFR |
| launches: | TCNV, TCNV, TCNV, TCNV, AORD, TSRC, NONE, AMFR, AMFR |
| leading: | NONE, NONE, NONE, NONE, NONE, AMDR, AMDR, TAMT, AORD, AORD TSRC, AEID |
| leak: | AGDM, NONE, NONE, NONE, NONE, AMDR, AMDR, TSPL, APOS |
| least: | NONE, TAMT, TAMT, TAMT, TAMT |
| length: | AGDM, TRNG, ALDM |
| levels: | AORD, TAMT, TAMT, TAMT, TSPL, APOS, ALDM, ALDM, ALDM, ALDM AEID, ASTE, AFRM, AFRM, AFRM, AFRM, NONE, NONE, NONE, NONE, NONE, NONE, AMDR, TDGR |
| liftoff: | TCNV |
| limited: | TCNV, AGDM, TSPL, APOS, NONE, NONE, NONE, ALDM, TCND, AEID, AORD |
| linear: | AORD, AFRM |
| liner: | NONE, TCNV, TCNV |
| loading: | NONE, APHP, TSPL, APOS |
| locations: | TRES, APOS, APOS, APOS, TSPL, TSPL, TSPL, TCND |
| lock: | ASTE, AEID, AGMT, NONE, NONE, NONE, NONE, AFRM, TAMT, TACM |
| locker: | TAMT, ATMP, NONE |
| lockers: | TAMT, ATMP, NONE |
| locks: | ASTE, AEID, AGMT, NONE, NONE, NONE, NONE, AFRM, TAMT, TACM |
| longer: | TTIM, TTIM, TTIM, TDUR, TDUR, TDUR, NONE, NONE, NONE, NONE ALDM, ALDM |
| lost: | NONE, NONE, NONE, NONE, NONE, NONE, NONE, NONE, NONE, TAMT |
| machined: | TACM, TCNV, AVAR, TINS, TINS, TINS, TSRC, NONE, NONE, NONE, NONE |
| magnetic: | AMFR, NONE, NONE, NONE |
| maintained: | NONE, NONE, NONE, NONE, NONE, NONE, NONE, NONE, TTIM, TDUR TAMT, ALDM, AVAR |
| maintains: | NONE, NONE, NONE, NONE, NONE, NONE, NONE, NONE, TTIM, TDUR TAMT, ALDM, AVAR |
| make: | TAMT, TAMT, TAMT, AFRM, AFRM, AORD, TRES, NONE, NONE, NONE NONE, NONE, NONE, NONE, NONE, NONE, NONE, TDST, AMDR, TCSE, AVAR, TSRC, ASTE, TCNV, TCNV |
| makes: | TAMT, TAMT, TAMT, AFRM, AFRM, AORD, TRES, NONE, NONE, NONE NONE, NONE, NONE, NONE, NONE, NONE, NONE, TDST, AMDR, TCSE, AVAR, TSRC, ASTE, TCNV, TCNV |
| man: | TTIM, TTIM, NONE, NONE, NONE, NONE, NONE, NONE, NONE, NONE NONE, NONE, NONE, NONE, NONE, TACM, AGND, AGND |
| manifolds: | NONE, TAMT |
| manned: | TTIM, TTIM, NONE, NONE, NONE, NONE, NONE, NONE, NONE, NONE NONE, NONE, NONE, NONE, NONE, TACM, AGND, AGND |
| manner: | NONE, NONE, NONE, NONE, AEID, AORD, AORD, TCND, TMAN |
| manufacturing: | TSRC, TSRC |
| many: | TAMT, TAMT, TAMT, NONE, NONE, NONE, TTIM |
| margin: | AEID, AEID, NONE, NONE, NONE, NONE, NONE, TRNG, TSPL, TSPL APOS, APOS |
| material: | NONE, NONE, NONE, NONE, NONE, NONE, NONE, NONE, NONE, NONE NONE, NONE, NONE, NONE, NONE, NONE, NONE, NONE, AEID |
| materials: | NONE, NONE, NONE, NONE, NONE, NONE, NONE, NONE, NONE, NONE NONE, NONE, NONE, NONE, NONE, NONE, NONE, NONE, AEID |
| means: | NONE, NONE, TMNS, TMNS, TAMT, TMAN, TINS |
| measure: | NONE, NONE, NONE, NONE, NONE, NONE, NONE, NONE, NONE, NONE NONE, NONE, NONE, NONE, NONE, NONE, NONE, NONE, NONE, NONE, NONE, NONE, TAMT, TAMT, TAMT, TAMT, TAMT, TAMT, AGDM, AGDM, AGDM, TDGR, TMNS, ALDM, TCMP, TCMP, TCNV, APOS, TSPL |
| measurements: | TAMT, TAMT, NONE, AGDM, TCMP |
| meet: | AORD, AORD, AORD, AORD, TACM, TACM, TACM, TACM, NONE, NONE NONE, NONE, NONE, NONE, NONE, NONE, NONE, NONE, NONE, NONE, NONE, NONE, TAMT, AMFR, AMDR, AGDM, TTIM, AEID |
| message: | TINS, NONE, NONE, NONE, NONE, NONE |
| metal: | ASTE, ASTE, ASTE, ASTE, AEID, NONE |
| meters: | NONE, NONE, NONE, NONE, NONE, NONE, NONE, NONE, TTIM |
| mile: | ALDM, TAMT, TRNG |
| million: | TAMT, TAMT, TAMT |
| minimize: | NONE, NONE, NONE, TAMT |
| mixture: | NONE, NONE, NONE, TAMT, TAMT, TAMT, TAMT, AORD, TACM, TINS, ASTE |
| mobility: | AVAR, AGMT |
| model: | NONE, NONE, NONE, NONE, NONE, NONE, NONE, NONE, NONE, NONE NONE, NONE, NONE, NONE, NONE, NONE, AFRM, AFRM modification:AVAR, TCND, NONE, NONE |
| modular: | TAMT, TCNV |
| modulation: | AVAR, NONE, NONE, NONE, NONE |
| modules: | TAMT, TCNV |
| mounting: | AMDR, AMDR, TAMT, AGMT, AGMT, ALDM, ALDM, NONE |
| moves: | NONE, NONE, NONE, NONE, NONE, NONE, NONE, NONE, NONE, NONE NONE, NONE, TMNS, AGMT, AGMT, AGMT, TSPL, APOS, AMFR, AMFR, AMDR, TCNV, TCNV, TCSE |
| mph: | AGMT |
| much: | TAMT, TAMT, TAMT, NONE, NONE |
| national: | NONE, NONE, NONE, AORD |
| negative: | NONE, NONE, NONE, NONE, NONE, NONE, NONE, NONE, NONE, NONE NONE, NONE, NONE, NONE, NONE, NONE, NONE, NONE, NONE, NONE, NONE, NONE, TAMT, TAMT |
| nine: | TAMT, TACM |
| norm: | TAMT, NONE, NONE, NONE, NONE, AORD |
| north: | AMDR, AMDR, AMDR, TSPL, APOS |
| now: | TTIM, TTIM, TTIM, TTIM, TTIM, TTIM, TDUR |
| objectives: | TGOL, TPUR, TINS, NONE, NONE, NONE, NONE |

| | |
|---|---|
| obtained: | NONE, NONE, AMDR, TCNV, TCSE, AORD, TBNF |
| ocean: | TAMT, ASTE |
| office: | NONE, NONE, NONE, NONE, NONE, NONE, NONE, NONE, NONE, NONE AUSE, TSPL, APOS, TINS |
| operator: | NONE, NONE, NONE, NONE, NONE, NONE, NONE, TPUR |
| optical: | TINS, NONE |
| orbiters: | NONE, NONE, NONE, AFRM, AFRM, AFRM, AMDR, AMDR, AMDR, TSPL APOS, THAN, TCNV |
| orbits: | NONE, NONE, NONE, AFRM, AFRM, AFRM, AMDR, AMDR, AMDR, TSPL APOS, THAN, TCNV |
| orientation: | NONE, AMDR, AMDR, TSPL, APOS |
| original: | NONE, NONE, NONE, NONE, NONE, NONE, NONE, NONE, AORD, AORD AORD, AORD, AORD, TCSE, TCSE, ALDM, TSRC, TTIM, TTIM AUSE |
| originally: | AORD, TSRC, NONE |
| outlets: | NONE, NONE, NONE, AMDR, TSPL, APOS, THAN |
| outputs: | NONE, NONE, TRES, TAMT |
| overall: | AORD, AORD, AORD, TACM, TAMT |
| overhead: | TAMT, AEID, ALDM |
| overland: | ASTE |
| pack: | TAMT, TAMT, TAMT, TAMT, TAMT, AORD, AORD, AORD, AORD, AORD TACM, TACM, TACM, TACM, TACM, NONE, NONE, NONE, NONE, NONE, NONE, NONE, NONE, TCNV, TCNV, TCNV, AVAR, AEID, AEID, TSPL, APOS, AFRM |
| package: | TAMT, TAMT, AORD, AORD, TACM, TACM, AEID, AEID, AEID |
| packages: | TAMT, TAMT, AORD, AORD, TACM, TACM, AEID, AEID, AEID |
| pads: | TSPL, APOS, ALDM, ALDM, AEID, NONE, NONE, NONE, NONE, NONE NONE, NONE, NONE, NONE, TCNV, TCNV, TAMT, TAMT |
| pairs: | TAMT, TAMT, TAMT, TAMT, TAMT, TAMT, NONE, TCNV, TCMP, AORD TACM, TACM |
| pallet: | ALDM, ALDM |
| pallets: | ALDM, ALDM |
| pane: | NONE, AEID, AFRM |
| panes: | NONE, AEID, AFRM |
| parachute: | TCNV, TCNV, NONE, AMDR, AMDR |
| parachutes: | TCNV, TCNV, NONE, AMDR, AMDR |
| parameter: | AEID, TCND, NONE |
| park: | NONE, NONE, NONE, NONE, NONE, AEID, TRNG, TSPL, TSPL, APOS, APOS |
| particular: | NONE, NONE, NONE, NONE, NONE, NONE, NONE, TCND, TCND, TAMT AORD, AORD, AORD |
| parts: | TCNV, TCNV, TCNV, TCNV, NONE, NONE, NONE, NONE, NONE, NONE NONE, NONE, NONE, NONE, TSPL, APOS, TINS, AEID |
| passes: | TTIM, TTIM, TTIM, TTIM, NONE, NONE, NONE, NONE, NONE, NONE, NONE NONE, NONE, NONE, NONE, NONE, NONE, NONE, NONE, NONE, NONE, NONE, NONE, NONE, NONE, NONE, NONE, NONE, NONE, NONE, TAMT, TAMT, ALDM, THAN, AGDM, TCND, AMFR, AMFR, AFRM, TDUR, TGOL, AORD, AMDR, AMDR, AMDR, AGMT, TCNV, TCNV, AUSE |
| passive: | ,NONE, NONE, NONE, NONE, NONE, NONE, NONE, AGMT |
| paths: | TCNV, NONE, NONE, THAN, THAN |
| pedal: | AMFR, AMFR, TINS, TCNV, ALDM |
| pedals: | AMFR, AMFR, TINS, TCNV, ALDM |
| performs: | NONE, NONE, NONE, NONE, NONE, NONE, NONE, NONE, NONE, TSRC |
| periods: | NONE, NONE, NONE, NONE, TAMT, TDGR, TTIM, TTIM, TTIM, TTIM AORD, TGOL, TDUR, TDUR, AMDR, AMDR, AVAR |
| personnel: | AVAR, NONE, NONE |
| placed: | AORD, AORD, TSPL, APOS |
| placing: | TSPL, TSPL, TSPL, TSPL, TSPL, TSPL, TSPL, TSPL, TSPL, TSPL APOS, APOS, APOS, APOS, APOS, APOS, APOS, APOS, APOS, APOS, NONE, NONE, NONE, NONE, NONE, NONE, NONE, NONE, TTIM, TTIM, AORD, AORD, AORD, TAMT, TAMT, TDGR, THAN, AMDR, TCND, TDUR |
| plan: | TGOL, TPUR, TPUR, TPUR, TPUR, TPUR, NONE, NONE, NONE, NONE NONE, NONE, TAMT, AFRM, TSRC, TTIM, AORD |
| plane: | TCNV, TAMT, TDGR, ALDM, ALDM, AFRM, AFRM, AFRM, TINS, AMDR |
| planning: | AORD, NONE, NONE, TPUR |
| plants: | NONE, NONE, NONE, NONE, NONE, NONE, NONE, NONE, NONE, TSPL APOS, AVAR |
| plate: | AEID, AEID, AEID, AEID, NONE, NONE, NONE, NONE, AFRM, AMDR, AMDR |
| platforms: | TSPL, ALDM, ALDM, NONE, NONE, NONE, TPUR, APOS |
| pm: | TTIM, NONE |
| pointer: | NONE, NONE, TINS |
| pointing: | NONE, NONE, NONE, NONE, NONE, NONE, NONE, NONE, NONE, AFRM, AFRM, AFRM, AFRM, AFRM, AUSE, TINS, TDGR, TAMT, TAMT, TAMT, AMDR, AMDR, AMDR, TGOL, TGOL, AORD, AORD, TPUR, TSPL, APOS, AGDM, TCND, AVAR, ALDM, ALDM, TDUR, TTIM, AEID, APHP |
| polar: | AORD, TGOL, AEID, NONE |
| pole: | AMDR, ALDM, ALDM, ALDM, ALDM, ALDM, ALDM, NONE, NONE, AORD TGOL, TCNV, TCNV, AEID, AGDM, AMFR |
| portable: | TCNV |
| predetermined: | NONE, NONE, TCMP, TPUR |
| preliminary: | AORD, AORD, AORD, AORD, AORD, TSRC, TSRC, NONE |
| preparations: | NONE, NONE, NONE, NONE, NONE, NONE, TSRC |
| present: | NONE, NONE, NONE, NONE, NONE, NONE, NONE, NONE, NONE, NONE NONE, NONE, NONE, NONE, TTIM, TTIM, TTIM, AEID, AMDR, TAMT |
| pressure: | NONE, NONE, NONE, NONE, NONE, NONE, NONE, NONE, NONE, NONE NONE, NONE, TCNV, APHP, TCSE, TCSE, TCSE, AGDM, AMFR |
| pressures: | NONE, NONE, NONE, NONE, NONE, NONE, NONE, NONE, NONE, NONE NONE, NONE, TCNV, APHP, TCSE, TCSE, TCSE, AGDM, AMFR |
| previous: | TTIM, TTIM, TTIM, TTIM |
| previously: | TTIM, TTIM |
| primarily: | TAMT, AORD, TSRC, NONE |
| prior: | TTIM, TTIM, AMDR, AORD |
| probes: | NONE, NONE, NONE, NONE, NONE, NONE, NONE, TCNV, TCNV, TCNV |
| processes: | THAN, NONE, NONE, NONE, NONE, NONE, NONE, AEID, AEID, TSRC |
| produce: | AMDR, AMDR, AMDR, NONE, NONE, NONE, NONE, NONE, NONE, NONE NONE, NONE, TRES, TAMT, TCSE, TSRC, TSRC, TSRC, ALDM |
| product: | NONE, NONE, TRES, TRES, TAMT |
| products: | NONE, NONE, TRES, TRES, TAMT |
| profile: | NONE, NONE, NONE, AFRM, TPUR, AEID, AEID |
| programs: | NONE, NONE, NONE, NONE, NONE, NONE, NONE, NONE, NONE, TAMT TAMT, TPUR, TPUR |
| progress: | AMDR, AMDR, AVAR, AVAR, AVAR, AVAR, AGMT, AGMT, AGMT, TCNV TCNV, TCNV, TCNV, NONE, NONE, NONE, NONE |
| project: | TGOL, TPUR, TPUR, TPUR, TPUR, TTIM, TTIM, NONE, NONE, NONE NONE, NONE, AEID, ALDM, AFRM, TCNV, AMFR |
| proportional: | NONE, NONE, TSPL, APOS |
| providing: | TCND |
| provisions: | TCND, AMDR, AMDR, NONE, NONE, NONE, NONE, NONE, NONE, NONE NONE, NONE |
| pulled: | AMFR, AMFR, AMFR, AMFR, AMFR, AMDR, AMDR, AMDR, AMDR, NONE NONE, NONE, NONE, NONE, NONE, NONE, NONE, NONE, ALDM, TCNV |
| pyro: | NONE, ATMP |
| pyrotechnic: | ATMP, ATMP, NONE |
| qualification: | NONE, NONE, NONE, NONE, NONE, NONE, NONE, NONE, NONE, AVAR, AEID, TCND |
| quality: | AORD, AEID, TCND, NONE, NONE, NONE, NONE |
| quantity: | TAMT, TAMT, TAMT, TAMT, TAMT, AGDM, AGDM, NONE, NONE, NONE, NONE |
| quick: | NONE, NONE, NONE, NONE, NONE, NONE, NONE, NONE, NONE, NONE NONE, NONE, AGMT, AGMT, TTIM, TTIM, TTIM, TTIM, TDUR, TDUR |
| radiation: | AORD, AMDR, NONE, NONE, NONE, NONE, TCNV |
| radiators: | ATMP, NONE, NONE |
| radio: | NONE, NONE, NONE, NONE, NONE, NONE, NONE, NONE, NONE, NONE NONE, TINS |
| ram: | AGND, TCNV, AMFR, NONE |
| ranges: | TSPL, TSPL, TSPL, APOS, APOS, APOS, TCNV, TCNV, TCNV, TAMT TDGR, AMDR, AGDM, AGDM, AGDM, TRNG, TRNG, TRNG, TRNG, TRNG, TRNG, ALDM, AORD, AORD, AORD, AORD, NONE, NONE |

| | |
|---|---|
| ranging: | TSPL, TSPL, TSPL, APOS, APOS, APOS, TCNV, TCNV, TCNV, TAMT TDGR, AMDR, AGDM, AGDM, AGDM, TRNG, TRNG, TRNG, TRNG, TRNG, TRNG, ALDM, AORD, AORD, AORD, AORD, NONE, NONE |
| ratio: | TCMP, TAMT, TAMT, NONE, TDGR |
| reentry: | AMDR, TDST, TCNV |
| reach: | ASTE, TAMT, TAMT, TDGR, AGDM, AGDM, TRNG, TRNG, TRNG, ALDM TDST, TDST, AMDR, AMDR, NONE, NONE, NONE, NONE, NONE, NONE, TSPL, APOS, TCNV, TCNV |
| reached: | ASTE, TAMT, TAMT, TDGR, AGDM, AGDM, TRNG, TRNG, TRNG, ALDM TDST, TDST, AMDR, AMDR, NONE, NONE, NONE, NONE, NONE, NONE, TSPL, APOS, TCNV, TCNV |
| reaches: | ASTE, TAMT, TAMT, TDGR, AGDM, AGDM, TRNG, TRNG, TRNG, ALDM TDST, TDST, AMDR, AMDR, NONE, NONE, NONE, NONE, NONE, NONE, TSPL, APOS, TCNV, TCNV |
| receiving: | TBNF, TBNF, AMDR |
| reception: | NONE, NONE, NONE, NONE, NONE, AMDR, AMDR, AORD, AORD, TACM, TBNF |
| record: | TTIM, TDUR, NONE, NONE, NONE, NONE, NONE, NONE, NONE, NONE, TAMT |
| recorded: | TTIM, TDUR, NONE, NONE, NONE, NONE, NONE, NONE, NONE, NONE, TAMT |
| recorders: | TINS, TINS, NONE, NONE, NONE, NONE, TAMT |
| reduced: | TAMT, TAMT, TAMT, NONE, NONE, NONE, NONE, NONE, AMDR |
| reduces: | TAMT, TAMT, TAMT, TAMT, TAMT, TAMT, TAMT, TAMT, NONE, NONE NONE, NONE, NONE, NONE, NONE, NONE, NONE, NONE, AGDM, AVAR, AMDR, TCND, ALDM, ALDM |
| reduction: | TAMT, TAMT, TAMT, TAMT, TAMT, AGDM, AVAR, AMDR, ALDM, NONE NONE, NONE, NONE, NONE, NONE |
| region: | TSPL, TSPL, TSPL, APOS, APOS, APOS, ASTE |
| regulated: | NONE, NONE, NONE, NONE, NONE, NONE, AORD, AORD, TCND |
| rejection: | NONE, NONE, NONE, NONE, NONE, NONE, NONE, AUSE, AMDR, AORD |
| relative: | NONE, NONE, TCMP |
| relay: | NONE, NONE, NONE, TTIM, TDUR, TCNV |
| relays: | NONE, NONE, NONE, TTIM, TDUR, TCNV |
| reliability: | AVAR, NONE, NONE, NONE |
| remain: | TAMT, NONE, NONE, AGMT, AVAR, AVAR, TTIM, TDUR |
| remains: | TAMT, NONE, NONE, TTIM |
| removal: | AMDR, AMDR, AMDR, AMDR, AMDR, NONE, NONE, NONE, NONE, AUSE TCNV, AEID, AORD, TAMT, TAMT |
| remove: | AMDR, AMDR, AMDR, AMDR, AMDR, NONE, NONE, NONE, NONE, AUSE TCNV, AEID, AEID, AORD, TAMT, TAMT, TAMT, AGDM, TDGR |
| rendezvous: | AORD, AORD, TACM, TACM, NONE |
| replace: | TTIM, AMDR, NONE, AVAR |
| replaced: | TTIM, AMDR, NONE, AVAR |
| requires: | TAMT, NONE, NONE, NONE, NONE, NONE, NONE, AORD |
| requiring: | TAMT, NONE, NONE, NONE, NONE, NONE, NONE, AORD |
| residual: | TAMT |
| respect: | NONE, NONE, NONE, NONE, NONE, NONE, NONE, NONE, NONE, NONE NONE, NONE, NONE, NONE, NONE, NONE, NONE, TCND |
| respectively: | AORD, NONE, NONE |
| response: | TRES, TRES, NONE, NONE, NONE, NONE, NONE, NONE, NONE, NONE, AMFR |
| resulting: | TRES, TRES, TRES, TRES, TRES, TTIM , NONE |
| retracted: | NONE, NONE, NONE, NONE, AMDR |
| rigid: | NONE, NONE, NONE, NONE, NONE, NONE, AVAR, AVAR, APHP |
| ring: | TSPL, APOS, TACM, TACM, NONE, NONE, NONE, NONE, NONE, NONE NONE, NONE, NONE, NONE, NONE, AFRM, AFRM, AFRM, AEID |
| rooms: | AGDM, TSPL, TSPL, TSPL, TSPL, APOS, APOS, APOS, APOS, TTIM NONE, NONE, NONE |
| rotate: | TCNV, ALDM, AGMT, TTIM, AMDR |
| rotated: | TCNV, ALDM, AGMT, TTIM, AMDR |
| rotates: | TCNV, ALDM, AGMT, TTIM, AMDR |
| rpm: | AMDR, AGMT |
| safing: | TAMT, NONE, NONE, NONE |
| scan: | NONE, NONE, NONE, NONE, NONE, NONE, TRNG, TAMT |
| schedule: | TAMT, TAMT, TAMT, TPUR, TPUR, NONE, NONE, NONE |
| scheduled: | TAMT, TPUR, NONE |
| scrubbed: | NONE, NONE, NONE, NONE, NONE, NONE, NONE, NONE, AVAR |
| sealing: | AORD, NONE, NONE, NONE, NONE, NONE, NONE, NONE, NONE, NONE NONE, NONE, NONE, NONE, NONE, AFRM, ACOL |
| seat: | TSPL, TSPL, TSPL, TSPL, TSPL, APOS, APOS, APOS, APOS, APOS ALDM, ALDM, ALDM, AEID, NONE, AVAR |
| seats: | TSPL, TSPL, TSPL, TSPL, TSPL, APOS, APOS, APOS, APOS, APOS ALDM, ALDM, ALDM, AEID, NONE, AVAR |
| sections: | TSPL, TSPL, APOS, APOS, AORD, AORD, NONE, NONE, NONE, NONE, TAMT, TAMT, TAMT, TAMT |
| send: | NONE, NONE, NONE, NONE, NONE, TCNV, TCNV, AMFR, ASTE |
| sends: | NONE, NONE, NONE, NONE, NONE, TCNV, TCNV, AMFR, ASTE |
| sense: | TCMP, NONE, NONE, NONE, NONE, NONE, NONE, NONE, NONE, NONE, NONE, AEID, TRES |
| sensed: | TCMP, NONE, NONE, NONE, NONE, NONE, NONE, NONE, NONE, NONE, NONE, AEID, TRES |
| separated: | NONE, NONE, NONE, NONE, NONE, NONE, TAMT, TAMT, AGDM, AGDM |
| sequences: | TAMT, AORD, AORD, AORD, AMDR, TTIM, TRES |
| serial: | NONE, NONE, NONE, NONE, NONE, NONE, TAMT, AORD, TTIM |
| serves: | AMFR, AMFR, NONE, NONE, NONE, NONE, NONE, NONE, NONE, NONE, NONE, NONE, NONE, NONE, TAMT, TMNS, AUSE, AGND |
| serviced: | TMNS, NONE, NONE, NONE, NONE, NONE, NONE, NONE, NONE, NONE, NONE, NONE, NONE, NONE, NONE, AUSE, AMDR, AMDR, TCNV, AMFR, AGND |
| services: | TMNS, NONE, NONE, NONE, NONE, NONE, NONE, NONE, NONE, NONE, NONE, NONE, NONE, NONE, NONE, AUSE, AMDR, AMDR, TCNV, AMFR, AGND |
| servicing: | TMNS, NONE, NONE, NONE, NONE, NONE, NONE, NONE, NONE, NONE, NONE, NONE, NONE, NONE, NONE, AUSE, AMDR, AMDR, TCNV, AMFR, AGND |
| setting: | TSPL, APOS, AEID, APHP, APHP, NONE, NONE, NONE, NONE, NONE, ALDM, AMDR |
| seven: | NONE, TAMT |
| shaft: | NONE, NONE, ASTE, ASTE, AEID, ALDM, ALDM, ALDM, ALDM, AFRM |
| shear: | TAMT, NONE, AEID, ALDM |
| shield: | NONE, NONE, NONE, NONE, NONE, AEID, AEID, AEID |
| short: | NONE, NONE, NONE, NONE, NONE, NONE, NONE, NONE, NONE, ALDM ALDM, ALDM, TTIM, TDUR, AMDR, TAMT, TAMT, TAMT, AGDM |
| shoulder: | ALDM, ALDM, ALDM, ALDM, TAMT, TACM, AMDR, NONE, AFRM, AMFR |
| show: | NONE, NONE, NONE, NONE, NONE, NONE, NONE, NONE, NONE, NONE NONE, NONE, NONE, NONE, NONE, NONE, NONE, NONE, NONE, NONE, NONE, TRNG, AMDR |
| shows: | NONE, NONE, NONE, NONE, NONE, NONE, NONE, NONE, NONE, NONE NONE, NONE, NONE, NONE, NONE, NONE, NONE, NONE, NONE, NONE, NONE, TRNG, AMDR |
| shutoff: | NONE, NONE, TAMT, TAMT, AVAR |
| shuttle's: | TCNV, TCNV, ALDM, AMDR, AMDR |
| sides: | NONE, NONE, NONE, NONE, NONE, NONE, NONE, NONE, NONE, NONE NONE, AEID, AEID, AEID, AEID, AEID, TACM, ALDM, ALDM, AFRM, TCNV, AMDR, TTIM |
| sight: | NONE, NONE, NONE, NONE, NONE, NONE, NONE, NONE, NONE, NONE TAMT, TINS, TRNG, AMDR |
| simulate: | NONE, NONE, NONE, NONE, TCMP |
| simulated: | NONE, NONE, TCMP |
| simulation: | NONE, NONE, NONE, TCMP |
| simulator: | NONE, NONE, NONE, NONE,TCMP |
| sink: | ASTE, NONE, NONE, NONE, NONE, NONE, NONE, NONE, NONE, NONE NONE, NONE, NONE, NONE, NONE, NONE, AFRM, AFRM, TAMT, TAMT, TAMT, TTIM, TTIM, TDUR, TCNV, ALDM, AMDR, AMDR, AMDR, AMDR, AMDR, APHP, AGMT |
| sites: | TSPL, TSPL, APOS, APOS |
| situation: | AEID, TSPL, TSPL, APOS, APOS, NONE, NONE, TCND |
| size: | AGDM, AGDM, ASTE, NONE, NONE, NONE, AORD |
| skin: | AEID, AEID, AEID, AEID, AEID, AEID, AEID, NONE, NONE, NONE NONE, NONE, NONE, ALDM, TAMT, TAMT, TAMT, TAMT |
| skirt: | AEID, AEID, AEID, AEID, AEID, AEID, TTIM, AGND, NONE, AMDR, AGDM |
| sleep: | NONE, NONE, NONE, NONE, NONE, NONE, AGMT, AGMT |
| slide: | NONE, NONE, NONE, NONE, NONE, TCNV, TCNV, AMDR, AMDR, AFRM TINS, TTIM |

slope: ALDH, ALDH, ALDH
smaller: TAMT, TAMT
smoke: ACOL, ACOL, ATMP, ATMP, NONE, NONE, NONE, NONE, NONE, NONE NONE, NONE, TTIM, TDUR, ASTE, ASTE, ASTE, ASTE, AMDR
sop: NONE, NONE, NONE, ASTE
sound: ASTE, TRNG, NONE, NONE, NONE, NONE, NONE, NONE, NONE, NONE NONE, NONE, NONE, NONE, NONE, NONE, NONE, NONE, NONE, NONE, NONE, NONE, NONE, NONE, NONE, NONE, NONE, NONE, AMDR, ALDM, TAMT, AVAR
sources: ASTE, TINS, TCSE, TCSE, TGOL, NONE
south: AMDR, AMDR, AMDR, TSPL, APOS
spacecraft's: TCNV, TCNV
specified: TCND
spin: TCNV, TCNV, TCNV, TCNV, AMDR, AMDR, AMDR, AMDR, AMDR, ASTE ALDM, AGMT, NONE
spring: AMDR, AMDR, AMDR, ALDM, APHP, APHP, APHP, APHP, TCSE, TCSE TGOL, AMFR, AMFR, TSPL, APOS, TTIM, TTIM, NONE, NONE, AORD, TACM, AFRM, AFRM, TRES, AGMT
stability: TCNV, AORD, TTIM, TTIM, TDUR, TDUR, AVAR, AVAR, NONE, NONE NONE, NONE, NONE, NONE
stabilizer: NONE, AVAR
stack: NONE, NONE, NONE, NONE, TSPL, TSPL, APOS, APOS, TAMT, AORD AORD, TACM, TACM, ASTE
stages: APOS, TSPL, AEID, AEID, TTIM, TDUR, ALDM, ALDM, NONE, NONE TAMT, TDGR, TCNV
starboard: AEID, AEID, AEID, TCNV, TCNV
started: TAMT, TAMT, AORD, AORD, TSRC, TSRC, AEID, AMFR, AMFR, AMFR, AMDR, AMDR, AMDR, AMDR, NONE, NONE, NONE, NONE, NONE, NONE, NONE
starts: TAMT, TAMT, AORD, AORD, TSRC, TSRC, AEID, AMFR, AMFR, AMFR AMDR, AMDR, AMDR, AMDR, NONE, NONE, NONE, NONE, NONE, NONE, NONE
static: NONE, NONE, NONE, NONE, NONE, NONE, AORD, AGMT, AGMT, AVAR
steam: ATMP, ATMP, ATMP, ATMP, NONE, ASTE, ASTE, ASTE, AMDR, TCNV
steel: TINS, APHP, APHP, NONE, NONE, NONE, NONE, NONE, ASTE
stick: ALDM, ALDM, ALDM, ASTE, NONE, NONE, NONE, NONE, NONE, NONE NONE, NONE, NONE, NONE, NONE, NONE, NONE, NONE, TCNV, TINS, AVAR, AVAR, AVAR, AFRM, AFRM, AFRM, AGMT, TAMT, TAMT, TAMT, TSPL, APOS, TACM
still: NONE, NONE, NONE, NONE, NONE, NONE, NONE, ASTE, AGMT, AGMT AGMT, TAMT, TTIM
stop: AVAR, AVAR, AVAR, AVAR, AVAR, AVAR, AFRM, AFRM, AFRM, NONE NONE, NONE, NONE, NONE, NONE, NONE, NONE, NONE, NONE, NONE, NONE, NONE, NONE, NONE, TTIM, TTIM, TDST, AMDR, TINS, AGMT, AGMT, AUSE, AORD, TGOL
store: NONE, NONE, NONE, NONE, NONE, NONE, NONE, NONE, NONE, NONE NONE, AMDR, TSPL, APOS, AUSE
stow: TSPL, APOS, AUSE, NONE
stowage: AGDM, TSPL, APOS, NONE
straps: NONE, NONE, NONE, NONE, NONE, ALDM, TAMT, TACM, AFRM
strut: TCNV, TCNV, NONE, NONE
struts: TCNV, TCNV, NONE, NONE
subsequent: TTIM, AORD
suits: NONE, NONE, NONE, NONE, NONE, NONE, NONE, NONE, AORD, AORD TACM, AEID, AEID, AEID
supported: NONE, NONE, NONE, NONE, NONE, NONE, NONE, NONE, NONE, NONE NONE, NONE, NONE, NONE, NONE, NONE, NONE, NONE, NONE, NONE, NONE, NONE, NONE, NONE, ALDM, ALDM, ALDM, ALDM, TAMT, TAMT, TAMT, TAMT, TAMT, AMDR, TACM
surfaces: TSPL, TSPL, APOS, APOS, AEID, AEID, ALDM, ALDM, ALDM, APHP AMDR, AMDR, TCNV, NONE, NONE
switched: TAMT, AVAR, AVAR, AVAR, AVAR, AVAR, AVAR, AVAR, AEID, NONE NONE, NONE, NONE, NONE, NONE, NONE, TCNV, AMDR
table: TPUR, AMDR, AMDR, ALDM, ALDM, ALDM, ALDM, AORD, TAMT, TAMT ASTE, NONE, NONE, NONE, AEID, TTIM AUSE
take: NONE, NONE, NONE, NONE, NONE, NONE, NONE, NONE, NONE, NONE NONE, NONE, NONE, NONE, NONE, NONE, NONE, NONE, NONE, TAMT, ATMP, AMDR, AORD, TCNV, TBNF
taken: NONE, NONE, NONE, NONE, NONE, NONE, NONE, NONE, NONE, NONE NONE, NONE, NONE, NONE, NONE, NONE, NONE, NONE, NONE, TAMT, ATMP, AMDR, AORD, TCNV, TBNF
tank's: ASTE, TCNV, NONE, AEID
targets: NONE, NONE, TGOL, TPUR
television: NONE, NONE, NONE, NONE, TINS
terminated: NONE, AORD, TGOL
therefore: TCND, TRES, NONE, TCMP
thick: AORD, ALDM, ALDM, APHP, APHP, NONE, NONE, NONE, NONE, NONE NONE, NONE, TAMT, ASTE
thickness: ALDM, APHP, AEID, NONE, ASTE
threshold: AEID, AMDR, TSPL, APOS, ALDM
throttle: NONE, NONE, NONE, NONE, NONE, AGMT
thruster: AGMT, NONE, NONE, NONE, NONE, TCNV, TCNV, AMFR, AMFR, AMFR, AMFR, AMFR, AMFR, TAMT, TSPL, APOS
tile: NONE, NONE, AEID, TMAN
tilt: NONE, NONE, NONE, NONE, ALDM, ALDM, AMFR, AMDR
timer: TTIM, TTIM, TDUR, TDUR, NONE
timing: NONE, NONE, NONE, NONE, TTIM, TDUR
tip: TAMT, AORD, TGOL, NONE, NONE, NONE, NONE, NONE, ALDM, ALDM, ALDM, ALDM, ALDM, TINS, TINS, AFRM, AMFR, AMFR, AEID, TCNV
tire: AFRM, NONE, NONE, NONE, NONE, AEID
together: NONE, NONE, NONE, NONE, AORD, AORD, TACM, TACM, TACM, TACM, TAMT, TTIM
tone: NONE, NONE, NONE, NONE, NONE, NONE, NONE, NONE, NONE, NONE, NONE, NONE, NONE, NONE, NONE, ACOL, ACOL, ACOL, AEID, TCND, APHP, TMAN
topping: ALDM, ALDM, ALDM, ALDM, NONE, TAMT
torque: NONE, TCNV
touchdown: NONE, TCNV
toward: AEID, AMDR
tower: AFRM, TSPL, APOS, NONE, NONE, NONE, NONE, AVAR, ALDM, ALDM, AMDR, TAMT, AGDM
track: TAMT, NONE, NONE, NONE, NONE, NONE, NONE, NONE, NONE, NONE, AMDR, TRES, TINS, THAN, THAN, THAN, TCNV, TCNV, TTIM
tracker: TAMT, NONE, NONE, NONE, NONE, NONE, NONE, NONE, NONE, NONE, AMDR, TRES, TINS, THAN, THAN, THAN, TCNV, TCNV, TTIM
trackers: TAMT, NONE, NONE, NONE, NONE, NONE, NONE, NONE, NONE, NONE, AMDR, TRES, TINS, THAN, THAN, THAN, TCNV, TCNV, TTIM
train: AORD, AORD, AORD, AORD, TACM, NONE, NONE, NONE, NONE, NONE, TCNV, AMDR, AMFR
transducer: AVAR
transducers: AVAR
transfers: NONE, NONE, NONE, NONE, NONE, NONE, NONE, TCNV, TCNV
transit: AVAR, AFRM, TCNV, TCNV
translational: NONE, NONE, TCNV, AVAR
transmits: NONE, NONE, NONE, NONE, NONE, TCNV, TCNV
transport: TCNV, TCNV, NONE, NONE, NONE, NONE, AMDR
transporter: TCNV
trapped: NONE, NONE, NONE, NONE, NONE, AMDR, AFRM
trash: NONE, NONE, NONE, NONE, AUSE
travel: TCNV, TCNV, TCNV, TCNV, TCNV, AGMT, AGMT, AMDR, AMDR
tube: NONE, NONE, NONE, NONE, NONE, NONE, AFRM, ASTE, THAN, TCNV, TCNV
tubes: NONE, NONE, NONE, NONE, NONE, NONE, AFRM, ASTE, THAN, TCNV, TCNV
turn: NONE, NONE, NONE, NONE, NONE, NONE, NONE, NONE, NONE, NONE NONE, NONE, NONE, ALDM, ALDM, TCND, AVAR, AVAR, AVAR, AVAR, AVAR, AMDR, AMDR, AMDR, AMDR, AMDR, AMDR, AMDR, AMDR, AMDR, AMDR, TTIM, TTIM, TTIM, TTIM, TTIM, AFRM, AFRM, AFRM, AFRM, AFRM, AFRM, AFRM, TCNV, TCNV, TCNV, TDUR, TDUR
turnaround: AMDR, NONE
turned: NONE, NONE, NONE, NONE, NONE, NONE, NONE, NONE, NONE, NONE NONE, NONE, NONE, ALDM, ALDM, TCND, AVAR, AVAR, AVAR, AVAR, AVAR, AMDR, AMDR, AMDR, AMDR, AMDR, AMDR, AMDR, AMDR, AMDR, AMDR, TTIM, TTIM, TTIM, TTIM, TTIM, AFRM, AFRM, AFRM, AFRM, AFRM, AFRM, AFRM, TCNV, TCNV, TCNV, TDUR, TDUR
turns: NONE, NONE, NONE, ALDM, ALDM, TCND, AVAR, AVAR, AVAR, AVAR AVAR, AMDR, AMDR, AMDR, AMDR, AMDR, AMDR, AMDR, AMDR, AMDR, AMDR, TTIM, TTIM, TTIM, TTIM, TTIM, AFRM, AFRM, AFRM, AFRM, AFRM, AFRM, AFRM, TCNV, TCNV, TCNV, TDUR, TDUR type: NONE, NONE, NONE, NONE, NONE, NONE, NONE, NONE, NONE, NONE NONE, NONE, AFRM, AORD, AORD, AORD, AORD
types: NONE, NONE, NONE, NONE, NONE, NONE, NONE, NONE, NONE, NONE NONE, NONE, AFRM, AORD, AORD, AORD, AORD
umbilicals: AEID
unique: AORD, AORD, TTIM, TTIM, TAMT, TAMT, TAMT, NONE, NONE, NONE
united: TAMT, TAMT, TAMT, TACH, TACH, NONE
upgraded: ALDM, ALDM, ALDM, AMDR, AMDR, NONE, NONE
user: NONE, AUSE, AUSE
usually: NONE, TTIM, AORD, AORD
value: NONE, NONE, NONE, NONE, NONE, NONE, NONE, NONE, NONE, AUSE ACOL, TAMT, TAMT, TAMT, TCMP
vapor: ASTE, ASTE, NONE, NONE, NONE, NONE, NONE, NONE, NONE, ATMP, AMDR
vary: AVAR, AVAR, AVAR, AMDR, NONE, NONE, NONE, NONE, NONE, NONE TTIM, TCMP
vehicle's: TCNV, TMNS, ACOL, NONE, NONE
vehicles: TCNV, TMNS, ACOL, NONE, NONE
verification: NONE, NONE, NONE, TCMP
verify: TAMT, NONE, NONE, NONE, TCMP
vertically: ALDM, ALDM, ALDM, ALDM, AFRM
very: TAMT, TAMT, TDGR
vessel: NONE, NONE, ASTE, TCNV, TCNV, TCNV
vibration: TTIM, AMDR, AMDR, NONE
wall: NONE, NONE, AEID, AEID, AEID, AEID, AEID, ALDM
way: NONE, NONE, NONE, NONE, NONE, NONE, NONE, ASTE, AVAR, AMDR AMDR, AMDR, TRNG, TMAN, TMNS, TCND, TPUR, TSPL, APOS, AORD, TCNV
weather: ASTE, AEID, AEID, NONE, NONE, NONE, TCNV, TCNV, AVAR
wet: NONE, NONE, ASTE, ASTE, ASTE, ASTE, ASTE, AMDR
what: AORD, NONE
windows: AFRM, NONE
wire: ALDM, NONE, NONE, NONE, TAMT, TACM ability: TMNS, NONE, NONE, NONE, NONE
accelerations: TTIM, TAMT, AGMT
accept: NONE, NONE, NONE, NONE, NONE, NONE, NONE, NONE, NONE, NONE, NONE, NONE, NONE, TBNF
accommodations: NONE, TSPL, APOS
accomplish: NONE, NONE, NONE, NONE, AMDR, TDST, TAMT, TSRC
according: AORD
accumulators: AORD, TACM, TACM, TAMT, TAMT, NONE, NONE
accuracy: NONE, NONE, TCND
accurate: NONE, NONE, TCMP
acquire: NONE, NONE, NONE, TBNF
acquired: NONE, NONE, NONE, TBNF
act: NONE, NONE, NONE, NONE, NONE, NONE, NONE, NONE, NONE, NONE, NONE, NONE, NONE, TSRC
actuation: AGMT, TCSE
additionally: TTIM, TAMT, TAMT, NONE
adhesive: TAMT, TAMT, TAMT, TAMT, TACM, ASTE
adjust: NONE, NONE, NONE, NONE, NONE, NONE, NONE, NONE, AVAR, AORD, AORD, TAMT, AMDR, TCND, AGDM
adjustable: AVAR, AORD, NONE
affect: NONE, NONE, NONE, NONE, NONE, NONE, NONE, NONE, NONE, NONE, NONE, NONE, AORD, AEID
agent: NONE, NONE, NONE, NONE, NONE, NONE, NONE, NONE, NONE, NONE, TACH, TCSE, TMNS, AEID, AVAR, AVAR
airborne: TCNV
aisle: TMAN
aligned: AORD, AORD, TACM, ALDM, ALDM
alloy: TAMT, TAMT, ASTE, ASTE, NONE
already: TTIM, TTIM
alternate: NONE, NONE, AVAR, AVAR, AVAR, AVAR, AMDR, AMDR, TTIM, TTIM, TTIM, TDUR
alternative: AVAR, AVAR, NONE, NONE, NONE always:TTIM, TTIM, AVAR, TDUR, NONE, AORD
amplifier: TINS, NONE, NONE, NONE
amplifiers: TINS, NONE, NONE, NONE
angular: AFRM
announced: TTIM, NONE, NONE, NONE, NONE
apart: NONE, NONE, NONE, TAMT, TAMT, TAMT, TAMT, TAMT, AGDM, AGDM
apogee: NONE, TAMT, AGDM, TCNV, ALDM
application: NONE, NONE, NONE, NONE, NONE, NONE, NONE, NONE, NONE, AUSE
applies: NONE, NONE, NONE, NONE, NONE, AEID, AUSE
arranged: AORD, AORD, NONE, TPUR
assess: TAMT, TAMT, TAMT, TCMP, NONE
assessed: NONE, TAMT
associate: NONE, NONE, NONE, NONE, NONE, TACM, TACM, TACM, TACM, TACM, TACM, TACM, TCMP, AORD, TAMT, TAMT
assumes: NONE, NONE, NONE, NONE, NONE, NONE, NONE, NONE, NONE, NONE, NONE, NONE, AEID, TAMT, TBNF
attaches: TAMT, TAMT, NONE, NONE, TACM
attachments: NONE, NONE, NONE, NONE, TAMT, TAMT, TAMT, TACM
attitudes: NONE, NONE, TSPL, APOS
aurora: NONE, TTIM, TTIM
authority: NONE, NONE, NONE, NONE, NONE, NONE, NONE, NONE, NONE, NONE, NONE, NONE, NONE, NONE, NONE, NONE, TINS, AORD, TAMT
awarded: NONE, NONE, NONE, NONE, TCMP
background: TSPL, APOS, NONE, NONE, NONE, AGDM, AEID
bags: NONE, NONE, NONE, NONE, NONE, NONE, NONE, NONE, NONE, NONE, NONE, TAMT, ALDM, ALDM, AGND, AORD, AFRM, AFRM, AEID, TSPL, APOS
ballistic: AMFR
bands: TACM, TACM, TACM, TACM, TACM, AFRM, AORD, AEID, AEID, NONE, NONE, NONE, NONE, ALDM, ACOL, ACOL, TAMT, TAMT
barrier: AEID, AEID, NONE, NONE, NONE, AFRM
barriers: AEID, AEID, NONE, NONE, NONE, AFRM
bars: NONE, NONE, NONE, NONE, NONE, NONE, NONE, NONE, NONE, NONE, NONE, NONE, NONE, AFRM, AFRM, AFRM, TAMT, TAMT, ASTE, ALDM, ALDM, ALDM, ALDM, ALDM, ALDM, AMFR, ACOL, ACOL, AEID, AORD, AORD, AORD
basis: TCSE, TCSE, ALDM, NONE, NONE, NONE, NONE, TGOL, AMDR
basket: AGND, NONE, AEID
batteries: NONE, NONE, NONE, NONE, NONE, AORD, TACM, TINS
bearings: TSPL, TSPL, APOS, APOS, AMDR, TCND, NONE
became: AVAR, AVAR, TSRC, AORD, NONE, NONE
beginning: AORD, AORD, AORD, TSRC, TSRC, TSRC, TSRC, TTIM, TCSE
behind: AEID, AEID, AEID, AGMT, AMDR, AMDR, TTIM, TTIM, NONE
best: TAMT, TAMT, TAMT, TAMT, NONE, NONE, NONE, NONE
beyond: TAMT, TTIM, NONE, NONE, AGDM
bits: NONE, NONE, NONE, NONE, NONE, NONE, NONE, NONE, AFRM, TINS, TAMT, TAMT, TAMT, TTIM, TTIM, TDUR, TDUR, AGDM
bleed: NONE, NONE, NONE, NONE, NONE, NONE, AUSE, AMDR, AMDR, AMDR, TAMT block:NONE, NONE, NONE, NONE, NONE, NONE, NONE, NONE, NONE, NONE, NONE, NONE, NONE, TSPL, TSPL, APOS, APOS, AFRM, AFRM, TTIM, TTIM, AGDM, AORD, TACM, APHP, AEID, AVAR
bolted: NONE, NONE, NONE, NONE, NONE, NONE, NONE, NONE, NONE, NONE, NONE, NONE, NONE, AORD, AORD, AORD, TACM, TACM, ALDM, AGMT, AMDR, TAMT, AFRM
boost: NONE, NONE, NONE, NONE, NONE, NONE, NONE, NONE, NONE, NONE, TAMT, TAMT, AMDR, AMDR, AMFR, AMFR
bottle: NONE, NONE, AEID, AEID, TSPL, APOS
boulder: ASTE
brace: NONE, NONE, NONE, NONE, ALDM, ALDM, ALDM, TAMT, TAMT, TACM, APHP
brief: NONE, NONE, NONE, NONE, NONE, NONE, NONE, NONE, TCNV, TCNV, TCNV, TINS, TPUR, ALDM, TTIM, TDUR
bright: NONE, NONE, NONE, NONE, NONE, NONE, NONE, NONE, NONE, NONE, NONE, NONE, NONE, ACOL

| | |
|---|---|
| brightness: | NONE, NONE, NONE, NONE, NONE, NONE, NONE, NONE, ACOL, ACOL |
| build: | AFRH, AFRH, AFRH, TAMT, TAMT, TSRC, TSPL, APOS, AGDM |
| buildings: | TAMT, AFRH, AFRH, TSPL, APOS, TSRC |
| bulk: | TAMT, TAMT, TAMT, TAMT, TAMT, AGDM, AGDM, AGDM, AGDM, ALDM, AORD, TACM |
| burning: | NONE, NONE, NONE, NONE, NONE, NONE, NONE, NONE, NONE, NONE, NONE, NONE, NONE, NONE, ATMP, ATMP, ATMP, ATMP, ATMP, ACOL, AGND, AGDM |
| calculate: | TAMT, NONE, TPUR, TPUR |
| calibration: | TAMT, TDGR, NONE |
| caps: | AEID, AEID, AEID, AEID, ALDM, ALDM, ALDM, ALDM, ATMP, NONE, NONE, NONE, TAMT |
| carries: | TSPL, APOS, TRNG, TCNV, TCNV, NONE, NONE, NONE, NONE, TAMT, TAMT, TCSE, ALDM |
| carrying: | ALDM, ALDM, TCNV, NONE, NONE |
| casing: | NONE, NONE, NONE, NONE, NONE, NONE, NONE, NONE, NONE, NONE, NONE, NONE, AFRM, AEID, AEID, AEID, AEID, AEID, AORD, TCND, TCND |
| center's: | NONE, NONE, NONE, NONE, NONE, AMFR, TCNV, AEID, AEID, AEID, TAMT, AORD, AMDR |
| charged: | NONE, NONE, NONE, NONE, NONE, APHP, TTIM, TAMT |
| checked: | NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, TAMT, TAMT, TAMT, TAMT, TAMT, TAMT, TCMP, TCMP, AGDM, AGDM, TSPL, APOS, ACOL, ACOL, AGMT, AGMT, AVAR, AVAR, TTIM |
| chemical: | NONE, NONE, NONE, ASTE |
| chosen: | NONE, NONE, NONE, TAMT |
| chute: | ASTE, ASTE, ASTE, AMDR, AMDR, AMDR, NONE, ALDM, ALDM, TCNV |
| circular: | NONE, NONE, NONE, AMDR, AFRM |
| circulate: | NONE, NONE, NONE, AMDR, AMDR, TAMT |
| clean: | NONE, NONE, NONE, NONE, NONE, NONE, NONE, TAMT, TAMT, AFRM |
| clear: | NONE, NONE, NONE, NONE, NONE, NONE, NONE, NONE, NONE, NONE, NONE, NONE, NONE, NONE, NONE, NONE, NONE, NONE, NONE, NONE, NONE, ALDM, AMDR, AMDR, AORD, TCNV, TAMT, TAMT, TAMT, TAMT, TAMT, AFRM, AFRM, TRNG, TCND, AGDM |
| cloth: | NONE, NONE, NONE, NONE, TCNV |
| coated: | AEID, AEID, AEID, AEID, AEID, AEID, AEID, AEID, AEID, ACOL, |
| ACOL coil: | ALDM, AEID, AFRM, AFRM |
| collected: | NONE, NONE, AORD, TAMT, TACM, TACM |
| come: | NONE, NONE, NONE, AMDR, AMDR, AMDR, TTIM, AGND, TDST |
| comes: | NONE, NONE, NONE, AMDR, AMDR, AMDR, TTIM, AGND, TDST |
| communicate: | NONE, NONE, NONE, NONE, NONE, NONE, TAMT, TACM, TINS, TCNV |
| communicator: | NONE, NONE, NONE, NONE, NONE, NONE, TAMT, TACM, TINS, TCNV |
| company: | NONE, NONE, NONE, NONE, NONE, NONE, NONE, AORD, AORD, TACM, TACM, TACM |
| compared: | TCMP, TCMP, TCMP |
| comparison: | TCMP, TCMP, AVAR |
| compartments: | TSPL, APOS, TCNV |
| compensation: | NONE, NONE, NONE, NONE, NONE, NONE, TAMT, TAMT, TAMT |
| completely: | TAMT, TAMT, NONE, TCND |
| computation: | TAMT, TAMT, TAMT, TAMT, NONE, NONE, NONE |
| computes: | TAMT, TAMT, NONE |
| conditioned: | NONE, NONE, NONE, TCND, AEID |
| conditioner: | NONE, NONE, NONE, NONE, NONE, NONE, NONE, NONE, TCND, TCND, TCND, TCND, TCND, TCND, TCND, AEID, TAMT, TDGR |
| configured: | NONE, NONE, NONE, AORD, AFRM, AEID |
| connection: | NONE, NONE, NONE, NONE, NONE, NONE, NONE, NONE, TAMT, TAMT, TAMT, AORD, AGND, AEID, TACM, TACM, AGDM, THAN |
| consisted: | TAMT |
| consumed: | ATMP, NONE, TAMT, TAMT, AGDM, AUSE |
| consumption: | NONE, NONE, NONE, NONE, AMDR, TAMT, AGDM, AUSE, AUSE |
| continuously: | TAMT, TAMT, AVAR, TTIM, TTIM, TDUR, NONE, AORD |
| contracts: | NONE, NONE, NONE, NONE, NONE, NONE, NONE, NONE, NONE, AFRM, AGDM, AGDM, ALDM, ALDM |
| converted: | AVAR, AVAR, NONE, NONE, NONE, NONE |
| convoy: | TACM, TACM, TCNV, NONE, AORD |
| coordinates: | AEID, NONE |
| corner: | NONE, NONE, NONE, NONE, NONE, NONE, NONE, NONE, AFRM, AFRM, AMDR, AMDR, TSPL, APOS |
| corresponds: | NONE, NONE, NONE, NONE, NONE, NONE, TACM, AORD, TAMT, ALDM, |
| TCMP costs: | NONE, TAMT, TAMT, TAMT, TAMT |
| coupling: | TAMT, TAMT, TACM, TACM |
| couplings: | TAMT, TAMT, TACM, TACM |
| covering: | ACOL, AEID, AEID, AEID, AEID, AEID, AORD, NONE, NONE, NONE, NONE, NONE |
| cradle: | ALDM, ALDM, TCSE, TTIM, TSPL, APOS, AORD, TSRC, NONE, NONE, NONE, NONE |
| craft: | NONE, NONE, NONE, NONE, NONE, NONE, NONE, NONE, TCNV |
| crane: | ATMP, AMDR, ALDM, NONE |
| cranes: | ATMP, AMDR, ALDM, NONE |
| crawler: | TCNV, TCNV, TCNV, AGMT, AGMT, ALDM, ALDM, NONE, NONE, TTIM, TDUR |
| crew's: | TCNV, AORD, TACM, TACM, TACM, NONE |
| crewman: | TCNV, AORD, TACM, TACM, TACM, NONE |
| crews: | TCNV, AORD, TACM, TACM, TACM, NONE |
| cryo: | ATMP |
| cue: | TINS, TINS, NONE, NONE, NONE, NONE, NONE, NONE, AEID, AEID |
| currently: | NONE, NONE, NONE, NONE, NONE, NONE, NONE, NONE, NONE, NONE, AGMT, AMDR, ASTE, ASTE, TTIM, AORD, AORD |
| cut: | NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, TAMT, TAMT, TAMT, TAMT, TAMT, TAMT, TAMT, TAMT, TAMT, TAMT, TAMT, TAMT, TAMT, TAMT, TAMT, TAMT, TAMT, AORD, AGDM, AGDM, AGDM, AFRM, AFRM, AFRM, AFRM, AFRM, AFRM, AFRM, AFRM, AFRM, AFRM, AMFR, AMFR, AMFR, AMFR, AMFR, ALDM, ALDM, ALDM, AEID, ATMP, AMDR, ASTE, AVAR, APHP, APHP, TDGR |
| cycle: | NONE, NONE, NONE, AORD, AFRM, TDUR, TCNV, TCNV, TCNV, AMDR, AMDR, TTIM, TTIM, TTIM |
| cycles: | NONE, NONE, NONE, AORD, AFRM, TDUR, TCNV, TCNV, TCNV, AMDR, AMDR, TTIM, TTIM, TTIM |
| cylinder: | AFRM |
| cylindrical: | AFRM |
| date: | TTIM, TTIM, TTIM, TTIM, TDUR, TDUR, TDUR, NONE, NONE, NONE, AORD, AORD, TACM, TACM |
| decision: | NONE, NONE, NONE, NONE, TCMP |
| deflections: | AFRM, AFRM, ALDM, AMDR, NONE |
| deflector: | AFRM, NONE, NONE, AMDR, ALDM |
| deflectors: | AFRM, NONE, NONE, AMDR, ALDM |
| delay: | NONE, NONE, NONE, AGMT, AGMT, AGMT, TTIM, TTIM, TTIM, TTIM, AUSE |
| delivery: | NONE, NONE, NONE, NONE, NONE, NONE, TSRC, TCNV |
| demand: | NONE, NONE, NONE, NONE, NONE, NONE, NONE, NONE, NONE, NONE, NONE, NONE, NONE, NONE, NONE, TAMT, TAMT, AMDR, AMDR |
| density: | NONE, NONE, APHP, APHP |
| deploys: | AGDM, TSPL, APOS, NONE, NONE, AMDR, AORD |
| depress: | ALDM, ALDM, AFRM, AMDR, TAMT, NONE |
| deputy: | TACM, AVAR, NONE, NONE, NONE, NONE, NONE, NONE |
| derived: | NONE, TCMP, AMDR, TBNF |
| described: | AORD, NONE, NONE |

| | |
|---|---|
| designs: | NONE, NONE, NONE, NONE, NONE, NONE, NONE, NONE, NONE, NONE, NONE, TPUR, TPUR, TPUR, TPUR, TPUR, TGOL, TSRC |
| detached: | NONE, NONE, NONE, NONE, NONE, NONE, NONE, NONE, NONE, TAMT |
| detector: | ATMP, NONE |
| detects: | TRES |
| develop: | NONE, NONE, NONE, NONE, NONE, NONE, NONE, NONE, TAMT, AVAR, TTIM, TSRC, TRES, AGDM, AGDM, AGDM |
| diaphragm: | TINS, AEID, NONE, NONE, AORD |
| directs: | NONE, NONE, NONE, NONE, NONE, NONE, NONE, NONE, NONE, NONE, NONE, NONE, NONE, NONE, NONE, NONE, NONE, NONE, AORD, AFRM, TCNV, AMDR, AMDR, AMDR, AMDR |
| disassembly: | TAMT, NONE |
| disconnected: | AORD, TTIM, TAMT, TAMT, NONE |
| displacement: | NONE, NONE, NONE, ALDM, TCNV, AVAR, AVAR |
| dissipate: | NONE, NONE, NONE, NONE, NONE, AORD, TAMT |
| dissipated: | NONE, NONE, NONE, AUSE, AORD, TAMT, TAMT |
| ditching: | NONE, NONE, NONE, ASTE, AGDM, AGDM, AFRM, AFRM, TCNV, AUSE |
| domestic: | TSPL, APOS, NONE, NONE |
| downward: | AMDR, AMDR, AGMT |
| drinking: | NONE, NONE, NONE, NONE, NONE, AMDR, AMDR, AMDR, AMDR, AMDR, AMDR, ASTE, ASTE |
| drop: | NONE, NONE, NONE, NONE, NONE, NONE, NONE, NONE, NONE, NONE, NONE, NONE, NONE, NONE, NONE, TAMT, TAMT, TAMT, AGDM, AFRM, AMFR, ALDM, ALDM, AEID, AMDR, AMDR, AMDR, AMDR, AMDR, AMDR, AMDR, AMDR, ASTE, ASTE, APHP, AVAR, AUSE, TSRC |
| drops: | NONE, NONE, NONE, NONE, NONE, NONE, NONE, NONE, NONE, NONE, NONE, NONE, NONE, NONE, NONE, TAMT, TAMT, TAMT, AGDM, AFRM, AMFR, ALDM, ALDM, AEID, AMDR, AMDR, AMDR, AMDR, AMDR, AMDR, AMDR, AMDR, ASTE, ASTE, APHP, AVAR, AUSE, TSRC |
| ducts: | ASTE, ASTE |
| earlier: | ALDM, TTIM, TTIM, TTIM, TTIM |
| earth's: | NONE, NONE, NONE, NONE, ALDM, ALDM, TSPL, APOS, ASTE, ASTE |
| eastern: | AMDR, AMDR, AMDR |
| efficient: | NONE, NONE, NONE, NONE, AUSE |
| effort: | NONE, NONE, NONE, NONE, TMNS |
| empty: | NONE, NONE, NONE, NONE, NONE, NONE, NONE, NONE, NONE, NONE, NONE, NONE, NONE, AMDR, AMDR, AMDR, AUSE |
| enclosed: | NONE, AEID, AEID |
| encountered: | NONE, NONE, NONE, NONE, AGDM, AGDM, AMFR, AMFR, AEID, AMDR, TRES |
| energizes: | NONE, NONE, NONE, TCSE |
| engage: | NONE, NONE, NONE, NONE, NONE, NONE, NONE, NONE, NONE, NONE, NONE, TCSE |
| engine's: | TCNV, TINS, TINS, TINS, AVAR |
| entered: | TAMT, NONE |
| entering: | AORD, TACM, TSRC, AMDR, AMDR, TAMT, TAMT, NONE, NONE |
| entries: | TSPL, APOS, TAMT, AFRM, NONE, NONE, NONE, AMDR, AMDR, AMDR |
| environmentally: | TCND, AEID |
| environments: | TCND, AEID, AEID |
| equal: | NONE, NONE, NONE, NONE, TAMT, TAMT, TAMT, AFRM, ALDM, ALDM, AVAR, AVAR |
| essentially: | NONE, NONE, TAMT, TAMT |
| establish: | TSPL, APOS, NONE, NONE, NONE, NONE, NONE, AORD, AVAR, TCSE, TSRC, TSRC |
| evaluation: | TAMT, TAMT, TCMP, NONE |
| evaporators: | TTIM, TDUR, NONE, NONE, NONE, AORD, ASTE, ASTE |
| eventually: | AORD, TGOL, TTIM, NONE |
| ever: | NONE, TTIM, TTIM, TDUR |
| exceeded: | TAMT, TAMT, AMDR, NONE |
| exception: | NONE, NONE, NONE, NONE, NONE, NONE, NONE, AORD, AORD, TCND |
| excessive: | NONE, NONE, NONE, NONE, NONE, TAMT |
| exchangers: | NONE, NONE, NONE, NONE, NONE, NONE, NONE, NONE, NONE, NONE, AVAR, AVAR, AVAR, AVAR, AVAR |
| execute: | NONE, NONE, NONE, NONE, NONE, NONE, NONE, TSRC |
| executed: | NONE, NONE, NONE, NONE, NONE, NONE, NONE, TSRC |
| exposure: | TRES, AEID, TSPL, APOS, TRNG, NONE, NONE, NONE, NONE, NONE, NONE, NONE, NONE |
| fabric: | AFRM, AFRM, AFRM, TSPL, APOS, ALDM, NONE, NONE, NONE, NONE |
| face: | NONE, NONE, NONE, NONE, NONE, NONE, NONE, NONE, NONE, NONE, NONE, NONE, NONE, NONE, TAMT, ALDM, AEID, AEID, AEID, AEID, AEID, AEID, AEID, ACOL |
| facilitate: | TMNS, NONE, NONE |
| factor: | TCSE, TAMT, TAMT, TCND, NONE, NONE, NONE |
| factors: | TCSE, TAMT, TAMT, TCND, NONE, NONE, NONE |
| fall: | NONE, NONE, NONE, NONE, NONE, NONE, NONE, NONE, NONE, NONE, NONE, NONE, NONE, NONE, TAMT, TAMT, TAMT, ALDM, ALDM, ALDM, ALDM, AEID, AMDR, AMDR, AMDR, AMDR, AMDR, AMDR, ASTE, ASTE, ASTE, TTIM |
| falls: | ASTE |
| features: | NONE, AEID, AEID, AFRM |
| federal: | NONE, NONE, TAMT |
| few: | TAMT, TAMT, TAMT |
| fiber: | NONE, NONE, ALDM, ALDM |
| fibers: | NONE, NONE, ALDM, ALDM |
| fibrous: | ALDM, APHP |
| film: | AEID, AEID, AEID, ASTE, NONE, NONE, NONE, NONE, NONE, NONE, TRNG |
| fired: | ATMP, NONE, TCSE |
| fixtures: | TAMT, NONE, NONE, TINS, AVAR |
| flags: | NONE, NONE, NONE, NONE, NONE, NONE, NONE, NONE, NONE, NONE, TMAN, AEID, AGMT |
| flapper: | TCNV, NONE |
| flat: | NONE, NONE, NONE, NONE, NONE, NONE, NONE, NONE, NONE, NONE, NONE, TSPL, TSPL, TSPL, APOS, APOS, APOS, ALDM, ALDM, ALDM, ALDM, ALDM, ALDM, ALDM, ASTE, ASTE, TCNV, AFRM, AFRM, AFRM, ACOL, ACOL, AGDM, AGMT, TAMT, TCND |
| flex: | AFRM, AFRM |
| flowing: | NONE, NONE, NONE, ASTE, ASTE, ALDM, AGMT |
| fluids: | ASTE, ASTE, ASTE, ASTE, AVAR |
| flying: | TCNV, TCNV, AGMT, AGMT, TTIM, TDUR, NONE, NONE |
| foreign: | AORD, AEID, NONE, NONE |
| format: | AFRM, AFRM |
| frames: | NONE, NONE, NONE, NONE, NONE, NONE, NONE, NONE, ALDM, ALDM, AFRM, AFRM, AFRM, AFRM, AFRM, AFRM, AEID, AEID, TSRC, TSRC, TPUR, TPUR |
| frangible: | APHP, NONE |
| freezing: | NONE, ATMP, ATMP, ATMP |
| frequencies: | TTIM, AMDR, AMDR, NONE, NONE |
| fuses: | ATMP, ATMP, ATMP, NONE, NONE, TAMT, TAMT, TAMT, AORD, TACM, TACM, ASTE |
| g's: | APHP, TAMT, TAMT |
| gain: | NONE, NONE, NONE, NONE, NONE, NONE, NONE, NONE, TAMT, TAMT, AMDR, AGMT, TCSE, TBNF, TDST |
| gap: | TAMT, TAMT, AGDM, AGDM, AORD, AFRM, AFRM, TSPL, APOS |
| gauge: | NONE, NONE, NONE, AGDM, AGDM, TINS, TAMT, TCMP |
| gauges: | NONE, NONE, NONE, AGDM, AGDM, TINS, TAMT, TCMP |
| gauging: | NONE, TCMP, TAMT |
| generally: | AGDM, AORD, AORD, TAMT, NONE |
| government: | NONE, NONE, NONE, NONE, NONE, NONE, TSPL, APOS |
| grapple: | NONE, NONE, NONE, NONE, TINS, TAMT, TACM |
| green: | ACOL, ACOL, ACOL, ACOL, NONE, NONE, NONE, NONE, NONE, NONE, NONE, NONE, NONE, NONE, TAMT, TTIM, TTIM |
| guide: | NONE, NONE, NONE, NONE, NONE, NONE, NONE, NONE, NONE, NONE, NONE, AFRM, AORD, AORD, AORD, ASTE, TACM, AMDR, TCNV |
| guides: | NONE, NONE, NONE, NONE, NONE, NONE, NONE, NONE, NONE, NONE, NONE, AFRM, AORD, AORD, AORD, ASTE, TACM, AMDR, TCNV |
| guillotine: | AVAR, NONE, NONE, NONE |
| halt: | NONE, NONE, NONE, NONE, NONE, NONE, NONE, TTIM, AGMT, AGMT, AGMT, AVAR, AVAR, AVAR, AVAR, AVAR, |

| | |
|---|---|
| | TCNV |
| hangar: | TCNV, TSPL, APOS, NONE |
| harness: | NONE, NONE, NONE, TCNV, AEID, TAMT, TACH |
| head: | NONE, NONE, NONE, NONE, NONE, NONE, NONE, NONE, NONE, NONE, NONE, NONE, NONE, NONE, NONE, NONE, NONE, NONE, TAMT, AORD, AORD, AORD, AORD, AFRM, TCNV, AMFR, ALDM, ALDM, ALDM, ALDM, ALDM, AEID, AEID, AEID, AEID, AEID, AMDR, AMDR, AMDR, AMDR, ASTE, ASTE, ASTE, APHP, TCSE, TSRC, TSRC |
| head-up: | AORD, AORD, TSRC, NONE, NONE, AEID |
| headquarters: | AEID, NONE |
| headset: | TINS, NONE |
| heart: | NONE, NONE, NONE, NONE, NONE, NONE, NONE, NONE, NONE, NONE, NONE, NONE, NONE, AEID, AEID, AEID, AMDR, AORD |
| heated: | ATMP, ATMP, ATMP, NONE, NONE, NONE, NONE |
| heating: | ATMP, ATMP, ATMP |
| heavy: | NONE, NONE, NONE, NONE, NONE, NONE, NONE, NONE, NONE, NONE, NONE, NONE, NONE, NONE, NONE, NONE, NONE, NONE, NONE, NONE, TAMT, AGDM, AGMT, ALDM, ASTE, ASTE, APHP, APHP, APHP |
| height: | NONE, NONE, ALDM, ALDM, ALDM, TAMT, TAMT, TDGR, AMDR, AGDM help:NONE, NONE, NONE, NONE, NONE, NONE, NONE, NONE, NONE, NONE, NONE, NONE, NONE, TACM, AMDR |
| here: | TTIM, TSPL, APOS, NONE |
| hinged: | AMDR, TAMT, TAMT, TACM, TACM, TTIM, TCND, TRES |
| hoisted: | AMDR, AMDR, AHDR |
| holding: | NONE, NONE, NONE, NONE, NONE, NONE, NONE, NONE, ALDM |
| holds: | NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, TSPL, TSPL, TSPL, APOS, APOS, APOS, TCMP, TAMT, AORD, AMFR, ALDM, ALDM, ALDM, TTIM, TTIM, TDUR, AVAR, AVAR, AVAR, AVAR |
| hole: | NONE, NONE, NONE, NONE, NONE, NONE, TSPL, TSPL, TSPL, TSPL, TSPL, TSPL, TSPL, TSPL, APOS, APOS, APOS, APOS, APOS, APOS, APOS, APOS, AGDM, AGDM, AFRM, AFRM, AFRM, TCNV, ALDM |
| holes: | NONE, NONE, NONE, NONE, NONE, NONE, TSPL, TSPL, TSPL, TSPL, TSPL, TSPL, TSPL, TSPL, APOS, APOS, APOS, APOS, APOS, APOS, APOS, APOS, AGDM, AGDM, AFRM, AFRM, AFRM, TCNV, ALDM |
| hood: | NONE, NONE, NONE, NONE, NONE, AEID, AEID, AEID, AEID |
| hooks: | TCNV, AFRM, AFRM, AFRM, AFRM, AFRM, AMFR, NONE, NONE, NONE, NONE, NONE, NONE, ALDM, TAMT, TACM, TCSE |
| hose: | AEID, ASTE, ASTE |
| humidity: | ASTE, ATMP |
| hybrid: | TAMT, TAMT, NONE |
| hydraulically: | ASTE, NONE |
| hydraulics: | ASTE, NONE |
| i: | NONE, AORD, TAMT |
| identified: | TAMT, TRES, NONE, NONE, NONE, NONE, NONE, NONE |
| igloo: | AFRM, ATMP, TSPL, APOS |
| ignited: | ATMP |
| igniter: | NONE, ATMP |
| illuminates: | ACOL, NONE, NONE, NONE, NONE |
| illumination: | ACOL, NONE, NONE, NONE, NONE, NONE, NONE, NONE, NONE |
| image: | NONE, NONE, NONE, NONE, NONE, NONE, NONE, NONE, NONE, NONE, NONE, NONE, NONE, NONE, NONE, NONE, NONE, TCMP |
| immediately: | NONE, TTIM, TTIM, TDUR |
| improvement: | NONE, NONE, NONE, AVAR, AVAR |
| impulse: | TTIM, NONE, NONE, NONE, NONE, AMFR, TCSE |
| incoming: | AMDR, AMDR, AMDR, TDST |
| incorporate: | NONE, TAMT, TAMT, AORD |
| incorporates: | NONE, TAMT, TAMT, AORD |
| increasing: | TAMT |
| indications: | NONE, NONE, NONE, NONE, TINS |
| individually: | AORD, TAMT |
| inert: | AGMT, ASTE, AVAR, NONE, NONE |
| inerting: | AGMT, ASTE, AVAR, NONE, NONE |
| ingress: | ASTE, AMDR, AMDR |
| initiates: | TACH, NONE, NONE, NONE, AORD, AORD, TSRC, TSRC, AMDR |
| initiation: | AMDR, TSPL, APOS, AORD, TSRC, NONE, NONE |
| initiator: | TACM, NONE, NONE, NONE, AORD, AORD, TSRC, TSRC, AMDR |
| inoperative: | NONE, NONE, AUSE |
| inserted: | AMDR, AMDR, AMDR, AEID, AEID, NONE |
| integral: | TAMT, TAMT, TAMT, TAMT, TAMT, NONE |
| interchanger: | NONE, NONE, NONE, NONE, NONE, NONE, NONE, NONE, AVAR, AVAR, THAN, TCNV |
| interconnected: | TACH, TAMT, NONE |
| interference: | NONE, NONE, NONE, AEID, AMDR |
| international's: | AORD, NONE |
| inverters: | AGND, ALDM |
| involves: | NONE, NONE, NONE, NONE, NONE, NONE, NONE, NONE, NONE, NONE, NONE, TAMT, AORD, AEID |
| island : | TCNV, ASTE, ASTE |
| issues : | TCSE, NONE, NONE, NONE, NONE, NONE, NONE, NONE, NONE NONE, NONE, NONE, NONE, NONE, NONE, NONE, NONE, NONE, NONE, AMDR, AMDR, AMDR, TRES, TRES, TRES, TRES, TSRC, AORD, AORD, TTIM, ASTE, TAMT |
| jettisoning : | NONE, NONE, AUSE, AUSE, AMDR, AMDR |
| john : | AMDR, AMDR |
| keel : | ALDM, ALDM, TCNV, TCNV, TCNV |
| key : | NONE, NONE, NONE, NONE, NONE, NONE, NONE, ACOL, ASTE, AFRM, AFRM, TINS, AEID |
| keyboards : | TINS, NONE |
| keys : | NONE, TINS |
| label : | AORD, AORD, NONE, NONE, NONE, NONE, NONE |
| labeled : | AORD, AORD, NONE, NONE, NONE, NONE, NONE |
| laboratories : | TSPL, APOS, NONE, NONE |
| lands : | ASTE, TSPL, TSPL, APOS, APOS, NONE, NONE, TDST, AMDR, AMDR, TCNV |
| lasted : | TGOL, TGOL, TGOL, AORD, AORD, AORD, NONE, NONE, NONE  NONE, NONE, NONE, TTIM, TTIM, TTIM, TTIM, TDUR, AVAR, AMDR |
| latching : | AFRM, TACM, TAMT |
| late : | TTIM, TTIM, TTIM, TTIM, TTIM, TTIM, NONE, AGMT |
| layer : | ASTE, AEID, AEID |
| layers : | ASTE, AEID, AEID |
| lead : | APHP, NONE, NONE, NONE, NONE, NONE, NONE, NONE, NONE, NONE, NONE, NONE, NONE, NONE, NONE, AMDR, AMDR, AMDR, AORD, AORD, AORD, AORD, AORD, TAMT, TAMT, TSRC, AEID, TCSE, TCSE, TACM |
| leakage : | AMDR, AMDR, NONE, NONE |
| leaks : | AGDM, NONE, NONE, NONE, NONE, AMDR, AMDR, TSPL, APOS |
| leave : | NONE, NONE, NONE, NONE, NONE, NONE, NONE, NONE, NONE, NONE, AMDR, AMDR, TAMT, TAMT |
| leaves : | NONE, NONE, NONE, NONE, NONE, NONE, NONE, NONE, NONE, NONE, AMDR, AMDR, TAMT, TAMT |
| leaving : | NONE, NONE, AMDR |
| leg : | NONE, NONE, AMDR, TCNV, TCNV, TCNV, TAMT, ALDM |
| lens : | NONE, TINS |
| lever : | TMNS, AMDR, AMFR, AMFR |
| lift : | NONE, NONE, NONE, NONE, NONE, NONE, NONE, NONE, ASTE, ASTE, ASTE, TCNV, TCNV, TCNV, AMDR, AMDR, AMDR, AMDR, ALDM, TAMT |
| lightning : | NONE, AGMT |
| lightweight : | NONE, NONE, NONE, NONE, NONE, NONE, APHP, APHP, TAMT, AGDM |
| linkage : | TACH, TAMT, NONE |
| links : | AEID, TACM, TACH, TACH, TAMT, TAMT, TAMT, NONE, NONE, NONE, AORD, AORD |
| little : | AGDM, AGDM, AGDM, TDUR, TTIM, TAMT, TAMT, TAMT, TAMT, NONE, NONE, NONE, NONE, ALDM |
| live : | NONE, NONE, NONE, NONE, NONE, NONE, NONE, TDUR, TTIM, ATMP |

local : TACH, NONE, NONE, NONE, NONE, TCNV, TCNV, TSPL, APOS
locked : ASTE, AEID, NONE, NONE, NONE, NONE, AGMT, AFRM, TACH, TAMT
looking : ASTE, AEID, NONE, NONE, NONE, NONE, AGMT, AFRM, TACH, TAMT
longitude : NONE, NONE, NONE, NONE, NONE, NONE, NONE, NONE, NONE, NONE, NONE, ALDM, TPUR, TSPL, APOS
longitudinal : NONE, NONE, NONE, NONE, NONE, NONE, NONE, NONE, NONE, NONE, NONE, ALDM, TPUR, TSPL, APOS
lowered : AMDR, NONE, TAMT
lubber : NONE, NONE, TCNV
maintaining : NONE, NONE, NONE, NONE, NONE, NONE, NONE, NONE, TDUR, TTIM, TAMT, ALDM, AVAR
majority : TAMT, TAMT, TAMT, TAMT, TTIM
making : NONE, TRES, TSRC, AFRM
manage : NONE, NONE, NONE, NONE, NONE, NONE, NONE, NONE, NONE, TCND, AUSE, AUSE, TAMT, AVAR, TCNV
managed : NONE, NONE, NONE, NONE, NONE, NONE, NONE, NONE, NONE, TCND, AUSE, AUSE, TAMT, AVAR, TCNV
maneuvered : NONE, NONE, NONE, NONE, NONE, NONE, NONE, TMNS, TCNV, TCNV, TPUR
manufactured : NONE, TSRC
margins : AEID, AEID, NONE, NONE, NONE, NONE, NONE, TRNG, TSPL, TSPL, APOS, APOS
mark : NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, AEID, AORD, AORD, AORD, AORD, TRES, TDGR, TAMT, TGOL, TPUR, TCMP
mast : TCNV, TCNV, ALDM, ALDM
mate : TACH, TACH, AORD, NONE, NONE, NONE, NONE, TAMT, TAMT, TCMP, TCNV, AGND
matrix : ASTE, AFRM, NONE, TCSE
mean : TAMT, TAMT, TAMT, TAMT, AORD, AORD, NONE, NONE, NONE, NONE, NONE, NONE, NONE, NONE, NONE, NONE, NONE, NONE, NONE, NONE, NONE, NONE, NONE, NONE, NONE, NONE, TPUR, AEID
meanwhile : TDUR, TDUR, TTIM, TTIM, TTIM
measured : NONE, NONE, NONE, NONE, NONE, NONE, TTIM, TAMT
measures : NONE, NONE, NONE, NONE, NONE, NONE, NONE, NONE, NONE NONE, NONE, NONE, NONE, NONE, NONE, NONE, NONE, NONE, NONE, NONE, NONE, NONE, AGDM, AGDM, AGDM, TDGR, TAMT, TAMT, TAMT, TAMT, TAMT, TAMT, TMNS, ALDM, TSPL, APOS, TCMP, TCMP, TCNV
mechanically : NONE, NONE, NONE, TINS
mechanisms : NONE, NONE, NONE, TMNS, TMNS, TINS, TINS
member's : TACH, TAMT
mercury : AVAR, NONE, AGMT, ATMP
mesa : ASTE, ALDM
method : NONE, NONE, TMNS, AORD, TPUR, THAN
microphone : TINS, TINS, NONE
mid : AORD, NONE, TAMT, AEID
middle : AEID, AEID, AEID, AEID, TAMT, AORD, AORD, AORD, NONE, NONE
might : NONE, NONE, NONE, TAMT
minor : NONE, NONE, NONE, TTIM, TTIM, TAMT
mixed : TAMT, TAMT, NONE
moded : NONE, NONE, NONE, NONE, NONE, AFRM, TCND, TCND, THAN
models : NONE, NONE, NONE, NONE, NONE, NONE, NONE, NONE, NONE, NONE, NONE, NONE, NONE, NONE, NONE, NONE, AFRM, AFRM
moisture : ASTE, ASTE, ASTE
momentary : TDUR, TDUR, TTIM, TTIM, TTIM
multiple: TAMT, TAMT, TAMT, NONE
name : NONE, NONE, NONE, NONE, NONE, NONE, NONE, NONE, NONE, NONE, AORD
named : AORD, NONE, NONE
nearest : AGDM
nearly : ALDM, AGDM, TAMT, TAMT
need : TAMT, TAMT, TAMT, NONE, NONE, NONE, NONE, NONE, NONE
needle : NONE, NONE, NONE, NONE, NONE, NONE, NONE, AFRM, AFRM, AFRM, ALDM, ALDM, TCSE
needles : NONE, NONE, NONE, NONE, NONE, NONE, NONE, AFRM, AFRM, AFRM, ALDM, ALDM, TCSE
networks : NONE, ALDM
never : TAMT, TTIM, NONE
note : NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, TAMT, TAMT, TAMT, TAMT, TAMT, AEID
nut : NONE, NONE, NONE, NONE, NONE, NONE, AMDR, AMDR, AORD, AORD
objective : TGOL, TPUR, TINS, NONE, NONE, NONE, NONE
obtain : NONE, NONE, AMDR, TCNV, TCSE, AORD, TBNF
officer : NONE, NONE, NONE, NONE, TCNV
offices : NONE, NONE, NONE, NONE, NONE, NONE, NONE, NONE, NONE, NONE, AUSE, TSPL, APOS, TINS
openings : AFRM, NONE, NONE, NONE, NONE, TSRC, AORD, AGDM, AMDR, AMDR, AMDR, TTIM, THAN
opportunity : TTIM, TTIM, NONE, TDUR
opposite : ALDM, NONE, NONE, NONE, NONE, NONE, AEID, AEID, AEID, AGDM
organization : TACH, TAMT, AORD, AORD, NONE, NONE, NONE, NONE, TPUR, TSRC, AFRM
orifices : TSPL, APOS
others : NONE, NONE, NONE, NONE, TAMT, TTIM
oven : ATMP, NONE
overheated : ATMP, ATMP
overheating : ATMP, ATMP
override : NONE, NONE, NONE, AEID, TAMT, AMDR
paint : NONE, NONE, NONE, NONE, NONE, NONE, NONE, NONE, AEID, ACOL, ACOL, ACOL
parker : NONE, NONE, NONE, NONE, NONE, AEID, TRNG, TSPL, TSPL, APOS, APOS
passed : NONE, TTIM
patch : NONE, NONE, NONE, NONE, NONE, NONE, TSPL, TSPL, APOS, APOS, TAMT, ACOL
peak : NONE, NONE, NONE, NONE, TAMT, ALDM, ALDM, ALDM, AFRM, ASTE, ASTE
pedestal : ALDM
pedestals : ALDM
personal : NONE, NONE, AORD
pilots : NONE, NONE, NONE, NONE, NONE, NONE, TCNV, TCNV, TCNV, TCNV
pin : AMDR, NONE, NONE, NONE, TCNV, AFRM, TACH, TAMT
pins : AMDR, NONE, NONE, NONE, TCNV, AFRM, TACH, TAMT
piston : AMFR
places : TSPL, TSPL, TSPL, TSPL, TSPL, TSPL, TSPL, TSPL, TSPL, TSPL, APOS, APOS, APOS, APOS, APOS, APOS, APOS, APOS, APOS, APOS, NONE, NONE, NONE, NONE, NONE, NONE, NONE, NONE, TTIM, TTIM, AORD, AORD, AORD, TDGR, TAMT, TAMT, THAN, AMDR, TCND, TDUR
plans : TGOL, TPUR, TPUR, TPUR, TPUR, TPUR, NONE, NONE, NONE NONE, NONE, NONE, TAMT, AFRM, TSRC, TTIM, AORD
plastic : NONE, NONE, NONE, NONE, NONE, NONE, NONE, AVAR, AORD, AORD, AFRM, AFRM, APHP
plume : AEID, NONE, NONE
pointers : NONE, NONE, TINS
portions : TAMT, TAMT, TAMT, TAMT, AMDR, AMDR, NONE, NONE, NONE NONE, NONE, NONE, ALDM
ports : TCNV, NONE, NONE, NONE, NONE, TDST, AMDR, AMDR, AEID AEID, AEID, AFRM
post : TACH, ALDM, ALDM, ALDM, NONE, NONE, NONE, NONE, NONE, NONE, NONE, NONE, NONE, NONE, NONE, TSPL, TSPL, APOS, APOS, TINS, TAMT, TAMT, TAMT, TTIM, AGMT, TCNV
posts : TACH, ALDM, ALDM, ALDM, NONE, NONE, NONE, NONE, NONE, NONE, NONE, NONE, NONE, NONE, NONE, TSPL, TSPL, APOS, APOS, TINS, TAMT, TAMT, TAMT, TTIM, AGMT, TCNV
pound : TAMT, TAMT, TAMT, AMFR, AMFR, TSPL, APOS, NONE, NONE, NONE, NONE, NONE, NONE, NONE, NONE, APHP, APHP, TCNV, AMDR
practice : NONE, NONE, NONE, NONE, NONE, NONE, NONE, NONE, NONE, NONE, NONE, NONE, NONE, NONE, NONE, NONE, NONE, NONE, NONE, NONE, NONE, NONE, TAMT, TAMT, THAN, AUSE
precise : NONE, NONE, NONE, NONE, NONE, AORD, AORD, TCND, TCMP
precision : NONE, NONE, NONE, AORD
preclude : AORD, NONE, NONE
predicted : NONE, NONE, TTIM
prepare : NONE, NONE, NONE, NONE, NONE, NONE, NONE, NONE, ATMP, TSRC
prime : TSRC, TSRC, AORD, AORD, TTIM, TTIM, TTIM, TTIM, TTIM, NONE, NONE, NONE, NONE, NONE, NONE, AEID, AEID, ACOL, AMFR, TAMT, TAMT
principal : TAMT, TAMT, TAMT, NONE, NONE, NONE, NONE, NONE, TINS, TSRC, AORD
priority : AEID, NONE, NONE, AMDR, AORD, TTIM, TAMT
probability : NONE, NONE, NONE, NONE, NONE, NONE, NONE, NONE, TTIM
procedure : THAN, NONE, NONE, NONE, TPUR, TPUR
proceed : NONE, NONE, NONE, NONE, TTIM, AMDR, TRES
processors: THAN, NONE, NONE, NONE, NONE, NONE, NONE, AEID, AEID, TSRC
produced : AMDR, AMDR, AMDR, NONE, NONE, NONE, NONE, NONE, NONE, NONE, NONE, NONE, TRES, TAMT, TCSE, TSRC, TSRC, TSRC, ALDM
produces : AMDR, AMDR, AMDR, NONE, NONE, NONE, NONE, NONE, NONE, NONE, NONE, NONE, TRES, TAMT, TCSE, TSRC, TSRC, TSRC, ALDM
production : NONE, NONE, NONE, NONE, NONE, NONE, NONE, NONE, NONE, NONE, TSRC, TRES, ALDM, AFRM
programmed : NONE, NONE, NONE, NONE, NONE, NONE, NONE, NONE, NONE, TAMT, TAMT, TPUR, TPUR
projected : TTIM, TPUR, TPUR
properties : AORD, NONE, NONE, NONE, NONE, NONE, NONE, NONE, TAMT
property : AORD, NONE, NONE, NONE, NONE, NONE, NONE, NONE, TAMT
proximity : AGDM, NONE
pulses : TTIM, TTIM, NONE, NONE, NONE, NONE, AMDR, AMDR, AMDR
purged : NONE, AORD
purity : NONE, NONE, NONE, NONE, NONE, NONE, NONE, NONE, NONE, ACOL, TAMT, TAMT
purpose : AUSE, TPUR, TPUR, TGOL, NONE, NONE, NONE
put : NONE, NONE, NONE, NONE, NONE, NONE, NONE, AMFR, AMFR, TAMT, TSPL, APOS
pyrotechnics : ATMP, ATMP, NONE
quickly : NONE, NONE, NONE, TTIM, TTIM, TTIM, TDUR, AGHT
raise : ALDM, ALDM, TAMT, TAMT, NONE, NONE, NONE, NONE, NONE, NONE, NONE, NONE, NONE, NONE, NONE, TACM, AORD, AORD, TSRC, TSRC, TSRC, AMDR, AFRM, AGDM, TCSE
raised : AGDM, TSRC, TSRC, TAMT, AFRM, AMDR
ramp : NONE, NONE, NONE, NONE, ALDM, AMDR, AMDR, AMDR, ALDM
rapid : ASTE, TTIM, AGHT, ALDM
rated : AORD, TAMT
rather : NONE, NONE, NONE, NONE, NONE, NONE, AVAR, TAMT, TAMT, TDGR
ray : NONE, NONE, AMDR, AMDR, AMDR
rear : AEID, AEID, AEID, AEID, AEID, AMDR, AMDR, ALDM, ALDM, ALDM, TSRC, TSRC, NONE, NONE, NONE, TCNV, TAMT
reason : NONE, NONE, NONE, NONE, NONE, NONE, NONE, NONE, NONE, NONE, NONE, NONE, NONE, TCSE, TCSE, TGOL, TRES, TCMP
receiver : NONE, NONE, NONE, NONE, NONE, NONE, NONE, TAMT, TBNF
records : TDUR, TTIM, NONE, NONE, NONE, NONE, NONE, NONE, NONE, NONE, TAMT
reducing : ALDM, ALDM, NONE
regardless : NONE, NONE, NONE, NONE, THAN, TAMT
reinforced : APHP, TAMT
releases : NONE, NONE, NONE, NONE, NONE, NONE, NONE, NONE, NONE NONE, NONE, NONE, NONE, NONE, NONE, NONE, NONE, NONE, NONE, AORD, AORD, TINS, TAMT, TAMT, AMDR
releasing : NONE, NONE, NONE, NONE, NONE, NONE, NONE, NONE, NONE NONE, NONE, NONE, NONE, NONE, NONE, NONE, NONE, NONE, NONE, AORD, AORD, TINS, TAMT, TAMT, AMDR
relieve : NONE, NONE, NONE, NONE, NONE, APHP, TDUR, TTIM, AVAR
relieves : NONE, NONE, NONE, NONE, NONE, APHP, TDUR, TTIM, AVAR
remainder : TAMT, TAMT, TAMT, NONE, NONE, TTIM
removable : TCNV
removing : NONE, NONE, NONE, NONE, AORD, TAMT, TAMT, TAMT, AMDR, AMDR, AMDR, AMDR, AMDR, TDGR, AUSE, AEID, AEID, AGDM, TCNV
repair : TCND, NONE, NONE, NONE, NONE
replacement : AVAR, AVAR, NONE, AORD
replaces : TTIM, AMDR, NONE, AVAR
report : TCMP, TCMP, TINS, TINS, NONE, NONE, NONE, NONE, NONE, NONE, NONE, NONE, NONE, NONE, NONE, NONE, NONE, NONE, NONE, NONE, NONE
reports : TCMP, TCMP, TINS, TINS, NONE, NONE, NONE, NONE, NONE, NONE, NONE, NONE, NONE, NONE, NONE, NONE, NONE, NONE, NONE, NONE, NONE
represent : NONE, NONE, NONE, NONE, NONE, NONE, NONE, AVAR
represents : NONE, NONE, NONE, NONE, NONE, NONE, NONE, AVAR
reservoir : ASTE, NONE, NONE
resources : NONE, NONE, TAMT, TMNS
rest : NONE, NONE, NONE, NONE, NONE, NONE, NONE, NONE, NONE, NONE, AMFR, TTIM, AVAR, AVAR, AGHT, AGHT, TAMT, TAMT, AMDR, ALDM, TCND, TSPL, TSPL, APOS, APOS, TCNV
returning : TRES, NONE, NONE, NONE, NONE, NONE, NONE, NONE, NONE NONE, NONE, TDST, AMDR, AMDR, AMDR, AMDR, TAMT, TAMT, TAMT, TAMT, TAMT, TTIM, TTIM, AMFR, AVAR, AVAR, AVAR, TRES
returns : NONE, NONE, NONE, TAMT, TAMT
reverse : NONE, NONE, NONE, NONE, NONE, NONE, NONE, NONE, AEID, AEID, AEID, TINS, ALDM, ALDM, AMDR, AMDR, AVAR, AVAR, AVAR, TCNV
reversible : NONE, AVAR
revive : NONE, NONE, NONE, NONE, NONE, NONE, NONE, NONE, NONE, NONE, NONE, AVAR, AVAR, TAMT
rib : AMDR, AFRM, NONE, NONE
ribs : AMDR, AFRM, NONE, NONE
rod : NONE, NONE, NONE, NONE, NONE, ALDM
rods : NONE, NONE, NONE, NONE, NONE, ALDM
rolled : TCNV, TCNV, TCNV, TCNV, TCNV, TCNV, AMDR, AMDR, AMDR AMDR, AMDR, AMDR, AMDR, AMDR, AMDR, TACM, AORD, NONE, NONE, NONE, NONE, NONE, NONE, NONE, NONE, NONE, NONE, NONE, AFRM, AFRM, AFRM, ALDM, ALDM, TAMT, TAMT, ASTE, ASTE, AMFR
routine : AORD, AORD, AORD, AORD, NONE, NONE, NONE, THAN, TTIM, TAMT
running : NONE, NONE, NONE, NONE, NONE, ATMP, ASTE, ASTE, AGHT, AGHT, AGHT, AMDR, AORD, AORD, AORD, TTIM
runways : TCNV, THAN
safely : TAMT, NONE, NONE, NONE
sample : TAMT, NONE, NONE, NONE, NONE, NONE, NONE, NONE
scene : NONE, NONE, NONE, NONE, NONE, TSPL, APOS, AEID
schedules : TAMT, TAMT, TAMT, TPUR, TPUR, NONE, NONE, NONE
scheme : NONE, NONE, NONE, NONE, NONE, NONE, TPUR, TPUR, TPUR, TPUR, TAMT
screen : AORD, AORD, AORD, NONE, NONE, NONE, NONE, NONE, NONE, NONE, NONE, NONE, NONE, NONE, NONE, NONE, NONE, NONE, AEID, AEID, AEID, ALDM, AFRM, TCMP
sea : TAMT, ASTE, ASTE
sealed : AFRM, NONE, NONE, NONE, NONE
selecting : NONE, NONE, NONE, NONE, NONE, NONE, NONE, TCMP, AORD, AORD
separately : AORD, TAMT, TAMT
separates : TAMT, TAMT, TAMT, TAMT, TAMT, AORD, AORD, AORD, AEID AEID, NONE, NONE, NONE, NONE, NONE, NONE, NONE, NONE, NONE, NONE, TCMP, AMDR, AGDM, AFRM
separators : TAMT, TAMT, TAMT, TAMT, TAMT, AORD, AORD, AORD, AEID, AEID, NONE, NONE, NONE, NONE, NONE, NONE, NONE, NONE, NONE, NONE, TCMP, AMDR, AGDM, AFRM
sequencing : TAMT, AORD, AORD, AORD, TRES, AMDR, TTIM
serve : AMFR, AMFR, NONE, NONE, NONE, NONE, NONE, NONE, NONE, NONE, NONE, NONE, NONE, NONE, TAMT, TMNS, AUSE, AGND
seventh : NONE, TAMT
shallow : ALDM, ALDM, ALDM, NONE, NONE, NONE, TAMT
shell : NONE, NONE, NONE, NONE, NONE, NONE, NONE, AFRM, AFRM, AEID, AEID, AEID, AEID, AEID, AEID
ship : TCNV, TCNV, TCNV, TCNV, TCNV, TCNV, TCNV, TSPL, APOS
shipped : TCNV, TCNV, TCNV, TCNV, TCNV, TCNV, TCNV, TSPL, APOS
ships : TCNV, TCNV, TCNV, TCNV, TCNV, TCNV, TCNV, TSPL, APOS shock : TACM, AORD, NONE, NONE, NONE, NONE, NONE, NONE, NONE, NONE, NONE, NONE, NONE, NONE, NONE, AEID, AMFR, AMDR, AMDR
sign : NONE, NONE, NONE, NONE, NONE, NONE, NONE, NONE, NONE, NONE, NONE, NONE, NONE, NONE, NONE, NONE, TINS, TAMT, AORD, AVAR
similarly : TAMT, TCMP, TCND
simulations : NONE, NONE, NONE, TCMP
simulators : NONE, NONE, NONE, NONE, TCMP
situations : AEID, TSPL, TSPL, APOS, APOS, NONE, NONE, TCND
skid : AMDR, AMDR, TCNV, TCNV, AEID
skins : AEID, AEID, AEID, AEID, AEID, AEID, AEID, NONE, NONE NONE, NONE, NONE, NONE, ALDM, TAMT, TAMT, TAMT, TAMT
sleeping : NONE, NONE, NONE, NONE, AGMT
slow : AGMT, AGMT, AGMT, NONE, NONE, NONE, NONE, NONE, TTIM, TTIM, TTIM, TTIM, TTIM, TTIM
snare : NONE, NONE, NONE, NONE, NONE, TINS
snares : NONE, NONE, NONE, NONE, NONE, TINS
sniff : ASTE, ASTE, AMDR, AMDR, NONE, NONE, NONE, NONE, TRES
soon : TTIM, TTIM
southeast : AMDR, AMDR, AMDR, TSPL, APOS
spar : ALDM, NONE, NONE, NONE, NONE, AMFR, TCNV, TCNV
spare : AVAR, NONE, NONE, NONE, NONE, NONE, NONE, NONE, NONE, NONE, NONE, NONE, NONE, NONE, NONE, TAMT, TAMT, TAMT, TAMT, TAMT, AUSE, AUSE, ALDM, TTIM, TTIM, AVAR
spares : AVAR, NONE, NONE, NONE, NONE, NONE, NONE, NONE, NONE, NONE, NONE, NONE, NONE, NONE, NONE, TAMT, TAMT, TAMT, TAMT, TAMT, AUSE, AUSE, ALDM, TTIM, TTIM, AVAR
spectrometer : TINS
speeds : NONE, NONE, NONE, TCNV, TTIM, TTIM, AGMT, AGMT, TCSE
spent : NONE, NONE, NONE, TAMT, TAMT, AUSE
spherical : AFRM, TSPL, APOS
springs: AMDR, AMDR, AMDR, ALDM, APHP, APHP, APHP, APHP, TCSE, TCSE, TGOL, AMFR, AMFR, TSPL, APOS, TTIM, TTIM, NONE, NONE, TACM, AORD, AFRM, AFRM, TRES, AGMT
squared : TTIM, TSPL, TSPL, TSPL, APOS, APOS, APOS, AORD, AORD AEID, TAMT, TAMT, TAMT, TAMT, TAMT, TAMT, TAMT, AFRM, AFRM, ALDM, ALDM, ALDM, NONE, NONE, NONE, NONE, NONE, NONE, NONE, NONE, AGDM, AMDR
stabilization : AVAR
stacking : NONE, NONE, NONE, NONE, TSPL, TSPL, APOS, APOS, TAMT TACM, TACM, AORD, AORD, ASTE
stand : NONE, NONE, NONE, NONE, NONE, NONE, NONE, NONE, NONE, NONE, NONE, NONE, NONE, NONE, NONE, AVAR, AVAR, ALDM, ALDM, ALDM, ALDM, AGMT, AGMT, TDUR, TTIM, TSPL, TSPL, TSPL, APOS, APOS, APOS, TAMT, TAMT
stands : NONE, NONE, NONE, NONE, NONE, NONE, NONE, NONE, NONE, NONE, NONE, NONE, NONE, NONE, NONE, AVAR, AVAR, ALDM, ALDM, ALDM, ALDM, AGMT, AGMT, TDUR, TTIM, TSPL, TSPL, TSPL, APOS, APOS, APOS, TAMT, TAMT
stars: NONE, NONE, NONE, NONE, NONE, NONE, NONE, NONE, NONE, NONE, NONE, NONE, NONE, NONE, NONE, NONE, TAMT, TAMT, TAMT
starting : TAMT, TAMT, TSRC, TSRC, AORD, AORD, AEID, AMFR, AMFR AMFR, AMDR, AMDR, AMDR, AMDR, NONE, NONE, NONE, NONE, NONE, NONE, NONE
startup : NONE, AMDR, AMDR, TSRC, TSRC, AORD, AORD, AMFR, AFRM
states : TCND, TSPL, TSPL, APOS, APOS, NONE, NONE, NONE, NONE NONE, NONE, NONE, NONE, NONE, AORD
steep : ALDM, ALDM, ALDM, ALDM, ALDM, AMDR, TAMT, TAMT, ASTE, NONE, NONE
stopped : AFRM, TTIM, NONE
stops : AVAR, AVAR, AVAR, AVAR, AVAR, AVAR, AFRM, AFRM, AFRM NONE, NONE, NONE, NONE, NONE, NONE, NONE, NONE, NONE, NONE, NONE, NONE, NONE, NONE, NONE, TTIM, TTIM, TDST, AMDR, TINS, AGMT, AGMT, AUSE, TGOL, AORD
stores : NONE, NONE, NONE, NONE, NONE, NONE, NONE, NONE, NONE NONE, NONE, AMDR, TSPL, APOS, AUSE
strain : NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, AORD, AORD, ALDM, ALDM, AMFR, APHP, AFRM, AMDR
strength : NONE, NONE, NONE, NONE, NONE, NONE, NONE, NONE, NONE, TAMT, TAMT, APHP
strip : ALDM, ALDM, ALDM, TCNV, NONE, NONE, NONE, TAMT, TAMT, AMDR, AEID, AEID, AEID
stroke : NONE, NONE, NONE, NONE, NONE, NONE, NONE, NONE, NONE, NONE, NONE, NONE, NONE, AMFR, TDUR, TTIM, TMNS, AMDR, AUSE
structures : AFRM, AFRM, AFRM, AFRM, TAMT, TAMT, TSPL, APOS, NONE NONE, NONE, AORD, AORD, APHP
stub : NONE, NONE, TGOL, AORD, AEID
study : NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, TPUR, TSPL, APOS, TGOL
subject : NONE, NONE, NONE, NONE, NONE, NONE, NONE, NONE, NONE, NONE, NONE, NONE, NONE, NONE, TAMT
subjected : NONE, NONE, NONE, NONE, NONE, NONE, NONE, NONE, NONE, NONE, NONE, NONE, NONE, NONE, TAMT
sum : TAMT, TAMT, TAMT, TAMT, TAMT, TAMT, TAMT, TAMT, NONE, NONE
summary : ALDM, ALDM, TAMT, TAMT, NONE, NONE, TTIM
summed : TAMT, TAMT, TAMT, TAMT, TAMT, TAMT, TAMT, TAMT, NONE, NONE
sun : NONE, NONE, NONE, TDUR, TDUR, TTIM, TTIM, ATMP, ASTE
supporting : NONE, NONE, NONE, ALDM
surge : AMDR, AMDR, AMDR, AMDR, AMDR, NONE, NONE, ASTE, ASTE, ASTE, ASTE, ASTE, TAMT, TACM, AORD
synchronization : TTIM, TACM, NONE, NONE, AORD
synchronize : TTIM, TACM, NONE, NONE, AORD
system's : NONE, NONE, NONE, AORD, AORD, TPUR, TMAN
takeover : NONE, NONE, NONE, NONE, NONE, NONE, TBHF
tang : AORD, NONE, NONE, NONE
targeting : NONE, NONE, TGOL, TPUR
teams : TACM, TACM, AORD, TCNV, TAMT, TAMT
technique : NONE, NONE, NONE, NONE, TMAN
terminate : AVAR, NONE, TGOL, AORD, TRES
tether : NONE, NONE, TACM, TAMT, AVAR
text : NONE, NONE, NONE, NONE, NONE, NONE, NONE, NONE, TAMT
thereby : TMNS
thermostat : ATMP, ATMP
thermostats : ATMP, ATMP
throttled : NONE, NONE, NONE, NONE, NONE, AGMT
tie : TAMT, TAMT, TAMT, TAMT, TAMT, NONE, NONE, NONE, NONE, NONE, NONE, NONE, NONE, NONE, AEID, AEID, TACM, TACM, TACM, TTIM, AVAR
tires : AFRM, NONE, NONE, NONE, NONE, AEID
toe : ALDM, ALDM
toggle : TACM, TACM, TAMT, TAMT, TAMT, TINS
too : TAMT, NONE
tool : NONE, NONE, NONE, TINS, TINS, TINS, TINS, TINS, TMNS
tow : AMFR
towed : AMFR
tracks : TAMT, NONE, NONE, NONE, NONE, NONE, NONE, NONE, NONE, NONE, AMDR, TINS, TMAN, TMAN, TMAN, TCNV, TCNV, TTIM, TRES
trailing : AMDR, AMDR, NONE, NONE
transmissions : TINS, TINS, NONE, NONE, NONE, TCNV
transmitting : NONE, NONE, NONE, NONE, NONE, TCNV, TCNV
traveled : TCNV
traveling : TCNV, TCNV, AGMT
trench : ASTE, ASTE, AGDM, AGDM, NONE, NONE, ALDM, AFRM, AFRM, AFRM, AFRM, AEID
trip : NONE, NONE, NONE, NONE, NONE, NONE, NONE, NONE, NONE, NONE, NONE, NONE, NONE, TCNV, TCNV, TCNV, TACM, AORD, AMDR, AMDR, AMDR, AGMT
true : NONE, NONE, NONE, NONE, NONE, NONE, NONE, NONE, NONE, NONE, NONE, AFRM
truss : TACM, TACM, TACM, AORD, AORD, TAMT, NONE
typical : AORD, AORD, NONE, NONE, NONE
typically : AORD, AORD, NONE, NONE, NONE

```
undergo :            TAMT, NONE
underway :           TCNV, NONE, NONE, NONE, AGMT
unit's :             NONE, NONE, NONE, NONE, NONE, NONE, TAMT, TAMT, APHP
universal :          NONE, NONE, NONE, AORD, AORD, AORD, TAMT, TAMT, TAMT
unless :             AORD, TCND
unload :             APHP, NONE, NONE, NONE, AMDR
unloaded :           APHP, NONE, NONE, NONE, AMDR
update :             TDUR, TTIM, TTIM
upstream :           AMDR
urine :              ASTE, AMDR
users :              NONE, AUSE, AUSE
utilize :            AUSE, NONE
utilizes :           AUSE, NONE
values :             NONE, NONE, NONE, NONE, NONE, NONE, NONE, NONE, NONE, AUSE, ACOL, TAMT, TAMT, TAMT, TCMP
van :                AEID, NONE, AMDR, TCNV, TCNV, TCNV
variable :           AVAR, AVAR, TTIM, NONE, NONE
variety :            AORD, AORD, AORD, AVAR, AVAR, NONE, NONE, NONE, NONE, NONE, TACM, TAMT
vectors :            TCNV, NONE, NONE, AMDR, AFRM
velocities :         TCNV, AGMT, AGMT
vented :             ASTE, AMDR, AMDR, AMDR, NONE, NONE, AFRM, TCNV
ventilation :        ASTE, NONE, NONE, NONE
venting :            ASTE, AMDR, AMDR, AMDR, NONE, NONE, AFRM, TCNV
vents :              ASTE, AMDR, AMDR, AMDR, NONE, NONE, AFRM, TCNV
versus :             AMDR, NONE, AEID
visual :             TRNG, NONE
walls :              NONE, NONE, AEID, AEID, AEID, AEID, AEID, ALDM
warm :               NONE, NONE, NONE, NONE, NONE, NONE, NONE, NONE, NONE, NONE, ATMP, ATMP, ACOL, ACOL, ACOL, TRES,
                     AGDM, TAMT
wash :               NONE, NONE, NONE, NONE, NONE, NONE, NONE, NONE, NONE, TCNV, ACOL, ACOL, ASTE, ASTE, ASTE, ASTE
wear :               NONE, NONE, NONE, NONE, NONE, NONE, NONE, NONE, AEID, AEID, TAMT, TAMT, TCNV, TDUR, TTIM
weigh :              TAMT, NONE, NONE, NONE, NONE, TCMP, APHP
weighing :           TAMT
weld :               TACM, TACM, TAMT, TAMT, TAMT, ATMP, NONE
welded :             TACM, TACM, TAMT, TAMT, TAMT, ATMP, NONE
western :            AMDR
wheels :             TCNV, TINS
whenever :           TTIM, TTIM
whereas :            NONE, TTIM, TCND
wind :               ASTE, ASTE, ASTE, ASTE, AMDR, AMDR, AMDR, AMDR, NONE, NONE, NONE, NONE, NONE, NONE, AGMT, TINS,
                     TCNV, AFRM, AFRM
winds :              ASTE, ASTE, ASTE, ASTE, AMDR, AMDR, AMDR, AMDR, NONE, NONE, NONE, NONE, NONE, NONE, AGMT, TINS,
                     TCNV, AFRM, AFRM
wipe :               NONE, NONE, ASTE
wipes :              NONE, NONE, ASTE
wiring :             ALDM, NONE, NONE, NONE, TACM, TAMT
working :            NONE, NONE, NONE, NONE, NONE, NONE, NONE, NONE, NONE, TRES, AUSE, APHP
world :              NONE, NONE, NONE, TAMT, TSPL, APOS
worldwide :          AORD
wrist :              AMFR, TACM, TAMT
year :               TDUR, TTIM
years :              TTIM, TTIM, TDUR
zone :               NONE, NONE, AFRM, TSPL, TSPL, APOS, APOS, AEID, AEID, AORD, TAMT
abroad:              NONE, NONE, NONE, AGDM, AGDM, TSPL, APOS, AEID, AORD
absolute:            NONE, NONE, NONE, NONE, NONE, NONE, NONE, NONE, NONE, NONE, NONE, NONE, NONE, NONE, TAMT, TAMT,
                     TAMT, TAMT, AORD, TCND
absorb:              AUSE, AMDR, AMDR, NONE, NONE, NONE, NONE, NONE, NONE
absorber:            AUSE, AMDR, AMDR, NONE, NONE, NONE, NONE, NONE, NONE
absorbers:           AUSE, AMDR, AMDR, NONE, NONE, NONE, NONE, NONE, NONE
absorbs:             AUSE, AMDR, AMDR, NONE, NONE, NONE, NONE, NONE, NONE
absorptance:         AUSE, AMDR, AMDR, NONE, NONE, NONE, NONE, NONE, NONE
absorption:          NONE, NONE, NONE, NONE, NONE, AUSE, AMDR, AMDR
abuts:               AGDM, AGDM, ALDM
acceptance:          NONE, NONE, NONE, NONE, NONE, NONE, NONE, NONE, NONE, NONE, NONE, AMDR, TAMT, TBNF
accepted:            NONE, NONE, NONE, NONE, NONE, NONE, NONE, NONE, NONE, TBNF
accepts:             NONE, NONE, NONE, NONE, NONE, NONE, NONE, NONE, NONE, NONE, NONE, NONE, NONE, TBNF
accessed:            NONE, NONE, NONE, NONE, AMDR, AMDR, AMDR, AMDR, AMDR, AMDR, THAN, TAMT
accessible:          NONE, NONE, NONE, NONE, NONE, NONE, AMDR, AUSE, AFRM
accessories:         TACM, TACM, TACM, TAMT, TAMT, NONE, NONE, NONE, NONE, NONE, NONE, NONE, AORD, AORD
accessory:           TACM, TACM, TACM, TAMT, TAMT, NONE, NONE, NONE, NONE, NONE, NONE, NONE, AORD, AORD
accommodated:        NONE, NONE, NONE, NONE, NONE, NONE, NONE, NONE, NONE, NONE, NONE, AVAR, AORD, TAMT, AMDR
accommodates:        NONE, NONE, NONE, NONE, NONE, NONE, NONE, NONE, NONE, NONE, NONE, AVAR, AORD, TAMT, AMDR
accomplishes:        NONE, NONE, NONE, NONE, AMDR, TAMT, TSRC, TDST
accomplishment:      NONE, NONE, NONE, NONE, NONE, NONE, AMDR, TSRC, AVAR, TRES, TDST
accordance:          NONE, NONE, NONE, NONE, NONE, NONE, NONE, TACM, AORD, TCMP
accordingly:         TCND, TRES, NONE
account:             NONE, NONE, NONE, NONE, NONE, TAMT, TAMT, TAMT, TAMT, TAMT, TAMT, TAMT, TAMT, TAMT, TAMT, TINS,
                     TCMP
accounts:            NONE, NONE, NONE, NONE, NONE, TAMT, TAMT, TAMT, TAMT, TAMT, TAMT, TAMT, TAMT, TAMT, TAMT, TINS,
                     TCMP
accumulation:        NONE, NONE, AORD, TACM, TAMT
achieving:           NONE, NONE, NONE, AMDR, TSRC, TDST
acquires:            NONE, NONE, NONE, TBNF
acquiring:           NONE, NONE, NONE, TBNF
acres:               NONE, TAMT, ASTE
actions:             TMNS, TCMP, TINS, NONE, NONE, NONE, NONE, NONE, NONE, NONE, NONE, NONE, NONE, NONE
acts:                NONE, NONE, NONE, NONE, NONE, NONE, NONE, NONE, NONE, NONE, NONE, NONE, NONE, TSRC
actually:            NONE, NONE, TAMT
actuates:            AMFR, AGMT, TCSE
actuating:           AMFR, AGMT, TCSE
adaptation:          AVAR, AVAR, AORD, NONE, NONE, NONE, NONE, AMDR
adapters:            NONE, NONE, NONE, NONE, AVAR, AORD, AMDR
adding:              TAMT, TAMT
address:             NONE, NONE, NONE, NONE, NONE, NONE, NONE, NONE, NONE, NONE, NONE, NONE, NONE, TSPL, APOS
adds:                TAMT, TAMT, TAMT
adjusting:           NONE, NONE, NONE, NONE, NONE, NONE, NONE, NONE, AVAR, AORD, AORD, TAMT, AMDR, TCND, AGDM
adjustment:          NONE, NONE, NONE, NONE, NONE, NONE, NONE, AVAR, TCND, AORD, AORD, TAMT, AMDR
adjustments:         NONE, NONE, NONE, NONE, NONE, NONE, NONE, AVAR, TCND, AORD, AORD, TAMT, AMDR
adjusts:             NONE, NONE, NONE, NONE, NONE, NONE, NONE, NONE, AVAR, AORD, AORD, TAMT, AMDR, TCND, AGDM
advantage:           AUSE, AUSE, NONE, NONE, NONE, NONE, NONE, NONE, AMFR, TAMT
advises:             NONE, NONE, TINS
advisory:            NONE, NONE, TINS
aerodynamically:     NONE, TCNV, ASTE
aerodynamics:        NONE, NONE, TCNV, ASTE
aeronautics:         TCNV
```

| | |
|---|---|
| affairs: | NONE, NONE, TCND |
| affects: | NONE, NONE, NONE, NONE, NONE, NONE, NONE, NONE, NONE, NONE, NONE, NONE, AORD, AEID |
| agencies: | NONE, NONE, NONE, NONE, TMNS, AVAR |
| agency: | NONE, NONE, NONE, NONE, TMNS, AVAR |
| agents: | NONE, NONE, NONE, NONE, NONE, NONE, NONE, NONE, NONE, NONE, TACM, TCSE, AEID, AVAR, AVAR, TMNS |
| agreement: | NONE, NONE, NONE, NONE, NONE, NONE, NONE, NONE, TAMT, TACM, AORD, TCMP, TTIM |
| agreements: | NONE, NONE, NONE, NONE, NONE, NONE, NONE, NONE, TAMT, TACM, AORD, TCMP, TTIM |
| ahead: | TAMT, TTIM, AMDR, AEID, TCNV |
| aimed: | NONE, NONE, AMDR, AMDR, AMDR, TPUR, TPUR, TPUR, TGOL, TGOL |
| airliner's: | TCNV |
| airlines: | TCNV |
| airlock's: | AMDR, ASTE |
| airplane: | TCNV, TCNV, TCNV, TCNV |
| airport: | TCNV |
| airports: | TCNV |
| airworthiness: | NONE, TCNV |
| alerted: | NONE, NONE, NONE, NONE, NONE, NONE, NONE, NONE, TINS, TTIM |
| algorithm: | TAMT, TAMT, TAMT, TMAN |
| align: | AORD, AORD, ALDM, TACM |
| alignments: | ALDM, TACM, AMDR |
| alleviate: | NONE, NONE, APHP, TAMT |
| allocated: | NONE, AORD, TSPL, APOS |
| alloys: | NONE, ASTE, ASTE, TAMT, TAMT |
| alone: | NONE, NONE, TAMT, TAMT, TAMT, TAMT |
| alongside: | TCNV, AEID, ALDM |
| alphanumeric: | NONE, NONE, TAMT, TAMT |
| altered: | AVAR, AVAR, AVAR, TCND, TAMT |
| alternating: | NONE, NONE, AVAR, AVAR, AVAR, AVAR, AVAR, AVAR, AMDR, AMDR, TTIM, TDUR |
| altimeters: | ALDM |
| altitudes: | NONE, TCNV, ALDM |
| am: | NONE, TTIM |
| america: | TSPL, TSPL, APOS, APOS |
| american: | TSPL, TSPL, APOS, APOS |
| amis: | NONE, NONE, NONE, AORD, AMDR |
| amplification: | NONE, NONE, NONE, NONE, NONE, AVAR, AGDM, TAMT |
| ana: | NONE, NONE, NONE, NONE, AORD, TACM |
| analogous: | NONE, TCMP, TCMP, ALDM |
| analytical: | NONE, NONE, NONE, TAMT, TAMT |
| analyze: | NONE, NONE, NONE, NONE, TAMT, TAMT, AORD, TCMP |
| analyzed: | NONE, NONE, NONE, NONE, TAMT, TAMT, AORD, TCMP |
| anchor: | NONE, TCNV, TCNV, TCNV, TAMT, TACM, AVAR, TSPL, APOS |
| annex: | NONE, NONE, NONE, TAMT, TAMT, TAMT, TAMT, TACM |
| anomalies: | NONE, NONE, NONE, AORD, AORD |
| anomaly: | NONE, NONE, NONE, AORD, AORD |
| antenna's: | NONE, NONE, NONE, AEID |
| appear: | NONE, NONE, NONE, NONE, NONE, NONE, NONE, TRNG |
| appearance: | NONE, NONE, NONE, NONE, NONE, NONE, NONE, NONE, AMDR, TDST, AEID, AFRM |
| appears: | NONE, NONE, NONE, NONE, NONE, NONE, NONE, TRNG |
| applying: | NONE, NONE, NONE, NONE, NONE, AEID, AUSE |
| approaches: | NONE, NONE, NONE, NONE, NONE, NONE, NONE, NONE, NONE, NONE, NONE, NONE, AMDR, AMDR, AMDR, AMDR, AMDR, AMDR, AMDR, TDST, TDST, TCNV, AGDM, AGDM, AGDM, TPUR, TCMP, TCMP, THAN, TTIM |
| approved: | NONE, NONE, NONE, NONE, NONE, NONE, TBNF |
| arc: | NONE, NONE, AFRM |
| arm's: | NONE, NONE, NONE, NONE, NONE, ASTE, AMFR, TAMT, ALDM, TACM |
| arming: | NONE, NONE, NONE, NONE, NONE, ASTE, AMFR, TAMT, ALDM, TACM |
| army: | NONE, NONE, TAMT, AORD, AORD, TACM, TACM |
| array: | NONE, NONE, NONE, AORD, AORD, AORD, AORD, AORD, AORD, AORD, AEID, AEID |
| arrays: | NONE, NONE, NONE, AORD, AORD, AORD, AORD, AORD, AORD, AORD, AEID, AEID |
| arrival: | AMDR, AMDR, TDST, TCNV |
| arrive: | NONE, AMDR, TDST |
| arrived: | NONE, AMDR, TDST |
| arrives: | NONE, AMDR, TDST |
| arriving: | NONE, AMDR, TDST |
| ascend: | ALDM, ALDM, TCNV, APHP, AGMT, AMDR |
| ascension: | NONE, AMDR |
| aspects: | NONE, NONE, NONE, TAMT, TCND, TSPL, APOS |
| assemble: | NONE, NONE, AORD, AORD, TACM, TACM, TACM, TAMT, TAMT, TSRC |
| assessments: | NONE, NONE, TAMT, TAMT, TAMT, TAMT, TCMP |
| assigning: | NONE, NONE, NONE, NONE, NONE, NONE, NONE, TSPL, APOS, AORD, TCNV |
| assignment: | NONE, NONE, NONE, NONE, NONE, NONE, NONE, NONE, NONE, TSPL, APOS, AORD |
| assignments: | NONE, NONE, NONE, NONE, NONE, NONE, NONE, NONE, NONE, TSPL, APOS, AORD |
| assisted: | NONE, NONE, NONE, TMNS |
| assists: | NONE, NONE, NONE, TMNS |
| assume: | NONE, NONE, NONE, NONE, NONE, NONE, NONE, NONE, NONE, NONE, NONE, NONE, AEID, AORD, TBNF |
| astronaut's: | TCNV, TCNV, TCNV |
| astronautics: | TCNV, TCNV |
| atomize: | NONE, NONE, NONE, TAMT, TAMT, TCND, APHP, ASTE |
| attained: | NONE, NONE, AMDR, TDST |
| attenuation: | NONE, NONE, NONE, AORD, APHP, TAMT, AGDM, ALDM |
| attenuator: | NONE, NONE, NONE, AORD, APHP, TAMT, AGDM, ALDM |
| attributed: | NONE, NONE, NONE, AORD |
| augmentation: | NONE, TAMT, TAMT, AGDM |
| augmenting: | NONE, TAMT, TAMT, AGDM |
| augments: | NONE, TAMT, TAMT, AGDM |
| august: | TDUR, TTIM |
| automobile: | TCNV, TCNV, TCNV |
| availability: | NONE, NONE, AUSE |
| averaged: | NONE, AORD, AORD, AORD, AORD, AORD, TAMT, TAMT, TANT |
| avoid: | NONE, NONE, NONE, AMFR |
| avoidance: | NONE, NONE, AMFR |
| awaiting: | NONE, NONE, TTIM, TTIM |
| azimuths: | NONE, AMDR, AMDR, ALDM, TSPL, APOS |
| backpack: | TCNV |
| backward: | NONE, NONE, NONE, NONE, NONE, TTIM, TTIM, TTIM, TTIM, TTIM, AVAR, AGMT, AGMT, ALDM, ALDM, AEID, AEID, AMDR |
| bacteria: | NONE, AGDM |
| bail: | NONE, NONE, TCNV |
| bailout: | NONE, NONE, NONE, AMDR, TCNV |
| balance: | NONE, NONE, NONE, NONE, NONE, NONE, NONE, NONE, NONE, NONE, TAMT, TAMT, TAMT, TAMT, TAMT, TAMT, TAMT, TAMT, TAMT, TAMT, TAMT, TAMT, TCMP, TCMP, AVAR, AVAR, AFRM, AFRM, APHP |
| balanced: | NONE, NONE, NONE, NONE, NONE, NONE, TAMT, AVAR, AFRM |
| ballast: | TAMT, APHP, APHP, TCNV, AVAR |
| bandage: | NONE, NONE, NONE, ALDM, AEID, TAMT, TACM |
| banks: | NONE, NONE, NONE, NONE, NONE, NONE, NONE, NONE, AEID, AEID, ALDM, ALDM, ALDM, ALDM, TAMT, TAMT, ASTE, ASTE, AORD, AORD, AORD, AORD, TACM, TACM, TCNV, ATMP |
| banning: | NONE, NONE, NONE, NONE, NONE, NONE, NONE, AORD, AORD, TAMT, AMDR |
| barge: | TCNV, TCNV |
| barometric: | ASTE |

bases: NONE, NONE, NONE, NONE, NONE, NONE, NONE, NONE, NONE, NONE, NONE, NONE, ALDM, ALDM, ALDM, ALDM, ALDM, TCSE, AEID, AMDR, TSPL, TSPL, APOS, APOS, TAMT
basically: NONE, NONE, NONE, TCSE, TAMT, ALDM
basin: NONE, NONE, NONE, ALDM, AFRM, ASTE
baskets: NONE, AGND, AEID
batting: NONE, NONE, NONE, NONE, NONE, NONE, AMFR, AMFR
bc: TTIM
beacon: NONE, NONE, NONE, NONE, NONE, NONE, TCNV, ATMP
beams: NONE, NONE, NONE, NONE, NONE, NONE, NONE, NONE, NONE, NONE, NONE, NONE, NONE, TCNV, ALDM, ALDM, ALDM, ALDM, AMFR, AEID
bell: NONE, NONE, AVAR, TTIM, TDUR, TINS, TINS
bells: NONE, NONE, AVAR, TTIM, TDUR, TINS, TINS
belt: NONE, NONE, ASTE, ASTE, AFRM, AEID, AEID, AEID, AEID, AMFR, AMFR, TSPL, APOS, ALDM, ACOL, TAMT, TACM
bending: NONE, NONE, NONE, NONE, NONE, NONE, NONE, NONE, NONE, AFRM, AFRM, AFRM, AFRM, AFRM, ALDM, ALDM, ALDM, AMDR, AMDR, AMDR, AMDR, AMDR, APHP, TAMT, TACM, AORD
berthing: NONE, NONE, NONE, NONE, TCNV, TSPL, APOS
better: NONE, NONE, NONE, AVAR, AVAR, TAMT, TAMT
beverage: NONE, ASTE, AMDR, AMDR
beverages: NONE, ASTE, AMDR, AMDR
bias: NONE, NONE, NONE, NONE, NONE, NONE, NONE, NONE, NONE, ALDM, ALDM, ALDM, ALDM, ALDM, ALDM, AMDR, AMDR, AFRM
binder: NONE, TAMT, AEID
binding: NONE, NONE, NONE, NONE, NONE, NONE, TAMT, TAMT, TACM, TACM, AEID, AEID
binoculars: TINS
bit: NONE, NONE, NONE, NONE, NONE, NONE, NONE, NONE, AFRM, TINS, TAMT, TAMT, TAMT, TTIM, TTIM, TDUR, TDUR, AGDM
bite: NONE, NONE, NONE, NONE, NONE, NONE, NONE, NONE, NONE, NONE, NONE, NONE, AMDR, AMDR, AMDR, AFRM, AFRM, ATMP
blackout: NONE, NONE, NONE, NONE, NONE, TCNV, TCNV
blade: NONE, NONE, NONE, NONE, NONE, TCNV, TINS
blades: NONE, NONE, NONE, NONE, NONE, TCNV, TINS
blended: NONE, TAMT, TAMT
blocked: NONE, AFRM, TTIM
blocks: NONE, NONE, NONE, NONE, NONE, NONE, NONE, NONE, NONE, NONE, NONE, NONE, NONE, TSPL, TSPL, APOS, APOS, AFRM, AFRM, TTIM, TTIM, AGDM, AORD, TACM, APHP, AEID, AVAR
blood: NONE, NONE, NONE, NONE, NONE, NONE, NONE, NONE, NONE, ASTE, ASTE, AORD, AORD
blowdown: NONE, AMDR
blown: NONE, NONE, ASTE
blue: NONE, NONE, NONE, NONE, NONE, ACOL, ACOL, ACOL, ACOL
boards: NONE, NONE, NONE, NONE, NONE, NONE, NONE, NONE, NONE, NONE, AEID, AEID, AMDR, AMDR, AMDR, AMDR, AMDR, AMDR, AMDR, ALDM, TCNV
bohemia: NONE, AORD, AORD, TCNV
boiling: NONE, NONE, AMDR, ATMP, ATMP, ATMP, ASTE
boils: NONE, NONE, NONE, NONE, AMDR, AMDR, ATMP, ATMP, ATMP, ATMP, AFRM, ASTE
bonding: NONE, NONE, NONE, NONE, NONE, NONE, NONE, NONE, NONE, NONE, NONE, TAMT, TAMT, TAMT, TACM, TACH, TACH
boom: NONE, NONE, NONE, NONE, NONE, NONE, NONE, NONE, NONE, NONE, NONE, NONE, TCNV, TCNV, TAMT, TAMT, AMFR, AGMT
boosts: NONE, NONE, NONE, NONE, NONE, NONE, NONE, NONE, NONE, NONE, TAMT, TAMT, AMDR, AMDR, AMFR, AMFR
boot: NONE, NONE, NONE, NONE, NONE, NONE, AEID, AEID, AEID, AMFR, AMFR, AMDR, TCNV
boots: NONE, NONE, NONE, NONE, NONE, NONE, AEID, AEID, AEID, AMFR, AMFR, AMDR, TCNV
bottles: NONE, NONE, AEID, AEID, TSPL, APOS
boundary: TAMT, TAMT, AORD, AORD, TGOL, TGOL, AEID, AEID, AEID, AEID, TACM, AVAR
braces: ALDM
bracket: NONE, NONE, AORD, ALDM, ALDM, TAMT, TAMT, TACM, AEID
brackets: NONE, NONE, AORD, ALDM, ALDM, TAMT, TAMT, TACM, AEID
brain: NONE, NONE, NONE, NONE, NONE, AEID
brake's: NONE, NONE, NONE, AGMT, AVAR
branch: NONE, NONE, NONE, NONE, NONE, NONE, TACM, AORD, AORD, AMDR, AMDR, AMDR, TAMT, TAMT, TMAN, ASTE, ASTE, AFRM, AGDM
branches: NONE, NONE, NONE, NONE, NONE, NONE, TACM, AORD, AORD, AMDR, AMDR, AMDR, TAMT, TAMT, TMAN, ASTE, ASTE, AFRM, AGDM
breached: NONE, NONE, NONE, TAMT, TAMT, AGDM, AGDM, AORD, AORD, TSRC, AFRM
break: NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, AVAR, AVAR, AVAR, AVAR, TAMT, TAMT, TAMT, TAMT, TAMT, TAMT, TAMT, AGDM, AGDM, AORD, AORD, TTIM, TTIM, TDUR, TDUR, ASTE, TCNV, AMDR, APHP
breaks: NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, AVAR, AVAR, AVAR, AVAR, TAMT, TAMT, TAMT, TAMT, TAMT, TAMT, TAMT, AGDM, AGDM, AORD, AORD, TTIM, TTIM, TDUR, TDUR, ASTE, TCNV, AMDR, APHP
breathing: NONE, NONE, NONE, NONE, NONE, NONE, ASTE, ASTE, ASTE, TTIM, TTIM, TDUR, TDUR
bridges: NONE, NONE, NONE, NONE, AFRM, THAN, AEID, TAMT, TACH, TINS
briefing: NONE, NONE, NONE, NONE, TCNV, TINS
briefings: NONE, NONE, NONE, NONE, TCNV, TINS
briefly: NONE, ALDM, TTIM, TDUR
bring: NONE, NONE, TCSE, TCSE, TAMT, AORD, TCNV
brings: NONE, NONE, TCSE, TCSE, TAMT, AORD, TCNV
british: TSPL, APOS
broad: NONE, NONE, NONE, NONE, NONE, NONE, NONE, TTIM, AGND, ALDM, ALDM, AORD, AORD, TSPL, APOS, AGDM
broken: NONE, NONE, NONE, NONE, NONE, NONE, AORD, TSPL, APOS, TTIM, AFRM, TAMT, TAMT, TAMT
brothers: NONE, NONE, NONE, NONE, TACM, TACM, TCMP
brought: TSRC
btu: ATMP
bubble: NONE, NONE, NONE, NONE, NONE, NONE, ASTE, ASTE, AFRM, AFRM, APHP, APHP, TTIM, TDUR
bubbles: NONE, NONE, NONE, NONE, NONE, NONE, ASTE, ASTE, AFRM, AFRM, APHP, APHP, TTIM, TDUR
budget: NONE, NONE, NONE, NONE, NONE, TAMT, TAMT, TAMT, TAMT, TAMT, TAMT, AORD, TACM
budgets: NONE, NONE, NONE, NONE, NONE, TAMT, TAMT, TAMT, TAMT, TAMT, TAMT, AORD, TACM
buffer: NONE, NONE, NONE, NONE, AEID, TINS
builds: AFRM, AFRM, TAMT, TAMT, TSRC, TSPL, TSPL, APOS, APOS, AGDM
bulkheads: NONE, NONE, AMDR, AEID
bundle: NONE, NONE, AORD, AORD, TACM, TACM, TACM, TAMT, AMDR, TTIM, TTIM, AMFR, TCNV
bunk: NONE, NONE, NONE, NONE, NONE, ALDM
bunker: NONE, NONE, NONE, NONE, NONE, TSPL, APOS, TCNV, AFRM
buoyancy: NONE, APHP, APHP
burned: NONE, NONE, NONE, NONE, NONE, NONE, NONE, NONE, NONE, NONE, NONE, NONE, NONE, ATMP, ATMP, ATMP, ATMP, ATMP, TCNV, TCNV, ASTE, ASTE, ACOL, TRES
burnout: NONE, NONE, ATMP
burns: NONE, NONE, NONE, NONE, NONE, NONE, NONE, NONE, NONE, NONE, NONE, NONE, NONE, ATMP, ATMP, ATMP, ATMP, ATMP, TCNV, TCNV, ASTE, ASTE, ACOL, TRES
burst: NONE, NONE, NONE, NONE, NONE, NONE, NONE, NONE, NONE, NONE, NONE, NONE, TAMT, TAMT, TAMT, ATMP, AGMT
business: NONE, NONE, NONE, NONE, NONE, NONE, NONE, NONE, TACM
buttons: NONE, NONE, AEID, TAMT, TAMT, TACM, TACM, TINS, AFRM, AFRM, AGDM, ASTE
bypassed: THAN, THAN, TSPL, TSPL, APOS, APOS, AMDR, AMDR, AMDR
bypasses: THAN, THAN, TSPL, TSPL, APOS, APOS, AMDR, AMDR, AMDR
bypassing: THAN, THAN, TSPL, TSPL, APOS, APOS, AMDR, AMDR, AMDR
cabling: NONE, NONE, NONE, NONE, ALDM, ALDM
caddies: NONE, TCNV caged: NONE, NONE, NONE, AEID
calculated: NONE, TPUR, TPUR
calculates: NONE, TAMT, TPUR, TPUR
calculating: NONE, NONE, NONE, TAMT, TPUR
calculation: NONE, NONE, TAMT, TPUR, TPUR
calculations: NONE, NONE, TAMT, TPUR, TPUR
calibrations: NONE, TAMT, TDGR
calling: NONE, NONE, NONE, NONE, NONE, TCSE, TGOL
calls: NONE, NONE, NONE, NONE, NONE, NONE, NONE, NONE, NONE, NONE, NONE, NONE, NONE, NONE, NONE, NONE, NONE, NONE, NONE, NONE, NONE, NONE, TCSE, TAMT, TCMP
camera's: NONE, NONE, TIRS
canal: ASTE, ASTE, ALDM, AFRM, AFRM
cancelled: NONE, NONE, NONE, NONE, NONE, NONE, NONE, TAMT, TAMT, TAMT, AORD, TGOL, AVAR
canned: NONE, NONE, NONE, NONE, AEID, AEID, TCNV, AMDR, AMDR, AMDR, TSPL, APOS
cannon: NONE, NONE, AMFR, AMFR, AMFR, AMFR
canopy: NONE, NONE, AEID, AEID
cant: NONE, NONE, NONE, NONE, NONE, NONE, NONE, AFRM, ALDM, ALDM, TCNV, TCNV
capacitor: NONE, NONE, NONE, NONE, NONE, NONE, NONE, TAMT, TAMT, TMNS, TCND, TSPL, APOS, AGDM
capsule: NONE, NONE, NONE, NONE, NONE, AEID, AEID, TCNV, ALDM
care: NONE, NONE, NONE, NONE, NONE, NONE, NONE, NONE, NONE, NONE, NONE, NONE, NONE, NONE, NONE, NONE, NONE, AUSE, TAMT
carefully: NONE, NONE, TAMT
carriers: NONE, NONE, NONE, NONE, NONE, TCNV, TCNV, TCNV, TCNV, ALDM
cart: TCNV, TCNV, TCNV
casings: NONE, NONE, NONE, NONE, NONE, NONE, NONE, NONE, NONE, NONE, NONE, NONE, AFRM, AORD, TCND, TCND, AEID, AEID, AEID, AEID, AEID
casting: NONE, NONE, NONE, TAMT, TSRC, ASTE, AMFR
castings: NONE, NONE, NONE, TAMT, TSRC, ASTE, AMFR
catalyst: TCSE, TCSE, TAMT, AVAR
catastrophic: NONE, NONE, AVAR
catch: NONE, NONE, NONE, NONE, NONE, NONE, NONE, NONE, NONE, NONE, NONE, NONE, NONE, NONE, NONE, NONE, NONE, NONE, NONE, NONE, TCND, AVAR, ATMP, TRES
categories: AORD
category: AORD
cavitating: TSPL, TSPL, APOS, APOS, AGDM, AFRM, AFRM, ALDM
cavities: TSPL, TSPL, APOS, APOS, AGDM, AFRM, AFRM, ALDM
cell's: NONE, NONE, NONE, NONE, TACM, TSPL, APOS
centered: NONE, NONE, NONE, AMFR, TCNV, AEID, AEID, AEID, APHP, APHP, TMAN, TAMT, TAMT, TAMT, TACM, TACM
centering: NONE, NONE, NONE, AMFR, TCNV, AEID, AEID, AEID, APHP, APHP, TMAN, TAMT, TAMT, TAMT, TACM, TACM
centerthe: NONE, NONE, NONE, AMFR, TCNV, AEID, AEID, AEID, APHP, APHP, TMAN, TAMT, TAMT, TAMT, TACM, TACM
centimeters: TAMT, TTIM, NONE, NONE, NONE, NONE, NONE, NONE, NONE, NONE
centralized: AEID, AMDR, TAMT
centrifugal: AMDR
chain: NONE, NONE, NONE, NONE, NONE, NONE, AORD, AORD, ATMP, ALDM, TAMT, TAMT, TACM, TACM, AVAR
chaired: NONE, NONE, NONE, NONE, NONE, NONE, ALDM, ALDM
chambers: NONE, TSPL, APOS
changing: NONE, NONE, NONE, NONE, AVAR, AVAR, AVAR, AVAR, AVAR, AVAR, AVAR, AVAR, AVAR, TAMT, AEID, AGMT
characters: NONE, NONE, NONE, NONE, NONE, NONE, NONE, NONE, NONE, NONE, NONE, NONE, NONE, NONE, NONE, NONE, NONE, NONE, NONE, NONE, AORD, AORD, AORD, AGND, TAMT, TCND
charcoal: NONE, NONE, NONE, ATMP, ATMP, ACOL, ACOL
charge: NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, TAMT, TAMT, TAMT, TAMT, TAMT, TAMT, TAMT, TAMT, APHP, APHP, TCNV, AMFR
charges: NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, TAMT, TAMT, TAMT, TAMT, TAMT, TAMT, TAMT, TAMT, APHP, APHP, TCNV, AMFR
charging: NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, TAMT, TAMT, TAMT, TAMT, TAMT, TAMT, TAMT, TAMT, APHP, APHP, TCNV, AMFR
charts: NONE, NONE, TPUR, TPUR, TPUR, TAMT, TAMT, AORD
checking: NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, TAMT, TAMT, TAMT, TAMT, TAMT, TAMT, TCMP, TCMP, AGDM, AGDM, TSPL, APOS, ACOL, ACOL, AGMT, AGMT, AVAR, AVAR, TTIM
checklist: NONE, TAMT, TAMT
checklists: NONE, TAMT, TAMT
checkouts: NONE, NONE, NONE, NONE, TAMT, AMDR
chemically: NONE, NONE, NONE, ASTE
chilled: NONE, NONE, NONE, NONE, NONE, NONE, NONE, NONE, NONE, ATMP, ATMP, ATMP, ATMP, ATMP, ATMP
chiller: NONE, ATMP
choice: NONE, NONE, NONE, NONE, NONE, NONE, NONE, TCMP
chutes: NONE, ASTE, ASTE, ASTE, AMDR, AMDR, ALDM, TCNV
circle: NONE, NONE, NONE, AMDR, AMDR, AMDR, TSPL, TSPL, APOS, APOS, TACM, AFRM, AFRM, AFRM, AEID, AEID, TTIM, TTIM, AGMT
circularize: NONE, NONE, NONE, AMDR, AFRM
circulated: NONE, NONE, NONE, AMDR, AMDR, TAMT
circulates: NONE, NONE, NONE, AMDR, AMDR, TAMT
circulating: NONE, NONE, NONE, AMDR, AMDR, TAMT
cite: NONE, NONE, NONE, NONE, NONE, TCND
clamp: NONE, AGDM, AGDM, TAMT, TACM
clamps: NONE, AGDM, AGDM, TAMT, TACM
class: NONE, NONE, NONE, NONE, NONE, AORD, AORD, AORD, TACM, TACM, TAMT, TAMT, TCMP, TDGR
classified: NONE, AORD, AORD
cleaned: NONE, NONE, NONE, NONE, NONE, NONE, NONE, TAMT, TAMT, AFRM
clearance: NONE, NONE, NONE, NONE, NONE, TCNV, AORD, AMDR, TSPL, TSPL, TSPL, APOS, APOS, APOS, TAMT, TRNG
cleared: NONE, NONE, NONE, NONE, NONE, NONE, NONE, NONE, NONE, NONE, NONE, NONE, NONE, NONE, NONE, NONE, NONE, NONE, NONE, NONE, NONE, ALDM, AMDR, AMDR, AORD, TCNV, TAMT, TAMT, TAMT, TAMT, TAMT, AFRM, AFRM, TRNG, TCND, AGDM
clears: NONE, NONE, NONE, NONE, NONE, NONE, NONE, NONE, NONE, NONE, NONE, NONE, NONE, NONE, NONE, NONE, NONE, NONE, NONE, NONE, NONE, ALDM, AMDR, AMDR, AORD, TCNV, TAMT, TAMT, TAMT, TAMT, TAMT, AFRM, AFRM, TRNG, TCND, AGDM
clip: NONE, NONE, AMFR, AMFR, TAMT, TAMT, TAMT, TAMT, AGMT, AGMT, TACM, ALDM
clips: NONE, NONE, AMFR, AMFR, TAMT, TAMT, TAMT, TAMT, AGMT, AGMT, TACM, ALDM
clock: TTIM, TTIM, TTIM, TDUR, TDUR, TDUR
clockwise: AEID, AMDR, AMDR
closely: APHP, AGDM, ALDM
closeouts: NONE, NONE, NONE, NONE, TAMT
closer: NONE, NONE, NONE, NONE, NONE, NONE, NONE, NONE, NONE, NONE NONE, NONE, NONE, NONE, NONE, NONE, NONE, AVAR, AVAR, AORD, AORD, AORD, TGOL, TGOL, AMDR, AMDR, AFRM, AFRM, AEID, AEID, AEID, AEID, TMAN, TSPL, TSPL, APOS, APOS, AGMT, TAMT, TAMT, TACM, TACM, APHP, APHP, ALDM, AGDM, AGDM, AGDM, TCMP, ATMP
clothing: AEID
cluster: AORD, AORD, AORD, AORD, TACM, TACM, TACM, TACM, TAMT, TAMT, APHP, APHP
coarse: NONE, NONE, NONE, NONE, NONE, NONE, NONE, NONE, NONE, APHP, AFRM, ALDM
coatings: AEID, AEID, AEID, AEID, ACOL, ACOL
coats: AEID, AEID, AEID, AEID, AEID, AEID, AEID, AEID, AEID, ACOL, ACOL
coax: NONE, NONE, TCSE
cockpit: TSPL, APOS
coefficient: TACM

| | |
|---|---|
| coils: | ALDM, AEID, AFRM, AFRM |
| coincident: | NONE, NONE, AORD, TACM, TACM, TACM, TAMT |
| collect: | NONE, NONE, NONE, AORD, AORD, TACM, TACM, TACM, TCMP, TAMT |
| collecting: | NONE, NONE, NONE, AORD, AORD, TACM, TACM, TACM, TCMP, TAMT |
| collector: | NONE, NONE, NONE, NONE, NONE, NONE, AORD, TACM |
| collects: | NONE, NONE, NONE, AORD, AORD, TACM, TACM, TACM, TCMP, TAMT |
| column: | NONE, NONE, NONE, ALDM, ALDM, ALDM, AFRM, AORD |
| columns: | NONE, NONE, NONE, ALDM, ALDM, ALDM, AFRM, AORD |
| combinations: | NONE, NONE, NONE, TACM, TACM, TACM, TACM, TACM, AORD, TAMT, TAMT, TAMT, TAMT, TAMT, TAMT |
| combine: | NONE, TACM, TACM, TACM, TACM, TACM, TACM, TAMT, TAMT, TAMT, TAMT, TAMT, AORD, AORD |
| combiner: | NONE, TACM, TACM, TACM, TACM, TACM, TACM, TAMT, TAMT, TAMT, TAMT, TAMT, AORD, AORD |
| coming: | NONE, NONE, NONE, NONE, NONE, NONE, AMDR, AMDR, AMDR, AMDR, AMDR, TTIM, TTIM, TDST, TDST |
| commanders: | NONE, NONE, NONE, TAMT, TCNV |
| commentary: | NONE, NONE, TAMT |
| commission: | NONE, NONE, NONE, NONE, NONE, NONE, NONE, NONE, NONE, NONE, NONE, AORD, TACM, TAMT, TAMT, AVAR |
| communicates: | NONE, NONE, NONE, NONE, NONE, NONE, TAMT, TACM, TINS, TCNV |
| communicating: | NONE, NONE, NONE, NONE, NONE, NONE, TAMT, TACM, TINS, TCNV |
| companies: | NONE, NONE, NONE, NONE, AORD, AORD, TACM, TACM, TACM |
| companion: | NONE, NONE, NONE, NONE, AORD, AORD, TACM, TACM, TACM, TCMP, TCNV, AMDR |
| compare: | TCMP, TCMP, TCMP |
| compares: | TCMP, TCMP, TCMP |
| compensate: | NONE, NONE, NONE, NONE, TAMT, TAMT, TAMT, AVAR |
| compensates: | NONE, NONE, NONE, NONE, TAMT, TAMT, TAMT, AVAR |
| complement: | NONE, NONE, TAMT, TAMT, TAMT, AORD, TACM, TACM, TCMP, TCNV |
| completing: | NONE, NONE, NONE, NONE, NONE, NONE, AVAR, AORD, AORD, AORD, AORD, TGOL, TGOL, TAMT, TAMT, TAMT, TAMT, TCND |
| complexes: | NONE, NONE, NONE, NONE, NONE, TAMT, TAMT, TAMT, TAMT |
| complexity: | NONE, NONE, TAMT |
| comprehensive: | TAMT, TAMT, TAMT, TAMT, AORD, TACM, AGDM |
| compressed: | NONE, ALDM, APHP, AGDM |
| compression: | ALDM, APHP, AGDM, AGDM |
| comprise: | TAMT, TAMT, TAMT, AORD, AORD, TACM, AEID |
| comprises: | TAMT, TAMT, TAMT, AORD, AORD, TACM, AEID |
| computational: | NONE, NONE, TAMT, TAMT |
| computations: | NONE, NONE, TAMT, TAMT |
| computer's: | NONE, NONE, NONE, TAMT |
| concentration: | NONE, NONE, NONE, NONE, NONE, NONE, AEID, AGDM, AMDR, AMDR, AMDR, APHP, TAMT |
| concentrations: | NONE, NONE, NONE, NONE, NONE, NONE, AEID, AGDM, AMDR, AMDR, AMDR, APHP, TAMT |
| conclusion: | NONE, NONE, NONE, NONE, TTIM, AORD, AORD, TGOL, TCMP, TRES |
| concurrently: | NONE, TACM, TACM, TACM, TAMT, TTIM |
| condenser: | NONE, NONE, AGDM, APHP, APHP, TAMT, ALDM, ASTE |
| condiment: | NONE, AMDR |
| condiments: | NONE, AMDR |
| conditioners: | NONE, NONE, NONE, NONE, NONE, NONE, NONE, NONE, TCND, TCND, TCND, TCND, TCND, TCND, TCND, TAMT, TDGR, AEID |
| conducting: | NONE, NONE, NONE, NONE, NONE, NONE, NONE, NONE, NONE, AORD, TACM, ASTE, TCNV, AMDR |
| conducts: | NONE, NONE, NONE, NONE, NONE, NONE, NONE, NONE, NONE, AORD, TACM, ASTE, TCNV, AMDR |
| cones: | NONE, AFRM, TINS |
| configuration's: | NONE, NONE, NONE, AORD, AFRM, AEID |
| configure: | NONE, NONE, NONE, AORD, AFRM, AEID |
| configuring: | NONE, NONE, NONE, AORD, AFRM, AEID |
| confined: | NONE, NONE, NONE, AEID, AEID, TSPL, APOS, ALDM, AORD |
| confirm: | NONE, NONE, NONE, NONE, NONE, NONE, NONE, NONE, TCMP, AVAR |
| confirmed: | NONE, NONE, NONE, NONE, NONE, AVAR |
| confirms: | NONE, NONE, NONE, NONE, NONE, NONE, NONE, NONE, TCMP, AVAR |
| conflagration: | ATMP |
| conflicting: | NONE, NONE, NONE, NONE, NONE, NONE, NONE, ACOL |
| conical: | AFRM |
| connecting: | AGDM, TAMT, TAMT, TACM |
| consecutive: | TAMT, AMDR, TTIM, AORD |
| consequently: | TCND, TRES, NONE |
| conservative: | NONE, NONE, NONE, NONE, NONE, AVAR, AVAR, TTIM, AEID, AEID |
| conserve: | NONE, NONE, NONE, AMDR |
| conserving: | NONE, NONE, NONE, AMDR |
| consideration: | NONE, NONE, NONE, NONE, NONE, NONE, NONE, NONE, NONE, NONE, NONE, NONE, TCMP, TGOL, TCSE, TAMT, TAMT considerations:NONE, NONE, NONE, NONE, NONE, NONE, NONE, NONE, NONE, NONE, NONE, NONE, TCMP, TGOL, TCSE, TAMT, TAMT |
| consistent: | NONE, NONE, NONE, NONE, NONE, TAMT |
| constantly: | NONE, NONE, TTIM, TTIM, TTIM, TDUR, AORD |
| constants: | NONE, NONE, NONE, NONE, NONE, NONE, NONE, NONE, NONE, ACOL, TTIM, TTIM, TTIM, TTIM, TDUR, TDUR, AORD, AVAR, AVAR |
| constitute: | NONE, NONE, TAMT, TSRC |
| consumables: | NONE, NONE, NONE, TAMT, TAMT, TAMT, TAMT, AMDR, AGDM, AUSE, AUSE |
| contactor: | NONE, NONE, NONE, NONE, NONE, AGDM, AGDM |
| contactors: | NONE, NONE, NONE, NONE, NONE, AGDM, AGDM |
| contacts: | NONE, NONE, NONE, NONE, NONE, AGDM, AGDM |
| contaminant: | NONE, NONE, NONE, NONE, TAMT |
| contaminants: | NONE, NONE, NONE, NONE, TAMT |
| continual: | AORD, TTIM, TTIM, TDUR |
| continuation: | TAMT, AVAR, TTIM, TTIM, TDUR, AORD, AORD |
| continued: | NONE, AORD, TTIM, TTIM, TTIM, TTIM, TTIM, TDUR, TDUR, ALDM, AVAR |
| continuing: | NONE, AORD, TTIM, TDUR, AVAR, AVAR |
| contour: | AEID, AEID, AFRM |
| contracted: | NONE, NONE, NONE, AFRM, AGDM, TAMT |
| contrast: | NONE, NONE, NONE, TCMP, TCMP, TCMP, AEID, AEID |
| controller's: | NONE, NONE, TAMT, TAMT |
| controllerfcs: | NONE, NONE, TAMT, TAMT |
| controlseast: | NONE, NONE, NONE, NONE, NONE, NONE, NONE, NONE, NONE, NONE, NONE, NONE, NONE, NONE, NONE, NONE, NONE, NONE, NONE, NONE, NONE, NONE, TAMT, TCNV |
| convection: | TCNV |
| convenient: | NONE, NONE, NONE, AUSE, AGDM, TTIM |
| conversely: | NONE, NONE, NONE, NONE, NONE, NONE, NONE, NONE, ALDM, AEID, AEID |
| conversion: | NONE, NONE, NONE, NONE, AVAR, AVAR, AVAR, TSRC, AUSE |
| convoluted: | NONE, NONE, TAMT, AFRM, AFRM |
| cools: | NONE, NONE, NONE, NONE, NONE, NONE, NONE, NONE, NONE, NONE NONE, NONE, NONE, NONE, NONE, NONE, NONE, NONE, NONE, ATMP, ATMP, ATMP, ATMP, AVAR, AVAR, AGMT, ACOL |
| coordinating: | NONE, TCMP, TAMT, TAMT, AORD, AFRM, AFRM, TACM |
| coordination: | NONE, NONE, NONE, TAMT, AORD, AFRM |
| coordinator: | NONE, TCMP, TAMT, TAMT, AORD, AFRM, AFRM, TACM |
| copier: | NONE, NONE, NONE, NONE, NONE, NONE, NONE, NONE, NONE, NONE, NONE, NONE, NONE, NONE, NONE, NONE, NONE, NONE, NONE, TPUR, AVAR, TAMT, TAMT, TCMP |
| corduroy: | NONE, AFRM, AFRM |
| corners: | NONE, NONE, NONE, NONE, NONE, NONE, NONE, NONE, AFRM, AFRM, AMDR, AMDR, TSPL, APOS |
| corona: | NONE, NONE, NONE, NONE, NONE, AFRM |
| corporation: | NONE, TACM |
| corps: | NONE, NONE, AORD, TACM, TACM |
| corrected: | NONE, NONE, NONE, NONE, NONE, NONE, NONE, NONE, NONE, NONE, NONE, NONE, NONE, AORD |
| correctly: | NONE, NONE, NONE, NONE, NONE, NONE, NONE, NONE, NONE, NONE, NONE, NONE, NONE, AORD |

| | |
|---|---|
| correlation: | NONE, NONE, TCMP |
| correspond: | NONE, NONE, NONE, NONE, NONE, NONE, TACM, AORD, TAMT, ALDM, TCMP |
| corridor: | TCNV, TSPL, TSPL, APOS, APOS, AMDR, THAN |
| corrugated: | AFRM, AFRM, AFRM, AFRM |
| cost: | NONE, TAMT, TAMT, TAMT, TAMT |
| council: | NONE, NONE, NONE, NONE, NONE, TACM, TACM, AORD |
| count: | NONE, NONE, NONE, NONE, NONE, NONE, TAMT, TAMT, TAMT, TAMT, TAMT, TAMT, TCND, TCMP, TCMP, AORD |
| countdowns: | NONE, NONE, NONE, NONE, NONE, NONE, TAMT, TAMT, TAMT, TAMT, TAMT, TAMT, TCND, TCMP, TCMP, AORD |
| counterclockwise: | AMDR, AMDR, AMDR, AEID |
| countries: | NONE, TSPL, TSPL, TSPL, APOS, APOS, APOS |
| coupled: | NONE, NONE, TAMT, TAMT, TAMT, AORD, TACM, TACM |
| couplers: | NONE, NONE, NONE, TCMP, TAMT, TAMT, TAMT, TAMT, AORD, TACM, TACM, AGND |
| courses: | NONE, NONE, NONE, NONE, NONE, NONE, TSPL, APOS, TCNV, TCNV, TCNV, TCNV, TCNV, TCNV, AGMT, ASTE, ASTE, ASTE, TTIM, AORD, AMDR, AMDR, AMDR, AMDR, AEID, THAN, THAN, TPUR |
| cove: | NONE, AFRM, AFRM, AFRM, ASTE, AGND, TSPL, APOS |
| cracks: | NONE, NONE, NONE, NONE, NONE, NONE, NONE, NONE, NONE, NONE, NONE, NONE, NONE, NONE, NONE, NONE, NONE, NONE, NONE, NONE, TAMT, TAMT, AGDM, AGDM, AGDM, AFRM, AFRM, AFRM, AMFR, AMFR, TTIM, TDUR, ACOL, ATMP, TRES, TSPL, APOS |
| crank: | NONE, NONE, NONE, NONE, NONE, NONE, NONE, NONE, AFRM, AFRM, AMFR, AMFR, AORD, AMDR |
| crawlers: | NONE, NONE, TCNV, TCNV, TCNV, AGMT, AGMT, ALDM, ALDM, TTIM, TDUR |
| crawlerway: | NONE, NONE, TCNV, TCNV, TCNV, AGMT, AGMT, ALDM, ALDM, TTIM, TDUR |
| create: | NONE, NONE, AORD, TSRC, TSRC, TCSE, AFRM |
| created: | NONE, NONE, AORD, TSRC, TSRC, TCSE, AFRM |
| creates: | NONE, NONE, AORD, TSRC, TSRC, TCSE, AFRM |
| crosses: | NONE, NONE, NONE, NONE, NONE, NONE, NONE, NONE, NONE, NONE, NONE, NONE, NONE, NONE, NONE, NONE, NONE, NONE, NONE, NONE, NONE, NONE, ALDM, ALDM, ALDM, ALDM, ALDM, ALDM, ALDM, TAMT, TAMT, TAMT, AMDR, TCNV |
| crossing: | NONE, NONE, ALDM, ALDM, TAMT, AMDR, TCNV, TCNV |
| crosstie: | NONE, NONE, NONE, NONE, NONE, NONE, NONE, NONE, NONE, NONE, NONE, NONE, NONE, NONE, NONE, NONE, NONE, NONE, NONE, NONE, NONE, NONE, ALDM, ALDM, ALDM, ALDM, ALDM, ALDM, ALDM, TAMT, TAMT, TAMT, AMDR, TCNV |
| crosswind: | NONE, NONE, NONE, NONE, NONE, NONE, NONE, NONE, NONE, NONE, NONE, NONE, NONE, NONE, NONE, NONE, NONE, NONE, NONE, NONE, NONE, NONE, ALDM, ALDM, ALDM, ALDM, ALDM, ALDM, ALDM, TAMT, TAMT, TAMT, AMDR, TCNV |
| crosswinds: | NONE, NONE, NONE, NONE, NONE, NONE, NONE, NONE, NONE, NONE, NONE, NONE, NONE, NONE, NONE, NONE, NONE, NONE, NONE, NONE, NONE, NONE, ALDM, ALDM, ALDM, ALDM, ALDM, ALDM, ALDM, TAMT, TAMT, TAMT, AMDR, TCNV |
| cues: | NONE, NONE, NONE, NONE, NONE, NONE, TINS, TINS, AEID, AEID |
| ablate : | NONE, NONE, NONE, AUSE, TAMT, TAMT |
| allocation : | NONE, AORD, AORD, TSPL, APOS |
| apron : | TCNV, NONE, AEID |
| award : | NONE, NONE, NONE, NONE, TCMP |
| buzz : | NONE, NONE, NONE, NONE, NONE, NONE, NONE, NONE, NONE, NONE, NONE, NONE, AORD, TCNV, TINS |
| cast : | NONE, NONE, NONE, NONE, NONE, NONE, NONE, NONE, NONE, NONE, NONE, NONE, NONE, NONE, NONE, AEID, AEID, AORD, AORD, AORD, ACOL, AFRM, AFRM, TACM, TACM, ASTE, TAMT, TAMT, TAMT, AMFR, AMFR, TCNV, TSRC, TSRC, TSRC, TSRC, AUSE, AMDR, ATMP, TSPL, APOS, TPUR |
| chargeable : | NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, NONE, TAMT, TAMT, TAMT, TAMT, TAMT, TAMT, TAMT, TAMT, APHP, APHP, TCNV, AMFR |
| chemicals : | NONE, NONE, NONE, ASTE |
| circling : | AMDR, AEID, AEID, TTIM |
| circumnavigate : | AMDR, TCNV |
| complexities : | NONE, NONE, TAMT |
| conpress : | NONE, AGDM, AGDM, APHP, TAMT, ALDM |
| comform : | NONE, NONE, NONE, NONE, NONE, AORD |
| consolidating : | TAMT, TAMT, AGDM, TACM, APHP |
| cook : | ATMP, ATMP, ATMP, ATMP, NONE, NONE, NONE, NONE |
| crash : | NONE, NONE, NONE, NONE, NONE, NONE, NONE, NONE, NONE, NONE, NONE, TCNV, TCNV, TAMT, TAMT, TAMT, TAMT, AMDR, AMDR, AMFR, AMFR, ASTE, AEID |
| decelerate : | TAMT, NONE, AGMT |
| departing : | NONE, NONE, NONE, NONE, NONE, AMDR, AMDR, TAMT |
| disintegrates : | AORD, AORD, NONE, NONE, NONE, NONE, NONE, NONE, TAMT, TAMT, APHP, APHP, APHP |
| famous : | TAMT, NONE, NONE |
| fastest : | NONE, NONE, NONE, NONE, NONE, NONE, NONE, NONE, AFRM, ACOL, TACM, TACM, TAMT, TAMT, AVAR, AVAR, AGMT, AGMT |
| ferrying : | TCNV, TCNV, TCNV, THAN |
| filament : | AEID, ALDM |
| finder : | TINS |
| flutter : | NONE, NONE, NONE, NONE, NONE, NONE, NONE, NONE, NONE, NONE, NONE, NONE, NONE, NONE, NONE, NONE, AMDR, AMDR, AMDR, AMDR, AMDR, TTIM |
| globe : | NONE, NONE, TPUR, AFRM, AFRM |
| guided : | NONE, NONE, NONE, NONE, NONE, NONE, NONE, NONE, NONE, NONE, NONE, AFRM, AORD, AORD, AORD, ASTE, TACM, AMDR, TCNV |
| gun : | NONE, NONE, NONE, NONE, NONE, NONE, NONE, NONE, NONE, AVAR, AMFR, AMFR, AMFR |
| infringement : | NONE, NONE, NONE, NONE, NONE, NONE, AEID, AMDR |
| injected : | AMDR, TCSE, ASTE |
| insertions : | AMDR, AMDR, AMDR, AEID, NONE, TCNV |
| institute : | TACM, NONE, TSRC, TSRC, AORD, TCSE |
| integrator : | TAMT, TAMT, TAMT, TAMT, TAMT, AFRM |
| islands : | TCNV, ASTE, ASTE |
| latest : | TTIM, TTIM |
| lengthened : | ALDM, TDUR, TTIM |
| masted : | TCNV, TCNV, ALDM, ALDM |
| math : | TAMT, TAMT |
| month : | TDUR, TTIM |
| needleless : | NONE, NONE, NONE, NONE, NONE, NONE, NONE, AFRM, AFRM, AFRM, ALDM, ALDM, TCSE |
| negotiate : | NONE, NONE, NONE, NONE, NONE, NONE, AMDR |
| northerly : | AMDR, AMDR |
| oceanographic : | ALDM, NONE, ASTE |
| operators : | NONE, NONE, NONE, NONE, NONE, NONE, NONE, TPUR |
| orient : | NONE, NONE, AMDR, TSPL, APOS |
| penalties : | TAMT, NONE, NONE, NONE, NONE |
| perched : | TSPL, TSPL, APOS, APOS, ALDM, ALDM, AMDR, NONE, AGMT |
| person : | NONE, NONE, NONE, NONE, NONE, TAMT, AFRM |
| pigmented : | NONE, ACOL, ACOL, ACOL, ACOL, ACOL, ACOL, ACOL, ACOL, ACOL, ACOL, ACOL, ACOL, ACOL, ACOL |
| pitches : | TCNV, TCNV, ACOL, TDGR, TAMT, AMDR, AMDR, AMDR, AMDR, AMDR, AMDR, AMDR, NONE, NONE, NONE, NONE, NONE, NONE, ALDM, ALDM, ALDM, ALDM, ALDM, AMFR, AMFR, TSPL, APOS |
| planks : | NONE, NONE, AEID, AEID, ALDM, TSPL, APOS |
| prohibit : | AORD, NONE, NONE, NONE, NONE |
| prolonged : | ALDM, TDUR, TTIM |
| quickest : | NONE, NONE, NONE, NONE, NONE, NONE, NONE, NONE, NONE, NONE, NONE, NONE, AGMT, AGMT, TTIM, TTIM, TTIM, TTIM, TDUR, TDUR |
| radii : | AFRM, AFRM, AMDR, AMDR, TRNG, AGDM, ALDM |
| redesignated: | NONE, NONE, NONE, NONE, AORD |
| rehearsal : | NONE, NONE, NONE, NONE, TAMT, TAMT |
| rejected : | AUSE, NONE, NONE, NONE, NONE |
| rewaterproofed: | NONE, AFRM, TCNV, ASTE |
| rewaterproofing: | NONE, AFRM, TCNV, ASTE |

| | |
|---|---|
| resumption : | AVAR, NONE, TAMT |
| roughly : | AGDM, AORD, TTIM, NONE, NONE, AFRM |
| safest : | TAMT, NONE, NONE, NONE |
| self : | AORD, NONE, NONE |
| severely : | NONE, NONE, NONE, NONE, NONE, NONE, NONE, NONE, NONE, NONE, NONE, NONE, ATMP, TAMT |
| shirt : | AEID, AEID |
| shuttles : | TCNV, TCNV, ALDM, AMDR, AMDR |
| siphons : | AMDR, AMDR, ASTE, ASTE, TCNV |
| skip : | AMDR, AMDR, AMDR, TCNV, TCNV, NONE, NONE, NONE, NONE, NONE, NONE, NONE, NONE |
| slows : | AGMT, AGMT, AGMT, NONE, NONE, NONE, NONE, NONE, TTIM, TTIM, TTIM, TTIM, TTIM, TTIM |
| somewhat : | TAMT, TAMT, TAMT, TDGR |
| southeastern : | AMDR, AMDR, AMDR, TSPL, APOS |
| spa : | NONE, NONE, TSPL, APOS |
| specification : | AEID, TCND, TCND, TCND, NONE, NONE, AORD |
| springboard : | APHP |
| steers : | NONE, NONE, NONE, AGND, TINS, AMDR, AMDR, AMDR, TCNV |
| step : | NONE, NONE, NONE, NONE, NONE, NONE, NONE, TDGR, TAMT, TMNS, TCNV, TCNV, TCNV, AEID, AGMT, AGMT, AGDM, AMDR, AMDR |
| story : | NONE, NONE, NONE, NONE, NONE, NONE, NONE, TSPL, APOS, AEID |
| strengthened : | APHP, TAMT |
| stretch : | TRNG, TRNG, APHP, APHP, APHP, APHP, ALDM, ALDM, ALDM, ALDM, NONE, NONE, NONE, NONE, NONE, NONE, NONE, NONE, NONE, TDUR, TDUR, TDUR, TTIM, TTIM, TTIM, TCNV, AGDM, AGDM, TSPL, APOS |
| stuck : | NONE, NONE, NONE, AVAR, TAMT, TAMT, TACH |
| survive : | TDUR, TDUR, TTIM, TTIM, TTIM, NONE, NONE, NONE, AVAR, TAMT |
| swing : | NONE, NONE, NONE, NONE, NONE, NONE, NONE, NONE, NONE, NONE, NONE, NONE, NONE, NONE, NONE, NONE, AMFR, AMFR, AMDR, AMDR, AMDR, AMDR, AMDR, AMDR, AMDR, AMDR, AMDR, TCNV, TCNV, TCNV, ALDM, ALDM, TSPL, APOS, AVAR |
| threatens : | NONE, NONE, NONE, NONE, NONE, NONE, TTIM |
| thrustings : | AGMT, NONE, NONE, NONE, NONE, TCNV, TCNV, AMFR, AMFR, AMFR, AMFR, AMFR, AMFR, TAMT, TSPL, APOS |
| turbulence : | AMDR, TCNV, TCNV, TSPL, APOS, AORD, NONE, NONE, AFRM |
| turbulent : | NONE, NONE, NONE, NONE, NONE, AMDR, AORD, ASTE |
| unpowered : | TINS |
| upright : | TINS, ALDM, ALDM, ALDM, ALDM, ALDM, ALDM, NONE, NONE, AMDR, AFRM |
| utilization : | AUSE |
| waived : | NONE, AUSE |
| waterproof : | NONE, AFRM, TCNV, ASTE |
| woods : | TSPL, APOS, TINS, NONE |
| accidental: | NONE, NONE, NONE, TCND, NONE, TTIM, NONE |
| accompanied: | TACM, AORD, NONE, TTIM |
| accord: | NONE, NONE, NONE, AORD, NONE, NONE, NONE, NONE NONE, NONE, TACM, NONE, AORD, NONE, NONE, NONE, NONE, NONE, NONE |
| acquisitions: | NONE, NONE, TBNF, NONE |
| adhere: | TACH, TAMT, TAMT |
| adjudicate: | TCMP |
| adobe: | NONE, NONE, ASTE, ASTE |
| advance: | AMDR, AGMT, AVAR, NONE, NONE, TAMT, NONE, NONE NONE, AMDR, NONE, NONE, AMDR, NONE, NONE, TMNS, TCSE, NONE, TTIM, NONE, AMDR, AVAR, AMDR, NONE, TAMT, NONE, NONE, NONE, AGMT, NONE, AMDR, NONE, NONE, NONE, AMFR, NONE |
| advantages: | AUSE, NONE, NONE, NONE, AMFR, TAMT, NONE, AUSE, NONE, NONE |
| aeronautic: | TCNV |
| afford: | TAMT, TAMT, TAMT, NONE, NONE, NONE, TAMT |
| aftermath: | TRES, AORD, TTIM, NONE |
| agricultural: | NONE, TSPL, APOS |
| aided: | TACH, NONE, NONE, NONE, NONE, ALDM, NONE, NONE, NONE |
| altering: | AVAR, AVAR, TAMT, AVAR, TCND |
| alternatively: | NONE, NONE, AVAR, NONE, AVAR |
| alternatives: | NONE, NONE, AVAR, NONE, AVAR |
| announce: | NONE, TTIM, NONE, NONE, NONE |
| announcements: | NONE, NONE, TINS, NONE |
| announcing: | NONE, TTIM, NONE, NONE, NONE |
| answer: | NONE, NONE, NONE, NONE, NONE, NONE, AMFR, NONE, NONE TRES, TRES, NONE, NONE, AUSE, NONE, NONE, NONE, AMFR, NONE, NONE, NONE, TRES, TRES, NONE, NONE |
| answers: | NONE, NONE, NONE, NONE, NONE, NONE, AMFR, NONE, NONE TRES, TRES, NONE, NONE, AUSE, NONE, NONE, NONE, AMFR, NONE, NONE, NONE, TRES, TRES, NONE, NONE |
| architectural: | TSRC, AFRM |
| architecture: | NONE, AFRM, TSRC, NONE, AFRM, NONE |
| architectures: | NONE, AFRM, TSRC, NONE, AFRM, NONE |
| aside: | AEID, NONE, AGDM, NONE, NONE, AEID, NONE, AEID |
| ask: | TAMT, NONE, NONE, NONE, NONE, NONE |
| asset: | TAMT, TAMT, NONE, NONE, TAMT |
| assets: | TAMT, TAMT, NONE, NONE, TAMT |
| association: | TACM, TAMT, TACM, AORD, TACM, NONE, NONE, NONE, NONE, NONE, NONE, TACM, NONE |
| attrition: | NONE, AUSE, APHP, TAMT, NONE, TAMT, NONE |
| authorization: | NONE, NONE, NONE, NONE, NONE, NONE, TAMT |
| baby: | TSRC, AORD, NONE, NONE, TTIM, TTIM, AGDM, NONE, TTIM TTIM, AGDM |
| ban: | NONE, NONE, AORD, NONE, NONE, TAMT, NONE, AMDR, AORD NONE, NONE |
| bankers: | NONE, TAMT, NONE |
| bear: | NONE, NONE, NONE, NONE, TAMT, NONE, NONE, TSRC, AORD TSRC, NONE, AMDR, NONE, TCSE, NONE, NONE, ALDM, AMFR, TCNV, TSRC |
| benefit: | NONE, NONE, NONE, NONE, NONE, NONE, AUSE, NONE, NONE AUSE, NONE, NONE |
| bid: | NONE, NONE, NONE, NONE, TAMT, NONE, NONE, NONE, NONE |
| billion: | TAMT, TAMT, TAMT |
| billions: | TAMT, TAMT, TAMT |
| bonds: | NONE, TACM, TAMT, NONE, NONE, NONE, NONE, TACM, TAMT NONE, NONE, NONE, NONE, TACM, TAMT, NONE, NONE |
| borrowed: | TAMT, TAMT, NONE, NONE, NONE, NONE |
| borrows: | TAMT, TAMT, NONE, NONE, NONE, NONE |
| brand: | ATMP, NONE, ATMP, ATMP, AORD, ATMP, AORD, NONE, ATMP NONE, NONE, NONE, NONE, ATMP, NONE, NONE, NONE |
| breakthrough: | NONE, AVAR, AORD |
| breakthroughs: | NONE, AVAR, AORD |
| bull: | NONE, NONE, NONE, NONE, NONE, NONE, AGND, NONE, NONE NONE, NONE, NONE, AMFR, AGND |
| burden: | NONE, NONE, AGDM, NONE, NONE, NONE, NONE, NONE, NONE NONE, TAMT, NONE, NONE, APHP, TAMT, NONE, NONE, TSPL, APOS, NONE, NONE, APHP, NONE, NONE |
| burma: | TSPL, APOS |
| bush: | NONE, TSPL, APOS, NONE, NONE, NONE, NONE |
| business: | NONE, NONE, NONE, NONE, TACM, NONE, NONE, NONE, NONE, NONE |
| buy: | TAMT, NONE, NONE, NONE, NONE, NONE |
| buying: | TAMT, NONE, NONE, NONE, NONE, NONE |
| buys: | TAMT, NONE, NONE, NONE, NONE, NONE |
| camp: | NONE, NONE, TSPL, APOS, TSPL, APOS, TACM, NONE, NONE NONE, TSPL, APOS, NONE |
| campaign: | TCSE, TCNV, NONE, NONE, NONE, NONE, TCNV |
| canada: | TSPL, APOS |
| canaveral: | TSPL, APOS |
| cancellation: | TAMT, TAMT, ALDM, NONE, NONE, NONE, NONE |
| cancellations: | TAMT, TAMT, ALDM, NONE, NONE, NONE, NONE |
| capacity: | NONE, NONE, TAMT, NONE, NONE, TMNS, TCND, NONE, TSPL APOS, NONE, AGDM, NONE, TAMT |
| cape: | AEID, AFRM |

capital: AEID, TSPL, APOS, TAMT, ALDM, ALDM, THNS, NONE, NONE TAMT, NONE, NONE, TAMT, NONE, ALDM
capitalization: TAMT, TAMT, NONE
carried: TSPL, APOS, TCNV, NONE, NONE, NONE, TSPL, APOS, TAMT TCSE, TAMT, ALDM, TCNV, NONE
cars: TCNV, TCNV
cartel: TACM, TAMT, NONE, NONE
case: NONE, NONE, NONE, NONE, AFRM, NONE, AEID, NONE, NONE AORD, TCND, AEID, NONE, AEID, NONE, TCND, NONE, NONE, AEID, NONE, AEID
cases: NONE, NONE, NONE, NONE, AFRM, NONE, AEID, NONE, NONE AORD, TCND, AEID, NONE, AEID, NONE, TCND, NONE, NONE, AEID, NONE, AEID
cash: TAMT, TAMT, TAMT, TAMT, TAMT, TAMT
categories: AORD
caused: TCSE, TCSE, NONE, NONE, TCSE, NONE, TCSE, TSRC, TCSE
causes: TCSE, TCSE, NONE, NONE, TCSE, NONE, TCSE, TSRC, TCSE
center: NONE, AMFR, TCNV, AEID, NONE, AEID, TAMT, AORD, NONE NONE, NONE, AEID, AMDR
central: NONE, NONE, TCSE, TAMT, AEID, TAMT, AORD, AEID, NONE, NONE
century: TAMT, TDUR, TTIM, TDUR, TTIM, TAMT
change: AVAR, AVAR, AVAR, NONE, TAMT, AVAR, AVAR, AVAR, AVAR NONE, AEID, AVAR, AGMT, AVAR, NONE, NONE
changes: AVAR, AVAR, AVAR, NONE, TAMT, AVAR, AVAR, AVAR, AVAR NONE, AEID, AVAR, AGMT, AVAR, NONE, NONE
changing: AVAR, AVAR, AVAR, NONE, TAMT, AVAR, AVAR, AVAR, AVAR NONE, AEID, AVAR, AGMT, AVAR, NONE, NONE
channel: ALDM, ASTE, TINS, TINS, ALDM, AMDR, TMAN, NONE, ASTE TCNV, AFRM, ASTE, AFRM, TCNV
character: NONE, AORD, NONE, NONE, NONE, NONE, NONE, NONE, AORD NONE, AGND, NONE, TAMT, AORD, NONE, NONE, NONE, NONE, NONE, TCND, NONE, NONE, NONE, NONE, NONE, NONE
characters: NONE, AORD, NONE, NONE, NONE, NONE, NONE, NONE, AORD, NONE, AGND, NONE, TAMT, AORD, NONE, NONE, NONE, NONE, NONE, TCND, NONE, NONE, NONE, NONE, NONE, NONE
charges: NONE, NONE, NONE, NONE, TAMT, APHP, NONE, NONE, NONE NONE, NONE, NONE, TAMT, NONE, TAMT, TAMT, NONE, NONE, NONE, NONE, NONE, NONE, NONE, TAMT, NONE, TCNV, NONE, NONE, NONE, NONE, NONE, NONE, NONE, APHP, NONE, NONE, TAMT, NONE, TAMT, NONE, NONE, NONE, TAMT, AMFR, NONE
chemicals: NONE, NONE, ASTE, NONE
chernobyl: TSPL, APOS
chief: NONE, NONE, NONE, NONE, NONE, TAMT, NONE, NONE TSRC, AORD, AEID, NONE, AMDR, TAMT, NONE, AORD, ALDM cite:NONE, NONE, NONE, NONE, TCND, NONE
cites: NONE, NONE, NONE, NONE, TCND, NONE
city: TSPL, APOS, TSPL, APOS, TSPL, APOS, TSPL, APOS
claim: NONE, NONE, AMDR, NONE, NONE, NONE, NONE, NONE, AMDR NONE, NONE, NONE, NONE, NONE
claims: NONE, NONE, AMDR, NONE, NONE, NONE, NONE, NONE, AMDR NONE, NONE, NONE, NONE, NONE
class: AORD, AORD, TACM, NONE, NONE, NONE, TDGR, TAMT, TACM NONE, NONE, TAMT, AORD, TCMP
clean: NONE, NONE, NONE, NONE, NONE, TAMT, AFRM, NONE, TAMT, NONE
cleanup: AORD, NONE, NONE, NONE
clearance: NONE, NONE, TCNV, AGDM, AORD, AMDR, AGDM, NONE, NONE TAMT, TSPL, APOS, TSPL, APOS, NONE
climb: ALDM, AMDR, AMDR, TCNV, ALDM, AGMT
close: AEID, AEID, TSPL, TMAN, APOS, TSPL, APOS, AGMT, NONE NONE, NONE, TACM, AORD, APHP, NONE, TACM, TAMT, NONE, NONE, NONE, ALDM, AGDM, NONE, NONE, NONE, TCMP, TAMT, ATMP, NONE, AFRM, NONE, AGDM, AEID, APHP, AGDM
clot: NONE, APHP, TAMT, NONE, TAMT, TACM, AORD, ASTE, APHP
club: TACM, NONE, NONE, TSPL, APOS, NONE, NONE, AMFR, TAMT, NONE
coherent: NONE, TAMT, APHP, NONE
collaboration: TACM, TACM, NONE
collaborative: NONE, NONE, TACM, TACM, NONE
colombia: TSPL, APOS
columbia: TSPL, APOS
coming: AMDR, TTIM, NONE, TDST, AMDR, NONE, AMDR, TDST, AMDR NONE, AMDR, NONE, TTIM, NONE, NONE
commerce: NONE, NONE, AGND, NONE, NONE
commission: NONE, NONE, NONE, NONE, NONE, TACM, AORD, TAMT, NONE, NONE, TAMT, NONE, NONE, NONE, AVAR, NONE
commitment: TCSE, NONE, NONE, NONE, NONE, NONE, NONE, NONE, NONE, NONE, NONE, NONE
commitments: TCSE, NONE, NONE, NONE, NONE, NONE, NONE, NONE, NONE, NONE, NONE, NONE
common: NONE, NONE, NONE, NONE, TACM, TTIM, NONE, NONE, NONE NONE, TAMT, NONE, NONE, AORD, NONE, NONE, TAMT, NONE, NONE, AORD, NONE, NONE, NONE
communicating: NONE, NONE, TACM, TAMT, NONE, NONE, NONE, TINS, NONE, TCNV
community: NONE, TACM, AORD, TACM, NONE, NONE, NONE, NONE, NONE NONE, TCMP, NONE, TACM
companies: NONE, TACM, AORD, NONE, TACM, TACM, AORD, NONE, NONE NONE, TACM, NONE
company: NONE, TACM, AORD, NONE, TACM, TACM, AORD, NONE, NONE NONE, TACM, NONE
company's: NONE, TACM, AORD, NONE, TACM, TACM, AORD, NONE, NONE NONE, TACM, NONE
comparison: TCMP, TCMP, AVAR
complete: AVAR, TGOL, AORD, NONE, NONE, TAMT, AORD, NONE, NONE NONE, AORD, TGOL, AORD, NONE, TAMT, TAMT, TCND, TAMT
completing: AVAR, TGOL, AORD, NONE, NONE, TAMT, AORD, NONE, NONE, NONE, AORD, TGOL, AORD, NONE, TAMT, TAMT, TCND, TAMT
complex: NONE, NONE, TAMT, NONE, TAMT, TAMT, NONE, NONE, TAMT
complexity: NONE, NONE, TAMT
component: NONE, TAMT, NONE, TAMT, NONE, TAMT
comprehensive: TAMT, AORD, TACM, TAMT, TAMT, AGDM, TAMT
computer: NONE, NONE, TAMT, NONE
computers: NONE, NONE, TAMT, NONE
computing: NONE, TAMT
con: NONE, NONE, NONE, NONE, NONE, TCSE, NONE, NONE, NONE
concessional: NONE, NONE, NONE, TAMT, NONE, NONE, NONE, TCND
conditions: TCND, NONE, NONE, TCND, TDGR, TAMT, TCND, TCND, NONE, NONE, NONE, NONE, AEID, NONE, TCND, NONE, TCND, NONE
conducted: NONE, NONE, NONE, NONE, ASTE, AMDR, TACM, AORD NONE, NONE, NONE, NONE, NONE, TCNV
conforms: NONE, NONE, AORD, NONE, NONE, NONE
connected: TAMT, NONE, NONE, TACM, TAMT, NONE, TCMP
connectionism: NONE, NONE, TAMT, NONE, NONE, AGND, NONE, AEID, TACM, TAMT, TACM, TAMT, AGDM, NONE, NONE, TMAN, NONE, NONE
consequences: TTIM, NONE, TCMP, TAMT, NONE, NONE, NONE, NONE, TRES, AORD
consideration: NONE, NONE, NONE, NONE, NONE, NONE, NONE, NONE, NONE, TCMP, NONE, TCSE, TAMT, TAMT, NONE, NONE
considered: TPUR, NONE
consistent: NONE, TAMT, NONE, NONE, NONE, NONE
construction: AFRM, TAMT, NONE, TSRC, NONE, NONE, AFRM, NONE
consume: ATMP, NONE, NONE, NONE, TAMT, AMDR, AGDM, AUSE, AUSE TAMT, TAMT
contain: AFRM, AEID, AORD, AORD, AEID, AEID, NONE, TAMT
containing: AFRM, AEID, AORD, AORD, AEID, AEID, NONE, TAMT
contamination: TAMT, NONE, NONE, NONE, NONE
context: TCND, AEID
contract: NONE, NONE, NONE, NONE, NONE, NONE, AFRM, AGDM, NONE NONE, AGDM, ALDM, NONE, ALDM
contractor: NONE, NONE, NONE, NONE, NONE, NONE, AFRM, AGDM, NONE, NONE, AGDM, ALDM, NONE, ALDM
contracts: NONE, NONE, NONE, NONE, NONE, NONE, AFRM, AGDM, NONE NONE, AGDM, ALDM, NONE, ALDM
control: NONE, NONE, NONE, NONE, NONE, NONE, NONE, NONE, NONE NONE, NONE, NONE, NONE, NONE, NONE, NONE, NONE, TAMT, NONE, TCNV, NONE, NONE, NONE, NONE, NONE
controlled: NONE, NONE, NONE, NONE, NONE, NONE, NONE, NONE, NONE, NONE, NONE, NONE, NONE, NONE, NONE, NONE, NONE, TAMT, NONE, TCNV, NONE, NONE, NONE, NONE, NONE
controls: NONE, NONE, NONE, NONE, NONE, NONE, NONE, NONE NONE, NONE, NONE, NONE, NONE, NONE, NONE, NONE, NONE, TAMT, NONE, TCNV, NONE, NONE, NONE, NONE, NONE
conversion: AVAR, TSRC, NONE, AUSE, AVAR, NONE, NONE, NONE, AVAR
conversions: AVAR, TSRC, NONE, AUSE, AVAR, NONE, NONE, NONE, AVAR
converting: NONE, NONE, NONE, AVAR, AVAR, NONE, ALDM, AUSE, TSRC, AVAR, NONE, NONE
converts: NONE, NONE, NONE, AVAR, AVAR, NONE, ALDM, AUSE, TSRC AVAR, NONE, NONE
cooperate: NONE, NONE, TACM, TACM, NONE, AVAR, NONE
cooperation: NONE, TACM, TACM, NONE, NONE, AVAR, NONE cop: AFRM, NONE, NONE
corporation: TACM, NONE
cosmonaut: TCNV
costs: TAMT, NONE, TAMT, TAMT, TAMT
counterclaims: TAMT, TRES, TRES
countries: NONE, TSPL, APOS, TSPL, APOS, TSPL, APOS
country: NONE, TSPL, APOS, TSPL, APOS, TSPL, APOS
country's: NONE, TSPL, APOS, TSPL, APOS, TSPL, APOS
course: TSPL, APOS, TCNV, AGMT, ASTE, TTIM, NONE, AMDR AMDR, ASTE, TCNV, AEID, THAN, TPUR, NONE, AMDR, NONE, THAN, AMDR, NONE, NONE, TCNV, NONE, TCNV, ASTE, NONE, TCNV, TCNV
court: TACM, AORD, NONE, NONE, NONE, AEID, AEID, NONE NONE, NONE, TSPL, APOS, NONE, TSPL, THAN, APOS, NONE, NONE, NONE, NONE, NONE
cover: AEID, NONE, NONE, AEID, AMDR, TCNV, ALDM, NONE AEID, NONE, NONE, AMDR, AMDR, NONE, NONE, AEID, NONE, NONE, AFRM, ACOL, TAMT, NONE, AGND, TSPL, APOS, AORD, TACM, TAMT, AMDR, NONE, AEID, NONE, TDUR, TTIM, AFRM, TCNV
covered: AEID, NONE, NONE, AEID, AMDR, TCNV, ALDM, NONE AEID, NONE, NONE, AMDR, AMDR, NONE, NONE, AEID, NONE, NONE, AFRM, ACOL, TAMT, NONE, AGND, TSPL, APOS, AORD, TACM, TAMT, AMDR, NONE, AEID, NONE, TDUR, TTIM, AFRM, TCNV
crack: NONE, NONE, TAMT, AGDM, NONE, NONE, NONE, NONE AFRM, AMFR, NONE, TDUR, TTIM, AFRM, NONE, AGDM, NONE, ACOL, NONE, NONE, NONE, NONE, NONE, NONE, TAMT, AGDM, NONE, AFRM, ATMP, AMFR, NONE, AFRM, NONE, TRES, NONE, NONE
created: TSRC, AORD, TCSE, AFRM, NONE, TSRC, NONE
creation: TSRC, AORD, NONE, AFRM, TSRC, TRES, TSRC, AFRM, NONE, NONE
creditor: TAMT
creditors: TAMT
crisis: NONE, TTIM, NONE, TAMT, NONE, NONE
crops: NONE, AFRM, TACH, AORD, AEID, NONE, NONE, TRES NONE, NONE, TAMT, AMDR, NONE, NONE, ALDM
curb: AEID, NONE, NONE, THAN, NONE, NONE, NONE, NONE, AGMT
currency: NONE, TAMT, AORD, NONE, AORD
current: AGMT, AMDR, NONE, NONE, ASTE, NONE, ASTE, NONE, NONE NONE, NONE, NONE, TTIM, AORD, NONE, AORD, NONE
currently: AGMT, AMDR, NONE, NONE, ASTE, NONE, ASTE, NONE, NONE NONE, NONE, NONE, TTIM, AORD, NONE, AORD, NONE
cut: NONE, TAMT, AORD, TAMT, AGDM, TAMT, TDGR, TAMT, TAMT AFRM, NONE, AFRM, AMFR, NONE, NONE, AMFR, NONE, AFRM, TAMT, TAMT, NONE, NONE, TAMT, AMFR, ALDM, AEID, NONE, NONE, NONE, AFRM, TAMT, NONE, NONE, AFRM, TAMT, ATMP, AGDM, ALDM, TAMT, NONE, TAMT, AMDR, NONE, TAMT, AFRM, AFRM, NONE, AMFR, NONE, NONE, NONE, NONE, ASTE, AFRM, AFRM, NONE, NONE, APHP, NONE, NONE, TAMT, NONE, AMFR, TAMT, ALDM, NONE, NONE, AVAR, TAMT, AGDM, NONE, NONE, NONE, NONE, AFRM, NONE, TAMT, APHP
cutback: TAMT, TAMT
cutbacks: TAMT, TAMT
cuts: NONE, TAMT, AORD, TAMT, AGDM, TAMT, TDGR, TAMT TAMT, AFRM, NONE, AFRM, AMFR, NONE, NONE, AMFR, NONE, AFRM, TAMT, TAMT, NONE, NONE, TAMT, AMFR, ALDM, AEID, NONE, NONE, NONE, AFRM, TAMT, NONE, NONE, AFRM, TAMT, ATMP, AGDM, ALDM, TAMT, NONE, TAMT, AMDR, NONE, TAMT, AFRM, AFRM, NONE, AMFR, NONE, NONE, NONE, NONE, ASTE, AFRM, AFRM, NONE, NONE, APHP, NONE, NONE, TAMT, NONE, AMFR, TAMT, ALDM, NONE, NONE, AVAR, TAMT, AGDM, NONE, NONE, NONE, NONE, AFRM, NONE, TAMT, APHP
cutting: NONE, TAMT, NONE, NONE, NONE, NONE, TAMT, NONE TAMT, TAMT, NONE, NONE, NONE, ATMP, NONE, NONE, NONE, AFRM, ASTE, NONE
damage: NONE, NONE, NONE, NONE, TAMT, NONE, NONE
damages: NONE, TAMT
data: TACM, AORD, NONE, NONE, NONE, TINS, NONE, NONE
debt: NONE, TAMT
debtor: TAMT, NONE
debtors: TAMT, NONE
decentralization: AORD
decided: NONE, NONE, TGOL, AORD, NONE, TAMT, NONE, NONE, TCND
decision: NONE, TCMP, NONE, NONE, NONE
decrease: AGDM, TAMT, NONE, TAMT, AGDM, TAMT, TDGR, TAMT, TAMT TAMT, TAMT, NONE
defense: NONE, NONE, NONE, TRES, NONE, NONE, NONE, NONE
deferring: TTIM
deficiency: NONE, NONE, TAMT, TAMT, TAMT, NONE
deficit: TAMT, TAMT, TAMT, AMDR, NONE
defined: AEID, TRNG, NONE, AORD
defining: AORD, AEID
definition: AORD, AEID, NONE, NONE, NONE, NONE, NONE, TRNG
delays: NONE, AGMT, TTIM, AGMT, NONE, NONE, TTIM, AUSE TTIM, AGMT, TTIM
delivery: NONE, TSRC, NONE, NONE, NONE, NONE, NONE, TCNV
demand: NONE, AMDR, TAMT, NONE, NONE, NONE, NONE, NONE NONE, NONE, TAMT, AMDR, NONE, NONE, NONE, NONE, NONE, NONE, NONE
department: TSPL, APOS, NONE, TSPL, APOS, NONE
deposit: ASTE, TAMT, TSPL, APOS, NONE, APHP, TAMT, TCNV NONE, NONE, APHP, TSPL, APOS, NONE, NONE
derives: NONE, TCMP, AMDR, TBNF
describe: AORD, NONE, NONE
described: AORD, NONE, NONE
describes: AORD, NONE, NONE
description: AORD, NONE, AORD, NONE
design: NONE, NONE, TPUR, NONE, TPUR, NONE, NONE, NONE TPUR, NONE, NONE, NONE, NONE, TSRC, TPUR, NONE, TPUR
designed: TPUR, TPUR
desired: NONE, TPUR, NONE, NONE, AGND, NONE, NONE, NONE NONE, NONE, TPUR, AGND, NONE, NONE, NONE
destruction: NONE, NONE, TAMT, NONE, NONE, NONE, NONE
detail: TAMT, TACM, AORD, NONE, NONE, NONE, TAMT, TCND NONE, TAMT, NONE, AVAR, NONE, TCND, AORD, TAMT
detect: TRES
develop: AGDM, TSRC, NONE, AVAR, NONE, NONE, AGDM, NONE TAMT, AGDM, NONE, NONE, TTIM, NONE, TRES, NONE
developed: TAMT, NONE, AGDM, NONE, TTIM
developer: TPUR, NONE
developers: TPUR, NONE
developing: AVAR
development: AVAR, NONE, NONE, AGDM, NONE, TAMT, TTIM, NONE, TRES, NONE, NONE
device: NONE, NONE, NONE, NONE, NONE, NONE, THNS, NONE NONE, THNS, THNS, THNS, NONE, NONE, TPUR, NONE, NONE, NONE, NONE, NONE, NONE, TINS, NONE
diagnosis: NONE, TCMP, NONE
diagnostics: NONE, NONE, NONE
difference: AORD, AVAR, NONE, NONE, NONE, TCMP, NONE, TAMT, NONE, TAMT, TAMT, NONE
digital: NONE, TAMT
direct: NONE, NONE, NONE, NONE, AMDR, NONE, NONE, NONE NONE, NONE, TCNV, AMDR, NONE, NONE, NONE, NONE, NONE, NONE, NONE, NONE, NONE, AFRM, AMDR, NONE, AMDR
directly: NONE, NONE, TTIM, TTIM, AFRM, NONE, AMDR
discount: TAMT, TAMT, TAMT, NONE, TCND
discounted: TAMT, TAMT, TAMT, NONE, TCND
discovery: TRES, NONE, NONE, AVAR
disk: AFRM, AEID, AMDR
disks: AFRM, AEID, AMDR
display: NONE, AEID, NONE, NONE, NONE, NONE, NONE, NONE NONE, NONE, NONE, NONE, NONE
dissolves: NONE, NONE, NONE, AORD, TAMT, AORD, ASTE
doctors: NONE, NONE, NONE, NONE, NONE, TAMT, NONE, NONE NONE, NONE, NONE, NONE
document: NONE, NONE, NONE, NONE, TCND
documents: NONE, NONE, NONE, NONE, TCND
doing: NONE, NONE, NONE, NONE, TSRC, NONE dole: NONE, NONE, TAMT, NONE, NONE, TAMT, NONE, NONE, NONE
dollar: TAMT, TAMT, TAMT
dollars: TAMT, TAMT, TAMT
domain: AORD, TSPL, APOS, NONE, TSPL, APOS, NONE, NONE
dominated: ALDM, NONE, NONE, NONE, AORD, NONE
done: NONE, ATMP, TGOL, AORD, NONE, TSRC, NONE, NONE
downward: AMDR, AGMT, AMDR
dozen: TAMT
drives: AGMT, NONE, NONE, TCSE, NONE, NONE, TACM, AORD, TTIM AMFR, NONE, TINS, NONE, NONE, AMFR, TCNV, TSPL, TMAN, APOS, TCSE, NONE, NONE, NONE, TCNV, NONE, AFRM, NONE, AFRM, NONE, NONE, AMFR, NONE, NONE, AMFR, TCNV, AGMT, NONE, NONE, AMFR
drop: TAMT, ALDM, TAMT, AMDR, NONE, NONE, NONE, AMDR NONE, NONE, AGDM, AVAR, AMDR, NONE, AFRM, ASTE, NONE, NONE, TAMT, AMDR, AUSE, NONE, AMDR, AMDR, TSRC, NONE, APHP, ALDM, AMDR, NONE, AMDR, NONE, NONE, AMFR, NONE, AEID, ASTE, NONE
dumped: NONE, TSPL, APOS, NONE, NONE, NONE, NONE, TSPL APOS, NONE, NONE, NONE, NONE, AUSE, AUSE, NONE, NONE, NONE, NONE, AMDR
dumping: NONE, TSPL, APOS, NONE, NONE, NONE, NONE TSPL, APOS, NONE, NONE, NONE, NONE, AUSE, AUSE, NONE, NONE, NONE, NONE, AMDR
duration: TDUR, TTIM, AVAR, TDUR, TTIM, TTIM
duties: NONE, NONE, AUSE, NONE, NONE, NONE, NONE NONE, TAMT, NONE, TAMT, NONE
early: TTIM, TTIM, TTIM, TTIM, TTIM, TTIM, TTIM, TTIM
easier: NONE, TAMT, NONE, NONE, NONE, NONE, NONE, NONE NONE, NONE, NONE, TTIM, NONE, APHP, TAMT, NONE, NONE, NONE, NONE, AGMT, AFRM, NONE, NONE, NONE
easing: NONE, APHP, NONE, NONE, APHP, APHP, NONE, NONE, APHP
economic: TAMT, NONE, TAMT
economically: ALDM, TAMT
economics: NONE, TAMT
edge: NONE, TAMT, TSRC, AORD, AEID, AFRM, NONE, AFRM, AFRM ALDM, AEID, AEID, AFRM, AEID
effect: NONE, TGOL, AORD, NONE, TPUR, NONE, NONE, TRES, TRES TTIM, NONE, TCSE, TSRC, NONE, NONE, TCSE
efficient: NONE, NONE, AUSE, NONE, NONE
either: AORD, TAMT, TAMT, TCMP
electric: TCNV, TCNV
electricity: NONE, NONE, AGMT, NONE
elements: TSRC, AORD, NONE, NONE, NONE, ASTE
eliminating: NONE, AUSE, AMDR, TAMT, AORD, AMDR, NONE, AMDR
encourage: NONE, NONE, NONE, NONE, NONE, NONE, TCSE
encouraging: NONE, NONE, NONE, TCSE
engineering: NONE, NONE, TSRC, TCNV, NONE, NONE, NONE, NONE, TPUR, TSRC
enterprise: NONE, NONE, TACM, NONE, NONE, NONE, TPUR, NONE, NONE
enterprises: NONE, NONE, TACM, NONE, NONE, NONE, TPUR, NONE, NONE
entities: NONE, TAMT, NONE
entity: NONE, TAMT, NONE
entry: AMDR, TAMT, AMDR, TSPL, APOS, AMDR, NONE, AFRM, NONE, NONE
environment: TCND, AEID, AEID
environmental: TCND, AEID
environments: TCND, AEID, AEID
equipment: NONE, NONE, NONE, NONE, NONE, NONE, NONE, TCNV, NONE
equity: TAMT, NONE, NONE, NONE, NONE, NONE
escape: NONE, NONE, AMDR, NONE, AMDR, NONE, NONE, NONE, NONE
especially: TAMT, AORD
establish: NONE, TSRC, AORD, TSRC, TSPL, APOS, AVAR, NONE, NONE, TCSE, NONE, NONE
established: NONE, NONE, AVAR, TSPL, APOS, NONE, NONE, TTIM, NONE
estate: AORD, TSPL, APOS, NONE, NONE, TCND
etc.: TAMT
europe: ASTE, TSPL, APOS
european: ASTE, TSPL, APOS
evacuation: NONE, AMDR, AMDR, AMDR
eventually: TGOL, AORD, TTIM, NONE
excel: NONE, TAMT
except: TAMT, NONE, NONE, AORD, TAMT, TCND
excess: NONE, NONE, TAMT, NONE, AMDR, TAMT, NONE, NONE
exchange: NONE, NONE, NONE, AVAR, NONE, NONE, NONE, AVAR, AVAR, NONE, NONE, AVAR, AVAR, NONE, NONE
execute: NONE, NONE, NONE, NONE, NONE, TSRC, NONE, NONE
executing: NONE, NONE, NONE, NONE, NONE, TSRC, NONE, NONE
existing: NONE, TTIM
exit: ASTE, NONE, AMDR, AMDR, NONE, AMDR, TMAN, NONE, AMDR, NONE, NONE, AMDR
expansion: NONE, AVAR, AORD, NONE, NONE, AGDM, TAMT, AGDM, TSPL, APOS
expectations: NONE, NONE, NONE, NONE, TTIM, NONE
expenditures: TAMT, AUSE, NONE, TAMT, TAMT
expert: NONE, NONE, NONE, NONE, AORD, NONE, NONE, NONE, AORD, NONE
explain: NONE, NONE, NONE, NONE, NONE, TRES
exploit: NONE, NONE, TAMT, AUSE, AUSE
explorer: AORD, TCNV
export: AMDR, TCNV, TCNV, AMDR, TCNV
exposure: NONE, NONE, TRES, NONE, NONE, AEID, NONE, NONE, TSPL APOS, NONE, NONE, TRNG
extension: TAMT, TAMT, AVAR, AGDM, TAMT, ALDM, ALDM, NONE, TDUR TTIM, NONE, AORD, AGDM, TSPL, APOS, APHP, NONE
external: AEID, AEID, NONE
fabricate: TAMT, TSRC, NONE, TSRC, NONE
face: AEID, AEID, NONE, AEID, NONE, NONE, NONE, ALDM, NONE NONE, NONE, NONE, TAMT, NONE, ACOL, AEID, AEID, AEID, NONE, NONE, AEID, NONE, NONE, NONE
facility: NONE, NONE, NONE, NONE, NONE, TINS, APHP, NONE NONE, NONE, NONE
factor: NONE, TCSE, TAMT, NONE, NONE, TCND, TAMT
fail: TTIM, NONE, NONE, TAMT, NONE, NONE, NONE, NONE NONE, AMDR, TAMT, NONE, NONE, NONE
failure: NONE, NONE, NONE, NONE, NONE, NONE, TAMT, TAMT TAMT, NONE, NONE, NONE, NONE, AMDR, NONE, NONE, NONE, NONE
fair: NONE, NONE, NONE, NONE, NONE, NONE, NONE, NONE NONE, NONE, NONE, ACOL, NONE, NONE, NONE, NONE, ASTE, NONE, NONE, NONE, ACOL, NONE, NONE
fall: TTIM, NONE, ALDM, TAMT, NONE, AMDR, NONE, NONE AEID, ALDM, NONE, AMDR, ASTE, NONE, AMDR, ASTE, NONE, NONE, TAMT, NONE, TAMT, AMDR, NONE, NONE, NONE, ALDM, ALDM, NONE, AMDR, ASTE, NONE, AMDR
fallout: NONE, APHP, NONE
families: NONE, AORD, TACM, NONE, NONE, NONE, NONE, NONE NONE, NONE
family: NONE, AORD, TACM, NONE, NONE, NONE, NONE, NONE, NONE, NONE
fat: NONE, AMDR, NONE, NONE, NONE, AGDM, AGDM, AGDM, NONE APHP, NONE, NONE, ALDM, NONE, ALDM, NONE, TAMT
federation: TACM, TACM, TAMT, NONE
feel: TCMP, NONE, NONE, AEID, APHP, NONE, NONE, NONE, NONE NONE, NONE, NONE, NONE
fiber: ALDM, NONE, NONE, ALDM
fibers: ALDM, NONE, NONE, ALDM
file: AFRM, NONE, TAMT, NONE, NONE, NONE, NONE, NONE, NONE NONE, AORD, AFRM, TAMT, TCNV, NONE, NONE, NONE, AFRM, NONE
files: AFRM, NONE, TAMT, NONE, NONE, NONE, NONE, NONE, NONE NONE, AORD, AFRM, TAMT, TCNV, NONE, NONE, NONE, AFRM, NONE
final: NONE, NONE, AMDR, NONE, NONE, NONE, TRES, TGOL, AORD, TCND
finance: TAMT, TAMT, TAMT, NONE, NONE
financial: TAMT
financing: NONE, TAMT
fine: NONE, NONE, NONE, TCMP, NONE, NONE, NONE, NONE, NONE NONE, NONE, NONE, APHP, ASTE, AFRM, APHP, NONE, APHP, ALDM, AGDM, NONE, NONE, NONE
fired: ATMP, NONE, TCSE
firm: TACH, NONE, APHP, AVAR, AFRM, TACH, AORD, APHP NONE, TACH, TAMT, AVAR, NONE, AVAR, NONE, NONE, APHP, NONE, AVAR, NONE, NONE, NONE, NONE
first: TSRC, AORD, TAMT, TSRC, AORD, AEID, AMDR, AORD TTIM, AEID, TSRC, AORD, NONE
fix: NONE, NONE, TCNV, NONE, TSPL, APOS, TCND, NONE NONE, NONE, TAMT, AEID, TCMP, NONE, AMDR, AORD, TSPL, APOS, TACH, TAMT, AFRM, NONE, NONE, NONE, AORD, TSPL, APOS, NONE, NONE, NONE, AFRM, NONE, TAMT, NONE, NONE, NONE, NONE, AORD, AVAR, NONE
flexible: AVAR, AORD, NONE, AFRM, APHP, APHP, NONE, NONE, NONE
flight: NONE, NONE, TCNV, TACH, AORD, AGMT, NONE, AMDR, NONE TAMT, TCNV, NONE, TCNV, NONE, AGMT, TCNV
flow: TCNV, AGMT, NONE, AMDR, TCNV, ASTE, NONE, NONE, ASTE ASTE, NONE, TTIM, AMDR, AMDR, TCNV, NONE, ALDM, AGMT, TRES, ASTE, TCNV
focusing: AMFR, AEID, AMDR, NONE, AEID
following: TACH, AORD, AMDR, NONE, TTIM, NONE, AORD, NONE, AMDR NONE, TTIM, NONE, TRES, TCMP, AORD, AMDR
follows: NONE, AEID, TAMT, NONE, TAMT, NONE, AORD, NONE, NONE ALDM, NONE, NONE, TCMP, TRES, NONE, AORD, AORD, NONE, NONE, AMDR, NONE, NONE
food: AMDR
ford: THAN, ALDM, AMDR
forecast: NONE, NONE, NONE, TPUR, NONE, NONE
forecasting: ASTE, NONE
forecasts: NONE, NONE, NONE, TPUR, NONE, NONE
foreign: AORD, AEID, NONE, NONE
form: NONE, AORD, NONE, NONE, TCND, NONE, NONE, NONE, NONE AFRM, NONE, AFRM, NONE, NONE, AORD, TSPL, APOS, NONE, TCND, NONE, NONE, NONE, NONE, AORD, AFRM, NONE, NONE, AFRM, NONE, THAN, AFRM, TAMT, TSRC, TSRC, AORD, AFRM, AORD, NONE
freedom: NONE, NONE, TTIM, TAMT, NONE, NONE
frequently: TTIM, NONE, TAMT
friendly: NONE, NONE, NONE, NONE, TSPL, APOS, NONE, NONE, NONE
full: TAMT, AFRM, ALDM, ACOL, TAMT, AGDM, TACH, AORD TCND, TAMT, NONE, NONE, NONE, NONE, TAMT, NONE, NONE, ALDM, NONE, AMDR
function: NONE, NONE, NONE, TPUR, NONE, NONE, NONE, AUSE NONE, NONE, NONE
functions: NONE, NONE, NONE, TPUR, NONE, NONE, NONE, AUSE NONE, NONE, NONE
fund: TAMT, TACH, AORD, TAMT, NONE, TAMT, TAMT, NONE NONE, NONE
funds: NONE, THNS, TAMT
future: NONE, NONE, NONE, TTIM, TTIM, NONE
gather: AFRM, TACH, AORD, NONE, ASTE, TACH, AORD, TCMP AFRM, AGDM, NONE, TACH, TAMT, AMDR, NONE, NONE
general: NONE, NONE, NONE, AORD, AORD, NONE, TCMP, NONE, NONE
generate: TCSE, NONE, TSRC, NONE
generation: TDUR, TTIM, NONE, TDUR, TTIM, NONE, TSRC generic:AORD
geographic: ASTE, TSPL, APOS, TSPL, APOS
glass: APHP, NONE, NONE, TINS, TINS, TINS, AFRM, ATMP, NONE NONE, ASTE, AEID, NONE
global: TAMT, AORD, AFRM, AORD, TCND
goal: TDST, AMDR, TGOL, AORD, TCSE, TPUR, NONE
goals: TDST, AMDR, TGOL, AORD, TCSE, TPUR, NONE
golden: NONE, NONE, ASTE, TAMT, NONE, ACOL
gore: ASTE, NONE, NONE, AFRM
government: NONE, NONE, TSPL, APOS, NONE, NONE, NONE, NONE
governments: NONE, NONE, TSPL, APOS, NONE, NONE, NONE, NONE
granting: NONE, TCND
gross: NONE, TAMT, TAMT, NONE, TAMT, NONE, NONE, NONE APHP, AGDM, NONE, NONE, NONE, NONE, TAMT, NONE, ALDM, NONE, TAMT
group: TAMT, NONE, TACH, TACH, AORD, AORD, TACH, TACH AORD, NONE, NONE, TCMP, TAMT, AORD, TACH, AORD, AORD, AGDM
grow: NONE, ALDM, AGDM, AVAR, NONE, NONE, TAMT, TTIM TSRC, NONE
growth: NONE, AVAR, AGDM, NONE, TAMT, NONE, AVAR, NONE, NONE
hampshire: TSPL, APOS
head: NONE, NONE, NONE, ALDM, NONE, AORD, AEID, NONE ASTE, AEID, AEID, ASTE, NONE, NONE, NONE, ALDM, NONE, AFRM, NONE, AMFR, AMDR, TCNV, TCSE, TAMT, NONE, NONE, ALDM, ASTE, AMDR, TSRC, AORD, NONE, NONE, AEID, NONE, APHP, AMDR, AMDR, AORD, NONE, ALDM, NONE, TSRC, AORD, AEID, NONE, ALDM
health: AORD, NONE
heavy: NONE, AGDM, NONE, NONE, NONE, ASTE, NONE, APHP NONE, NONE, AGMT, NONE, NONE, NONE, TAMT, NONE, NONE, NONE, NONE, NONE, NONE, NONE, NONE, ALDM, NONE, NONE, ASTE, APHP, APHP
high: NONE, TINS, NONE, NONE, NONE, NONE, ASTE, NONE NONE, TAMT, NONE, NONE, TAMT, NONE, NONE, ALDM, NONE, NONE, NONE, NONE, NONE, NONE, NONE, AMDR, NONE, NONE, ALDM, NONE
higher: ALDM, TAMT
hill: AFRM, ALDM, TACH, AORD, TACH, AORD
history: NONE, NONE, TTIM
identification: TAMT, NONE, NONE, NONE, NONE, NONE, NONE, NONE, NONE
identified: TAMT, TRES, NONE, NONE, NONE, NONE, NONE, NONE
identifies: TAMT, TRES, NONE, NONE, NONE, NONE, NONE, NONE
identify: TAMT, TRES, NONE, NONE, NONE, NONE, NONE, NONE
identifying: TAMT, TRES, NONE, NONE, NONE, NONE, NONE, NONE
identity: NONE, TAMT, NONE, AORD, TCMP, TAMT
image: NONE, NONE, NONE, NONE, NONE, NONE, NONE, NONE, TCMP NONE, NONE, NONE, NONE, NONE, NONE, NONE, NONE, NONE
images: NONE, NONE, NONE, NONE, NONE, NONE, NONE, NONE, TCMP NONE, NONE, NONE, NONE, NONE, NONE, NONE, NONE, NONE
imaging: NONE, NONE, NONE, NONE, NONE, NONE, NONE, NONE, TCMP NONE, NONE, NONE, NONE, NONE, NONE, NONE, NONE, NONE
immaturity: NONE, TAMT, NONE, TTIM, NONE, NONE, NONE, TTIM
immediate: AGDM, NONE, NONE, TTIM, NONE, TDUR, TTIM, AGDM, TTIM TTIM, AMDR
impact: AMFR, NONE, TRES, NONE, TCNV, AVAR, AMDR
implement: NONE, THNS, TINS, NONE, NONE, NONE
implications: NONE, NONE, AORD, NONE, TINS, NONE, NONE, NONE
implies: NONE, AORD, NONE, TINS, NONE, NONE, NONE
implying: NONE, AORD, NONE, TINS, NONE, NONE, NONE
imports: AMDR, AMDR, NONE, NONE, NONE, TCNV, NONE, AMDR, NONE NONE, TCNV
improve: AVAR, AVAR, TAMT, NONE, NONE, NONE, NONE, AUSE, NONE
improvement: NONE, AVAR, AVAR, NONE, NONE
include: TAMT, AORD, AEID, AEID, TACH, TAMT
includes: TAMT, AORD, AEID, AEID, TACH, TAMT
including: TAMT, AORD, TAMT
income: AMDR, NONE, TAMT, TAMT
increase: TAMT, TAMT, NONE, AMDR, AGDM, TAMT, TAMT, TAMT, TAMT TAMT, NONE, TAMT, AGDM, AGDM, TDGR, TAMT, AGDM, TAMT, TAMT
increased: NONE, AGDM, TAMT, TAMT
increasingly: TAMT
index: AORD, NONE, NONE, AORD, NONE, NONE, TAMT, NONE, TINS TAMT, TPUR, NONE, NONE, NONE, NONE, AORD, TAMT, NONE indication:NONE, TINS, NONE, NONE, NONE indications:NONE, TINS, NONE, NONE, NONE
indicator: NONE, ALDM, NONE, NONE
indicators: NONE, ALDM, NONE, NONE
indirect: AMDR, NONE, NONE, TCSE, AMDR, NONE, ALDM
indirectly: NONE, AMDR, NONE, ALDM
individuals: NONE, NONE, NONE, TAMT, NONE, TAMT, AORD, NONE
industrial: NONE, NONE, TSRC
industries: NONE, TACH, NONE, NONE, NONE, NONE
industry: NONE, TACH, NONE, NONE, NONE, NONE
infect: NONE, NONE, NONE, NONE, TCSE, NONE

| | |
|---|---|
| inflation: | AGDM, NONE, NONE, TAMT, TAMT, NONE, NONE, TAMT, NONE |
| inflexible: | NONE, AVAR, NONE, APHP, NONE, NONE, NONE |
| information: | NONE, NONE, NONE, NONE, NONE, TINS, NONE, NONE, NONE |
| infringement: | NONE, NONE, NONE, AEID, NONE, AMDR, NONE, NONE |
| infringes: | NONE, NONE, AMDR, AEID, NONE, NONE |
| ingredients: | TAMT, NONE |
| initial: | TSRC, AORD, NONE, NONE, TSRC, AORD |
| initiating: | TACM, NONE, TSRC, AORD, TSRC, AORD, AMDR, NONE, NONE |
| initiatives: | TSRC, AORD, NONE, NONE, NONE, TSRC, AORD, AMDR |
| injunction: | NONE, AORD, NONE, NONE, NONE, NONE |
| inland: | AEID, AEID, AEID |
| innovation: | AVAR, NONE, TTIM, NONE |
| innovative: | AVAR, TTIM, NONE |
| input: | AMDR |
| insider: | TINS, TACM |
| instability: | AVAR, NONE, NONE, TDUR, TTIM, NONE, NONE, NONE |
| install: | TSRC, AORD, TSRC, TSPL, APOS, NONE, AMDR, TSPL, APOS |
| installation: | AMDR, NONE, NONE, TSRC, TSRC, AORD, NONE, TSPL, APOS, NONE |
| institute: | TACM, NONE, TSRC, TSRC, AORD, TCSE |
| institution: | TSRC, AORD, NONE, TSRC, NONE, TACM, NONE, NONE |
| instrument: | NONE, TCNV, ACOL, NONE, NONE, TMNS, NONE, NONE, TINS, TINS, AFRM, TINS, NONE, TINS, APHP, NONE, TINS |
| integrated: | TAMT, TACM, TAMT, TAMT, TAMT integrating:TAMT, TAMT, TAMT, TAMT, AFRM, TAMT |
| intelligence: | TINS, NONE, NONE, NONE, NONE, NONE, NONE, NONE, NONE, NONE, NONE |
| intent: | TPUR, NONE, NONE, NONE, NONE, NONE |
| intentional: | TPUR |
| interconnects: | TACM, TAMT, NONE |
| interest: | NONE, NONE, NONE, AUSE, NONE, TCSE, NONE, TAMT, NONE NONE, NONE, NONE, NONE, TCSE, NONE, NONE, TACM, NONE, NONE, NONE, NONE, NONE, NONE, NONE, TCSE, NONE, NONE, NONE |
| interface: | AEID, TACM, TAMT |
| interfaces: | AEID, TACM, TAMT |
| interim: | TTIM, NONE, TDUR, TTIM, AVAR, AGDM, TDUR, TTIM |
| international: | NONE, AORD |
| introducing: | NONE, TSRC, AORD, AMDR, AVAR, AORD, AMDR, AEID, AORD, NONE, NONE |
| introduction: | NONE, NONE, NONE, AMDR, NONE, AMDR, TSRC, AORD, AVAR, AMDR, AEID, NONE, NONE, AORD |
| investment: | AEID, NONE, NONE, NONE, NONE, NONE, TAMT |
| investor: | TAMT |
| involved: | NONE, TAMT, NONE, NONE, NONE, AORD, TAMT, NONE NONE, NONE, NONE |
| involvement: | NONE, TAMT, NONE, AORD, NONE, NONE, NONE, NONE, NONE, AEID, NONE |
| involves: | NONE, TAMT, NONE, AORD, NONE, NONE, NONE, NONE NONE, NONE, NONE, NONE, NONE, AEID |
| involving: | NONE, TAMT, NONE, AORD, NONE, NONE, NONE, NONE NONE, NONE, NONE, NONE, NONE, AEID |
| iowa: | TSPL, APOS |
| issue: | TCSE, NONE, AMDR, NONE, NONE, NONE, NONE, NONE TRES, NONE, NONE, TRES, NONE, TRES, NONE, NONE, NONE, TSRC, AORD, NONE, NONE, TTIM, AORD, AMDR, NONE, ASTE, NONE, NONE, TAMT, NONE, TRES, AMDR |
| issues: | TCSE, NONE, AMDR, NONE, NONE, NONE, NONE, NONE TRES, NONE, NONE, TRES, NONE, TRES, NONE, NONE, NONE, TSRC, AORD, NONE, NONE, TTIM, AORD, AMDR, NONE, ASTE, NONE, NONE, TAMT, NONE, TRES, AMDR |
| item: | TAMT, NONE, NONE, TAMT, TAMT, TAMT, TCND, NONE, TAMT |
| jack: | NONE, NONE, AMDR, TAMT, NONE, ALDM, TCNV |
| japan: | TSPL, APOS |
| jerusalem: | TSPL, APOS |
| joint: | NONE, AGDM, TSPL, APOS, NONE, TACM, TAMT, NONE AMDR, TAMT, NONE, TACM, TAMT, TACM, AORD, TACM, AORD, TAMT, NONE, TACM, TACM, TACM, TAMT, NONE |
| jointly: | TACM, AORD, TACM, TACM, NONE, TACM, TAMT |
| judgment: | TCMP, NONE, NONE, TCMP, NONE, NONE, NONE, NONE |
| justice: | NONE, TAMT, NONE, NONE, TCMP, NONE, NONE, NONE, NONE, NONE |
| kind: | NONE, NONE, AORD, NONE, NONE, NONE, NONE, NONE, NONE |
| kingdom: | NONE, AORD, AORD, TSPL, APOS, NONE |
| knight: | NONE, NONE, NONE, NONE, TCNV, NONE |
| knowing: | NONE, NONE, TPUR, NONE, NONE, NONE, NONE |
| knowledge: | NONE, TINS, NONE, NONE |
| lack: | NONE, TAMT, NONE, TAMT, NONE, TAMT, NONE, TAMT, AMDR, NONE |
| lake: | ASTE, ACOL |
| landfill: | TSPL, APOS |
| lasso: | AFRM, NONE, NONE |
| launch: | TCNV, TCNV, TCNV, TSRC, AORD, NONE, TCNV, AMFR, AMFR |
| law: | NONE, NONE, NONE, NONE, NONE, AORD, NONE, NONE |
| laws: | NONE, NONE, NONE, NONE, NONE, AORD, NONE, NONE |
| layoffs: | AMDR, AVAR, NONE |
| least: | TAMT, NONE, TAMT, TAMT, TAMT |
| lending: | NONE, TAMT |
| length: | AGDM, ALDM, AGDM |
| lengthening: | AVAR, ALDM, TDUR, TTIM, TAMT |
| lengths: | AGDM, ALDM, AGDM |
| less: | TAMT, TAMT, TAMT, TAMT, TAMT, NONE, TAMT |
| level: | AORD, TDGR, TAMT, TSPL, APOS, ALDM, AEID, ASTE AFRM, NONE, NONE, AMDR, TAMT, ALDM, NONE, NONE, AFRM, TAMT, ALDM, NONE, AFRM, AFRM, NONE, ALDM |
| levels: | AORD, TDGR, TAMT, TSPL, APOS, ALDM, AEID, ASTE AFRM, NONE, NONE, AMDR, TAMT, ALDM, NONE, NONE, AFRM, TAMT, ALDM, NONE, AFRM, AFRM, NONE, ALDM |
| leverage: | AMFR, NONE, NONE |
| leveraged: | AMFR, NONE, NONE |
| levitated: | AMDR, AMDR, APHP |
| liability: | TAMT, NONE, NONE, NONE, NONE, NONE, NONE |
| light: | NONE, TTIM, NONE, NONE, NONE, ATMP, NONE TINS, NONE, NONE, NONE, NONE, AMDR, NONE, AGMT, AFRM, AMDR, NONE, ATMP, NONE, TCNV, NONE, NONE, ASTE, NONE, NONE, ACOL, NONE, NONE, NONE, NONE, ALDM, ACOL, NONE, NONE, ALDM, NONE, NONE, APHP, ACOL |
| limitation: | AEID, NONE, ALDM, TCND, NONE, AEID |
| limitations: | AEID, NONE, ALDM, TCND, NONE, AEID |
| limited: | TCNV, AGDM, TSPL, APOS, NONE, NONE, ALDM, TCND NONE, AEID, AORD |
| limiting: | AEID, AEID, TGOL, AORD, TCND, NONE, AEID |
| link: | AEID, TACM, TAMT, TAMT, NONE, NONE, NONE TACM, AORD, TACM, TAMT, NONE |
| liquidate: | TAMT, NONE, NONE, AORD, NONE, NONE, TAMT, AMDR, NONE |
| list: | AEID, AEID, AEID, TAMT, ALDM, NONE, NONE, ALDM, ACOL AEID, AORD, NONE, TAMT, ALDM, NONE, TCNV, NONE, AMDR |
| local: | TACM, NONE, NONE, TCNV, NONE, TCNV, NONE, TSPL, APOS |
| located: | TSPL, APOS |
| location: | TRES, NONE, TSPL, APOS, TSPL, APOS, TCND |
| long-term: | TDUR, TTIM |
| longer: | TDUR, TTIM, NONE, NONE, NONE, ALDM, TDUR TTIM, ALDM, NONE, TDUR, TTIM |
| lords: | NONE, NONE, TBNF |
| lose: | NONE, NONE, NONE, NONE, TAMT |
| loss: | TAMT, NONE, NONE, NONE, NONE |
| lower: | TAMT, ALDM, ALDM, NONE, AFRM, NONE, NONE AMDR, TAMT, AMDR, ALDM, TAMT, TAMT |
| machine: | TACM, TCNV, AVAR, NONE, TINS, TINS, NONE NONE, NONE, TSRC, TINS |
| machine's: | TACM, TCNV, AVAR, NONE, TINS, TINS, NONE NONE, NONE, TSRC, TINS |
| machines: | TACM, TCNV, AVAR, NONE, TINS, TINS, NONE NONE, NONE, TSRC, TINS |
| magnetically: | AMFR, NONE, NONE, NONE |
| mail: | NONE, NONE, AEID, AEID, NONE, NONE, TCNV |
| maine: | TSPL, APOS |

major: TTIM, NONE, NONE, NONE, NONE, TTIM, TAMT
makes: TAMT, AFRM, AORD, TRES, TAMT, AFRM, NONE NONE, NONE, NONE, NONE, TDST, AMDR, TCSE, NONE, TAMT, AVAR, TSRC, NONE, NONE, ASTE, NONE, NONE, TCNV, TCNV
making: NONE, TRES, TSRC, AFRM
manage: NONE, TCND, NONE, AUSE, NONE, NONE, TAMT, NONE NONE, NONE, NONE, AVAR, TCNV, NONE, AUSE
management: NONE, NONE, TAMT, NONE, NONE, NONE, NONE, NONE, TAMT, NONE, AUSE, AUSE
manipulation: NONE, TPUR, NONE, NONE, AGND, NONE, NONE, NONE, AUSE
manner: NONE, NONE, NONE, AEID, AORD, TCND, AORD, NONE, THAN
manufacturing: TSRC, TSRC
march: AEID, AEID, TCNV, NONE, AMDR, NONE, TSPL, APOS, TCNV AEID, AMDR, AMDR, AGDM, AMDR, NONE, TCNV
market: TSPL, APOS, NONE, NONE, NONE, NONE, NONE, NONE, NONE NONE, NONE, NONE
market's: TSPL, APOS, NONE, NONE, NONE, NONE, NONE, NONE, NONE NONE, NONE, NONE
markets: TSPL, APOS, NONE, NONE, NONE, NONE, NONE, NONE, NONE NONE, NONE, NONE
master: NONE, NONE, TTIM, TCNV, NONE, NONE, NONE, NONE, NONE NONE, TSRC, TBNF, TAMT, NONE, NONE, NONE, NONE, NONE, NONE, NONE, NONE, NONE, NONE, TAMT, NONE, NONE, AGND, NONE
material: NONE, AEID, NONE, NONE, NONE, NONE, NONE, NONE NONE, NONE, NONE, NONE, NONE, NONE, NONE, NONE, NONE, NONE, NONE
materials: NONE, AEID, NONE, NONE, NONE, NONE, NONE, NONE NONE, NONE, NONE, NONE, NONE, NONE, NONE, NONE, NONE, NONE, NONE
matter: NONE, ASTE, NONE, NONE, NONE, TCSE, TCND, NONE AMDR, TAMT, NONE, NONE, NONE, NONE, NONE, AMDR
maturities: TTIM, NONE, TAMT, NONE
meaning: NONE, NONE, TPUR, NONE, NONE, NONE
means: NONE, NONE, TAMT, THAN, NONE, TINS, THNS
measures: NONE, TAMT, NONE, AGDM, TDGR, TAMT, NONE, NONE NONE, ALDM, NONE, NONE, NONE, NONE, NONE, NONE, NONE, NONE, NONE, NONE, TAMT, NONE, NONE, AGDM, TSPL, APOS, NONE, NONE, NONE, NONE, TAMT, TCMP, NONE, NONE, TCMP, TAMT, TAMT, AGDM, TCNV
mechanism: NONE, NONE, THNS, THNS, TINS, NONE, TINS
mechanisms: NONE, NONE, THNS, THNS, TINS, NONE, TINS
medium: NONE, NONE, NONE, AEID, NONE, THNS, AEID, NONE TAMT, NONE, NONE, ACOL, NONE, NONE, NONE, TAMT, ATMP, AEID, NONE, AORD
member: TACM, TAMT
mention: NONE, TINS, NONE, NONE, TINS, NONE, AORD
mentioned: NONE, TINS, NONE, NONE, TINS, NONE, AORD
merely: TAMT, TAMT, TAMT
merger: TACM, TAMT, NONE, TACM, TAMT, TAMT
methodologies: NONE, AORD, TPUR, THAN
methods: NONE, NONE, THNS, AORD, TPUR, THAN
micro: AGDM, TINS, TAMT
midst: AORD, TAMT, AEID
mill: NONE, APHP, TINS, TAMT, TACM, AORD, AMDR, AFRM, TSRC, APHP, TINS
million: TAMT, TAMT, TAMT
mimic: NONE, NONE, NONE, NONE, TCMP, NONE
mining: AFRM, AMDR, TSRC, ASTE, ALDM
minnesota: TSPL, APOS
miracle: NONE, NONE, AORD
mission: NONE, NONE, NONE, NONE, TCNV, NONE, NONE, NONE, NONE, NONE
misuse: NONE, NONE, AFRM, AUSE, AUSE, NONE, AFRM, NONE, AUSE, AUSE
modeling: AFRM, NONE
modern: TTIM, NONE, TTIM, TTIM
modernize: TTIM
modifying: TCND
molded: TSRC, NONE
monetary: TAMT
money: TAMT, TAMT, TAMT
motion: NONE, NONE, NONE, NONE, TINS, AGMT, NONE, TCNV, NONE, NONE
moving: TCNV, AGMT, TCSE, TCNV, NONE, NONE, NONE, AMFR, AGMT, TCSE, NONE, AMDR, NONE, TCNV
multi: TAMT, NONE, TAMT, TAMT
multinational: TAMT
multiple: TAMT, NONE, TAMT, TAMT
mutual: TACM, AORD, NONE, NONE, TACM, AVAR
national: NONE, NONE, NONE, AORD
nationality: TSPL, APOS, TSPL, APOS, NONE, NONE, NONE, NONE
near: AMDR, NONE, TTIM, AGDM, TCMP, AMDR, NONE, AGDM, NONE NONE, AEID, ALDM, TCMP, TAMT, AGDM, AGDM, TSPL, APOS, AGDM
necessarily: TRES, NONE, NONE
need: TAMT, NONE, TAMT, NONE, NONE, TAMT, NONE, NONE, NONE
negotiated: NONE, NONE, NONE, AMDR, NONE, NONE, NONE
nervous: AMDR, NONE, NONE, NONE, NONE, NONE, NONE, NONE
network: NONE, ALDM
networks: NONE, ALDM
non: TAMT
notes: TAMT, TAMT, NONE, NONE, NONE, NONE, NONE, NONE NONE, NONE, NONE, NONE, TAMT, NONE, TAMT, NONE, NONE, NONE, NONE, NONE, NONE, NONE, NONE, AEID, NONE, NONE, TAMT, NONE, NONE
nuclear: NONE, NONE, AEID, AORD
num: NONE, TAMT, NONE, NONE, TAMT, AORD, TAMT, TAMT TAMT, TAMT, TAMT, TAMT, NONE, TAMT, NONE, TAMT, TAMT, TAMT, TAMT
numbers: NONE, TAMT, TAMT, NONE, NONE, TAMT
nutrition: ATMP, AMDR, AMDR
objective: TPUR, TINS, NONE, NONE, NONE, NONE
obligations: NONE, TCND, TAMT, NONE, NONE, NONE, NONE, NONE, NONE, NONE
observed: NONE, NONE, NONE, AORD, NONE, NONE, NONE, NONE, NONE NONE, NONE, NONE
obtain: NONE, AMDR, NONE, TCNV, TCSE, AORD, TBNF
obtained: NONE, AMDR, NONE, TCNV, TCSE, AORD, TBNF
obtaining: NONE, AMDR, NONE, TCNV, TCSE, AORD, TBNF
ocean: TAMT, ASTE
office: NONE, NONE, NONE, AUSE, NONE, NONE, NONE NONE, NONE, TSPL, APOS, TINS, NONE, NONE
officer: NONE, NONE, NONE, TCNV, NONE
oil: NONE, NONE, NONE, ATMP, NONE, NONE, NONE NONE, NONE, NONE, NONE, ATMP, NONE, NONE, NONE, AFRM
older: TTIM, TTIM, TTIM, TTIM
once: TTIM, TTIM, TTIM, TAMT, TTIM
ones: TAMT, NONE, TAMT, NONE, NONE, NONE, TAMT, TAMT, TAMT
ongoing: AGMT, AMDR, NONE, NONE, NONE, AMDR
open: TSRC, AORD, AGDM, NONE, NONE, AGDM, AFRM, NONE NONE, NONE, ASTE, NONE, TAMT, NONE, NONE, NONE, NONE, NONE, TTIM, TAMT, NONE, NONE, NONE, NONE, AMDR, AGDM, NONE, AFRM, NONE, NONE, NONE, TRNG
operation: NONE, NONE, NONE, NONE, TSRC, AUSE, NONE, NONE, NONE, AUSE
optical: TINS, NONE
optics: NONE, TINS, NONE
orange: ACOL, AMDR
order: AORD, NONE, AORD, AORD, NONE, TACM, TCND, NONE, TACM AORD, NONE, TCMP, NONE, NONE, NONE, AORD, AORD, NONE, NONE, THAN, TDGR, TAMT, NONE, NONE, TACM, NONE, AORD, AORD, AORD, NONE, NONE, NONE, NONE, AORD, TCMP, NONE
organization: TACM, TAMT, AORD, NONE, AORD, NONE, TPUR, NONE, TSRC, AFRM, NONE
organizational: TACM, AORD
organizations: TACM, TAMT, AORD, NONE, AORD, NONE, TPUR, NONE, TSRC, AFRM, NONE
original: NONE, AORD, NONE, AORD, TCSE, NONE, ALDM, TSRC AORD, TCSE, NONE, NONE, NONE, NONE, TTIM, AORD, AORD, TTIM, NONE, AUSE
other's: NONE, NONE, TAMT, NONE, TTIM, NONE
others: NONE, NONE, TAMT, NONE, TTIM, NONE

| | |
|---|---|
| outbreak: | TSRC, AORD, NONE, NONE, NONE |
| outbreaks: | TSRC, AORD, NONE, NONE, NONE |
| outer: | AEID |
| output: | NONE, TRES, TAMT, NONE |
| outright: | TAMT, TAMT, TCND, TAMT, NONE |
| outside: | AEID, AEID, AEID, AORD, NONE, AEID, AEID, AEID |
| overcoming: | NONE, TAMT, NONE, NONE, NONE, NONE, NONE, NONE, NONE |
| overseas: | NONE, AGDM, ASTE, AORD |
| package: | TAMT, TACM, AORD, TAMT, AEID, TACM, AORD, AEID, AEID |
| page: | NONE, NONE, NONE, TAMT, TAMT, NONE |
| paper: | NONE, TAMT, TAMT, NONE, TAMT, NONE, ALDM, NONE NONE, ACOL, NONE, AEID |
| paris: | TSPL, APOS |
| partner: | TACM, AORD, TACM, NONE, NONE, NONE, TACM, AORD TACM, TAMT |
| partners: | TACM, AORD, TACM, NONE, NONE, NONE, TACM, AORD TACM, TAMT |
| passage: | NONE, TMAN, NONE, ASTE, AVAR, TSPL, APOS, AGMT AMDR, NONE, NONE, TCNV, NONE, NONE, TAMT, AMDR, AGDM, TCNV, TCNV, TCNV |
| passed: | NONE, TTIM |
| past: | NONE, TTIM, TTIM, TTIM, TTIM, TTIM, TTIM, TTIM AGDM, NONE, NONE |
| pat: | NONE, NONE, AGDM, AMFR, NONE, NONE, AMFR, NONE NONE, AVAR |
| patent: | NONE, NONE, NONE, AEID, NONE, NONE, NONE, AEID NONE, NONE, TRMG, NONE |
| pattern: | NONE, TPUR, AFRM, NONE, NONE, NONE, NONE, NONE NONE, NONE, NONE, NONE, AFRM |
| pay: | NONE, TAMT, AUSE, NONE, NONE, NONE, TAMT, TAMT NONE, TAMT, NONE, TAMT, TAMT |
| paying: | TAMT, NONE, TAMT |
| payment: | TAMT, TCSE, TAMT, NONE, TAMT |
| payments: | TAMT, TCSE, TAMT, NONE, TAMT |
| pays: | NONE, TAMT, AUSE, NONE, NONE, NONE, TAMT, TAMT NONE, TAMT, NONE, TAMT, TAMT |
| penalties: | TAMT, NONE, NONE, NONE, NONE |
| pending: | ALDM, ALDM, NONE, TTIM |
| per: | TMNS, AORD, AORD |
| perform: | NONE, NONE, NONE, NONE, NONE, NONE, NONE, NONE TSRC, NONE |
| performance: | NONE, NONE, NONE, NONE, NONE, NONE, NONE, NONE, NONE, NONE, NONE, TSRC, NONE |
| performs: | NONE, NONE, NONE, NONE, NONE, NONE, NONE, NONE TSRC, NONE |
| period: | NONE, TDGR, TAMT, TTIM, TGOL, AORD, TDUR, TTIM AMDR, NONE, NONE, AVAR, NONE, TTIM, TDUR, TTIM, AMDR |
| permanent: | AEID, AVAR, TDUR, TTIM, NONE, TDUR, TTIM, NONE, AVAR |
| person: | NONE, NONE, NONE, NONE, TAMT, AFRM, NONE |
| personal: | NONE, AORD, NONE |
| personalities: | NONE, NONE, AORD, NONE, NONE, NONE, NONE |
| peru: | TSPL, APOS |
| pictures: | NONE, NONE, NONE, NONE, NONE, TCMP, NONE, NONE NONE, NONE, NONE, NONE, NONE, NONE, NONE, NONE, TPUR, NONE, NONE |
| piece: | NONE, TAMT, AGDM, TTIM, NONE, ALDM, NONE, NONE TAMT, NONE, NONE, NONE, AGND, NONE, NONE, NONE, NONE |
| pieces: | NONE, TAMT, AGDM, TTIM, NONE, ALDM, NONE, NONE TAMT, NONE, NONE, NONE, AGND, NONE, NONE, NONE, NONE |
| plan: | TPUR, NONE, TAMT, NONE, TPUR, NONE, AFRM, NONE TSRC, TPUR, TTIM, TPUR, AORD, NONE, TPUR, NONE |
| plane: | TCNV, TDGR, TAMT, ALDM, AFRM, TINS, AFRM, AMDR ALDM, AFRM |
| planetary: | NONE, AORD, AMDR |
| planning: | AORD, NONE, NONE, TPUR |
| plans: | TPUR, NONE, TAMT, NONE, TPUR, NONE, AFRM, NONE TSRC, TPUR, TTIM, TPUR, AORD, NONE, TPUR, NONE |
| plummet: | TAMT, ALDM, APHP, TAMT, TAMT, AMDR, AMDR |
| pollution: | TAMT, NONE, NONE, NONE, AUSE, NONE |
| possible: | NONE, NONE, TAMT |
| postscript: | TAMT, AORD |
| power: | NONE, NONE, TSPL, APOS, NONE, NONE, NONE, TAMT AMFR, NONE, TMNS, NONE, NONE, NONE, NONE, NONE, TAMT, NONE, NONE, AMFR |
| powerful: | NONE, NONE, TAMT, NONE, NONE, NONE |
| practical: | NONE, NONE, NONE, NONE, NONE, NONE, NONE, AUSE AUSE, NONE, NONE |
| practice: | NONE, NONE, NONE, NONE, NONE, NONE, TAMT, NONE NONE, NONE, NONE, NONE, NONE, NONE, THAN, NONE, NONE, NONE, NONE, NONE, NONE, NONE, TAMT, NONE, NONE, AUSE |
| practices: | NONE, NONE, NONE, NONE, NONE, NONE, TAMT, NONE NONE, NONE, NONE, NONE, NONE, NONE, THAN, NONE, NONE, NONE, NONE, NONE, NONE, NONE, TAMT, NONE, NONE, AUSE |
| prank: | NONE, AEID, NONE |
| predicted: | NONE, TTIM, NONE |
| predictions: | NONE, NONE, NONE, TTIM |
| preliminary: | TSRC, AORD, AORD, NONE, AORD, AORD, TSRC, AORD |
| premium: | TAMT, TAMT, TAMT, TAMT, NONE, TAMT |
| present: | NONE, TTIM, NONE, TTIM, NONE, NONE, AEID, AMDR NONE, NONE, TAMT, NONE, NONE, NONE, NONE, NONE, NONE, NONE, NONE, TTIM |
| previous: | TTIM, TTIM, TTIM, TTIM |
| price: | TAMT, TAMT, NONE, NONE, TAMT, TAMT, NONE, TAMT |
| prices: | TAMT, TAMT, NONE, NONE, TAMT, TAMT, NONE, TAMT |
| prime: | TSRC, AORD, TTIM, TTIM, TTIM, NONE, NONE, AEID ACOL, AMFR, NONE, NONE, TSRC, AORD, NONE, TAMT, AEID, NONE, TAMT, TTIM, TTIM |
| principal: | TAMT, NONE, NONE, NONE, NONE, TINS, TAMT, TAMT TSRC, AORD, NONE |
| principles: | TSRC, AORD, NONE, NONE, TPUR |
| private: | NONE, NONE, AORD, NONE, NONE, NONE |
| procedure: | TMAN, NONE, NONE, TPUR, TPUR, NONE |
| proceeds: | NONE, TRES, TAMT, NONE |
| processed: | TSRC |
| processing: | NONE, TSRC, NONE |
| produce: | AMDR, NONE, TRES, TAMT, AMDR, NONE, NONE, NONE TCSE, NONE, TSRC, NONE, NONE, ALDM, NONE, TSRC, AMDR, NONE, TSRC |
| producers: | TCSE, NONE, TSRC, NONE, NONE |
| produces: | AMDR, NONE, TRES, TAMT, AMDR, NONE, NONE, NONE TCSE, NONE, TSRC, NONE, NONE, ALDM, NONE, TSRC, AMDR, NONE, TSRC |
| product: | NONE, TRES, TRES, TAMT, NONE |
| production: | NONE, NONE, NONE, NONE, NONE, TSRC, NONE, TRES, NONE, ALDM, AFRM, NONE, NONE, NONE |
| products: | NONE, TRES, TRES, TAMT, NONE |
| program: | NONE, TAMT, NONE, TPUR, NONE, NONE, NONE, NONE NONE, NONE, TAMT, TPUR, NONE |
| programs: | NONE, TAMT, NONE, TPUR, NONE, NONE, NONE, NONE NONE, NONE, TAMT, TPUR, NONE |
| project: | TPUR, TPUR, NONE, TTIM, NONE, NONE, AEID, TTIM TPUR, ALDM, TPUR, AFRM, NONE, TCNV, NONE, AMFR |
| projected: | TTIM, TPUR, TPUR |
| projection: | NONE, NONE, TPUR, NONE, AEID, TPUR, ALDM, TPUR, AFRM, AFRM, NONE, AMFR |
| projections: | NONE, NONE, TPUR, NONE, AEID, TPUR, ALDM, TPUR, AFRM, AFRM, NONE, AMFR |
| proposal: | NONE, NONE, TPUR, NONE, NONE, TPUR |
| proposals: | NONE, NONE, TPUR, NONE, NONE, TPUR |
| proposed: | TPUR |
| prototype: | AFRM, NONE, NONE, NONE, NONE |
| provided: | NONE, NONE, NONE, TCND |
| providing: | TCND |
| publicity: | NONE, TINS, NONE |
| purchase: | NONE, AMFR, NONE, NONE, ALDM, AMFR, NONE, NONE |
| purpose: | AUSE, TPUR, NONE, NONE, TPUR, NONE |
| purposes: | AUSE, TPUR, NONE, NONE, TPUR, NONE |
| quality: | AORD, NONE, NONE, AEID, NONE, NONE, TCND |
| quantitative: | NONE, TAMT |
| quota: | NONE, TAMT, TAMT |

| | |
|---|---|
| radiation: | AORD, AMDR, NONE, NONE, NONE, NONE, TCNV |
| raise: | ALDH, TAMT, NONE, TACH, AORD, TSRC, AORD, NONE NONE, TSRC, AMDR, AFRM, NONE, ALDH, NONE, NONE, TSRC, TAMT, APHP, NONE, AGDM, NONE, NONE, TCSE, NONE, NONE |
| random: | NONE, NONE, NONE, AORD |
| range: | TSPL, APOS, TCNV, TDGR, TAMT, AMDR, AGDM, NONE NONE, TSPL, APOS, NONE, NONE, ALDM, NONE, TSPL, APOS, AGDM, TRNG, NONE, NONE, AGDM, AORD, AORD, TSPL, APOS, AGDM, TCNV, TCNV |
| rapid: | ASTE, TTIM, AGMT, ALDH |
| rate: | TAMT, AGMT, TAMT, TDGR, TAMT, TAMT, TAMT, TAMT TCMP, NONE, AORD, NONE, TCMP, NONE, AORD, TAMT, TAMT, NONE, AORD, TAMT |
| rates: | TAMT, AGMT, TAMT, TDGR, TAMT, TAMT, TAMT, TAMT TCMP, NONE, AORD, NONE, TCMP, NONE, AORD, TAMT, TAMT, NONE |
| rather: | NONE, NONE, AVAR, TAMT, NONE, TDGR, TAMT NONE, NONE, NONE |
| rationale: | NONE, TCSE |
| reached: | ASTE, TDGR, TAMT, AGDM, NONE, ALDM, TSPL APOS, AGDM, TDST, AMDR, NONE, NONE, TDST, AMDR, NONE, NONE, TAMT, NONE, TSPL, APOS, AGDM, TCNV, NONE, TCNV |
| real: | TAMT, NONE, NONE, NONE, NONE, TAMT, NONE, NONE, TAMT |
| received: | TSNF, NONE, NONE, NONE, NONE, NONE, NONE, NONE TTIM, NONE, TTIM, TTIM |
| recently: | TTIM, TTIM |
| recognition: | NONE, NONE, NONE, TRES, NONE, NONE, NONE, NONE, NONE, NONE, NONE, TRES, NONE, NONE, NONE, NONE |
| recommend: | NONE, NONE, NONE, NONE, TCSE |
| record: | TDUR, TTIM, NONE, NONE, NONE, NONE, TAMT, NONE NONE, NONE, NONE |
| redemption: | NONE, AVAR, NONE, NONE, NONE, NONE, NONE |
| reduce: | TAMT, TAMT, NONE, AGDM, AVAR, TAMT, NONE, AMDR NONE, TAMT, NONE, TAMT, NONE, TCND, TAMT, NONE, NONE, ALDM, NONE, TAMT, ALDM, NONE, TAMT, NONE |
| reduces: | TAMT, TAMT, NONE, AGDM, AVAR, TAMT, NONE, AMDR NONE, TAMT, NONE, TAMT, NONE, TCND, TAMT, NONE, NONE, ALDM, NONE, TAMT, ALDM, NONE, TAMT, NONE |
| reduction: | TAMT, AGDM, AVAR, TAMT, NONE, AMDR, TAMT, TAMT TAMT, NONE, NONE, NONE, ALDM, NONE, NONE |
| reductions: | TAMT, AGDM, AVAR, TAMT, NONE, AMDR, TAMT, TAMT, TAMT, NONE, NONE, NONE, ALDM, NONE, NONE |
| refer: | NONE, AUSE, NONE, NONE, NONE, NONE, NONE, NONE NONE |
| refers: | NONE, AUSE, NONE, NONE, NONE, NONE, NONE, NONE NONE |
| reform: | AVAR, NONE, AVAR, AVAR, AVAR, NONE, NONE, NONE NONE, NONE |
| regional: | NONE, TSPL, APOS, TSPL, APOS |
| regulate: | NONE, NONE, NONE, NONE, NONE, NONE, AORD, AORD TCND |
| regulation: | NONE, NONE, NONE, NONE, NONE, AORD, NONE, AORD, NONE, NONE, AORD |
| relatively: | TCMP, NONE, TAMT |
| releases: | NONE, NONE, AORD, NONE, NONE, TINS, NONE, NONE NONE, NONE, TAMT, NONE, NONE, NONE, NONE, TAMT, AORD, AMDR, NONE, NONE, NONE, NONE, NONE, NONE, NONE |
| relief: | NONE, NONE, NONE, NONE, TDUR, TTIM, APHP, AEID NONE, AFRM, NONE, NONE, NONE, NONE, AVAR, TDUR, TTIM, NONE |
| rendered: | NONE, AVAR, NONE, NONE, NONE, NONE, AMDR, NONE NONE, ATMP, TAMT, NONE, NONE, NONE |
| repair: | TCND, NONE, NONE, NONE, NONE |
| repayment: | TAMT, TAMT, NONE |
| repayments: | TAMT, TAMT, NONE |
| repays: | NONE, TAMT, NONE, TAMT, NONE |
| repercussions: | NONE, TRES, NONE, NONE, AMFR |
| replace: | TTIM, AMDR, NONE, AVAR |
| report: | NONE, NONE, NONE, TCMP, NONE, NONE, NONE, NONE TINS, NONE, NONE, NONE, NONE, NONE, NONE, TINS, NONE, TCMP, NONE, NONE, NONE |
| reports: | NONE, NONE, NONE, TCMP, NONE, NONE, NONE, NONE TINS, NONE, NONE, NONE, NONE, NONE, NONE, TINS, NONE, TCMP, NONE, NONE, NONE |
| reside: | NONE, NONE, TSPL, APOS |
| resign: | NONE, AUSE, NONE, NONE, NONE, NONE |
| resignation: | NONE, NONE, NONE, AUSE, NONE, NONE, NONE, NONE resistance:TCNV, NONE, NONE, NONE, NONE, NONE, APHP, NONE, NONE, NONE, NONE, NONE, NONE, APHP, NONE, NONE, NONE |
| resources: | NONE, TAMT, TMNS, NONE |
| responsible: | NONE, TAMT, NONE, NONE |
| restructure: | AVAR, AORD, NONE |
| restructuring: | AVAR, AORD, NONE |
| result: | TRES, TRES, TRES, TRES, TTIM, TRES, NONE |
| results: | TRES, TRES, TRES, TRES, TTIM, TRES, NONE |
| retains: | NONE, NONE, NONE, NONE, AVAR, AVAR |
| retires: | AFRM, NONE, NONE, NONE, NONE, AUSE, AMDR, NONE AMDR, TAMT, AMDR, NONE, AMDR, NONE |
| retrieved: | TCNV, NONE, NONE, NONE |
| return: | TRES, NONE, TDST, AMDR, TAMT, TTIM, NONE, AMFR TAMT, NONE, AMDR, NONE, TAMT, NONE, NONE, AVAR, TRES, TAMT, NONE, AVAR, NONE, TTIM, AMDR, NONE, NONE, AVAR, AMDR, TAMT |
| returns: | NONE, NONE, TAMT, TAMT, NONE |
| rev: | AGMT |
| revenues: | TAMT |
| review: | NONE, NONE, NONE, TCMP, NONE, NONE, TAMT, NONE NONE, NONE, NONE, NONE, NONE, NONE, NONE, NONE, TCMP, NONE, NONE, NONE, TAMT, NONE, NONE, NONE, NONE |
| rise: | ALDH, NONE, AMDR, AVAR, ALDM, NONE, TAMT, NONE AMFR, ALDM, TCSE, ASTE, NONE, AMDR, TSRC, AORD, ALDH, ASTE, NONE, AMDR, NONE, ALDM, TAMT, APHP, NONE, AGMT, TRES, NONE, NONE, ALDH |
| risk: | NONE, NONE, TAMT, NONE, NONE, NONE, NONE, NONE TAMT, NONE, NONE |
| road: | ASTE, NONE, TSPL, THAN, APOS, THAN, TCNV |
| role: | TCND, AUSE, NONE, NONE |
| route: | THAN |
| routine: | NONE, NONE, NONE, AORD, THAN, TTIM, NONE, TAMT, AORD, AORD |
| rule: | TAMT, NONE, NONE, NONE, NONE, NONE, NONE, NONE, NONE NONE, NONE, NONE, NONE, AORD, AFRM, TAMT, NONE, NONE, NONE, NONE, NONE, TCMP, NONE, AORD |
| rules: | TAMT, NONE, NONE, NONE, NONE, NONE, NONE, NONE NONE, NONE, NONE, NONE, NONE, AORD, AFRM, TAMT, NONE, NONE, NONE, NONE, NONE, TCMP, NONE, AORD |
| ruling: | NONE, TCMP, NONE, NONE, TAMT, NONE, NONE, NONE, AORD |
| runs: | AMDR |
| satellites: | TACH, AORD, TSPL, APOS, AMDR, NONE, TCNV, TACH, NONE, TCNV, TCNV, NONE, TAMT, NONE, NONE, NONE |
| save: | NONE, TAMT, NONE, AUSE, NONE, NONE, NONE, NONE, NONE NONE, NONE, AORD, TAMT, TCND |
| savings: | TAMT, NONE |
| scale: | TAMT, AEID, NONE, AEID, TDGR, TAMT, AEID, NONE, AMDR TPUR, NONE, NONE, TSPL, APOS, AGDM, AMDR, APHP, AMDR, TAMT, AEID, AEID, NONE |
| schedule: | TAMT, TPUR, NONE, NONE, TAMT, TAMT, TPUR, NONE |
| scheduled: | TAMT, TPUR, NONE |
| scheduling: | TAMT, TPUR, NONE |
| scheme: | NONE, TPUR, TAMT, TPUR, NONE, NONE, NONE, NONE TPUR, NONE, TPUR |
| schemes: | NONE, TPUR, TAMT, TPUR, NONE, NONE, NONE, NONE TPUR, NONE, TPUR |
| screen: | AORD, NONE, AEID, AEID, ALDM, AFRM, NONE, NONE NONE, NONE, NONE, NONE, NONE, NONE, AORD, NONE, AEID, NONE, TCMP, NONE, NONE, NONE, AORD, NONE, NONE |
| sec: | TDUR, TTIM, NONE, NONE |
| secondary: | ACOL, NONE, TAMT, NONE, AEID, NONE, AVAR, TAMT NONE, TAMT, AVAR, NONE, NONE |
| securities: | NONE, NONE, NONE, NONE, NONE, NONE, NONE, AVAR, NONE |
| security: | NONE, NONE, NONE, NONE, NONE, NONE, NONE, AVAR, NONE |
| selection: | NONE, NONE, NONE, AORD, NONE, AORD |
| sell: | NONE, NONE, NONE, TCSE, NONE, NONE, NONE, NONE, NONE |
| selling: | TCSE, NONE, NONE, NONE |
| sells: | NONE, NONE, NONE, TCSE, NONE, NONE, NONE, NONE, NONE |
| separate: | TAMT, AORD, AEID, NONE, AORD, TCMP, NONE, NONE, AMDR TAMT, NONE, AGDM, AFRM, TAMT, AEID, NONE, NONE, AORD, NONE, TAMT, NONE, TAMT, NONE, NONE |
| series: | AORD, TTIM, NONE, NONE, AMDR, TAMT, AORD, TACH, AORD |
| service: | TMNS, NONE, AUSE, NONE, NONE, NONE, AMDR, NONE NONE, NONE, NONE, NONE, AMDR, NONE, TCNV, NONE, NONE, AMFR, NONE, AGND, NONE |

| | |
|---|---|
| services: | THNS, NONE, AUSE, NONE, NONE, NONE, AMDR, NONE NONE, NONE, NONE, NONE, AMDR, NONE, TCNV, NONE, NONE, AMFR, NONE, AGND, NONE |
| servicing: | THNS, NONE, AUSE, NONE, NONE, NONE, AMDR, NONE NONE, NONE, NONE, NONE, AMDR, NONE, TCNV, NONE, NONE, AMFR, NONE, AGND, NONE |
| serving: | AMDR, TCNV, NONE, NONE, NONE |
| settle: | NONE, NONE, AORD, TCMP, NONE, AMDR, TCNV, APHP NONE, AMDR, TSPL, APOS, NONE, NONE, AORD, TAMT, NONE, NONE, NONE, NONE, NONE, NONE, NONE, AMDR, AVAR, NONE |
| settled: | NONE, NONE, TGOL, AORD, AVAR, NONE, AVAR, NONE NONE, TSPL, APOS, NONE, TAMT, NONE |
| settlement: | NONE, TACM, NONE, NONE, TSPL, APOS, NONE, TAMT, NONE, NONE, NONE, NONE, TSPL, APOS |
| severe: | NONE, ATMP, NONE, NONE, NONE, NONE, NONE, NONE NONE, TAMT, NONE, NONE, NONE, NONE |
| shapes: | NONE, AORD, TCND, AFRM, AFRM, NONE, NONE, AORD TCND, NONE, AFRM, AFRM, AORD, TSRC, AFRM, NONE, NONE, TPUR |
| share: | NONE, NONE, TAMT, NONE, NONE, NONE, NONE |
| shares: | NONE, NONE, TAMT, NONE, NONE, NONE, NONE |
| shift: | AVAR, AEID, AVAR, AMDR, NONE, NONE, TCNV, TDUR TTIM, NONE, NONE, AVAR, NONE, TCNV, AVAR, AMDR, NONE, NONE, AVAR, NONE, AGMT, TCNV, NONE |
| ships: | TCNV, TCNV, TCNV, TCNV, TCNV, TCNV, TSPL APOS, TCNV |
| short: | NONE, NONE, NONE, NONE, ALDM, TDUR, TTIM NONE, AMDR, NONE, NONE, TAMT, TAMT, AGDM, ALDM, NONE, TAMT, NONE, ALDM |
| shorter: | TAMT |
| shortfall: | AMDR, NONE |
| showing: | NONE, NONE, NONE, NONE, AEID, NONE, TRNG |
| shuttle: | TCNV, ALDM, AMDR, TCNV, AMDR |
| similar: | NONE, TCMP, TCMP |
| simple: | NONE, NONE, NONE, NONE, TSPL, APOS, NONE NONE, NONE, NONE, NONE, TAMT, NONE, TAMT, NONE, TAMT, ACOL, NONE, NONE |
| simply: | NONE, NONE, NONE, NONE, NONE, NONE, TAMT TAMT, NONE, TAMT |
| simulated: | NONE, NONE, TCMP |
| simulating: | NONE, NONE, NONE, NONE, TCMP |
| simultaneous: | TACM, AORD, TTIM |
| single: | TAMT, NONE, AORD, TAMT, TAMT, NONE |
| slip: | TCNV, NONE, TCNV, NONE, NONE, NONE, NONE TTIM, NONE, AGDM, NONE, ASTE, AEID, NONE, NONE, AMDR, TTIM, ALDM, ALDM, NONE, TTIM, NONE, NONE, NONE, TCNV, TTIM, NONE, NONE, NONE, TCNV, NONE, NONE, AMDR, NONE |
| slowdown: | NONE, TAMT, TTIM, TAMT, AGMT, NONE |
| soil: | NONE, ASTE, TSPL, APOS, ASTE, NONE, NONE NONE, NONE, NONE, NONE |
| solid: | APHP, TAMT, TACM, AORD, APHP, NONE, NONE APHP, AVAR, NONE, TAMT, AVAR, NONE, NONE, NONE, TAMT, NONE |
| solutions: | TRES, NONE, NONE, NONE, ASTE, ASTE |
| solving: | TRES |
| sometimes: | TTIM |
| source: | ASTE, TINS, TCSE, TCSE, NONE |
| space: | TCNV, AGDM, NONE, TDGR, TAMT, AGDM, TSPL APOS, AGDM, NONE, NONE, AFRM, TDUR, TTIM, TSPL, APOS, TTIM, NONE, AORD, AGDM, NONE, TSPL, APOS |
| speaking: | NONE, NONE, NONE, NONE, TCMP, NONE |
| specialized: | AORD |
| specific: | AORD, NONE, AEID, AORD, TCND, AORD |
| specifications: | AEID, TCND, NONE, AORD, NONE, NONE, TCND |
| specified: | TCND |
| speculation: | NONE, NONE, TAMT, NONE, NONE, NONE, NONE, NONE |
| spending: | AUSE, TAMT, NONE, NONE, AUSE, TAMT |
| spill: | ALDM, ATMP, ASTE, AFRM, ALDM, AMDR, NONE NONE, ASTE, TAMT |
| sponsoring: | TAMT, NONE, TACM, NONE, TAMT, NONE, NONE |
| staff: | NONE, NONE, NONE, NONE, NONE, NONE, ALDM ALDM, ALDM, NONE |
| standard: | ALDM, TDGR, TAMT, NONE, NONE, NONE, NONE NONE, ALDM, NONE, AORD, NONE, NONE, NONE, TCMP, AVAR, TAMT, NONE, NONE, NONE, AORD, AORD |
| standards: | ALDM, TDGR, TAMT, NONE, NONE, NONE, NONE NONE, ALDM, NONE, AORD, NONE, NONE, NONE, TCMP, AVAR, TAMT, NONE, NONE, NONE, AORD, AORD |
| star: | NONE, NONE, NONE, NONE, NONE, NONE, NONE NONE, NONE, NONE, TAMT, NONE, NONE, NONE, NONE, NONE, TAMT, TAMT |
| start: | TAMT, TSRC, AORD, AEID, AMFR, AMDR, AMDR, NONE NONE, NONE, TSRC, AORD, NONE, TAMT, AMDR, NONE, AMDR, AMFR, NONE, AMFR, NONE |
| state: | TCND, TSPL, APOS, TSPL, APOS, NONE, NONE, NONE NONE, NONE, NONE, NONE, NONE, AORD, NONE |
| statement: | NONE, NONE, NONE, TAMT, TINS, NONE, TAMT, NONE TAMT, NONE, NONE, NONE, NONE |
| states: | TCND, TSPL, APOS, TSPL, APOS, NONE, NONE, NONE NONE, NONE, NONE, NONE, NONE, AORD, NONE, TSPL, APOS |
| station: | AORD, NONE, NONE, NONE, TDGR, TAMT, TCND, TSPL APOS, TSPL, APOS |
| statistics: | TAMT, NONE |
| status: | AORD, NONE, TDGR, TAMT, TCND, TCND, TSPL, APOS |
| step: | NONE, NONE, NONE, TDGR, TAMT, NONE, TCNV, NONE AEID, NONE, NONE, AGMT, AGDM, AMDR, TCNV, NONE, AGMT, AMDR, TCNV |
| stimulate: | AMDR, NONE, NONE, NONE, TCSE, NONE, NONE |
| stock: | NONE, NONE, NONE, NONE, NONE, ASTE, NONE, NONE NONE, NONE, NONE, NONE, NONE, THNS, TCSE, NONE, AMDR, NONE, NONE, NONE, NONE, NONE, NONE, NONE, AORD |
| storage: | NONE, TAMT, TSPL, APOS, NONE, NONE |
| strategies: | TPUR, NONE, NONE |
| strategy: | TPUR, NONE, NONE |
| street: | TSPL, THAN, APOS |
| strengths: | NONE, NONE, NONE, TAMT, NONE, NONE, NONE, TAMT NONE, NONE, APHP, NONE |
| study: | NONE, NONE, NONE, NONE, NONE, NONE, NONE, NONE TPUR, NONE, NONE, NONE, NONE, NONE, TSPL, APOS, NONE, NONE, NONE, NONE, NONE, NONE, NONE, NONE, NONE, NONE |
| subject: | NONE, NONE, NONE, NONE, NONE, NONE, NONE, NONE NONE, NONE, NONE, NONE, NONE, TAMT, NONE |
| subsidies: | NONE, NONE, TAMT, NONE, TAMT, ALDM |
| succeed: | NONE, NONE, NONE, NONE, NONE, TTIM, AORD, TBNF NONE, NONE, AVAR, NONE |
| success: | NONE, NONE, NONE, NONE, NONE, TAMT, NONE |
| suggest: | NONE, NONE, TINS, NONE, NONE, NONE, NONE, NONE NONE, TCMP |
| suggesting: | NONE, NONE, TINS, NONE, NONE, NONE, NONE, NONE, NONE, TCMP |
| suit: | NONE, NONE, NONE, NONE, NONE, TACM, AORD, NONE AEID, AEID, NONE, AORD, NONE, AEID |
| supplies: | AMDR, NONE, NONE |
| supply: | NONE, THNS, NONE, NONE, NONE, NONE |
| supplying: | NONE, THNS, NONE, NONE, NONE, NONE |
| support: | NONE, NONE, NONE, ALDM, ALDM, NONE, NONE, TAMT AMDR, TACM, NONE, TAMT, NONE, NONE, ALDM, NONE, NONE, TAMT, ALDM, NONE, NONE, NONE, NONE, NONE, TAMT, NONE, NONE, NONE, TAMT, NONE, NONE, NONE, NONE, NONE, NONE |
| surge: | AMDR, NONE, ASTE, TAMT, ASTE, AMDR, AMDR, ASTE NONE, AMDR, ASTE, ASTE, TACM, AORD, AMDR |
| swap: | NONE, AVAR, NONE, AVAR, NONE, NONE |
| swaps: | NONE, AVAR, NONE, AVAR, NONE, NONE |
| switch: | TAMT, AVAR, AVAR, AVAR, AEID, NONE, NONE, AVAR NONE, NONE, NONE, AVAR, AVAR, NONE, AVAR, NONE, TCNV, AMDR |
| switching: | TAMT, AVAR, AVAR, AVAR, AEID, NONE, NONE, AVAR NONE, NONE, NONE, AVAR, AVAR, NONE, AVAR, NONE, TCNV, AMDR |
| symposium: | NONE, NONE, AMDR, TACM, AORD, NONE |
| symptoms: | NONE, NONE, TINS, NONE, NONE, NONE |
| system: | NONE, NONE, AORD, AORD, TPUR, NONE, TMAN |
| systems: | NONE, NONE, AORD, AORD, TPUR, NONE, TMAN |
| taking: | NONE, TBNF, NONE, NONE, NONE, NONE, NONE, NONE, NONE |
| takes: | NONE, NONE, NONE, NONE, TAMT, NONE, NONE, NONE, NONE ATMP, NONE, NONE, AMDR, NONE, AORD, NONE, NONE, TBNF, NONE, NONE, NONE, NONE, NONE, TCNV, NONE |

| | |
|---|---|
| target: | NONE, NONE, TPUR |
| tariffs: | TAMT |
| tax: | NONE, NONE, NONE, TAMT, NONE, APHP, TAMT, NONE NONE, NONE |
| taxes: | NONE, NONE, NONE, TAMT, NONE, APHP, TAMT, NONE NONE, NONE |
| technical: | NONE, NONE, NONE, AORD, NONE |
| technique: | NONE, NONE, NONE, NONE, TMAN |
| temperature: | ATMP |
| tender: | NONE, TCNV, NONE, NONE, TAMT, NONE, NONE, TTIM NONE, NONE, APHP, NONE, NONE, TCNV, NONE, APHP, ACOL, NONE term:AEID, TTIM, TCOL, AORD, TDUR, TTIM, NONE, NONE TDUR, TTIM, TDUR, TTIM, NONE, NONE, NONE |
| terms: | TCND, NONE |
| test: | NONE, NONE, NONE, NONE, NONE, NONE, AEID, NONE NONE, NONE, NONE |
| tests: | NONE, NONE, NONE, NONE, NONE, NONE, AEID, NONE NONE, NONE, NONE |
| texas: | TSPL, APOS |
| text: | NONE, NONE, NONE, TAMT, NONE, NONE, NONE, NONE NONE |
| thailand: | TSPL, APOS |
| themselves: | AORD |
| therefore: | TCND, TRES, NONE, TCMP |
| thin: | ALDM, NONE, AORD, ASTE, APHP, AGDM, TAMT, NONE TAMT, NONE, AGDM, NONE, NONE, APHP, ALDM, NONE, AGDM, ALDM, TAMT, NONE, ALDM |
| third: | NONE, NONE, TAMT, TAMT, TAMT |
| though: | TAMT |
| thus: | NONE, NONE, TMAN, TCMP, TCND |
| tie: | TAMT, NONE, NONE, NONE, AEID, TACM, TAMT, AEID NONE, NONE, TTIM, TACM, TAMT, NONE, TAMT, TACM, TAMT, NONE, NONE, NONE, AVAR |
| tiny: | TAMT, AGDM |
| tipster: | NONE, TINS, NONE |
| tissue: | NONE, NONE, ALDM, AFRM, ALDM |
| title: | NONE, NONE, AORD, NONE, NONE, NONE, NONE NONE, NONE, NONE, NONE |
| today's: | TTIM, TTIM |
| tomorrow: | TTIM, TTIM |
| tools: | NONE, TINS, NONE, TINS, TMNS, NONE, TINS, NONE, TINS |
| top: | TAMT, AEID, NONE, AEID, NONE, AEID, AMDR, AMDR ALDM, AEID, ALDM, ALDM, ALDM, AEID, TAMT, TAMT, ALDM, TAMT, NONE, NONE |
| towards: | AEID, AMDR |
| town: | TSPL, APOS, TSPL, APOS, TSPL, APOS |
| trade: | NONE, NONE, NONE, NONE, AVAR, NONE, NONE, NONE, NONE AVAR, NONE, NONE |
| trading: | NONE, AVAR, NONE, NONE |
| trains: | TACM, AORD, NONE, NONE, NONE, TCNV, AORD, NONE, AMDR NONE, AMFR, NONE, NONE |
| transfers: | NONE, NONE, NONE, TCNV, NONE, NONE, NONE, NONE, TCNV |
| transition: | AVAR, AVAR, TCNV |
| transitions: | AVAR, AVAR, TCNV |
| transmission: | TINS, TINS, NONE, TINS, NONE, NONE, TCNV transmitting:NONE, NONE, NONE, TCNV, TCNV, NONE, NONE |
| treat: | AMDR, TAMT, AMDR, NONE, NONE, NONE, AUSE NONE, NONE, NONE, TAMT, NONE, NONE, NONE |
| treated: | AMDR, TAMT, AMDR, NONE, NONE, NONE, AUSE NONE, NONE, NONE, TAMT, NONE, NONE, NONE |
| treatment: | NONE, NONE, NONE, NONE, NONE, NONE, AUSE |
| treatments: | NONE, NONE, NONE, NONE, NONE, NONE, AUSE |
| trend: | AGMT, AMDR, NONE, NONE, ASTE, AMDR, AMDR, ASTE, NONE |
| trends: | AGMT, AMDR, NONE, NONE, ASTE, AMDR, AMDR, ASTE, NONE |
| trials: | NONE, NONE, NONE, NONE, NONE, NONE, NONE, NONE, NONE, NONE, NONE, NONE, NONE, TAMT |
| triangle: | NONE, AFRM, NONE, TINS, NONE, AFRM, TAMT |
| tries: | NONE, NONE, NONE, NONE, TCMP, NONE, NONE, NONE, NONE |
| turbulence: | AMDR, TCNV, TCNV, AORD, NONE, AFRM, NONE |
| turkey: | NONE, AMDR, NONE |
| type: | NONE, AFRM, AORD, NONE, NONE, NONE, AORD, NONE, NONE, NONE, NONE, AORD, NONE, NONE, NONE, AORD, NONE |
| types: | NONE, AFRM, AORD, NONE, NONE, NONE, AORD, NONE, NONE, NONE, NONE, AORD, NONE, NONE, NONE, AORD, NONE |
| typically: | AORD, NONE, NONE, AORD, NONE |
| u.s.: | TSPL, APOS |
| unit: | NONE, NONE, TAMT, NONE, TAMT, NONE, NONE, NONE, APHP |
| united: | TAMT, TACM, NONE, TAMT, TACM, TAMT |
| units: | NONE, NONE, TAMT, NONE, TAMT, NONE, NONE, NONE, APHP |
| unlimited: | NONE, TAMT, NONE, NONE, TCND, NONE |
| upgrade: | ALDM, AMDR, NONE, NONE, AMDR, ALDM, ALDM |
| upgrades: | ALDM, AMDR, NONE, NONE, AMDR, ALDM, ALDM |
| upon: | TTIM, AGDM, ALDM, TMNS, NONE, AEID, AMDR |
| upward: | AMDR, AGMT, ALDM, AMDR |
| user: | NONE, AUSE, AUSE |
| users: | NONE, AUSE, AUSE |
| uses: | AUSE, NONE, AUSE, NONE, AUSE, NONE, AUSE, NONE, NONE, AUSE, AUSE, NONE, AUSE, NONE |
| using: | AUSE, NONE, AUSE, NONE, AUSE, NONE, AUSE, NONE, NONE, AUSE, AUSE, NONE, AUSE, NONE |
| usually: | NONE, TTIM, AORD, AORD |
| value: | NONE, NONE, AUSE, ACOL, NONE, NONE, NONE, NONE, TAMT, TAMT, TCMP, NONE, TAMT, NONE, NONE |
| valued: | NONE, TAMT, NONE |
| variety: | AORD, AVAR, NONE, AVAR, AORD, TACM, AORD, NONE, NONE, TAMT, NONE, NONE |
| vehicle: | TCNV, TMNS, ACOL, NONE, NONE |
| venture: | NONE, TAMT, NONE, NONE, NONE, NONE, NONE, TAMT, NONE, NONE, NONE |
| ventures: | NONE, TAMT, NONE, NONE, NONE, NONE, NONE, TAMT, NONE, NONE, NONE |
| vice: | NONE, NONE, NONE, NONE, NONE, AVAR |
| victimized: | NONE, NONE, TAMT, AUSE |
| violation: | NONE, NONE, NONE, NONE, AUSE, AUSE, NONE, NONE, NONE, NONE |
| volatility: | NONE, NONE, NONE, APHP, NONE, TDUR, TTIM, ASTE |
| volume: | NONE, NONE, AGDM, NONE, NONE, TAMT, TAMT, AGDM, TSPL, APOS |
| voluntary: | NONE, AORD, NONE, TPUR, NONE, NONE |
| vs: | NONE, AEID |
| waterways: | ASTE, TCNV, ASTE |
| western: | AMDR, NONE, NONE |
| white: | NONE, ACOL, NONE, ACOL, ACOL, ACOL, TTIM, NONE, NONE, NONE, ACOL, ACOL, ACOL, NONE |
| wide: | ALDM, NONE, NONE, AORD, AORD, NONE, TSPL, APOS, AGDM, AGDM, AGDM |
| win: | NONE, NONE, TAMT, NONE, TCSE |
| window: | AFRM, NONE |
| windows: | AFRM, NONE |
| wire: | ALDM, NONE, NONE, TACM, TAMT, NONE |
| within: | AEID, AEID |
| without: | AEID, AORD, NONE, TAMT, NONE |
| working: | NONE, NONE, NONE, NONE, TRES, AUSE, NONE, NONE, NONE, NONE, APHP, NONE |
| works: | NONE, NONE, AEID, TINS, NONE, TAMT |
| world: | NONE, TAMT, NONE, TSPL, APOS, NONE |
| worldwide: | AORD |
| worm: | NONE, NONE, NONE, NONE, TCNV, AGMT, AFRM |
| year: | TDUR, TTIM |
| yet: | TAMT, TAMT, TTIM, TTIM |

I claim:

1. A Computer implemented method for ranking documents being searched in a database by a word query according to text relevancy comprising the steps of:

(a) inputting a word query to a computer database of documents;

(b) selecting each document by the word query;

(c) determining a real value number for each document, comprising the steps of:

(i) calculating a first importance value for each word in the selected document;

(ii) calculating a second importance value for each word in the query that matches a word in the document;

(iii) determining a probability value for each word in the query matching a semantic category;

(iv) determining a probability value for each word in the document matching a semantic category;

(v) adjusting for each word in .the query that does not exist in the database of the document;

(vi) repeating steps (i) to (iv) for each adjusted word;

(vii) calculating weights of a semantic component in the query based on the importance value, the probability value and frequency of the word in the document;

(viii) calculating weights of a semantic component in the document based on the importance value, the probability value and frequency of word in the query;

(ix) multiplying query component weights by document component weights into products; and (x) adding the products together to represent the real-value number for the selected document; and (d) repeating step (c) for each additional document selected by the query; and (e) sorting the documents of the database according to their respective real value numbers.

2. The computer implemented method for ranking documents of claim 1, wherein the inputting step further includes:

imputing a natural language word query.

3. The computer implemented method for ranking documents of claim 1, wherein the calculating the first and the second importance values is based on $\mathrm{Log}_{10}(N/df)$, wherein N=total number of documents, and df=number of documents each word is located within.

4. The computer implemented method for ranking documents of claim 1, wherein the semantic category further includes:

correlating a semantic lexicon of approximately 36 semantic categories between the word query and each document.

5. The computer implemented method for ranking documents of claim 1, wherein the size of each document is chosen from at least one of:

a word, a sentence, a line, a phrase and a paragraph.

6. A computer implemented method of routing and filtering documents to topics comprising the steps of:

breaking down each document for routing into small portions of up to approximately 250 words in length;

calculating importance values of each word in both topics and the small portions of the documents;

determining real value numbers for each of the small portions of document to each topic based on the importance values;

calculating the real value number for the selected document based on adding the real value numbers of the small portions of the selected document;

routing each document according to their respective real value numbers to one or more topics; and sorting the routed documents at each topic.

7. A computer implemented method of routing and filtering documents to topics of claim 6, wherein the calculating step is based on $\mathrm{Log}_{10}(NT/dft)$, where NT is the total number of topics and dft is the number of topics each word is located within.

8. A computer implemented method of routing and filtering documents to topics of claim 6, wherein the size of each of the small portions are chosen from at least one of:

a word, a line, a sentence, and a paragraph.

9. A computer implemented method of routing and filtering documents to topics of claim 6, wherein the determining a real value number step further includes the steps of:

(i) calculating a first importance value for each word in the selected portion;

(ii) calculating a second importance value for each word in the query that matches a word in the selected portion;

(iii) determining a probability value for each word in the query matching a semantic category;

(iv) determining a probability value for each word in the selected portion matching a semantic category;

(v) adjusting for each word in the query that does not exist in the selected portion;

(vi) repeating steps (i) to (iv) for each adjusted word;

(vii) calculating weights of a semantic component in the query based on the importance value, the probability value and frequency of the word in the selected portion;

(viii) calculating weights of a semantic component in the selected portion based on the importance value, the probability value and frequency of word in the query;

(ix) multiplying query component weights by selected portion component weights into products; and (x) adding the products together to represent the real-value number for the selected document; and repeating steps (i) to (x) for each additional document selected.

* * * * *